US012351479B2

(12) United States Patent
Hu et al.

(10) Patent No.: US 12,351,479 B2
(45) Date of Patent: Jul. 8, 2025

(54) FAUCET WATER PURIFIER AND FILTERING DEVICE FOR USE IN FAUCET WATER PURIFIER

(71) Applicant: YUYAO YADONG PLASTIC CO., LTD., Zhejiang (CN)

(72) Inventors: Jizong Hu, Yuyao (CN); Zhenlin Chu, Yuyao (CN); Xiaozong Hu, Yuyao (CN)

(*) Notice: Subject to any disclaimer, the term of this patent is extended or adjusted under 35 U.S.C. 154(b) by 679 days.

(21) Appl. No.: 17/628,199

(22) PCT Filed: Jul. 13, 2020

(86) PCT No.: PCT/CN2020/101740

§ 371 (c)(1),
(2) Date: Jan. 18, 2022

(87) PCT Pub. No.: WO2021/008505

PCT Pub. Date: Jan. 21, 2021

(65) Prior Publication Data

US 2022/0259067 A1 Aug. 18, 2022

(30) Foreign Application Priority Data

Jul. 18, 2019 (CN) ........................ 201910651142.7
Jan. 17, 2020 (CN) ........................ 202010052563.0
(Continued)

(51) Int. Cl.
*C02F 1/00* (2023.01)
*B01D 35/04* (2006.01)
(Continued)

(52) U.S. Cl.
CPC .............. *C02F 1/003* (2013.01); *B01D 35/04* (2013.01); *C02F 1/444* (2013.01);
(Continued)

(58) Field of Classification Search
CPC . B01D 35/04; B01D 35/046; F16K 2200/501; F16K 11/0743; F16K 11/0746;
(Continued)

(56) References Cited

U.S. PATENT DOCUMENTS 4,147,631 A * 4/1979 Deines .................... C02F 1/003 210/288
4,770,768 A * 9/1988 Lang ......................... C02F 1/28 210/232
(Continued)

FOREIGN PATENT DOCUMENTS

CN 2725659 Y 9/2005
CN 201305482 Y 9/2009
(Continued)

OTHER PUBLICATIONS

WO-2013155878-A1, Hu , Translation (Year: 2013).*

*Primary Examiner* — Daphne M Barry
(74) *Attorney, Agent, or Firm* — Tsz Lung Yeung

(57) ABSTRACT

Provided by the present invention is a faucet water purifier, a control valve and a disk assembly for a faucet water purifier, which comprises a control valve and a filtering device, wherein the filtering device defines a first communicating opening, a second communicating opening and a third communicating opening, the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening is communicated with the first communicating opening of the filtering device, the second opening is communicated with the second communicating opening of the filtering device, the fourth opening is communicated with the third communicating opening of the filtering device, the third opening is
(Continued)

communicated with a water outlet of the filtering device, and the raw water inlet of the valve body is adapted to be communicated with a raw water source.

12 Claims, 76 Drawing Sheets

(30) Foreign Application Priority Data

| | | |
|---|---|---|
| Jan. 17, 2020 | (CN) | 202010053469.7 |
| Jan. 17, 2020 | (CN) | 202020112904.4 |
| Jan. 17, 2020 | (CN) | 202020113042.7 |
| Jan. 17, 2020 | (CN) | 202020113435.8 |
| Jan. 17, 2020 | (CN) | 202020113607.1 |
| Jan. 17, 2020 | (CN) | 202020113926.2 |
| Jan. 17, 2020 | (CN) | 202020114173.7 |
| Apr. 3, 2020 | (CN) | 202020483754.8 |
| Apr. 3, 2020 | (CN) | 202020484268.8 |
| Apr. 3, 2020 | (CN) | 202020487506.0 |

(51) Int. Cl.

| | |
|---|---|
| ***C02F 1/44*** | (2023.01) |
| ***F16K 11/074*** | (2006.01) |
| ***F16K 11/085*** | (2006.01) |
| ***F16K 27/04*** | (2006.01) |

(52) U.S. Cl.
CPC ...... *F16K 11/0743* (2013.01); *F16K 11/0746* (2013.01); *F16K 11/0856* (2013.01); *F16K 27/045* (2013.01); *C02F 2201/005* (2013.01); *C02F 2303/16* (2013.01); *C02F 2307/06* (2013.01)

(58) Field of Classification Search
CPC .... F16K 11/0856; F16K 27/045; C02F 1/003; C02F 1/444; C02F 2201/005; C02F 2303/16; C02F 2307/06
USPC .......................................................... 137/801
See application file for complete search history.

(56) References Cited

U.S. PATENT DOCUMENTS

| | | | | |
|---|---|---|---|---|
| 5,160,038 A * | 11/1992 | Harada | C02F 1/444 | 210/282 |
| 5,164,082 A * | 11/1992 | Lin | B01D 35/043 | 210/287 |
| 5,242,589 A * | 9/1993 | Kuo | B01D 29/668 | 210/264 |
| 5,628,900 A * | 5/1997 | Naito | B01D 24/12 | 210/287 |
| 6,135,151 A * | 10/2000 | Bowers | E03C 1/04 | 137/801 |
| 6,797,156 B2 * | 9/2004 | Chau | B01D 35/04 | 210/138 |
| 9,562,614 B2 * | 2/2017 | Hu | F16K 11/074 | |
| 9,604,857 B2 * | 3/2017 | Sasaki | B01D 29/01 | |

FOREIGN PATENT DOCUMENTS

| | | | |
|---|---|---|---|
| CN | 202266701 U | 6/2012 | |
| WO | WO-2013155878 A1 * | 10/2013 | C02F 1/008 |

* cited by examiner

FAUCET WATER PURIFIER AND FILTERING DEVICE FOR USE IN FAUCET WATER PURIFIER

CROSS REFERENCE OF RELATED APPLICATION

This application claims the benefit under 35 U.S.C. § 119 from International Application No. PCT/CN2020/101740, which claims priorities to CN201910651142.7, filed Jul. 18, 2019; CN202020113926.2, filed Jan. 17, 2020; CN202010052563.0, filed Jan. 17, 2020; CN202020114173.7, filed Jan. 17, 2020; CN202020113042.7, filed Jan. 17, 2020; CN202010053469.7, filed Jan. 17, 2020; CN202020112904.4, filed Jan. 17, 2020; CN202020113607.1, filed Jan. 17, 2020; CN202020113435.8, filed Jan. 17, 2020; CN202020484268.8, filed Apr. 3, 2020; CN202020483754.8, filed Apr. 3, 2020; CN202020487506.0, filed Apr. 3, 2020; CN202010660295.0, filed Jul. 10, 2020; CN202021362678.1, filed Jul. 10, 2020, the entire contents of which are hereby incorporated by reference in their entireties for teachings of additional or alternative details, and/or features.

BACKGROUND OF THE PRESENT INVENTION

Field of Invention

The present invention relates to a faucet water purifier, and more particularly to a faucet water purifier capable of purifying raw water (or tap water) in two stages. Further, the faucet water purifier of the present invention is also capable of controlling the raw water to back flush its primary filter. Accordingly, the present invention also relates to a filtering device for the faucet water purifier, wherein the ultrafiltration filter of the filtering device of the faucet water purifier of the present invention, which is used for ultrafiltration treatment of water, is provided to be able to be flushed to improve the service life of the filtering device of the faucet water purifier of the present invention.

Description of Related Arts

With the increasing improvement of people's living standards and increasing attention to health, people's requirements for the quality of domestic water are getting higher and higher. However, on the other hand, in many countries, especially developing countries, with the continuous development of industry and agriculture, the problem of water pollution has become more and more serious, which will inevitably lead to a lesser or more severe impact on the source of the domestic water, especially the source of the tap water. In addition, the quality of the tap water will also be affected by the external environment and water supply pipelines. For example, the increase in the sand content of the source of the tap water will cause the water quality of the tap water to deteriorate. The long-term lack of cleaning of the tap water supply pipe network and the aging of the pipe network will also affect the water quality of the tap water. Therefore, in many cases, the tap water is not suitable for direct drinking. In order to solve the above-mentioned problems of the tap water, various household water purifiers have appeared on the market, such as ultrafiltration water purifiers, RO membrane water purifiers, faucet water purifiers, etc., for purifying the tap water. Among these water purification equipment, faucet water purifiers are favored by many consumers because of their small size, easy installation and disassembly, the ability to automatically purify the tap water under the pressure of the tap water without requiring electricity, etc. However, the existing faucet water purifier also has many defects. First, most existing faucet water purifiers only use a single purifying filter, for example, only use a ceramic filter, an activated carbon filter or an ultrafiltration filter to purify the tap water. The faucet water purifier with a single ceramic filter or activated carbon filter, because of the large pore size of the ceramic filter or the activated carbon filter, does not completely purify the tap water, and the purified water obtained is not suitable for direct drinking. However, the faucet water purifier that uses a single ultrafiltration filter to purify the tap water, because of the small pore size of the ultrafiltration filter, is prone to blockage and cause the faucet water purifier to become unusable soon. Especially in the case of poor water quality, the ultrafiltration core is prone to blockage.

CN Pat. No. 201811199228.2 discloses a faucet water purifier with microfiltration ceramics, activated carbon and ultrafiltration ceramics for purifying the tap water, wherein when the faucet water purifier purifies the tap water, the tap water is first microfiltered by microfiltration ceramics, and then the purified water generated by the microfiltration ceramics is filtered by the activated carbon, and the purified water generated by the activated carbon is further filtered by the ultrafiltration ceramics and the ultrafiltration purified water is generated. However, the faucet water purifier disclosed by the patent lacks a flushing mechanism, especially a mechanism for flushing the microfiltration ceramics and the ultrafiltration ceramics, which will cause a large number of impurities and microorganisms to accumulate on the surface of the microfiltration ceramic and ultrafiltration ceramic membrane and clogging the microfiltration ceramic and ultrafiltration ceramic membrane in a short period of time. Even the accumulation of a large number of microorganisms causes the faucet water purifier provided by the patent to be stinky after being used for a short period of time.

CN Pat. No. 201220080023.4 discloses a faucet water purifier with ceramics and ultrafiltration filter for two-stage purification of the tap water, wherein the primary filter of the faucet water purifier is capable of preliminarily purifying the tap water, and its secondary filter further purifies the purified water generated by the primary filter. However, the faucet water purifier provided by the patent application lacks both a mechanism for flushing the primary filter and a mechanism for cleaning (or flushing) the secondary filter, which causes the faucet water purifier provided by the patent application also to be stinky after being used for a short period of time.

SUMMARY OF THE PRESENT INVENTION

The main advantage of the present invention is to provide a faucet water purifier, wherein the faucet water purifier of the present invention is integrated with a primary filter and a secondary filter, wherein the primary filter is adapted for a primary purification of the tap water, and the secondary filter is adapted to repurify the purified water generated by the primary filter. It can be understood that the faucet water purifier of the present invention can be directly installed on a faucet.

Another advantage of the present invention is to provide a faucet water purifier, wherein the purified water generated by the primary filter of the faucet water purifier of the present invention is capable of being provided to the users for using, and when the purified water generated by the primary filter is provided, the purified water is capable of being guided to flow through the outer surfaces of the ultrafiltration membrane filaments of the secondary filter, so that the outer surfaces of the ultrafiltration membrane filaments of the secondary filter is flushed. Accordingly, the secondary filter is an ultrafiltration filter, and the ultrafiltration filter is an external pressure type ultrafiltration membrane filament filter. Alternatively, the ultrafiltration filter is an internal pressure type ultrafiltration membrane filament filter, accordingly, when the purified water generated by the primary filter is provided, the purified water is capable of being guided to flow through the membrane filament channels of the ultrafiltration membrane filament of the secondary filter, so that the interior of the ultrafiltration membrane filament of the secondary filter is flushed. Those skilled in the art will appreciate that the secondary filter may also be a filter made of other materials, such as a ceramic filter, carbon fiber, PP cotton or activated carbon filter. Alternatively, the secondary filter is a composite filter made of multiple materials, for example, a composite filter composed of any two or more materials of ceramic, carbon fiber, PP cotton and activated carbon particles.

Another advantage of the present invention is to provide a faucet water purifier, wherein the purified water generated by the primary filter and the purified water generated by the secondary filter of the faucet water purifier of the present invention are provided through different water outlets, thereby preventing the purified water generated by the primary filter from affecting the purified water generated by the secondary filter. In other words, the flow channel of the purified water generated by the secondary filter of the faucet water purifier of the present invention is independent of the flow channel of the purified water generated by the primary filter of the faucet water purifier of the present invention. In addition, the providing ways of the purified water generated by the primary filter and the purified water generated by the secondary filter of the faucet water purifier of the present invention are more in line with the usage habits of consumers.

Another advantage of the present invention is to provide a faucet water purifier, wherein the control valve of the faucet water purifier of the present invention is capable of controlling the raw water (such as the tap water) to back flush the primary filter to increase the service life of the primary filter of the faucet water purifier. It is appreciated that the faucet water purifier of the present invention controls the raw water to back flush the primary filter, which can improve the filtering effect of the primary filter, reduce the accumulation of impurities in the raw water on the surface of the primary filter and prevent the growth of bacteria in the faucet water purifier.

Another advantage of the present invention is to provide a faucet water purifier, wherein the purified water generated by the primary filter of the faucet water purifier of the present invention and the waste water generated by the back flushing flow out through different water outlets, thereby preventing the waste water generated by the primary filter from polluting its purified water outlet. In other words, the flow channel of the waste water generated by the primary filter of the faucet water purifier of the present invention is independent of the flow channel of the purified water generated by the primary filter.

Another advantage of the present invention is to provide a faucet water purifier, wherein the purified water generated by the secondary filter of the faucet water purifier of the present invention and the waste water generated by back flushing the primary filter flow out through different water outlets, thereby preventing the waste water generated by the primary filter from polluting the purified water outlet of the secondary filter. In other words, the flow channel of the waste water generated by the primary filter of the faucet water purifier of the present invention is independent of the flow channel of the purified water generated by the secondary filter.

Another advantage of the present invention is to provide a faucet water purifier, wherein the faucet water purifier of the present invention further has a raw water opening to facilitate customers to obtain raw water when its filters are blocked. In addition, the flow channel of the raw water is independent of the flow channel of the waste water generated by the primary filter of the faucet water purifier of the present invention, thereby preventing the waste water generated by the primary filter from polluting its raw water outlet.

Another advantage of the present invention is to provide a faucet water purifier, wherein the faucet water purifier further comprises a terminal filter to further filter the purified water generated by the secondary filter of the faucet water purifier to improve its taste. In other words, the terminal filter is provided downstream of the secondary filter. Preferably, the filter material of the terminal filter is carbon fiber material. Alternatively, the filter material of the terminal filter can also be replaced by other filter materials, such as activated carbon.

Another advantage of the present invention is to provide a control valve for the faucet water purifier, wherein the control valve for the faucet water purifier of the present invention is capable of controlling the faucet water purifier to provide the raw water, the purified water generated by the primary filter and the purified water generated by the secondary filter, and also to drain the waste water, wherein the raw water, the purified water generated by the primary filter, the purified water generated by the secondary filter and the waste water flow out through different outlets.

Another advantage of the present invention is to provide a filtering device for the faucet water purifier, wherein the filtering device for the faucet water purifier of the present invention is integrated with a primary filter and a secondary filter, wherein the primary filter is adapted for a primary purification of the tap water, and the secondary filter is adapted to repurify the purified water generated by the primary filter. It can be understood that the faucet water purifier of the present invention can be directly installed on a faucet. Preferably, the primary filter is a ceramic filter, and the secondary filter is an ultrafiltration filter.

Additional objects and features of the present invention will become apparent from the following detailed description, and may be realized by means of the instrumentalities and combinations particular point out in the appended claims.

According to one aspect of the present invention, the foregoing and other objects and advantages are attained by a faucet water purifier of the present invention, which comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source.

According to another aspect of the present invention, the present invention further provides a filtering device for a faucet water purifier, which comprises:

an outer casing;

a primary filter; and a secondary filter, wherein the outer casing defines a first accommodation cavity, wherein the primary filter and the secondary filter are disposed inside the first accommodation cavity of the outer casing, and the outer casing and the primary filter define a raw water channel therebetween, the primary filter and the secondary filter define a purified water channel therebetween, the secondary filter has a purified water outlet, wherein the filtering device defines a first communicating opening, a second communicating opening and a third communicating opening, wherein the first communicating opening of the filtering device is communicated with the raw water channel of the filtering device, the second communicating opening of the filtering device is communicated with the purified water channel of the filtering device, the third communicating opening of the filtering device is communicated with the purified water outlet of the secondary filter.

Still further objects and advantages of the present invention will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 17F is a top view of the alternative embodiment of the plane valve of the faucet water purifier according to the above first embodiment of the present invention.

FIG. 17G is a bottom view of the alternative embodiment of the plane valve of the faucet water purifier according to the above first embodiment of the present invention.

FIG. 17H is a front view of the alternative embodiment of the plane valve of the faucet water purifier according to the above first embodiment of the present invention.

FIG. 17I is another front view of the alternative embodiment of the plane valve of the faucet water purifier according to the above first embodiment of the present invention.

FIG. 20F is a perspective view of the first seal of the sealing assembly of the alternative embodiment of the plane valve of the faucet water purifier according to the above first embodiment of the present invention.

FIG. 20G is a perspective view of the second seal of the sealing assembly of the alternative embodiment of the plane valve of the faucet water purifier according to the above first embodiment of the present invention.

FIG. 20H is a perspective view of a fixing holder of the fixing device of the alternative embodiment of the plane valve of the faucet water purifier according to the above first embodiment of the present invention, which shows the restricting grooves of the fixing holder.

FIG. 21E is a top view of the rotatable disk of the alternative embodiment of the plane valve of the faucet water purifier according to the above first embodiment of the present invention.

FIG. 21F is a bottom view of the rotatable disk of the alternative embodiment of the plane valve of the faucet water purifier according to the above first embodiment of the present invention.

FIG. 26E is another perspective view of the alternative embodiment of the plane valve of the faucet water purifier according to the above first embodiment of the present invention, which shows a third opening, a raw water opening and a draining opening of the valve body.

FIG. 26F is a top view of the alternative embodiment of the plane valve of the faucet water purifier according to the above first embodiment of the present invention.

FIG. 26G is a bottom view of the alternative embodiment of the plane valve of the faucet water purifier according to the above first embodiment of the present invention.

FIG. 26H is a front view of the alternative embodiment of the plane valve of the faucet water purifier according to the above first embodiment of the present invention.

FIG. 26I is another front view of the alternative embodiment of the plane valve of the faucet water purifier according to the above first embodiment of the present invention.

FIG. 27A is a sectional view of the alternative embodiment of the plane valve of the faucet water purifier according to the above first embodiment of the present invention, which shows the first channel, the first opening, the third channel and the third opening of the plane valve.

FIG. 27B is another sectional view of the alternative embodiment of the plane valve of the faucet water purifier according to the above first embodiment of the present invention, which shows the second channel and the second opening of the plane valve.

FIG. 27C is another sectional view of the alternative embodiment of the plane valve of the faucet water purifier according to the above first embodiment of the present invention, which shows the fourth channel, the fourth opening, the fifth channel and the fifth opening of the plane valve.

FIG. 27D is another sectional view of the alternative embodiment of the plane valve of the faucet water purifier according to the above first embodiment of the present invention, which shows the eighth channel and the draining opening of the plane valve.

FIG. 27E is another sectional view of the alternative embodiment of the plane valve of the faucet water purifier according to the above first embodiment of the present invention, which shows the ninth channel and the raw water opening of the plane valve.

FIG. 28A is another sectional view of the alternative embodiment of the plane valve of the faucet water purifier according to the above first embodiment of the present invention, wherein the fixing device is disposed inside the valve cavity of the plane valve.

FIG. 28B is a perspective view of the alternative embodiment of the plane valve of the faucet water purifier according to the above first embodiment of the present invention, wherein the guiding plate of the faucet water purifier of the present invention is provided at the valve body of the plane valve.

Figure 28A:
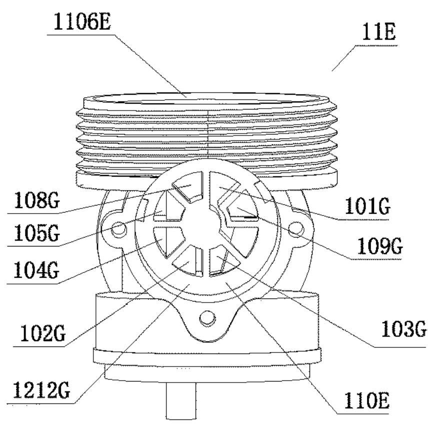
Figure 28B:
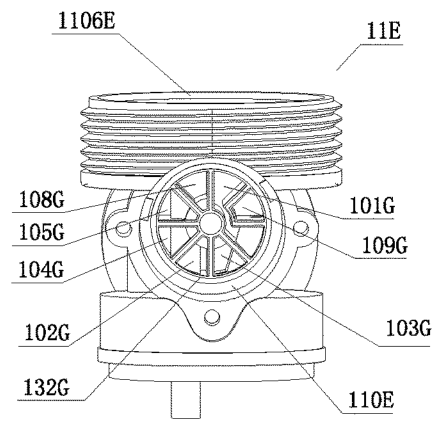
Figure 28C:
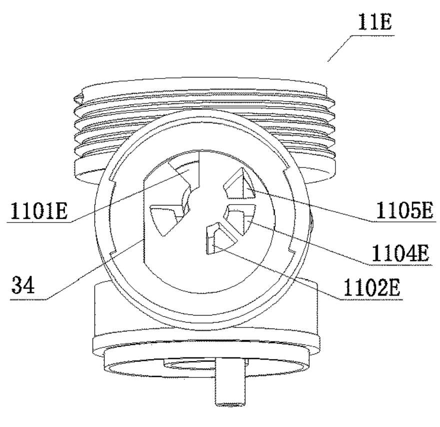

FIG. 28C is a perspective view of the guiding plate of the alternative embodiment of the plane valve of the faucet water purifier according to the above first embodiment of the present invention.

Figure 28D:
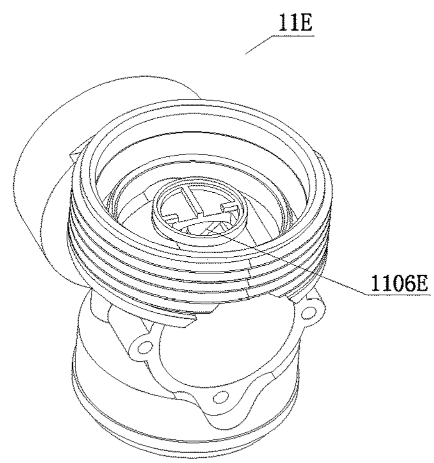
Figure 28E:
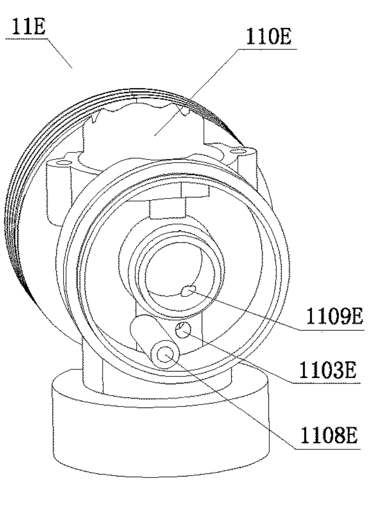
Figure 28F:
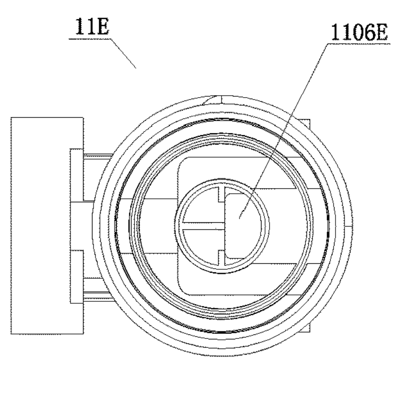
Figure 28G:
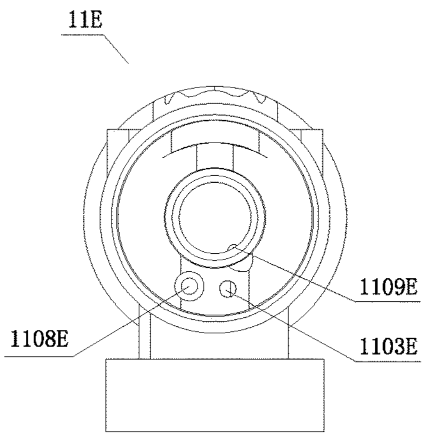
Figure 28H:
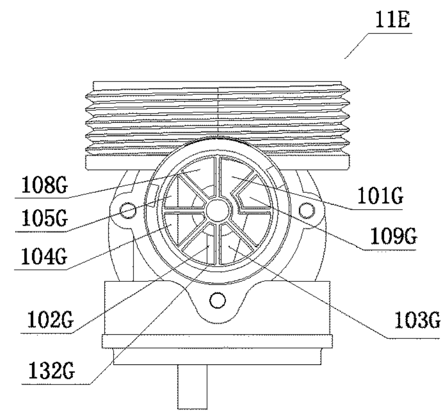
Figure 28I:
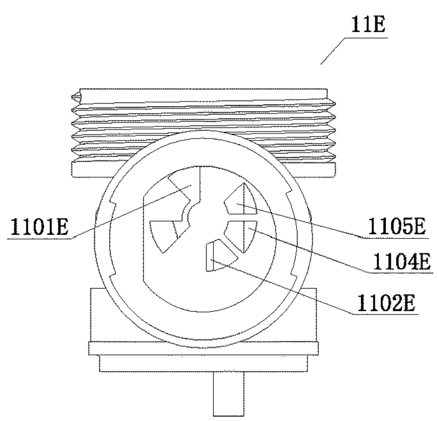

FIG. 28D is another perspective view of the guiding plate of the alternative embodiment of the plane valve of the faucet water purifier according to the above first embodiment of the present invention.

Figure 29A:
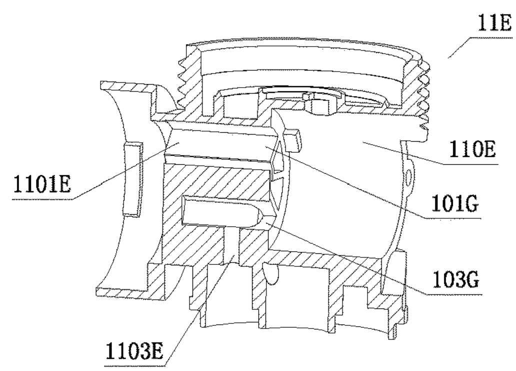

FIG. 29A is a perspective view of the fixing device of the alternative embodiment of the plane valve of the faucet water purifier according to the above first embodiment of the present invention.

Figure 29B:
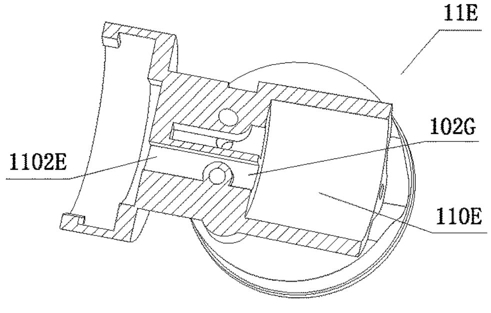

FIG. 29B is a sectional view of the fixing device of the alternative embodiment of the plane valve of the faucet water purifier according to the above first embodiment of the present invention.

Figure 29C:
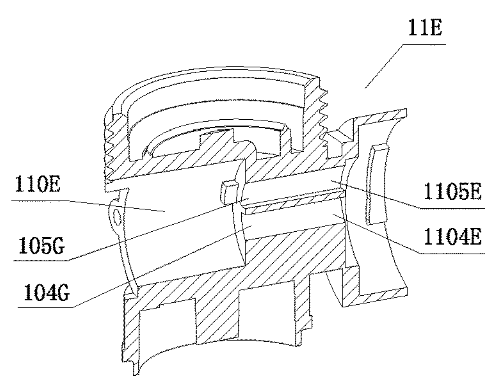

FIG. 29C is a perspective view of the fixing portion of the fixed disk of the alternative embodiment of the plane valve of the faucet water purifier according to the above second embodiment of the present invention, which shows the first sealing grooves of the fixing portion.

Figure 29D:
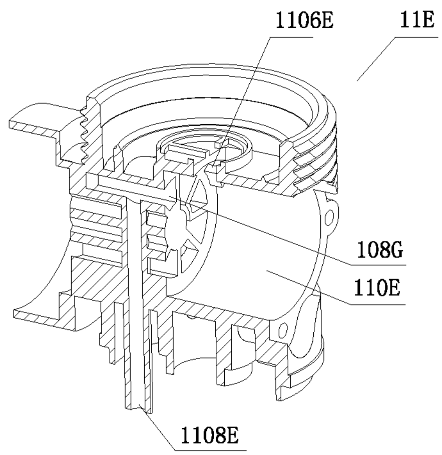

FIG. 29D is another perspective view of the fixing portion of the fixed disk of the alternative embodiment of the plane valve of the faucet water purifier according to the above first embodiment of the present invention, which shows the second sealing grooves of the fixing portion.

Figure 29E:
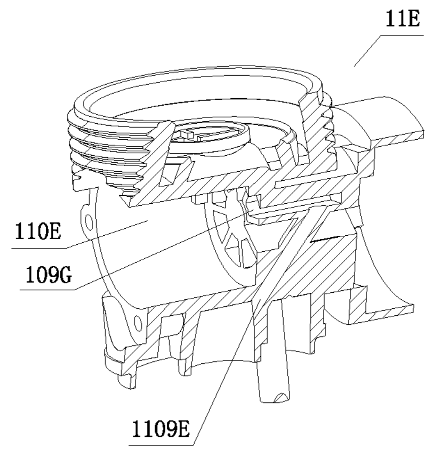

FIG. 29E is a perspective view of the upper end portion of the fixed disk of the alternative embodiment of the plane valve of the faucet water purifier according to the above first embodiment of the present invention, wherein the upper end portion of the fixed disk is provided at the fixing portion of the fixed disk.

FIG. 29F is a perspective view of the first seal of the sealing assembly of the alternative embodiment of the plane valve of the faucet water purifier according to the above first embodiment of the present invention.

FIG. 29G is a perspective view of the second seal of the sealing assembly of the alternative embodiment of the plane valve of the faucet water purifier according to the above first embodiment of the present invention.

FIG. 29H is a perspective view of a fixing holder of the fixing device of the alternative embodiment of the plane valve of the faucet water purifier according to the above first embodiment of the present invention, which shows the restricting grooves of the fixing holder.

Figure 30A:
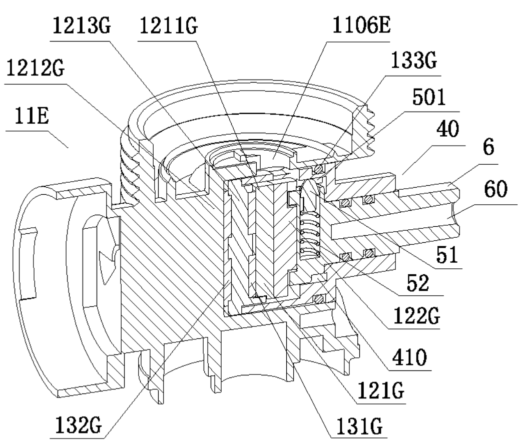

FIG. 30A is a perspective view of the fixed disk of the alternative embodiment of the plane valve of the faucet water purifier according to the above first embodiment of the present invention.

Figure 30B:
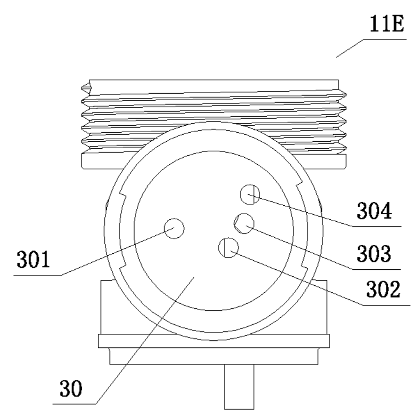

FIG. 30B is a top view of the fixed disk of the alternative embodiment of the plane valve of the faucet water purifier according to the above first embodiment of the present invention.

Figure 30C:
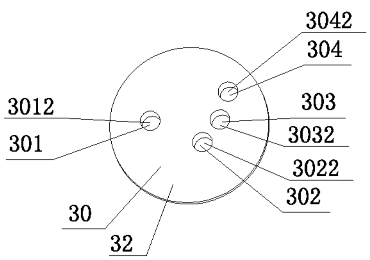

FIG. 30C is a bottom view of the fixed disk of the alternative embodiment of the plane valve of the faucet water purifier according to the above first embodiment of the present invention.

Figure 30D:
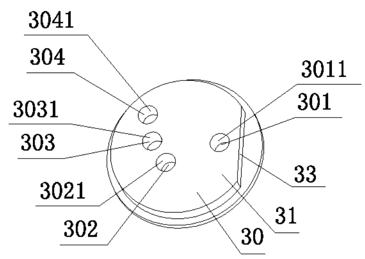

FIG. 30D is a perspective view of the rotatable disk of the alternative embodiment of the plane valve of the faucet water purifier according to the above first embodiment of the present invention.

FIG. 30E is a top view of the rotatable disk of the alternative embodiment of the plane valve of the faucet water purifier according to the above first embodiment of the present invention.

FIG. 30F is a bottom view of the rotatable disk of the alternative embodiment of the plane valve of the faucet water purifier according to the above first embodiment of the present invention.

Figure 31A:
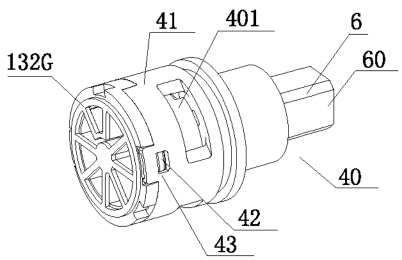

FIG. 31A is a structure diagram of the alternative embodiment of the faucet water purifier according to the above first embodiment of the present invention, wherein the faucet water purifier shown in FIG. 31A is under a first purifying working state, and the arrows shown in FIG. 31A point to the direction of water flow.

Figure 31B:
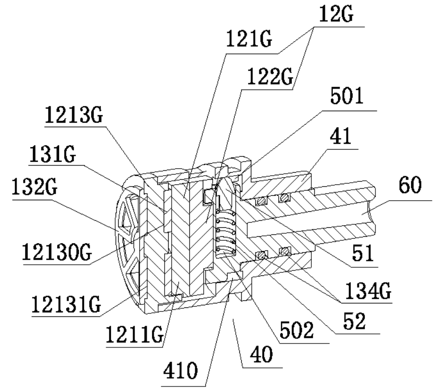

FIG. 31B is a structure diagram of the alternative embodiment of the faucet water purifier according to the above first embodiment of the present invention, wherein the faucet water purifier shown in FIG. 31B is under a back flushing working state, and the arrows shown in FIG. 31B point to the direction of water flow.

Figure 31C:
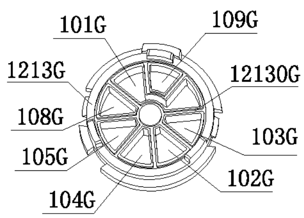

FIG. 31C is a structure diagram of the alternative embodiment of the faucet water purifier according to the above first embodiment of the present invention, wherein the faucet water purifier shown in FIG. 31C is under a raw water supplying working state, and the arrows shown in FIG. 31C point to the direction of water flow.

Figure 31D:
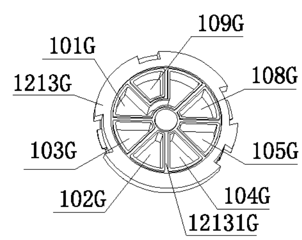
Figure 31E:
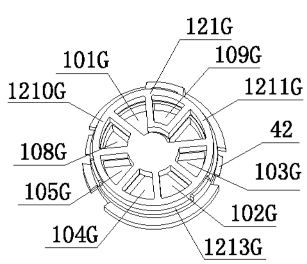
Figure 31F:
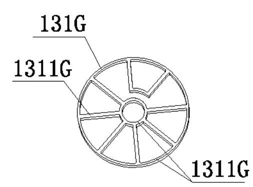
Figure 31G:
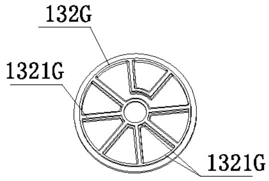
Figure 31H:
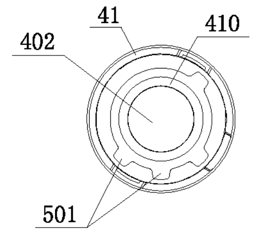

FIG. 31D is a structure diagram of the alternative embodiment of the faucet water purifier according to the above first embodiment of the present invention, wherein the faucet water purifier shown in FIG. 31D is under a second purifying working state, and the arrows shown in FIG. 31D point to the direction of water flow.

Figure 32A:
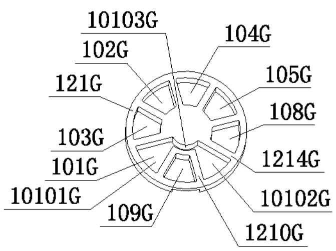

FIG. 32A is a structure diagram of the fixed disk of the alternative embodiment of the plane valve of the faucet water purifier according to the above first embodiment of the present invention.

Figure 32B:
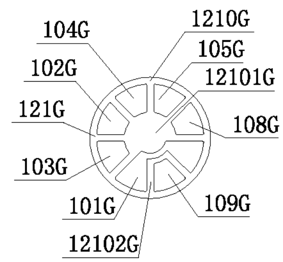

FIG. 32B is a structure diagram of the rotatable disk of the alternative embodiment of the plane valve of the faucet water purifier according to the above first embodiment of the present invention, wherein the dotted lines shown in FIG. 32B show the communicating channels of the rotatable disk.

Figure 32C:
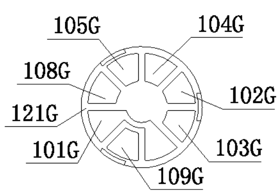

FIG. 32C is a diagram of the equal divisions of the fixed disk of the alternative embodiment of the plane valve of the faucet water purifier according to the above first embodiment of the present invention, which shows that the channels are respectively provided in the specific equal divisions of the fixed disk.

Figure 32D:
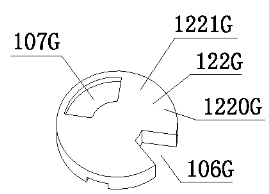
Figure 32E:
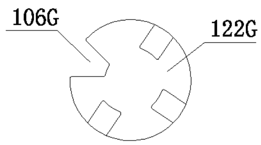
Figure 32F:
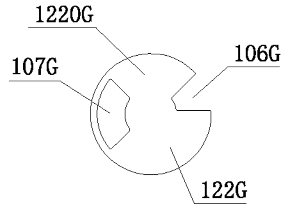

FIG. 32D is a diagram of the equal divisions of the rotatable disk of the alternative embodiment of the plane valve of the faucet water purifier according to the above first embodiment of the present invention, which shows that the channels are respectively provided in the specific equal divisions of the rotatable disk.

Figure 33A:
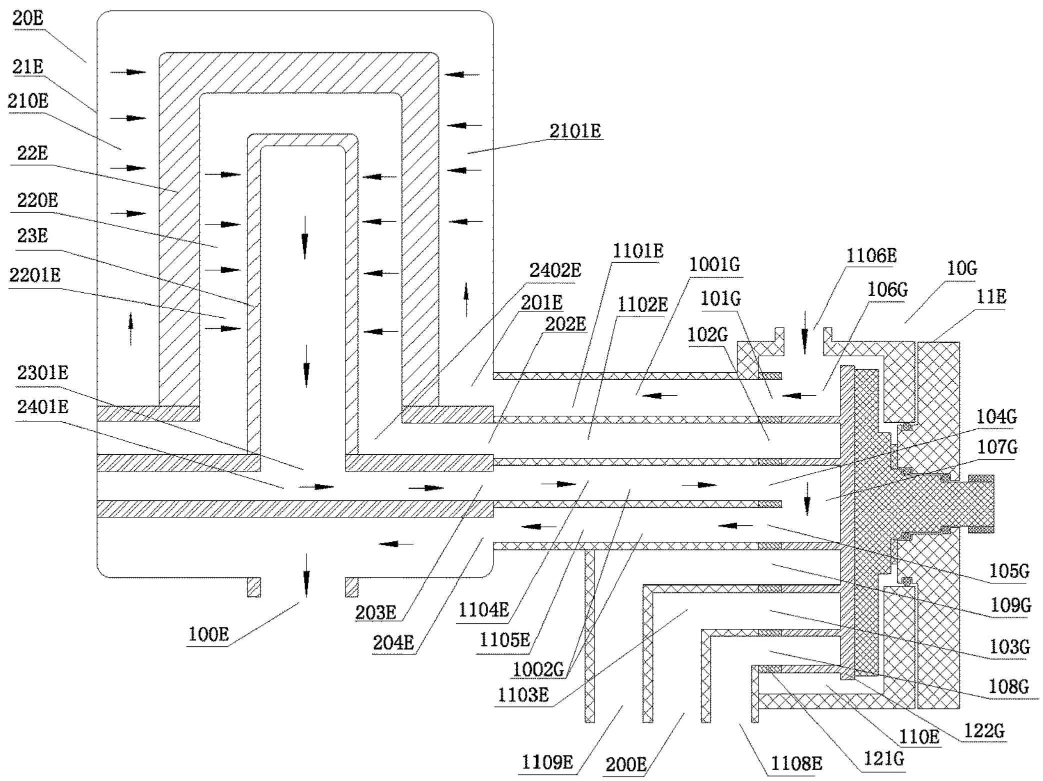

FIG. 33A is a diagram of the communication between the channels of the rotatable disk and the channels of the fixed disk of the plane valve, when the alternative embodiment of the plane valve of the faucet water purifier according to the above first embodiment of the present invention is under a first purifying working position, wherein the shaded area shown in FIG. 33A shows the passages defined by the communication between of the rotatable disk and the fixed disk of the plane valve.

Figure 33B:
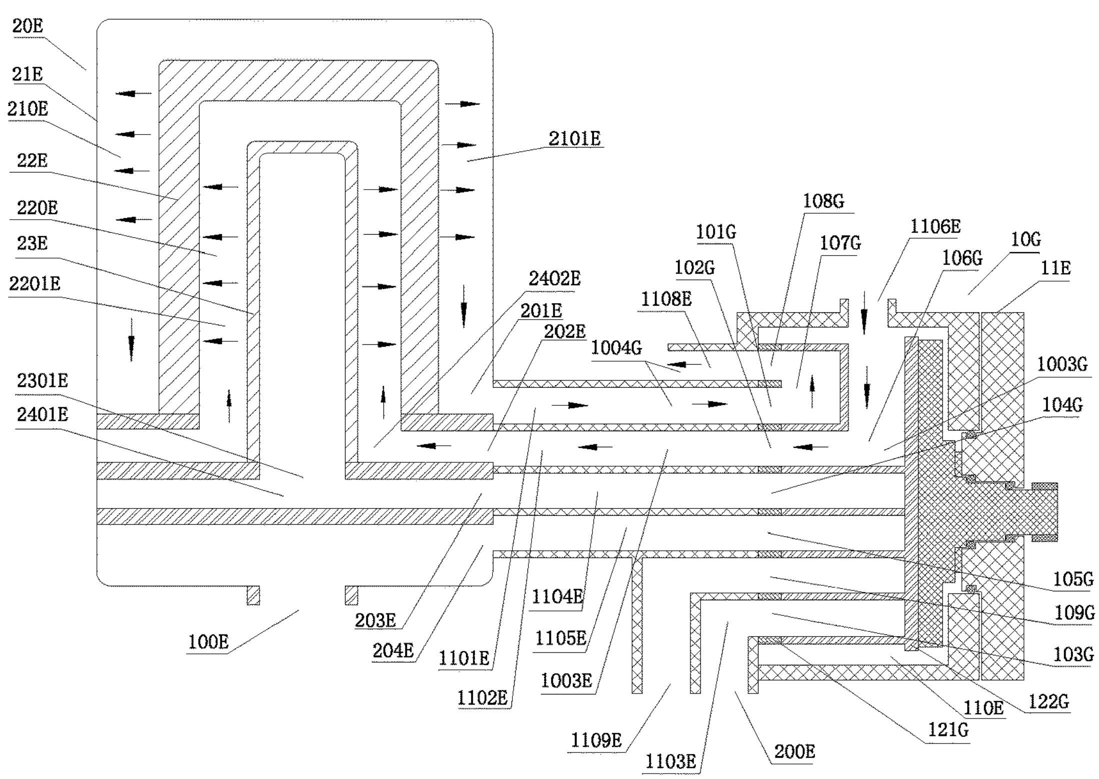

FIG. 33B is a diagram of the communication between the channels of the rotatable disk and the channels of the fixed disk of the plane valve, when the alternative embodiment of the plane valve of the faucet water purifier according to the above first embodiment of the present invention is under a back flushing working position, wherein the shaded area shown in FIG. 33B shows the passages defined by the communication between the rotatable disk and the fixed disk of the plane valve.

Figure 33C:
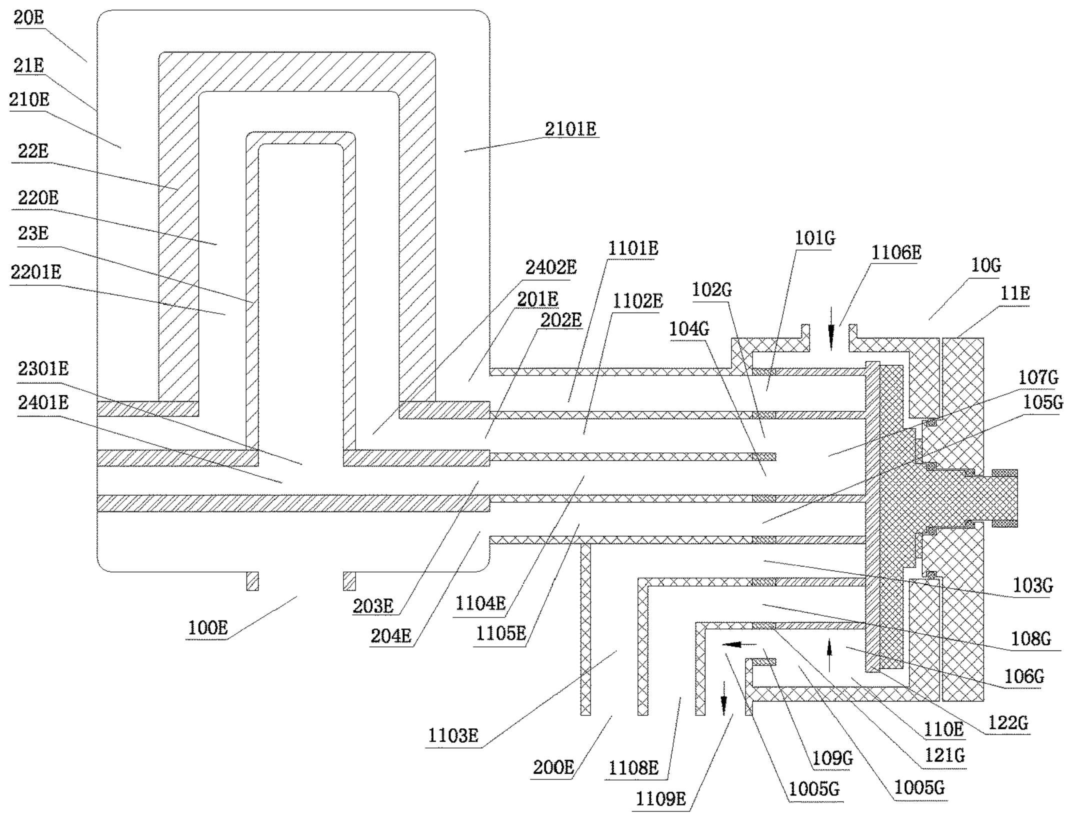

FIG. 33C is a diagram of the communication between the channels of the rotatable disk and the channels of the fixed disk of the plane valve, when the alternative embodiment of the plane valve of the faucet water purifier according to the above first embodiment of the present invention is under a raw water supplying working position, wherein the shaded area shown in FIG. 33C shows the passages defined by the communication between the rotatable disk and the fixed disk of the plane valve.

Figure 33D:
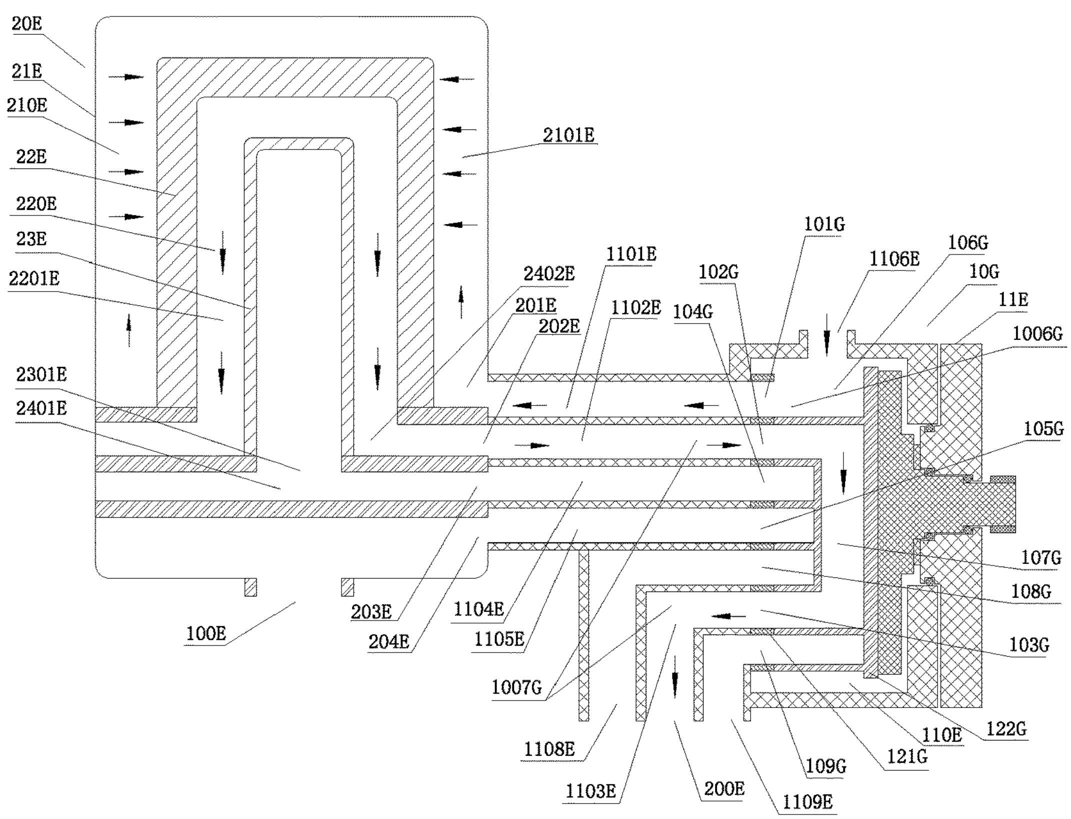
Figure 34A:
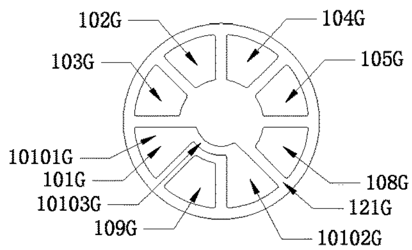
Figure 34B:
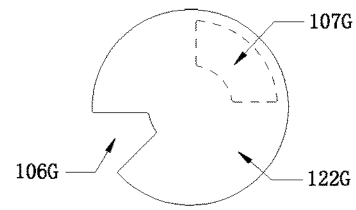
Figure 34C:
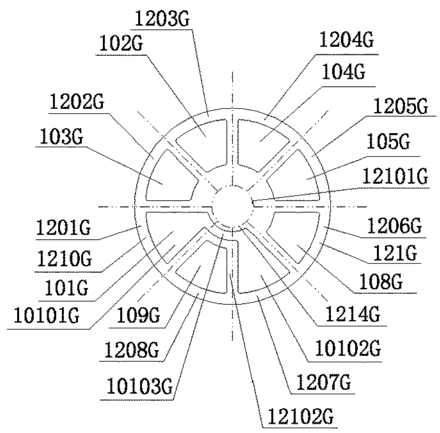
Figure 34D:
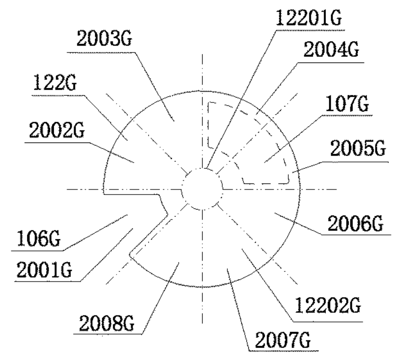

FIG. 33D is a diagram of the communication between the channels of the rotatable disk and the channels of the fixed disk of the plane valve, when the alternative embodiment of the plane valve of the faucet water purifier according to the above first embodiment of the present invention is under a second purifying working position, wherein the shaded area shown in FIG. 33D shows the passages defined by the communication between the rotatable disk and the fixed disk of the plane valve.

FIG. 34 is an exploded view of another alternative embodiment of the control valve of the faucet water purifier according to the above first embodiment of the present invention.

Figure 35A:
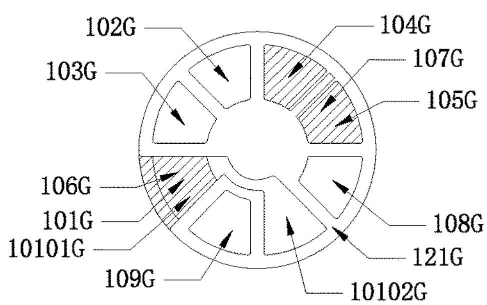

FIG. 35A is a perspective view of the alternative embodiment of the plane valve of the faucet water purifier according to the above first embodiment of the present invention, which shows a first channel, a second channel, a third channel, a fourth channel, a fifth channel, an eighth channel, a ninth channel and a raw water inlet channel of the plane valve.

Figure 35B:
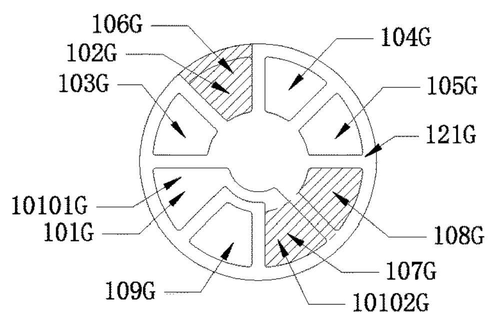

FIG. 35B is another perspective view of the alternative embodiment of the plane valve of the faucet water purifier according to the above first embodiment of the present invention, which shows the first channel, the second channel, the third channel, the fourth channel, the fifth channel, the eighth channel, the ninth channel, the raw water inlet channel and a second seal of the plane valve.

Figure 35C:
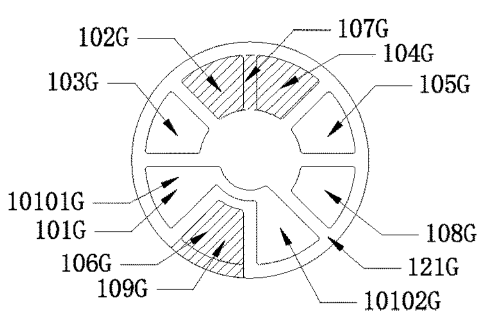

FIG. 35C is another perspective view of the alternative embodiment of the plane valve of the faucet water purifier according to the above first embodiment of the present invention, which shows a first opening, a second opening, a fourth opening and a fifth opening of the valve body.

Figure 35D:
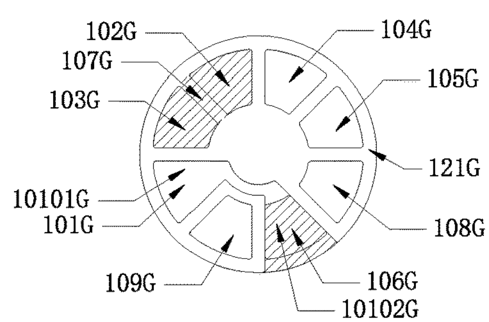

FIG. 35D is another perspective view of the alternative embodiment of the plane valve of the faucet water purifier according to the above first embodiment of the present invention, which shows a raw water inlet of the valve body.

FIG. 35E is another perspective view of the alternative embodiment of the plane valve of the faucet water purifier according to the above first embodiment of the present invention, which shows a third opening, a raw water opening and a draining opening of the valve body.

FIG. 35F is a top view of the alternative embodiment of the plane valve of the faucet water purifier according to the above first embodiment of the present invention.

FIG. 35G is a bottom view of the alternative embodiment of the plane valve of the faucet water purifier according to the above first embodiment of the present invention.

FIG. 35H is a front view of the alternative embodiment of the plane valve of the faucet water purifier according to the above first embodiment of the present invention.

FIG. 35I is another front view of the alternative embodiment of the plane valve of the faucet water purifier according to the above first embodiment of the present invention.

Figure 36:
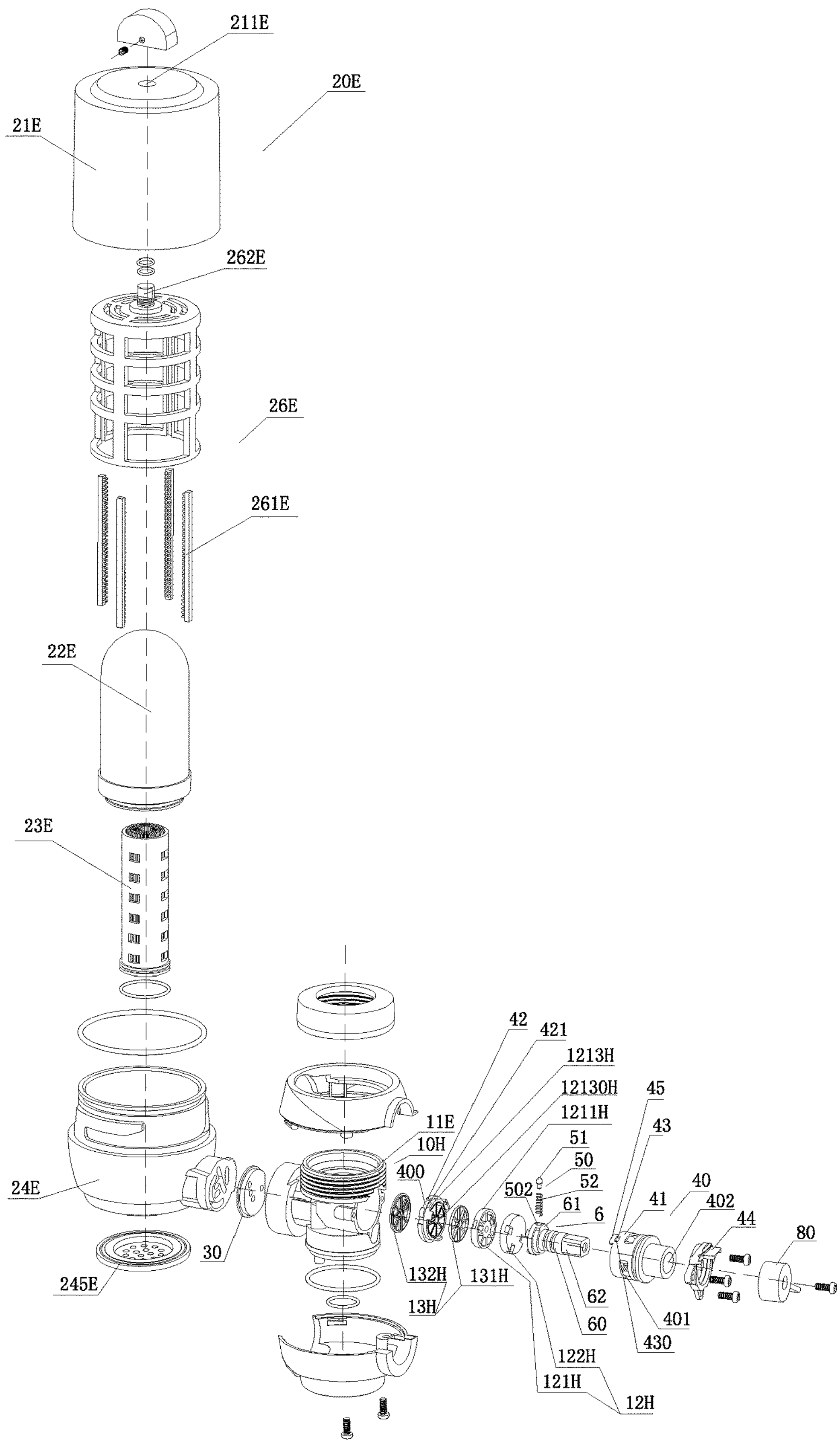

FIG. 36A is a sectional view of the alternative embodiment of the plane valve of the faucet water purifier according to the above first embodiment of the present invention, which shows the first channel and the first opening of the plane valve.

FIG. 36B is another sectional view of the alternative embodiment of the plane valve of the faucet water purifier according to the above first embodiment of the present invention, which shows the second channel and the second opening of the plane valve.

FIG. 36C is another sectional view of the alternative embodiment of the plane valve of the faucet water purifier according to the above first embodiment of the present invention, which shows the third channel and the third opening of the plane valve.

FIG. 36D is another sectional view of the alternative embodiment of the plane valve of the faucet water purifier according to the above first embodiment of the present invention, which shows the fourth channel, the fourth opening, the fifth channel and the fifth opening of the plane valve.

FIG. 36E is another sectional view of the alternative embodiment of the plane valve of the faucet water purifier according to the above first embodiment of the present invention, which shows the eighth channel and the draining opening of the plane valve.

FIG. 36F is another sectional view of the alternative embodiment of the plane valve of the faucet water purifier according to the above first embodiment of the present invention, which shows the ninth channel and the raw water opening of the plane valve.

FIG. 36G is another sectional view of the alternative embodiment of the plane valve of the faucet water purifier according to the above first embodiment of the present invention, which shows the raw water inlet channel and the raw water inlet of the plane valve.

Figure 37A:
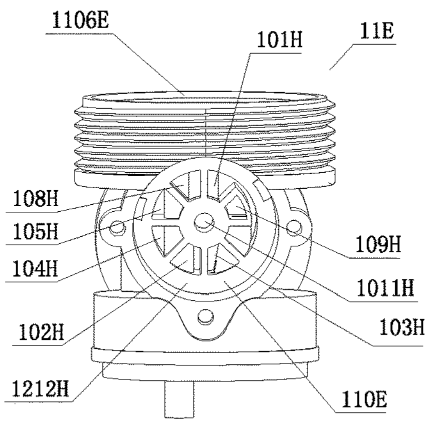

FIG. 37A is another sectional view of the alternative embodiment of the plane valve of the faucet water purifier according to the above first embodiment of the present invention, wherein the fixing device is disposed inside the valve cavity of the plane valve.

Figure 37B:
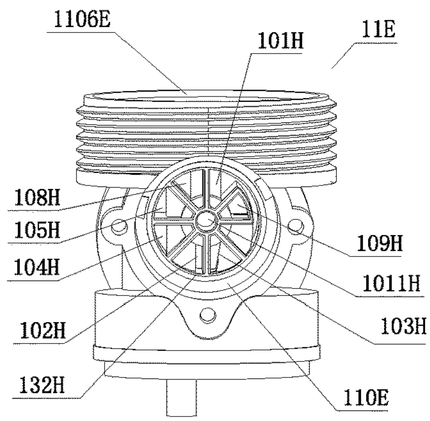

FIG. 37B is a perspective view of the alternative embodiment of the plane valve of the faucet water purifier according to the above first embodiment of the present invention, wherein the guiding plate of the faucet water purifier of the present invention is provided at the valve body of the plane valve.

Figure 37C:
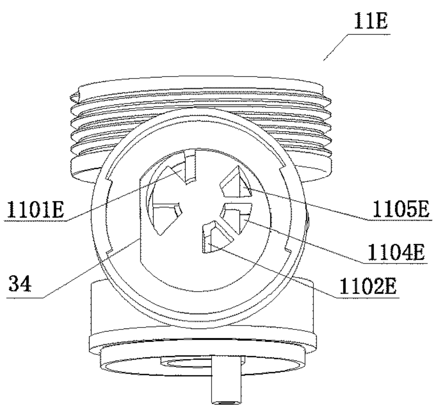

FIG. 37C is a perspective view of the guiding plate of the alternative embodiment of the plane valve of the faucet water purifier according to the above first embodiment of the present invention.

Figure 37D:
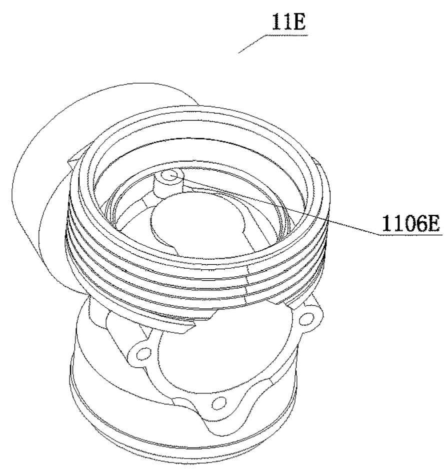
Figure 37E:
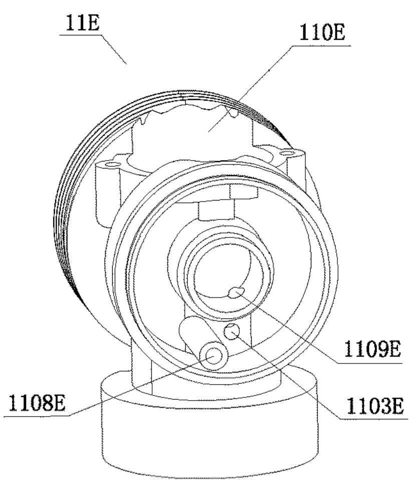
Figure 37F:
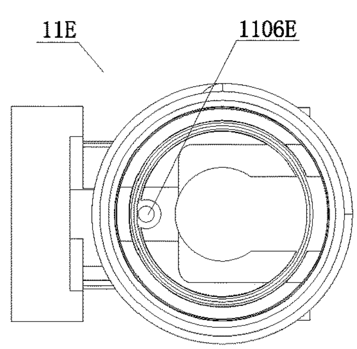
Figure 37G:
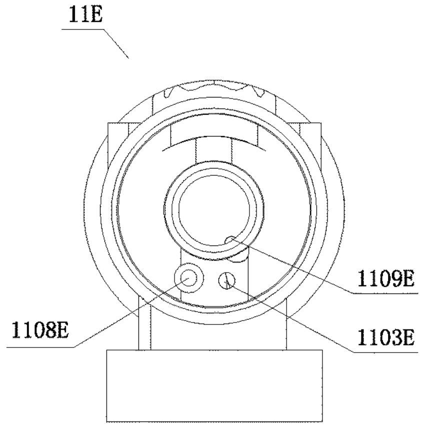
Figure 37H:
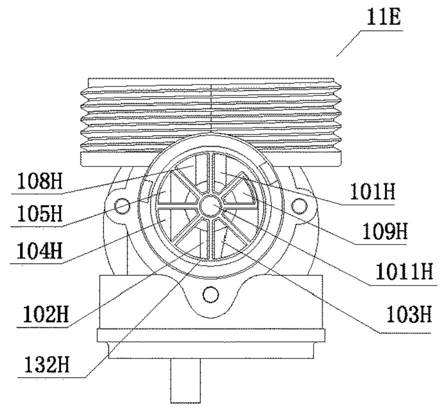
Figure 37I:
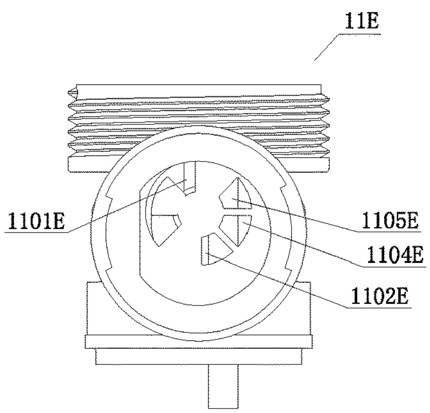

FIG. 37D is another perspective view of the guiding plate of the alternative embodiment of the plane valve of the faucet water purifier according to the above first embodiment of the present invention.

Figure 38A:
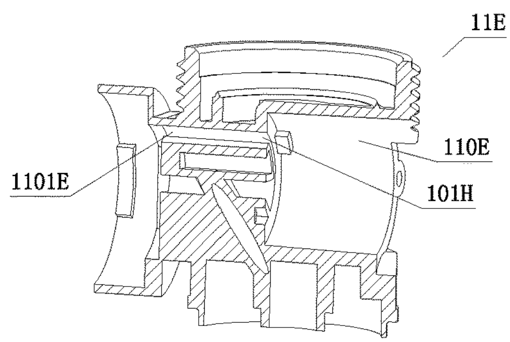

FIG. 38A is a perspective view of the fixing device of the alternative embodiment of the plane valve of the faucet water purifier according to the above first embodiment of the present invention.

Figure 38B:
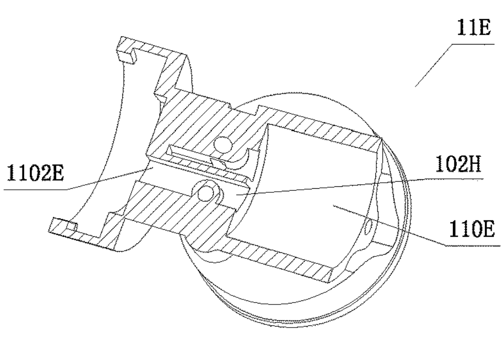

FIG. 38B is a sectional view of the fixing device of the alternative embodiment of the plane valve of the faucet water purifier according to the above first embodiment of the present invention.

Figure 38C:
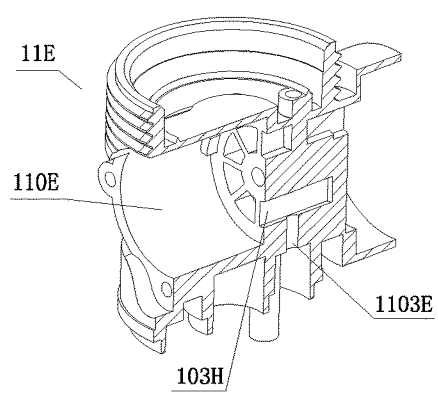

FIG. 38C is a perspective view of the fixing portion of the fixed disk of the alternative embodiment of the plane valve of the faucet water purifier according to the above first embodiment of the present invention, which shows the first sealing grooves of the fixing portion.

Figure 38D:
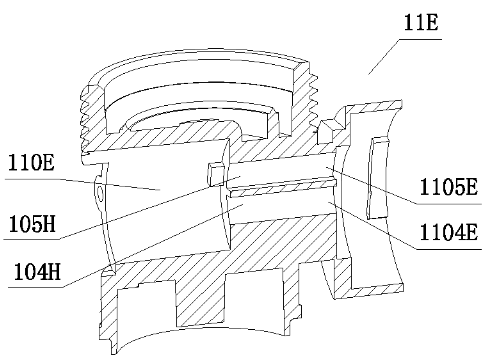

FIG. 38D is another perspective view of the fixing portion of the fixed disk of the alternative embodiment of the plane valve of the faucet water purifier according to the above first embodiment of the present invention, which shows the second sealing grooves of the fixing portion.

Figure 38E:
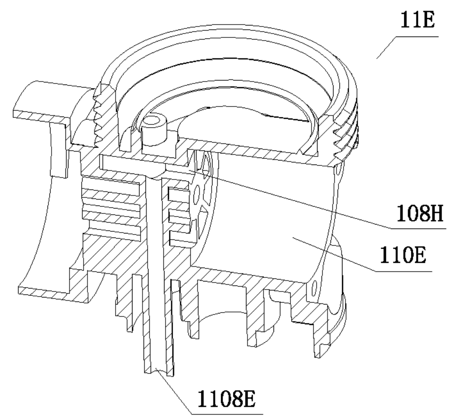

FIG. 38E is a perspective view of the upper end portion of the fixed disk of the alternative embodiment of the plane valve of the faucet water purifier according to the above first embodiment of the present invention, wherein the upper end portion of the fixed disk is provided at the fixing portion of the fixed disk.

Figure 38F:
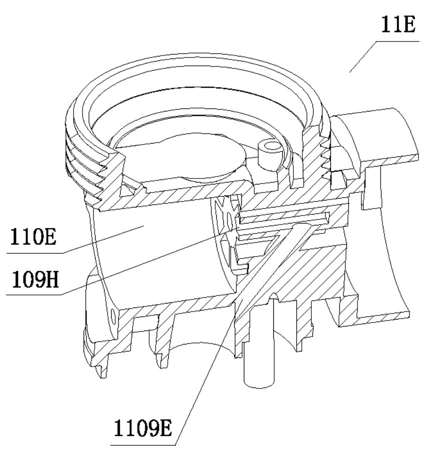

FIG. 38F is a perspective view of the first seal of the sealing assembly of the alternative embodiment of the plane valve of the faucet water purifier according to the above first embodiment of the present invention.

Figure 38G:
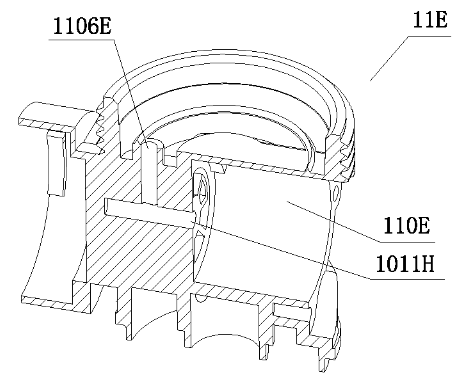

FIG. 38G is a perspective view of the second seal of the sealing assembly of the alternative embodiment of the plane valve of the faucet water purifier according to the above first embodiment of the present invention.

FIG. 38H is a perspective view of a fixing holder of the fixing device of the alternative embodiment of the plane valve of the faucet water purifier according to the above first embodiment of the present invention, which shows the restricting grooves of the fixing holder.

Figure 39A:
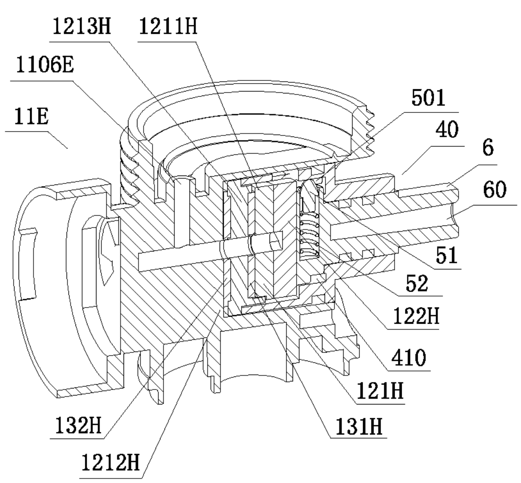

FIG. 39A is a perspective view of the fixed disk of the alternative embodiment of the plane valve of the faucet water purifier according to the above first embodiment of the present invention.

Figure 39B:
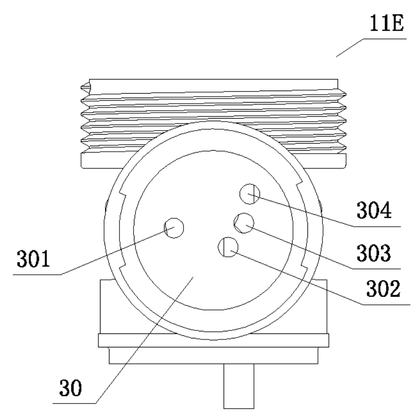

FIG. 39B is a top view of the fixed disk of the alternative embodiment of the plane valve of the faucet water purifier according to the above first embodiment of the present invention.

Figure 39C:
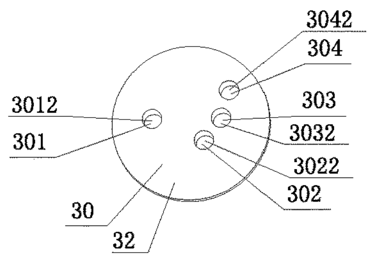

FIG. 39C is a bottom view of the fixed disk of the alternative embodiment of the plane valve of the faucet water purifier according to the above first embodiment of the present invention.

Figure 39D:
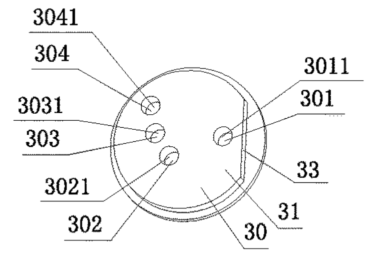

FIG. 39D is a perspective view of the rotatable disk of the alternative embodiment of the plane valve of the faucet water purifier according to the above first embodiment of the present invention.

FIG. 39E is a top view of the rotatable disk of the alternative embodiment of the plane valve of the faucet water purifier according to the above first embodiment of the present invention.

FIG. 39F is a bottom view of the rotatable disk of the alternative embodiment of the plane valve of the faucet water purifier according to the above first embodiment of the present invention.

Figure 40A:
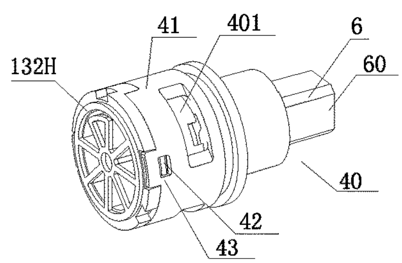

FIG. 40A is a structure diagram of the alternative embodiment of the faucet water purifier according to the above first embodiment of the present invention, wherein the faucet water purifier shown in FIG. 40A is under a first purifying working state, and the arrows shown in FIG. 40A point to the direction of water flow.

Figure 40B:
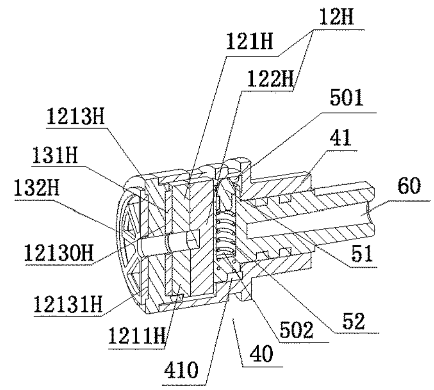

FIG. 40B is a structure diagram of the alternative embodiment of the faucet water purifier according to the above first embodiment of the present invention, wherein the faucet water purifier shown in FIG. 40B is under a back flushing working state, and the arrows shown in FIG. 40B point to the direction of water flow.

Figure 40C:
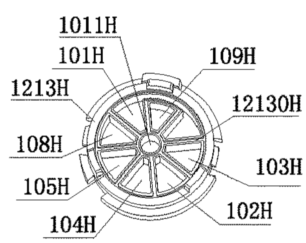

FIG. 40C is a structure diagram of the alternative embodiment of the faucet water purifier according to the above first embodiment of the present invention, wherein the faucet water purifier shown in FIG. 40C is under a raw water supplying working state, and the arrows shown in FIG. 40C point to the direction of water flow.

Figure 40D:
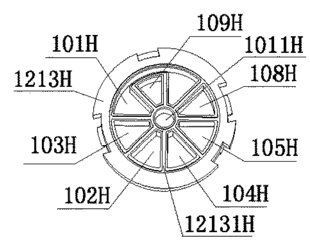
Figure 40E:
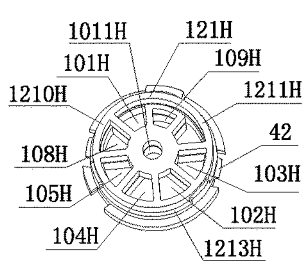
Figure 40F:
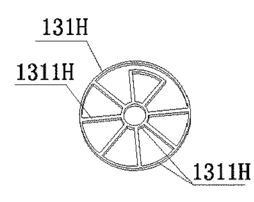
Figure 40G:
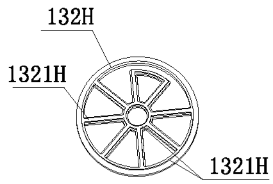
Figure 40H:
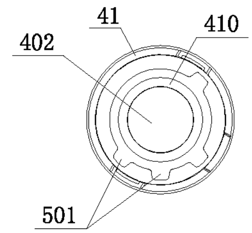

FIG. 40D is a structure diagram of the alternative embodiment of the faucet water purifier according to the above first embodiment of the present invention, wherein the faucet water purifier shown in FIG. 40D is under a second purifying working state, and the arrows shown in FIG. 40D point to the direction of water flow.

Figure 41A:
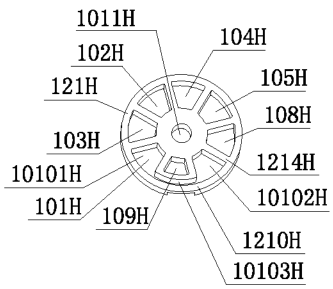

FIG. 41A is a structure diagram of the fixed disk of the alternative embodiment of the plane valve of the faucet water purifier according to the above first embodiment of the present invention.

Figure 41B:
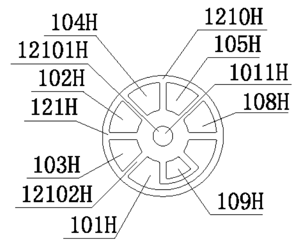

FIG. 41B is a structure diagram of the rotatable disk of the alternative embodiment of the plane valve of the faucet water purifier according to the above first embodiment of the present invention, wherein the dotted lines shown in FIG. 41B show the communicating channels of the rotatable disk.

Figure 41C:
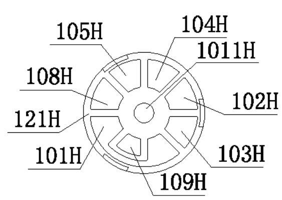

FIG. 41C is a diagram of the equal divisions of the fixed disk of the alternative embodiment of the plane valve of the faucet water purifier according to the above first embodiment of the present invention, which shows that the channels are respectively provided in the specific equal divisions of the fixed disk.

Figure 41D:
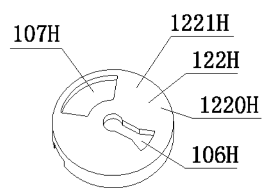
Figure 41E:
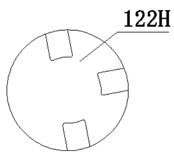
Figure 41F:
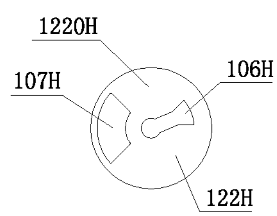

FIG. 41D is a diagram of the equal divisions of the rotatable disk of the alternative embodiment of the plane valve of the faucet water purifier according to the above first embodiment of the present invention, which shows that the channels are respectively provided in the specific equal divisions of the rotatable disk.

Figure 42A:
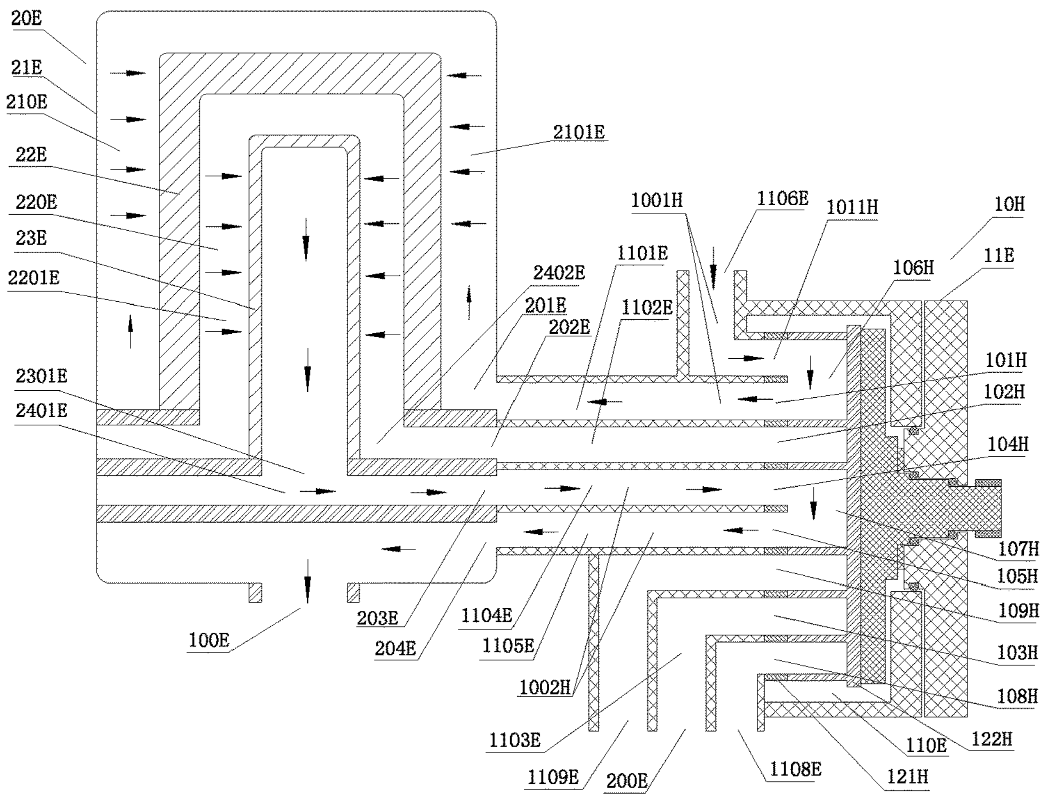

FIG. 42A is a diagram of the communication between the channels of the rotatable disk and the channels of the fixed disk of the plane valve, when the alternative embodiment of the plane valve of the faucet water purifier according to the above first embodiment of the present invention is under a first purifying working position, wherein the shaded area shown in FIG. 42A shows the passages defined by the communication between the rotatable disk and the fixed disk of the plane valve.

Figure 42B:
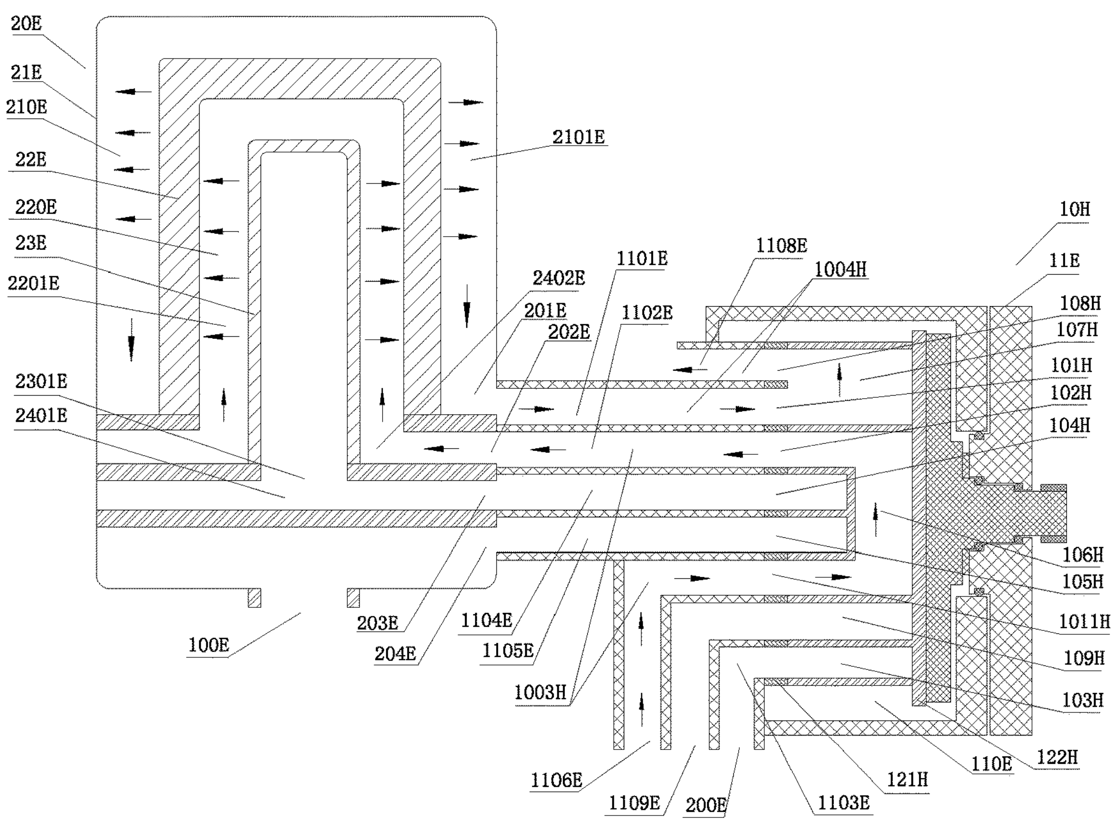

FIG. 42B is a diagram of the communication between the channels of the rotatable disk and the channels of the fixed disk of the plane valve, when the alternative embodiment of the plane valve of the faucet water purifier according to the above first embodiment of the present invention is under a back flushing working position, wherein the shaded area shown in FIG. 42B shows the passages defined by the communication between the rotatable disk and the fixed disk of the plane valve.

Figure 42C:
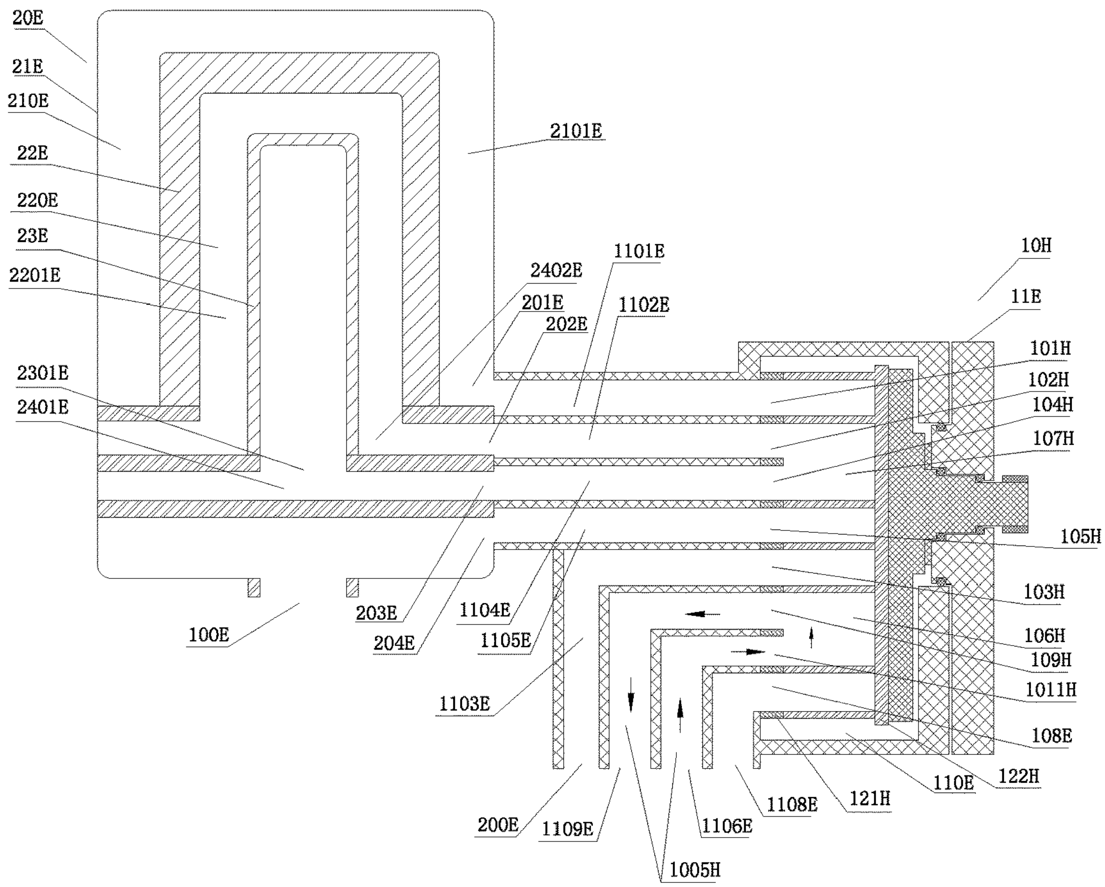

FIG. 42C is a diagram of the communication between the channels of the rotatable disk and the channels of the fixed disk of the plane valve, when the alternative embodiment of the plane valve of the faucet water purifier according to the above first embodiment of the present invention is under a raw water supplying working position, wherein the shaded area shown in FIG. 42C shows the passages defined by the communication between the rotatable disk and the fixed disk of the plane valve.

Figure 42D:
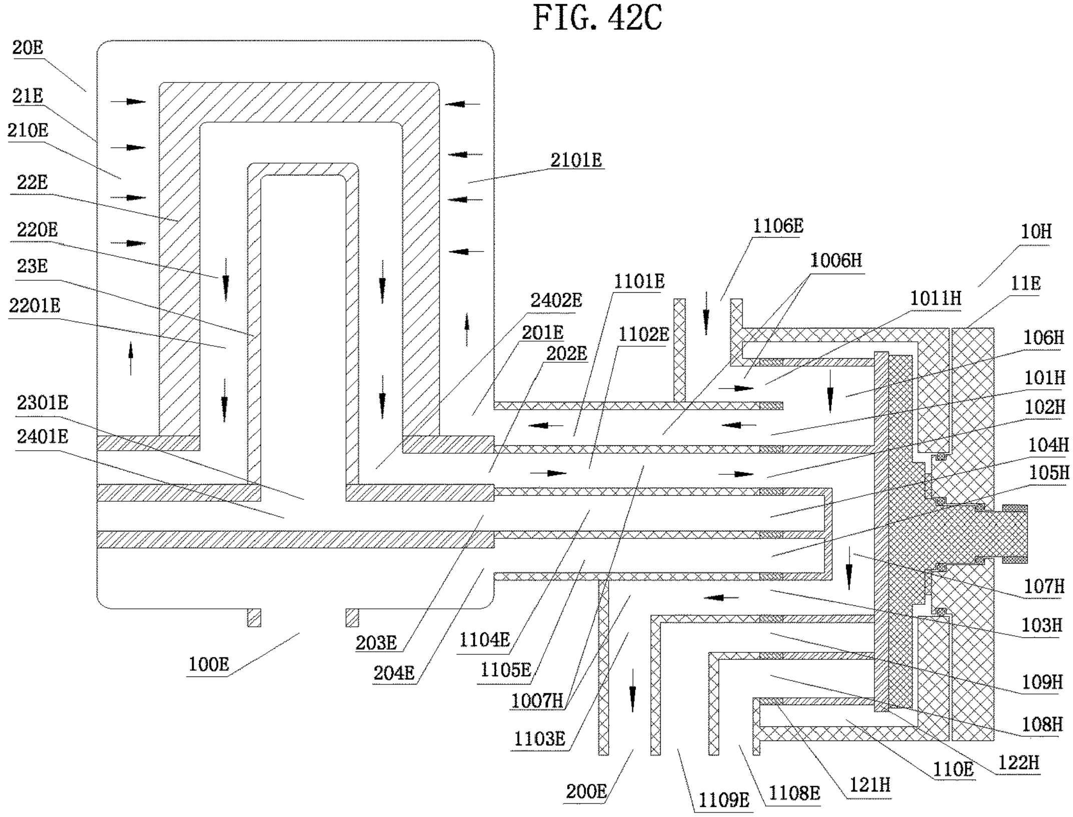
Figure 43A:
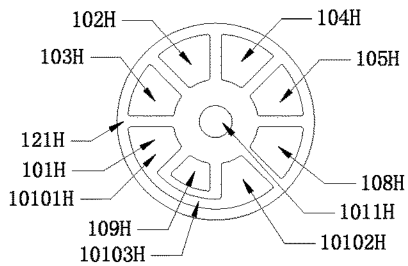
Figure 43B:
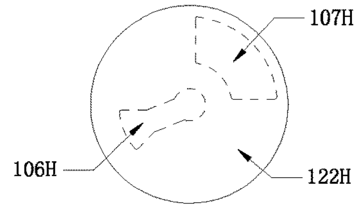
Figure 43C:
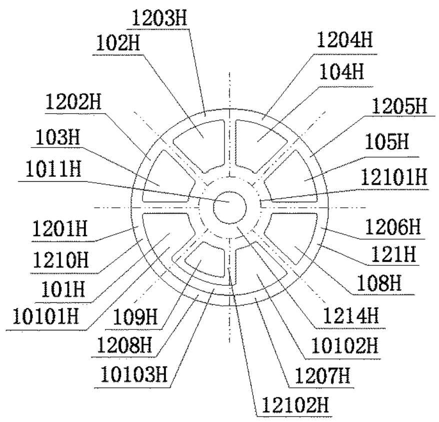
Figure 43D:
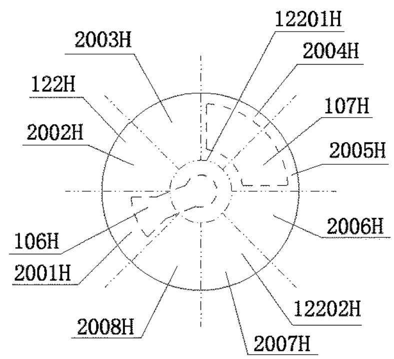
Figure 44A:
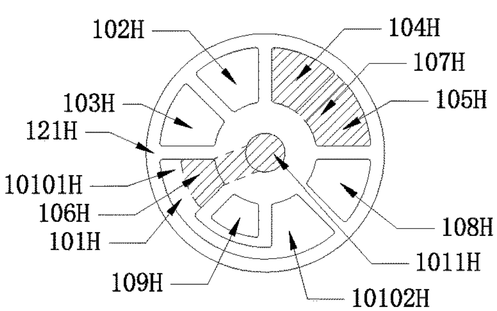
Figure 44B:
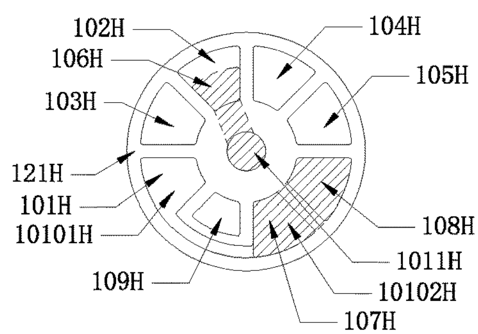
Figure 44C:
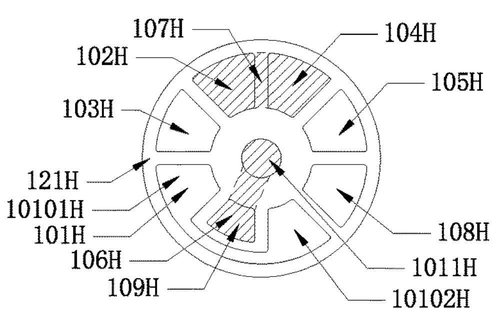
Figure 44D:
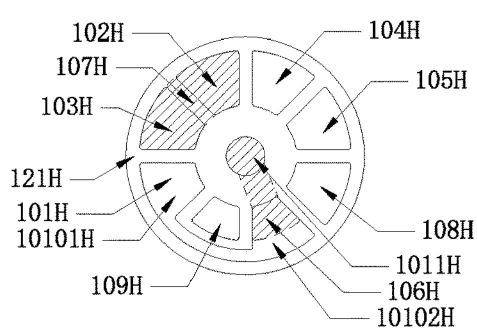

FIG. 42D is a diagram of the communication between the channels of the rotatable disk and the channels of the fixed disk of the plane valve, when the alternative embodiment of the plane valve of the faucet water purifier according to the above first embodiment of the present invention is under a second purifying working position, wherein the shaded area shown in FIG. 42D shows the passages defined by the communication between the rotatable disk and the fixed disk of the plane valve.

FIG. 43 is a front view of the faucet water purifier according to a second embodiment of the present invention.

FIG. 44 is an exploded view of the faucet water purifier according to the above second embodiment of the present invention.

Figure 45:
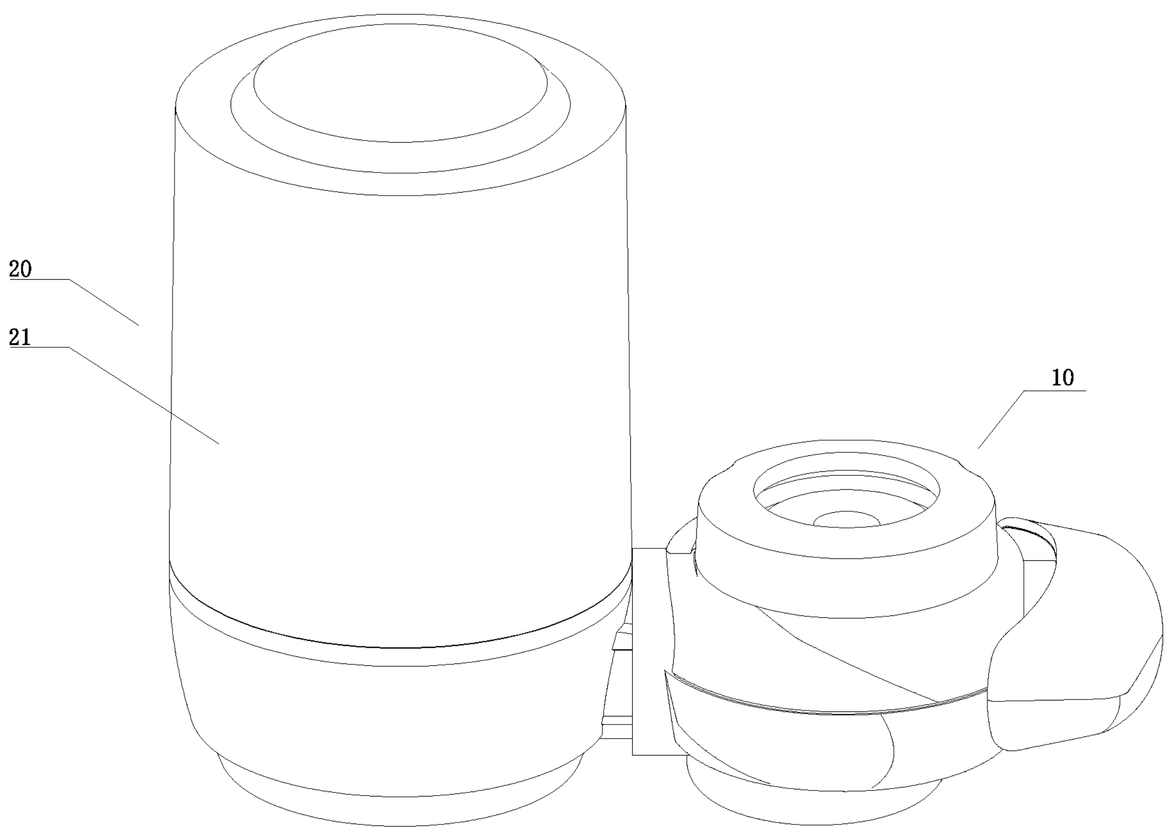

FIG. 45A is a front view of the filtering device of the faucet water purifier according to the above second embodiment of the present invention.

FIG. 45B is a sectional view of the filtering device of the faucet water purifier according to the above second embodiment of the present invention.

FIG. 45C is a perspective view of a primary filter of the filtering device of the faucet water purifier according to the above second embodiment of the present invention.

FIG. 45D is a perspective view of a secondary filter of the filtering device of the faucet water purifier according to the above second embodiment of the present invention.

Figure 46:
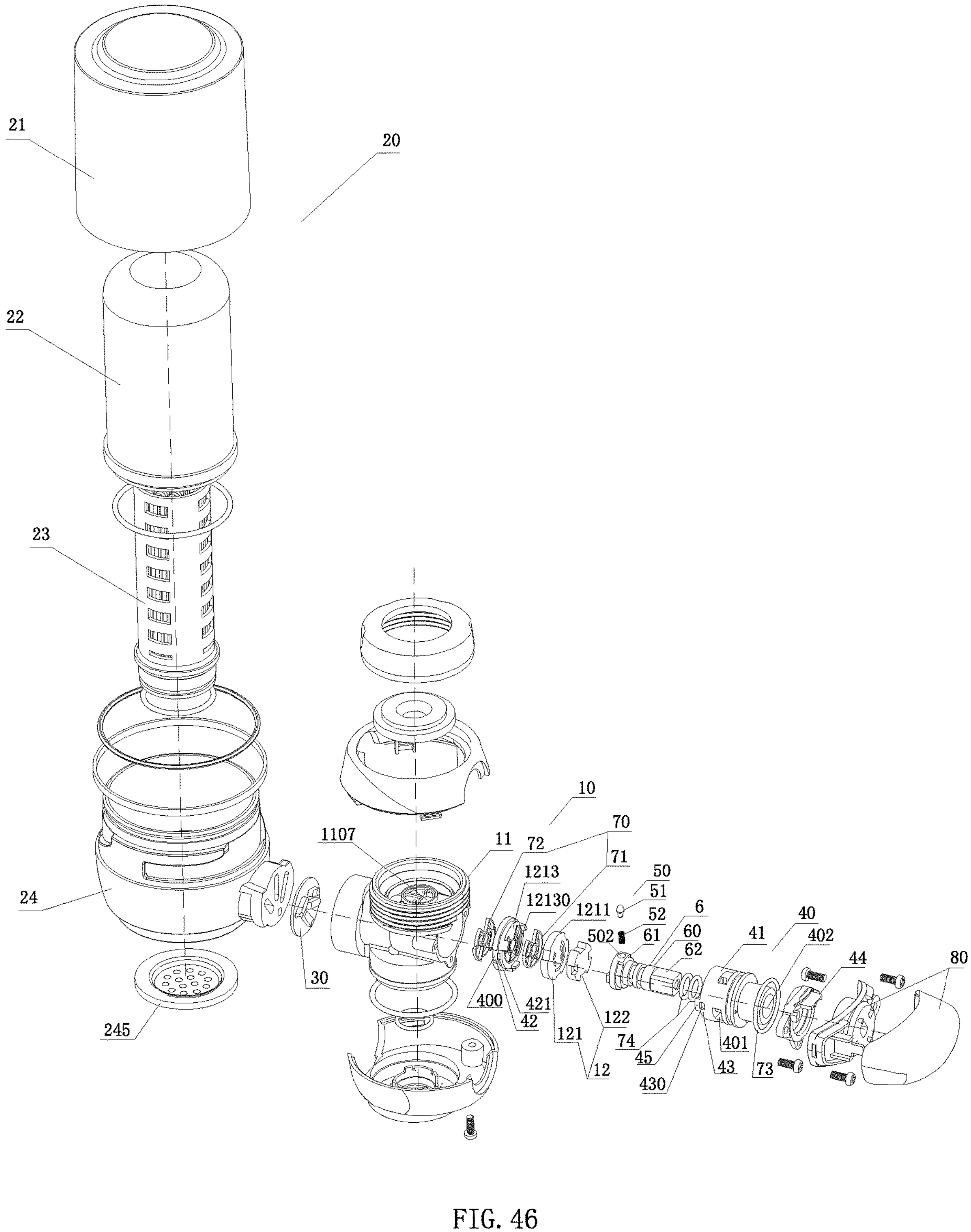

FIG. 46A is a perspective view of a base of the filtering device of the faucet water purifier according to the above second embodiment of the present invention.

FIG. 46B is a sectional view of the base of the filtering device of the faucet water purifier according to the above second embodiment of the present invention.

FIG. 46C is another sectional view of the base of the filtering device of the faucet water purifier according to the above second embodiment of the present invention.

FIG. 46D is another sectional view of the base of the filtering device of the faucet water purifier according to the above second embodiment of the present invention.

FIG. 46E is another sectional view of the base of the filtering device of the faucet water purifier according to the above second embodiment of the present invention.

Figure 47A:
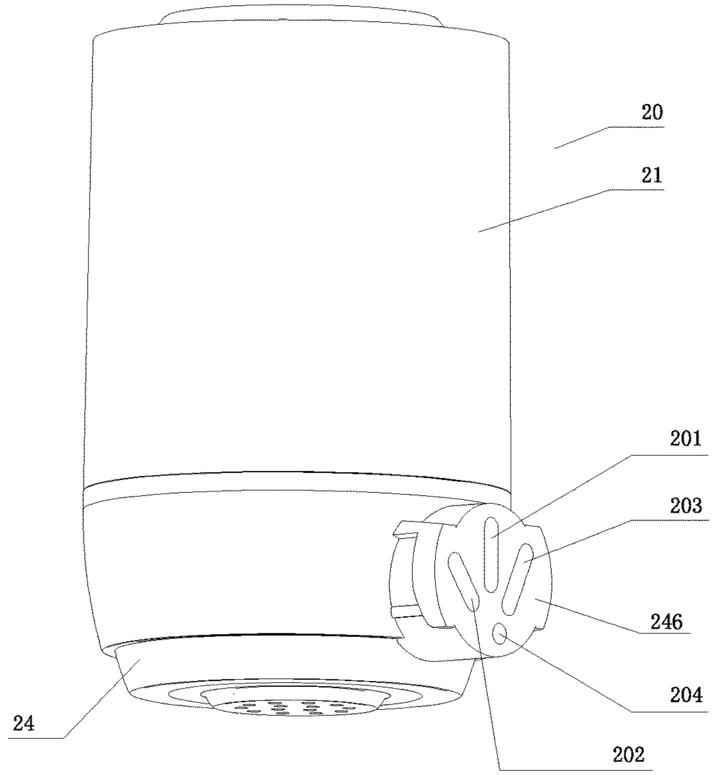

FIG. 47A is a sectional view of the base and a terminal filter of the filtering device of the faucet water purifier according to the above second embodiment of the present invention.

Figure 47B:
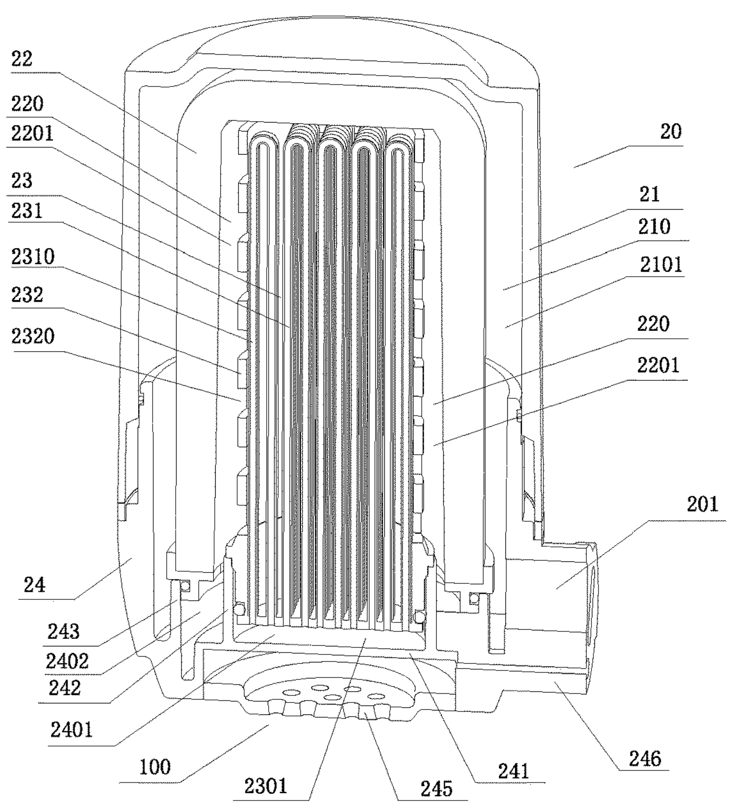

FIG. 47B is a sectional view of the terminal filter of the filtering device of the faucet water purifier according to the above second embodiment of the present invention.

Figure 47C:
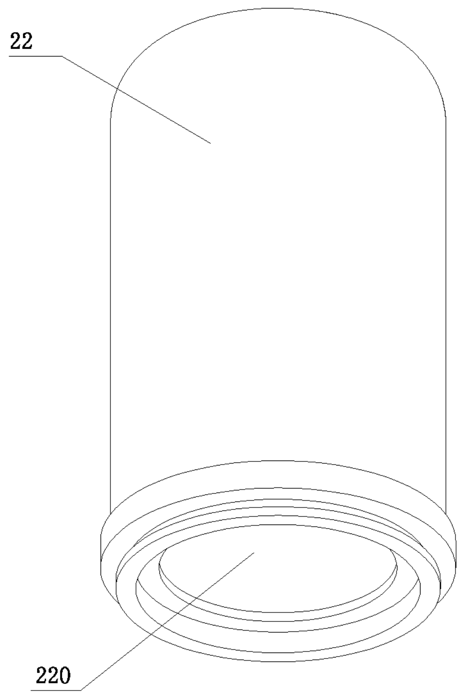
Figure 47D:
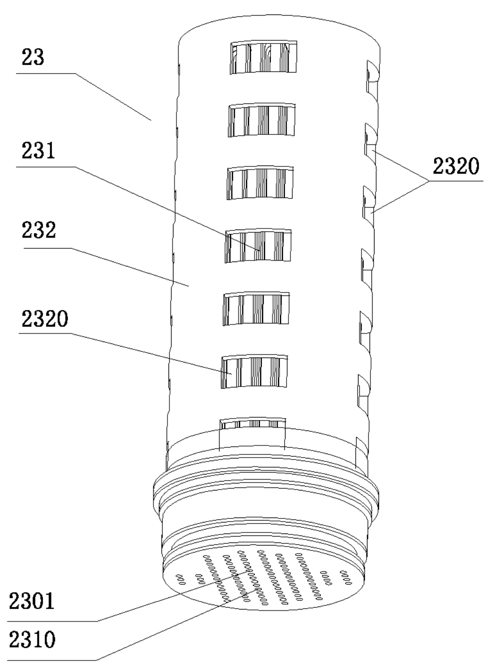

FIG. 47C is another sectional view of the terminal filter of the filtering device of the faucet water purifier according to the above second embodiment of the present invention.

Figure 48A:
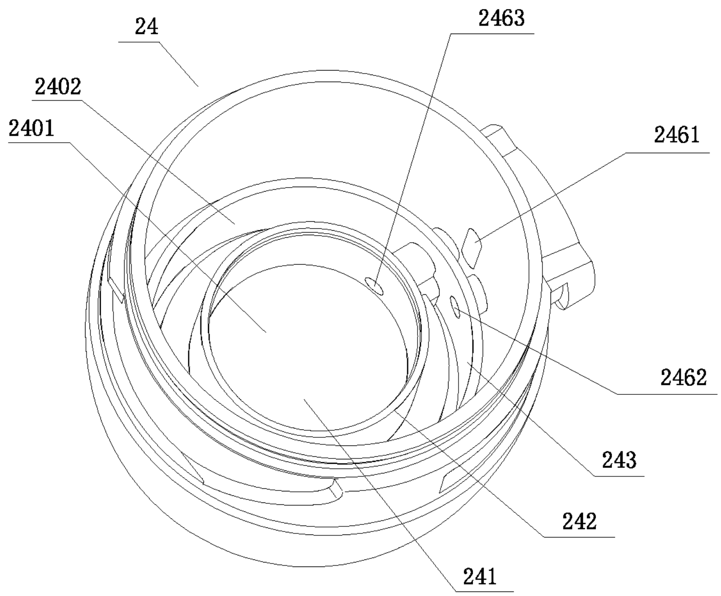

FIG. 48A is a front view of an alternative embodiment of the filtering device of the faucet water purifier according to the above second embodiment of the present invention.

Figure 48B:
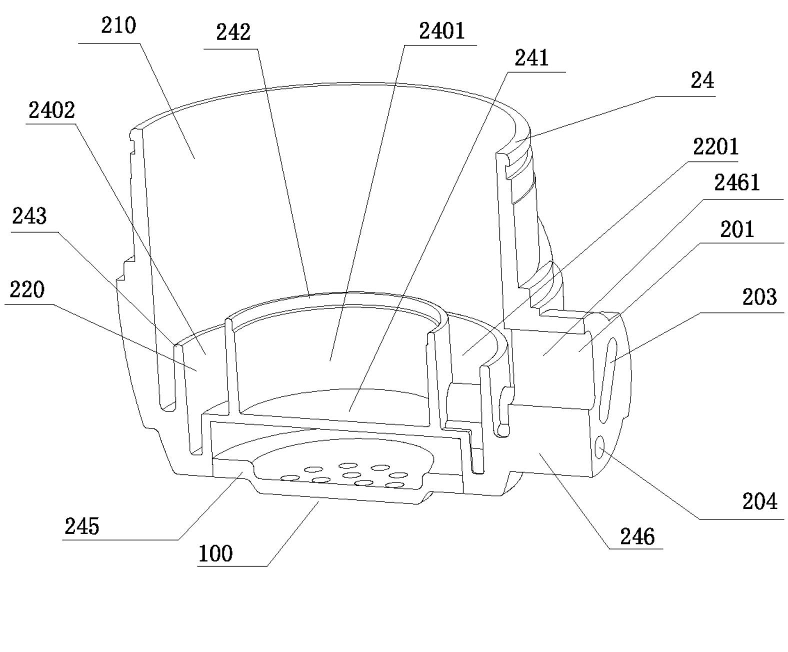

FIG. 48B is a sectional view of the alternative embodiment of the filtering device of the faucet water purifier according to the above second embodiment of the present invention.

Figure 48C:
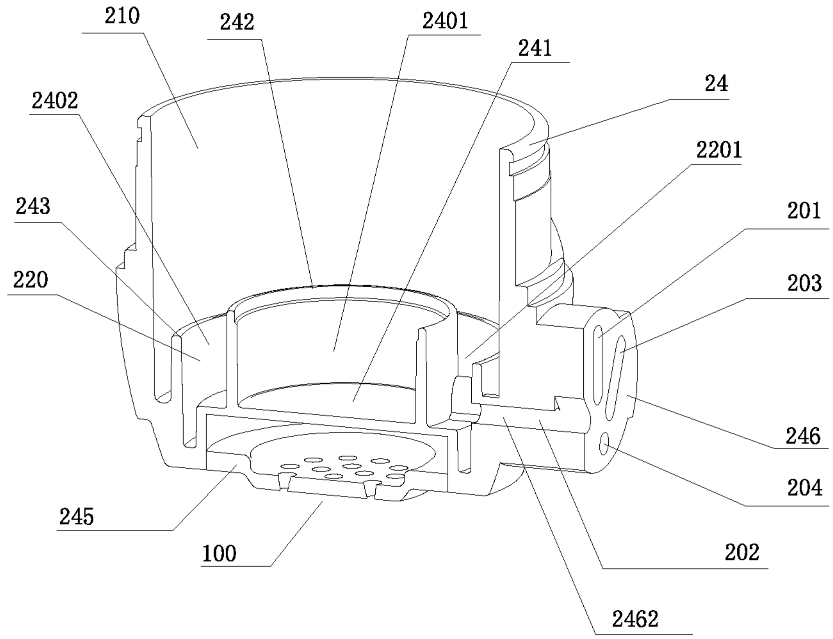

FIG. 48C is a perspective view of the secondary filter of the alternative embodiment of the filtering device of the faucet water purifier according to the above second embodiment of the present invention.

Figure 48D:
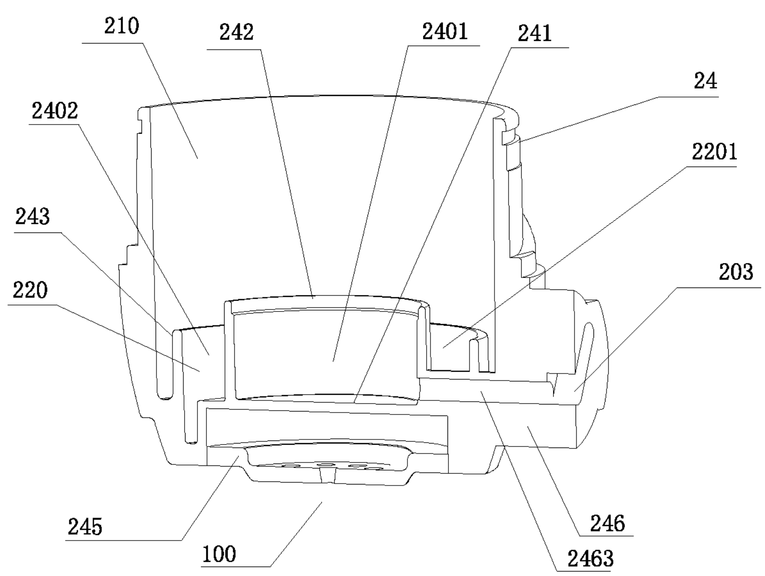
Figure 48E:
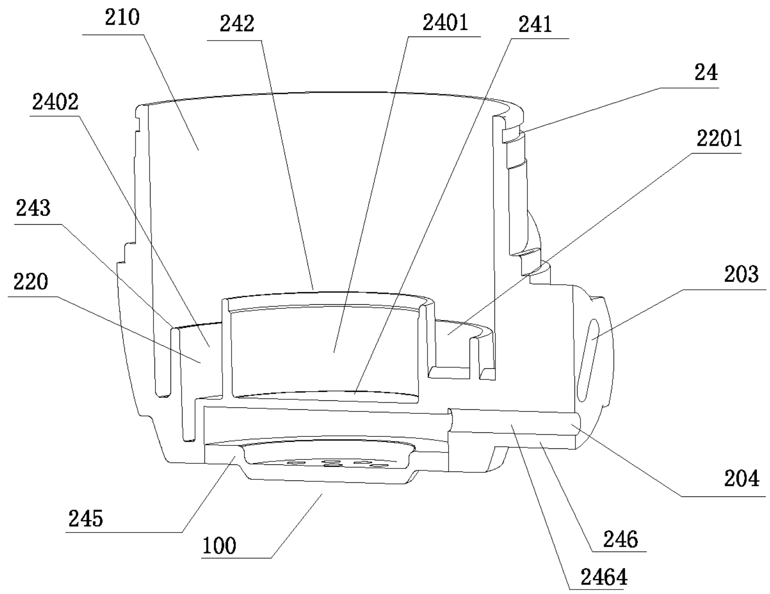

FIG. 48D is a sectional view of the secondary filter of the alternative embodiment of the filtering device of the faucet water purifier according to the above second embodiment of the present invention.

Figure 49A:
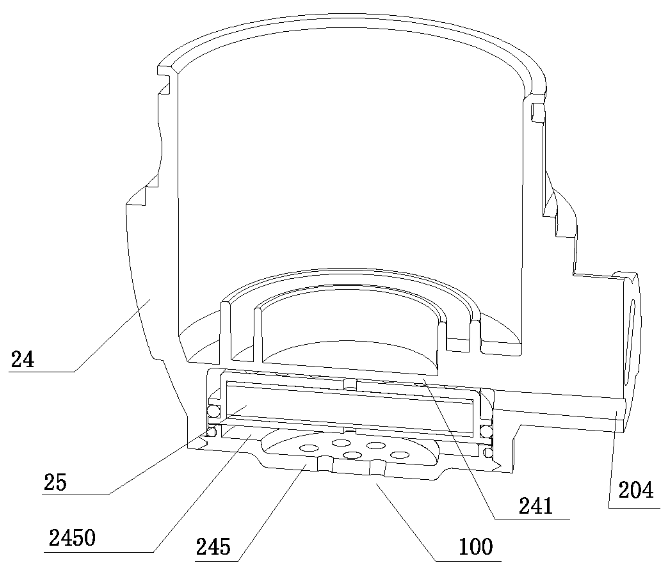

FIG. 49A is a perspective view of the base of the alternative embodiment of the filtering device of the faucet water purifier according to the above second embodiment of the present invention.

Figure 49B:
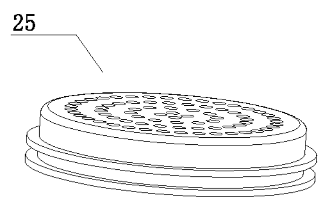

FIG. 49B is a sectional view of the base of the alternative embodiment of the filtering device of the faucet water purifier according to the above second embodiment of the present invention.

Figure 49C:
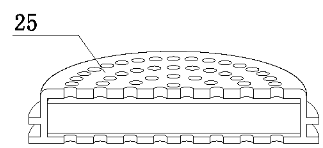
Figure 50A:
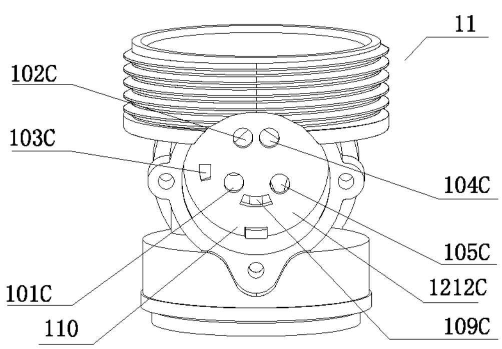
Figure 50B:
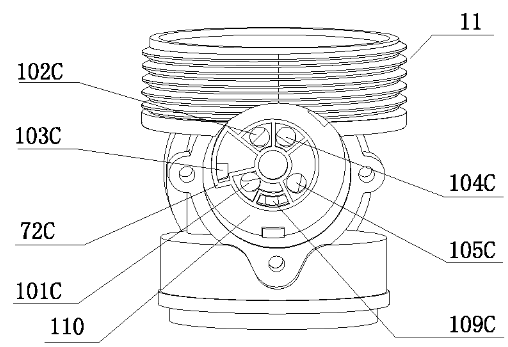
Figure 50C:
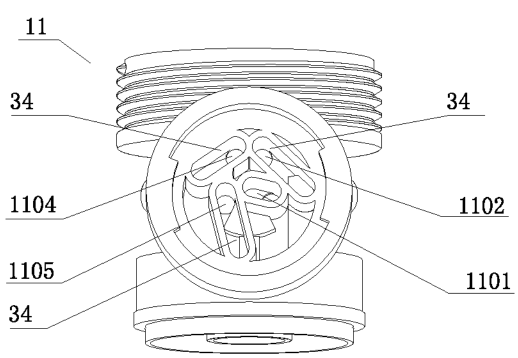
Figure 50D:
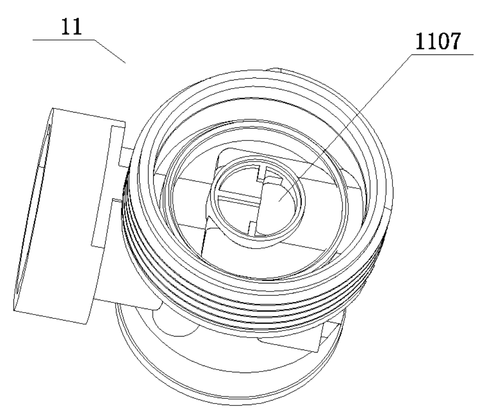
Figure 50E:
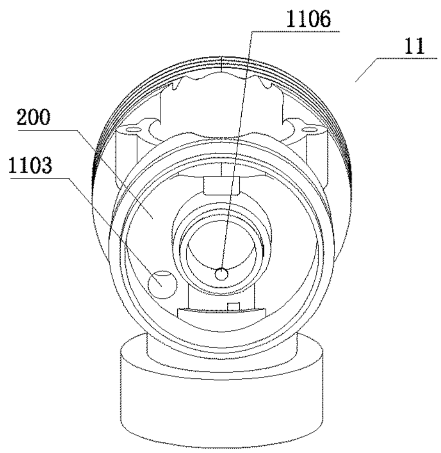
Figure 50F:
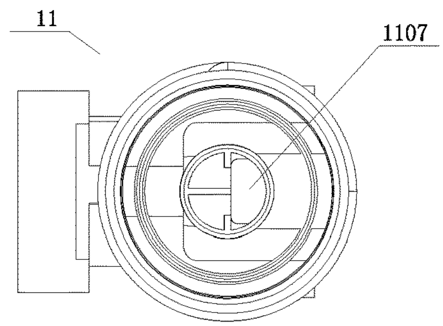
Figure 50G:
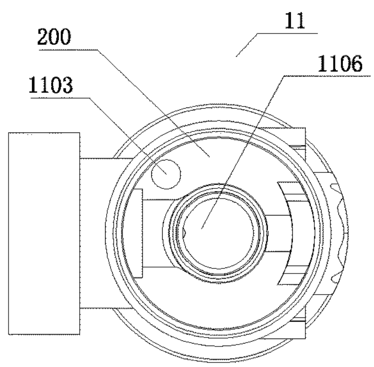
Figure 51A:
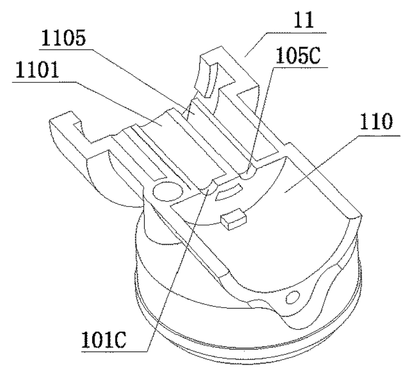
Figure 51B:
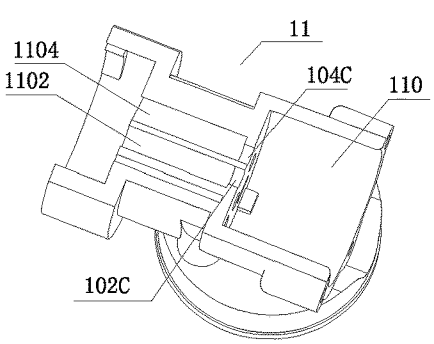
Figure 51C:
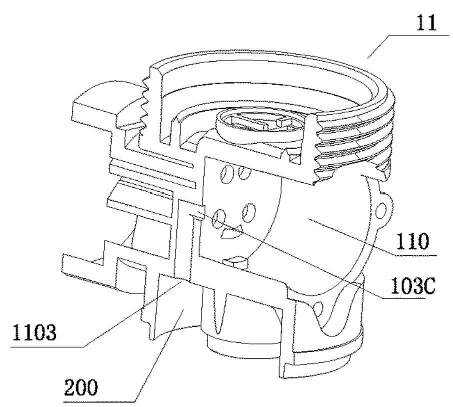
Figure 51D:
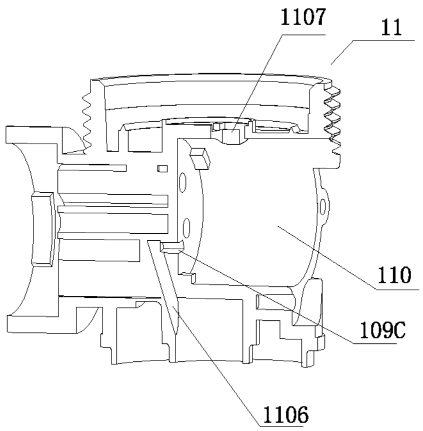
Figure 52A:
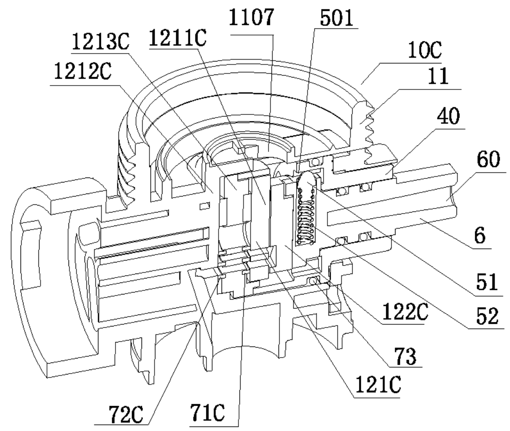
Figure 52B:
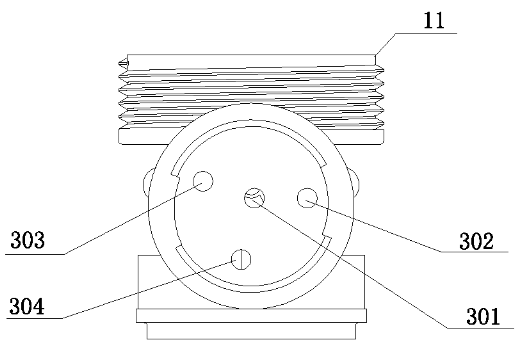
Figure 52C:
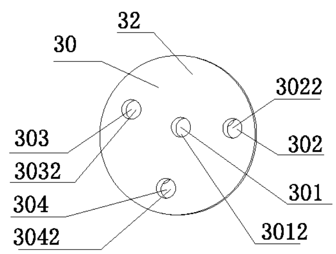
Figure 52D:
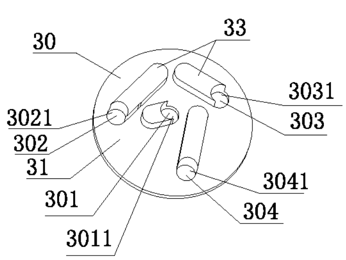
Figure 53A:
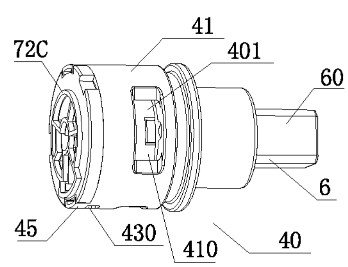
Figure 53B:
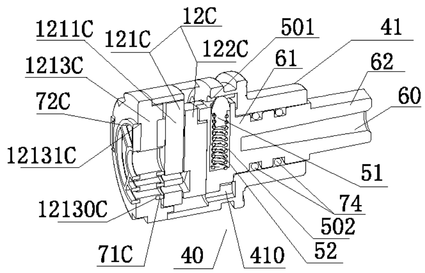
Figure 53C:
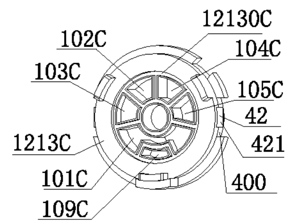
Figure 53D:
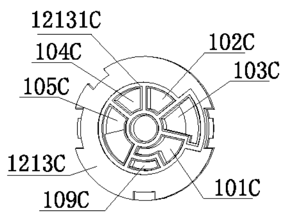
Figure 53E:
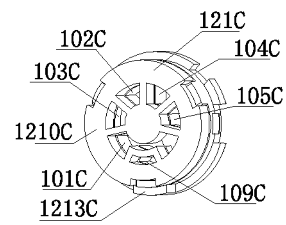
Figure 53F:
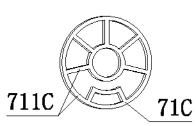
Figure 53G:
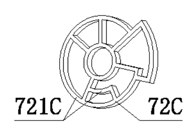
Figure 54A:
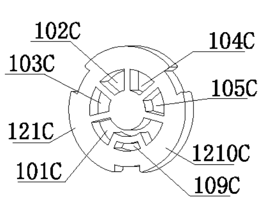
Figure 54B:
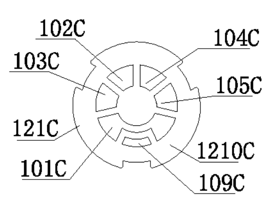
Figure 54C:
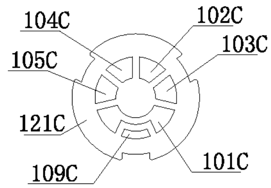
Figure 54D:
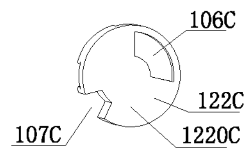
Figure 54E:
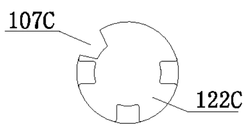
Figure 54F:
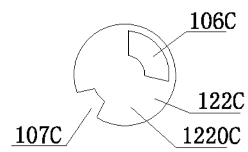
Figure 55A:
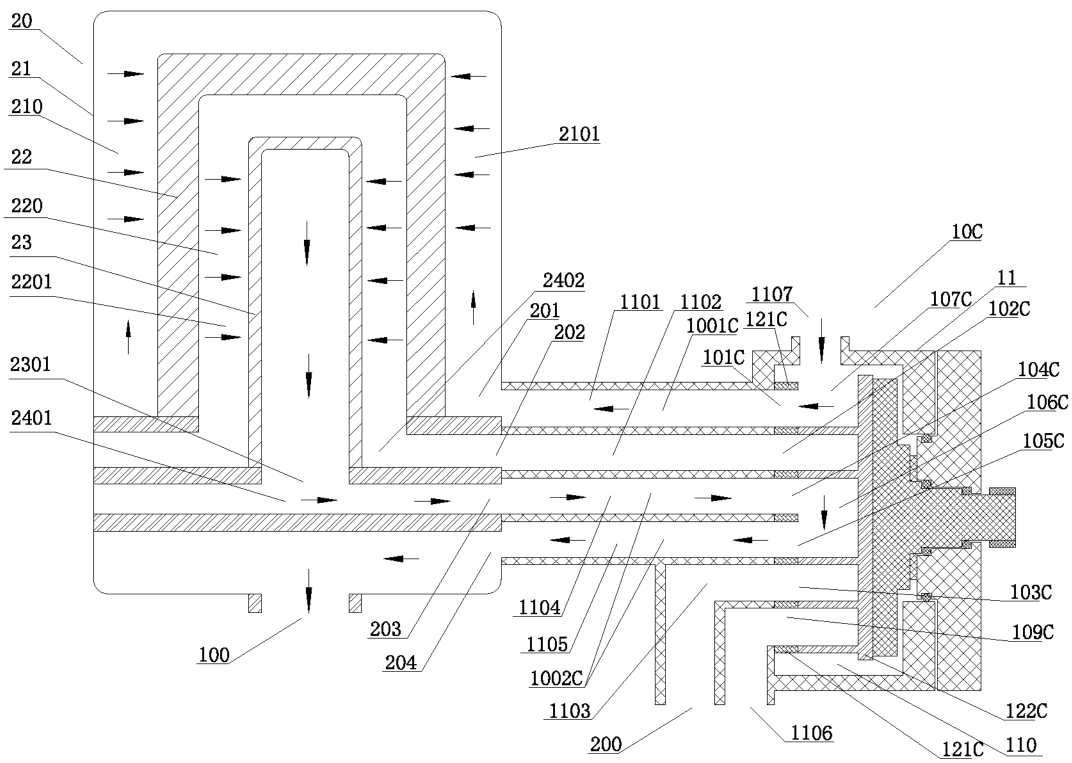
Figure 55B:
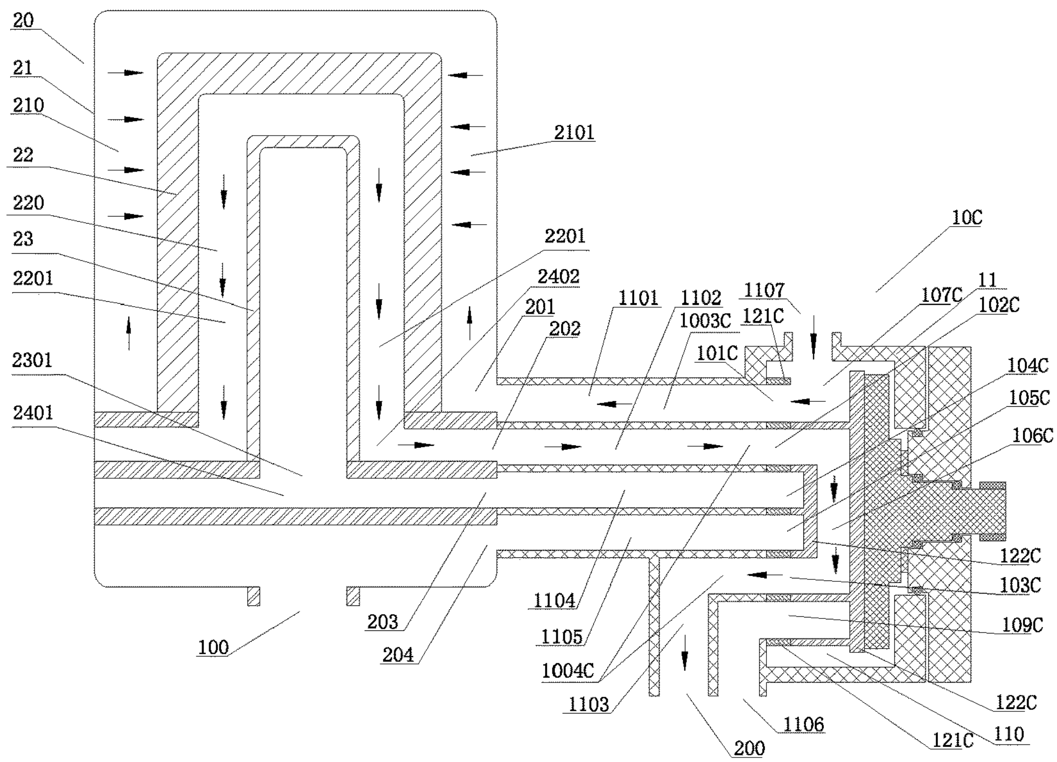
Figure 55C:
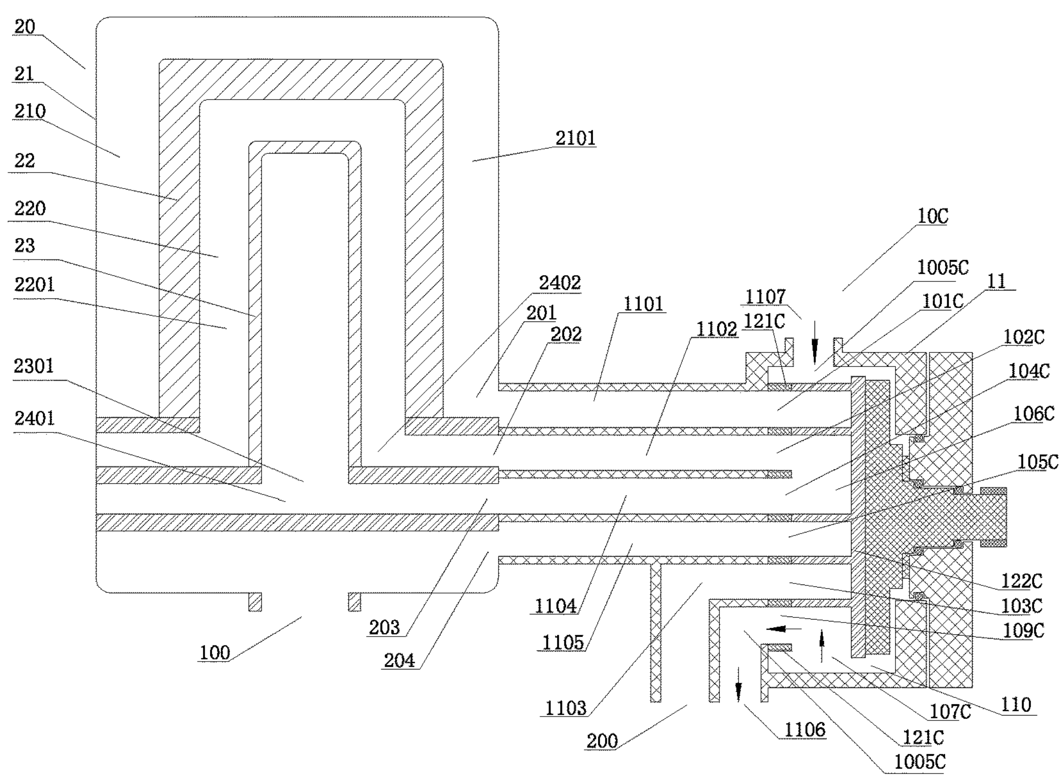
Figure 56A:
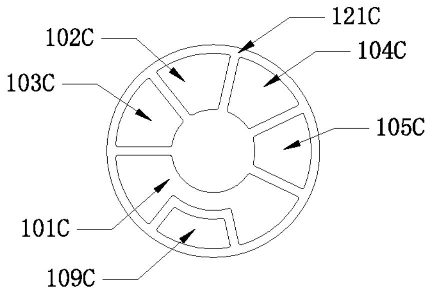
Figure 56B:
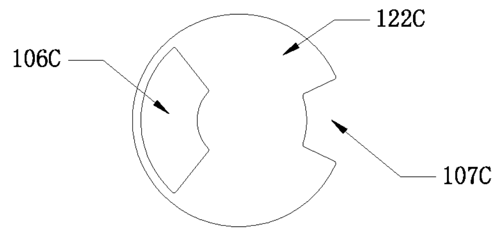
Figure 57A:
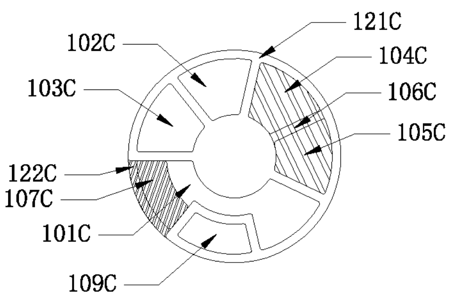
Figure 57B:
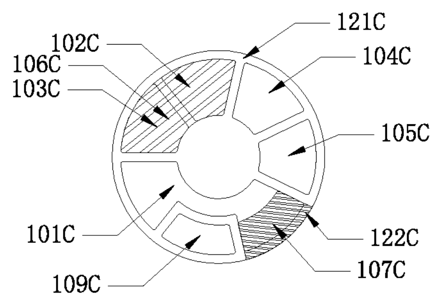
Figure 57C:
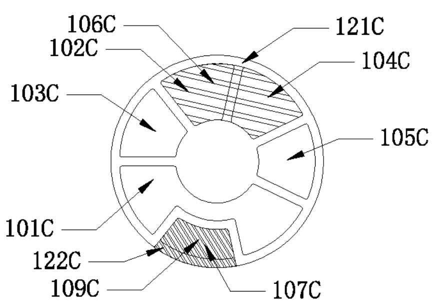
Figure 58A:
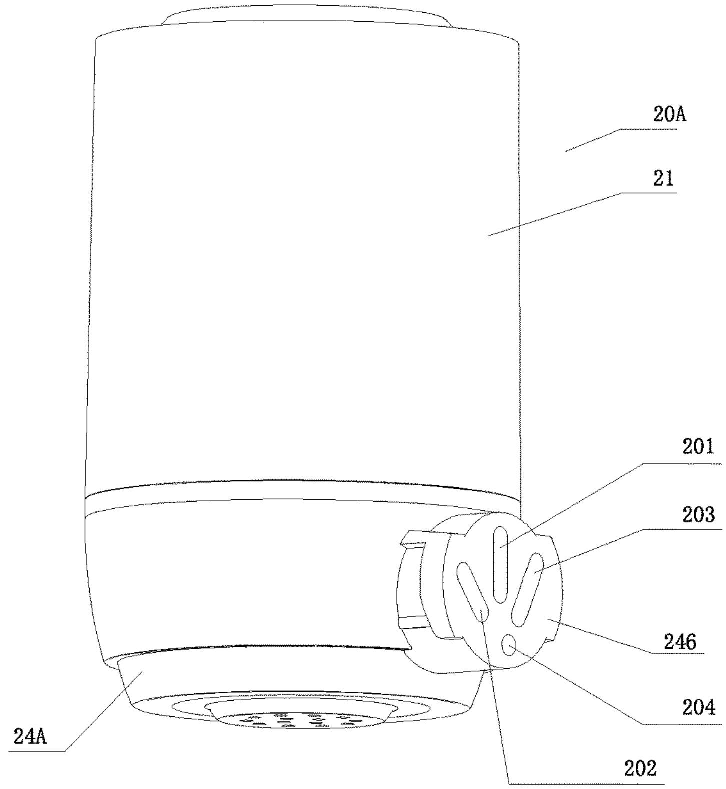
Figure 58B:
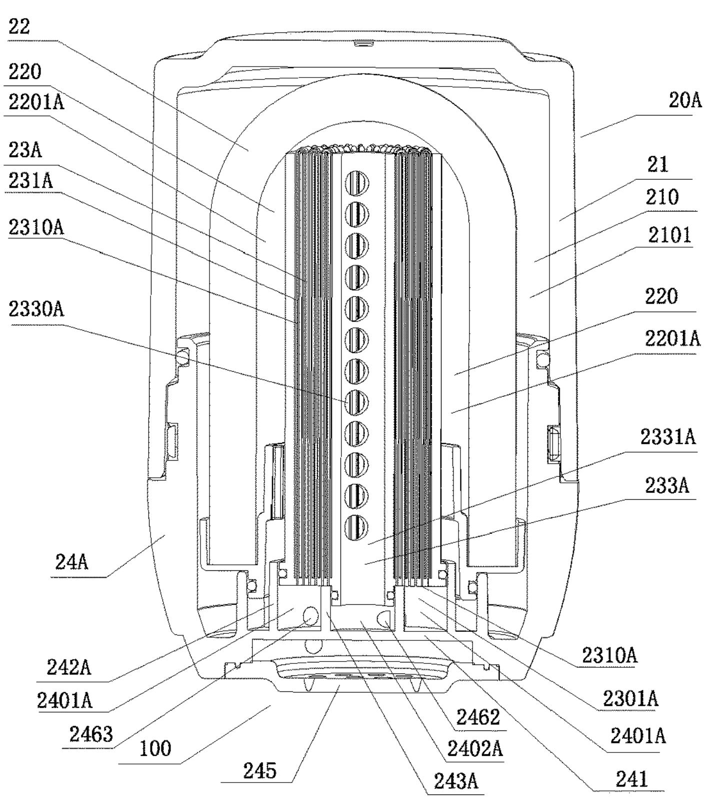
Figure 58C:
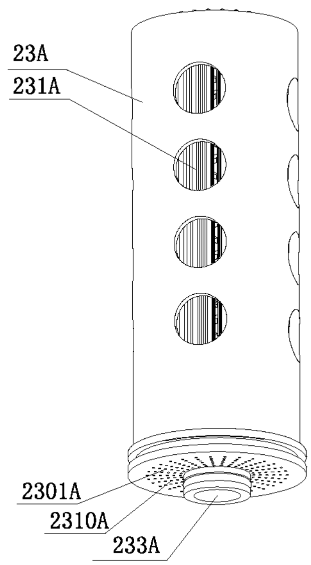
Figure 58D:
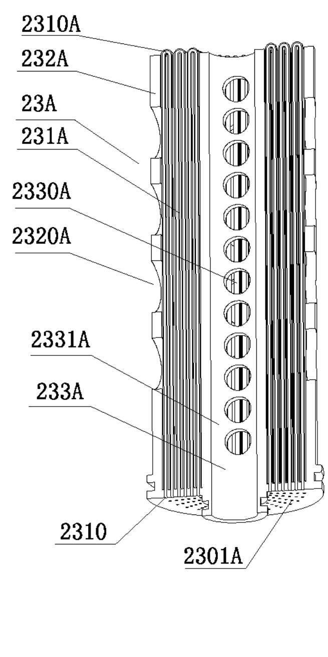
Figure 59A:
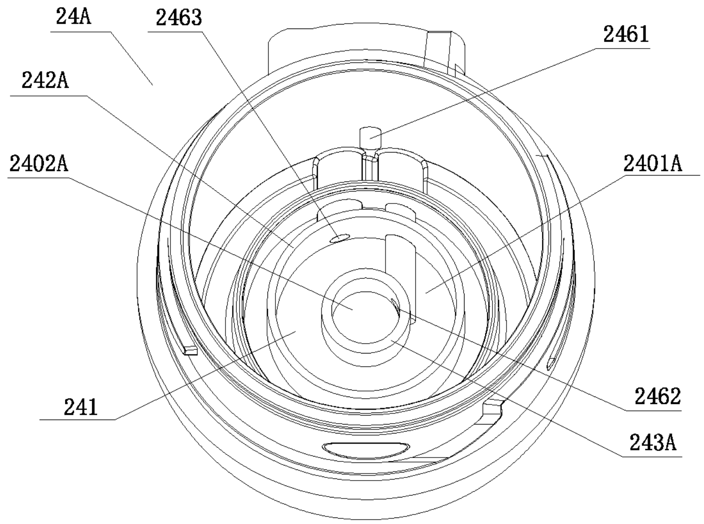
Figure 59B:
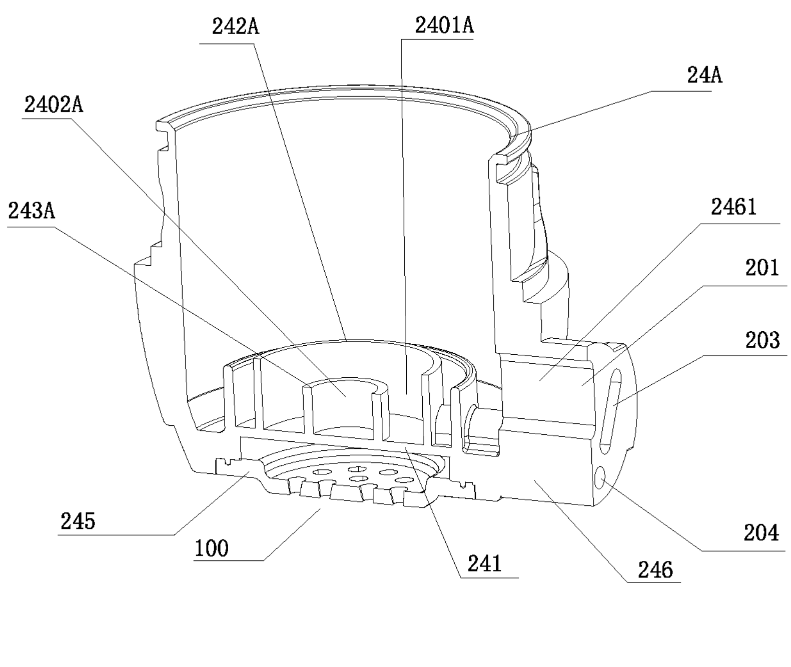
Figure 59C:
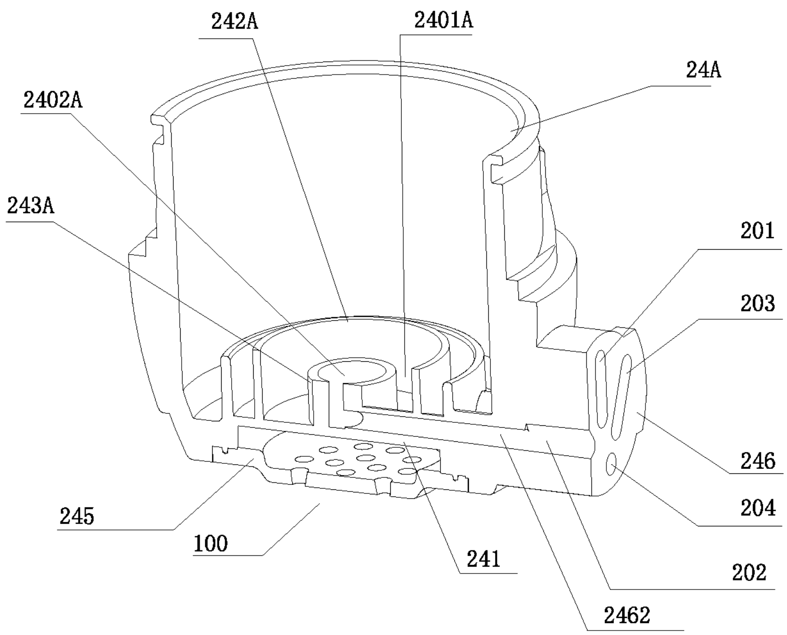
Figure 59D:
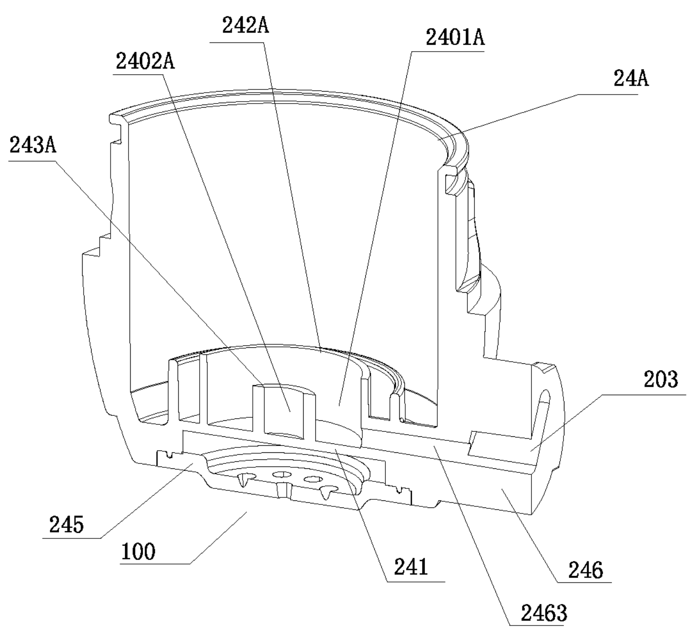
Figure 59E:
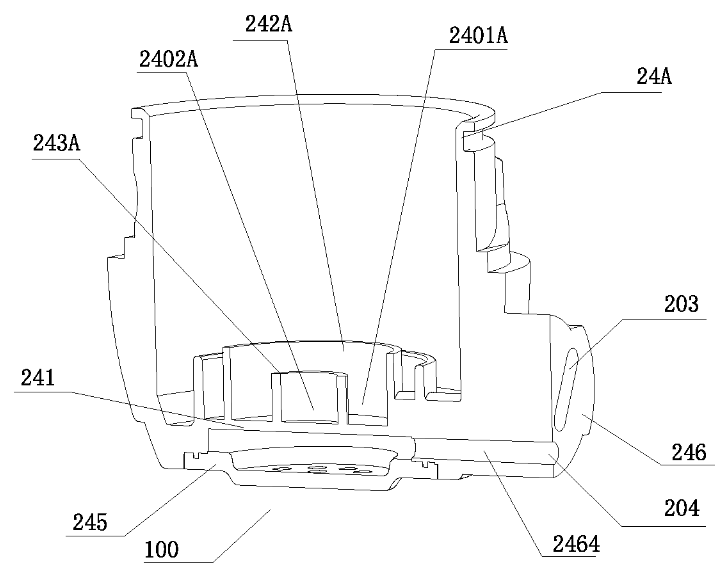
Figure 60A:
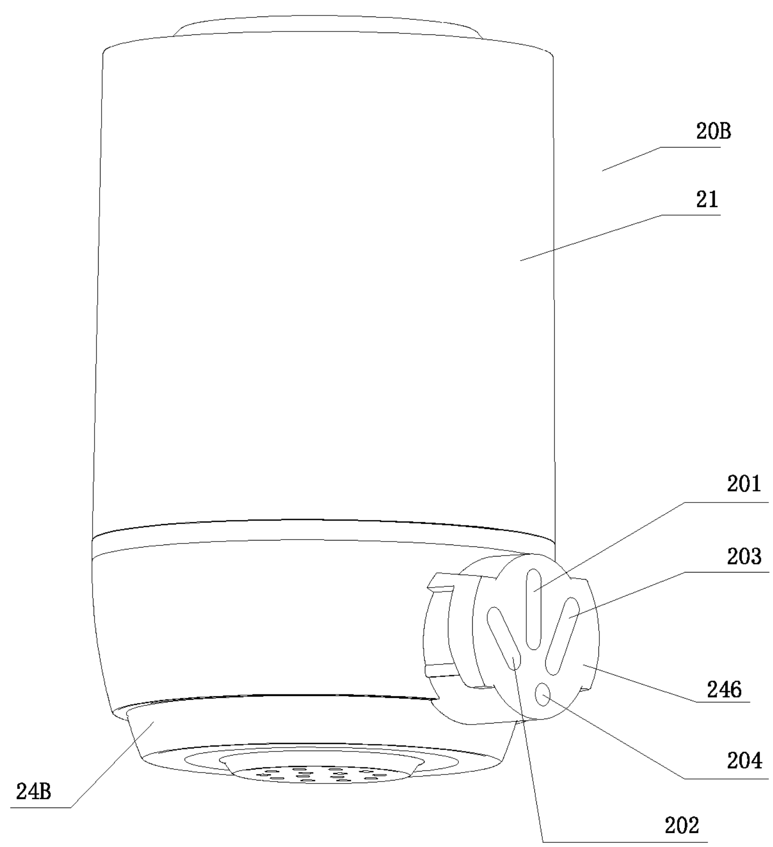
Figure 60B:
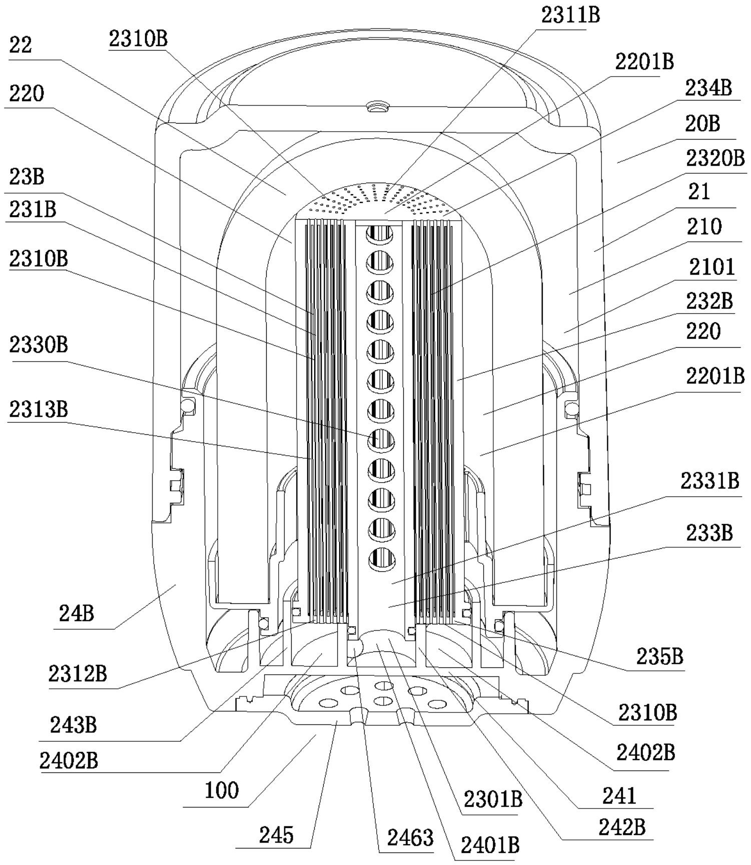
Figure 60C:
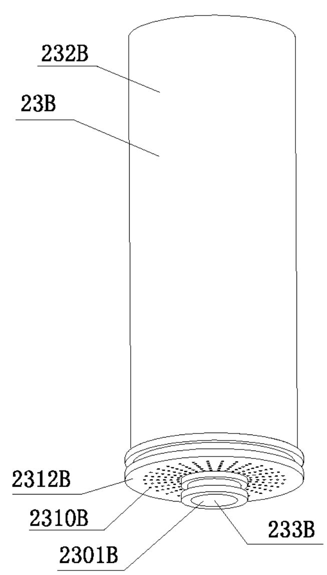
Figure 60D:
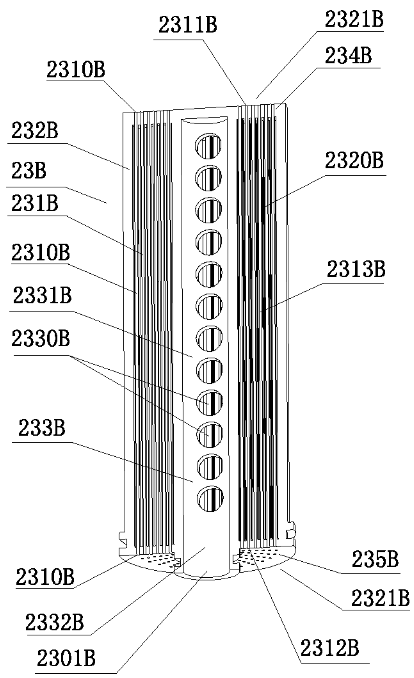
Figure 61A:
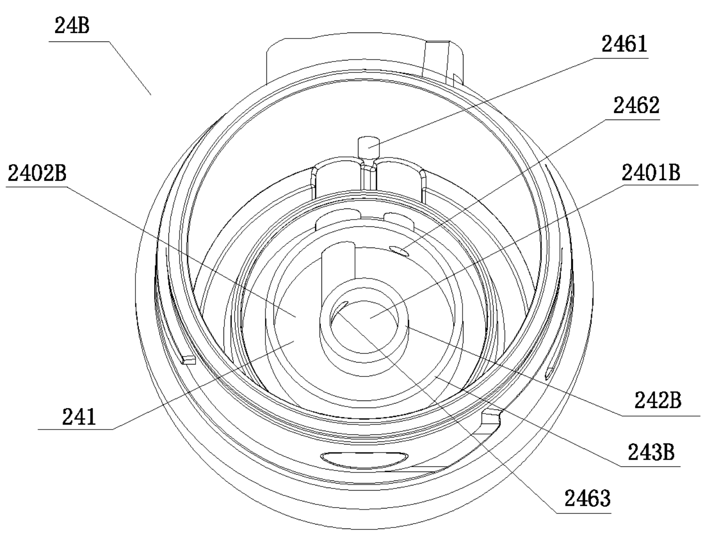
Figure 61B:
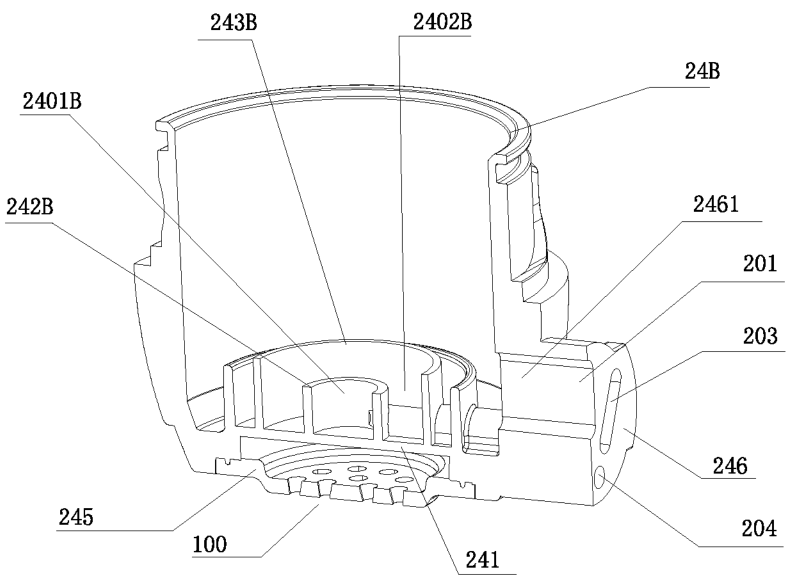
Figure 61C:
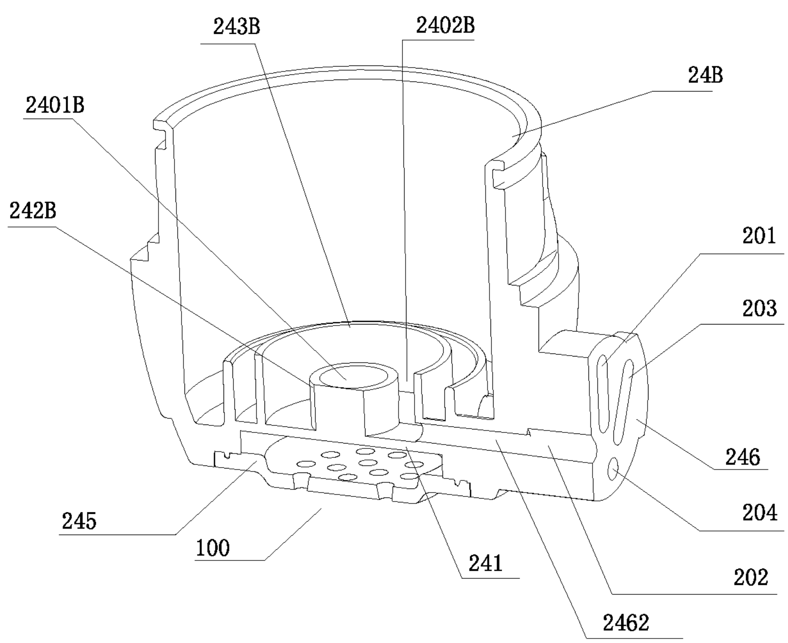
Figure 61D:
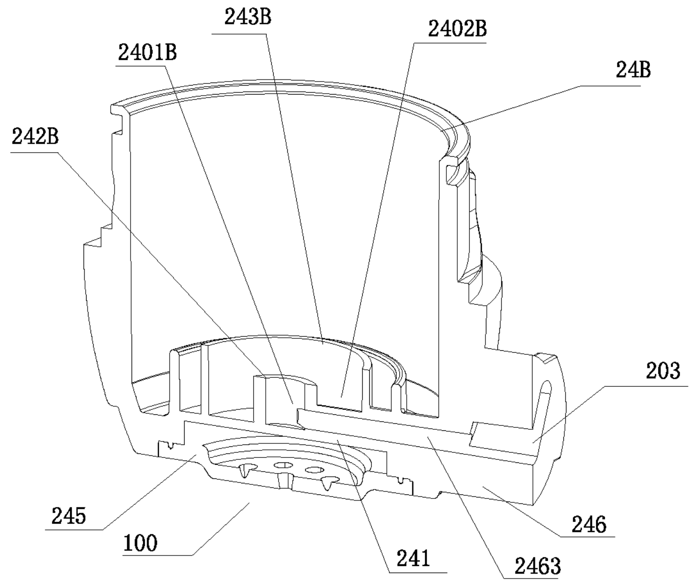
Figure 61E:
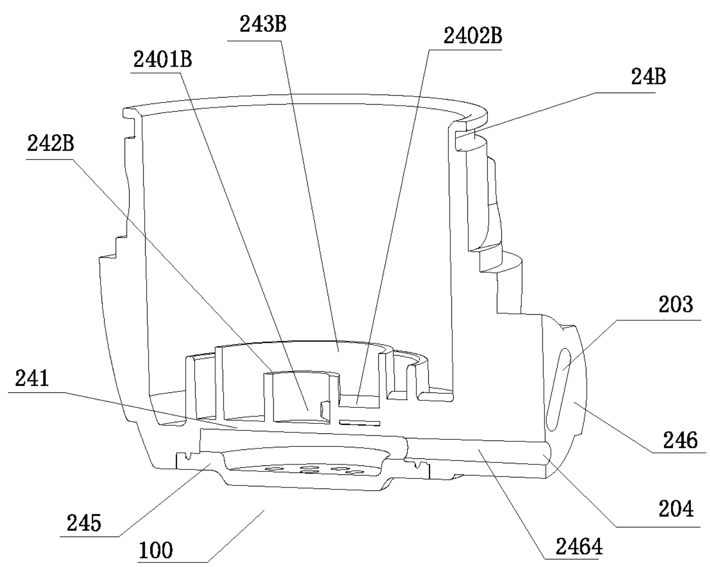

FIG. 49C is another sectional view of the base of the alternative embodiment of the filtering device of the faucet water purifier according to the above second embodiment of the present invention.

FIG. 49D is another sectional view of the base of the alternative embodiment of the filtering device of the faucet water purifier according to the above second embodiment of the present invention.

FIG. 49E is another sectional view of the base of the alternative embodiment of the filtering device of the faucet water purifier according to the above second embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal", "lateral", "upper", "lower", "front", "back", "left", "right", "perpendicular", "horizontal", "top", "bottom", "inner", "outer" and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It will be understood that the term "a" should be understood as "at least one" or "one or more", that is, in one embodiment, the number of an element may be one, and in other embodiments, the number of the element can be greater than one, and the term "a" cannot be construed as a limitation to the quantity.

Referring to FIG. 1 to FIG. 13D, a faucet water purifier of a first embodiment of the present invention is illustrated, wherein the faucet water purifier of the present invention comprises a control valve 10E and a filtering device 20E, wherein the control valve 10E is provided for controlling the flow of water, such as controlling the supply of raw water (or tap water) to be supplied to the filtering device 20E and controlling the supply of the purified water generated or produced by treating the raw water by the filtering device 20E.

As shown in FIG. 1 to FIG. 5C, the filtering device 20E of the faucet water purifier according to the first embodiment of the present invention comprises an outer casing 21E, a primary filter 22E and a secondary filter 23E, wherein the outer casing 21E defines a first accommodation cavity 210E, the primary filter 22E defines a second accommodation cavity 220E, wherein the primary filter 22E is disposed inside the first accommodation cavity 210E of the outer casing 21E, the secondary filter 23E is disposed inside the second accommodation cavity 220E of the primary filter 22E, and the outer casing 21E and the primary filter 22E define a raw water channel 2101E therebetween, the primary filter 22E and the secondary filter 23E define a purified water channel 2201E (the purified water channel 2201E can be regard as a part of the second accommodation cavity 220E) therebetween, the secondary filter 23E has a purified water outlet 2301E. Accordingly, since the secondary filter 23E is disposed inside the second accommodation cavity 220E of the primary filter 22E, after the raw water flows into the raw water channel 2101E under the action of water pressure and is treated by the primary filter 22E, the purified water generated by the primary filter 22E can flow to the secondary filter 23E under the action of water pressure and be treated by the secondary filter 23E, and the cleaner secondary purified water is obtained, wherein the secondary purified water flows out through the purified water outlet 2301E under the action of water pressure and is provided. Preferably, the primary filter 22E is a ceramic filter, and the secondary filter 23E is an external pressure type ultrafiltration filter, wherein ultrafiltration membrane filaments 231E of the secondary filter 23E are disposed inside the second accommodation cavity 220E of the primary filter 22E, so that the purified water channel 2201E is defined between the ultrafiltration membrane filaments 231E of the secondary filter 23E and the primary filter 22E. Therefore, the purified water generated by the primary filter 22E can be further ultrafiltered by the secondary filter 23E under the action of water pressure, so as to obtain cleaner purified water (or ultrafiltration filtered water). It should be understood that the primary filter 22E may also be a filter made of other materials, or a composite filter made of multiple materials, for example, a composite filter composed of any two or more materials of ceramic, carbon fiber, PP cotton and activated carbon particles. It is appreciated that the secondary filter may be an ultrafiltration filter, maybe also a filter made of other materials, such as a ceramic filter, carbon fiber, PP cotton or activated carbon filter. Alternatively, the secondary filter is a composite filter made of multiple materials, for example, a composite filter composed of any two or more materials of ceramic, carbon fiber, PP cotton and activated carbon particles.

As shown in FIG. 1 to FIG. 5C and FIG. 11A to FIG. 11D, the filtering device 20 of the faucet water purifier according to the first embodiment of the present invention has a first communicating opening 201E, a second communicating opening 202E and a third communicating opening 203E, wherein the first communicating opening 201E of the filtering device 20E is communicated with the raw water channel 2101E of the filtering device 20E, so that the control valve 10E can supply the raw water to the filtering device 20E through the first communicating opening 201E, the second communicating opening 202E of the filtering device 20E is communicated with the purified water channel 2201E, so that the purified water generated by treating the raw water by the primary filter 22E can flow to a second water outlet 200E of the faucet water purifier of the present invention under the control of the control valve 10E and be provided to the users, the third communicating opening 203E of the filtering device 20E is communicated with the purified water outlet 2301E of the secondary filter 23E, so that the purified water generated by the secondary filter 23E can flow out through the third communicating opening 203E, and be supplied to the users through a first water outlet 100E of the faucet water purifier of the present invention under the control of the control valve 10E. Preferably, the secondary filter 23E of the filtering device 20E of the faucet water purifier of the present invention is an external pressure type ultrafiltration filter. Accordingly, each of ultrafiltration membrane filaments 231E of the secondary filter 23E defines a membrane filament channel 2310E, and the membrane filament channels 2310E of the ultrafiltration membrane filaments 231E are all communicated with the purified water outlet 2301E of the secondary filter 23E, so that the purified water generated by each of ultrafiltration membrane filaments 231E of the secondary filter 23E can flow to the third communicating opening 203E of the filtering device 20E under the action of water pressure.

As shown in FIG. 1A to FIG. 5C and FIG. 11A to FIG. 11D, accordingly, when the filtering device 20E of the faucet water purifier according to the first embodiment of the present invention is used to treat the raw water, the users can control the raw water to flow to the first communicating opening 201E of the filtering device 20E through the control valve 10E, and the raw water flows to the raw water channel 2101E of the filtering device 20E under the action of water pressure, then the purified water generated by the treatment of the primary filter 22E flows to the purified water channel 2201E under the action of water pressure, at this time, if the purified water inside the purified water channel 2201E cannot flow freely through the second communicating opening 202E of the filtering device 20E under the control of the control valve 10E, and the purified water generated by the secondary filter 23E can flow freely to the third communicating opening 203E, the purified water generated by the primary filter 22E will be further purified by the secondary filter 23E under the action of water pressure, and the purified water generated by the secondary filter 23E will flow out and be provided through the third communicating opening 203E. Accordingly, at this time, the faucet water purifier according to the first embodiment of the present invention is under a first purifying working state. On the other hand, if the purified water inside the purified water channel 2201E can flow freely through the second communicating opening 202E of the filtering device 20E under the control of the control valve 10E, and the purified water generated by the secondary filter 23E cannot flow freely to the third communicating opening 203E, the purified water generated by the primary filter 22E will flow out and be provided through the second communicating opening 202E under the action of water pressure. Accordingly, at this time, the faucet water purifier according to the first embodiment of the present invention is under a second purifying working state. Those skilled in the art can understand that when the secondary filter 23E of the faucet water purifier according to the first embodiment of the present invention is an ultrafiltration filter, the secondary filter 23E of the faucet water purifier of the present invention in the first purifying working state can carry out ultrafiltration purification treatment on the purified water generated by the primary filter element 22E; when the secondary filter 23E is a ceramic, carbon fiber, PP cotton or activated carbon filter element, or a composite filter made of the above materials, the secondary filter 23E of the faucet water purifier of the present invention in the first purifying working state can filter and purify the purified water generated by the primary filter element 22E again.

As shown in FIG. 1A to FIG. 5C and FIG. 11A to FIG. 11D, the faucet water purifier according to the first embodiment of the present invention further has a back flushing working state, wherein when the faucet water purifier of the present invention is under the back flushing working state, the users can control the raw water flowing to the second communicating opening 202E of the filtering device 20E through the control valve 10E, and the raw water flows to the purified water channel 2201E of the filtering device 20E through the second communicating opening 202E under the action of water pressure, at this time, under the control of the control valve 10E, the purified water generated by the secondary filter 23E cannot flow freely to the third communicating opening 203E, the raw water inside the purified water channel 2201E back flushes the primary filter 22E under the action of water pressure, the generated waste water flows to the first communicating opening 201E of the filtering device 20E through the raw water channel 2101E under the action of water pressure, and flows out through the first communicating opening 201E under the control of the control valve 10E. It is appreciated that the back flushing mentioned herein refers to the flow direction of the raw water flowing through the primary filter 22E during the primary filter 22E being flushed is opposite to the flow direction of the raw water flowing through the primary filter 22E during the raw water being purified by the primary filter 22E.

As shown in FIG. 1A to FIG. 5C and FIG. 11A to FIG. 11D, the faucet water purifier according to the first embodiment of the present invention further has a raw water supplying working state, wherein when the faucet water purifier of the present invention is under the raw water supplying working state, the user can control the raw water to flow directly to a raw water outlet and to be provided through the control valve 10E, instead of flowing through the filtering device 20E and being purified by the filtering device 20E.

It is worth mentioning that, when the secondary filter 23E of the filtering device 20E of the faucet water purifier of the present invention is an external pressure type ultrafiltration filter, and the purified water generated by the primary filter 22E can freely flow out through the second communicating opening 202E of the filtering device 20E, when the purified water generated by the primary filter 22E flows out through the second communicating opening 202E of the filtering device 20E, the purified water generated by the primary filter 22E will flow through the ultrafiltration membrane filaments 231E of the secondary filter 23E, so that the ultrafiltration membrane filaments 231E of the secondary filter 23E are flushed by the purified water generated by the primary filter 22E. In other words, at this time, the filtering device 20E of the faucet water purifier of the present invention allows the purified water generated by the primary filter 22E to be provided, at the same time, the purified water generated by the primary filter 22E is further used to flush the ultrafiltration membrane filaments 231E of the secondary filter 23E. Those skilled in the art know that the faucet water purifier directly installed on a faucet has a small size due to the restriction of the using space where it is located in. When the faucet water purifier adopts the ultrafiltration filter, especially the ultrafiltration filter with ultrafiltration membrane filaments as the main filter, the ultrafiltration filter is easily to stink and can no longer be used due to the accumulation of tap water impurities attached to the surface of its ultrafiltration membrane filaments, such as microorganisms, etc. The filtering device 20E of the faucet water purifier of the present invention allows the purified water generated by the primary filter 22E to be provided, at the same time, the purified water generated by the primary filter 22E is further used to flush the surfaces of the ultrafiltration membrane filaments 231E of the secondary filter 23E, so as to prevent impurities such as microorganisms in the tap water from accumulating on the secondary filter 23E and prevent it from being unusable because of stinking. In other words, the faucet water purifier of the present invention uses the ingenious structural design of its filtering device 20E to solve the issue that when the traditional faucet water purifier uses the ultrafiltration filter (or ultrafiltration membrane filaments) to filter water, it is easy to cause impurities to accumulate and cannot be discharged in time and cause stinking, so that the ultrafiltration membrane filaments 231E of the secondary filter 23E have a better filtering effect and the service life of the secondary filter 23E is prolonged. More importantly, because of the small size of the traditional faucet water purifier, when it treats the raw water, such as tap water by utilizing the ultrafiltration filter, it will be blocked in a short time. The faucet water purifier of the present invention uses the purified water generated by the primary filter 22E to flush the ultrafiltration membrane filaments 231E of the secondary filter 23E, which significantly improves the issue that the impurities accumulate and cannot be discharged in time when the traditional faucet water purifier uses the ultrafiltration filter (or ultrafiltration membrane filaments) to filter water, so that it is possible for the faucet water purifier to use the ultrafiltration filter to filter the water. The greater significance of the faucet water purifier of the present invention is that it may enable the consumers to get rid of the large and expensive traditional desktop water purifier. In addition, since the primary filter 22E of the faucet water purifier of the present invention is preferably a ceramic filter, although the purified water generated by its filtration is not suitable for direct drinking, the raw water is also preliminarily filtered and purified, and can be used for washing vegetables, washing face or mouth and so on.

As shown in FIG. 1 to FIG. 5C, the filtering device 20E of the faucet water purifier according to the first embodiment of the present invention further comprises a base 24E, wherein the secondary filter 23E is provided at the base 24E, and the base 24E defines a first water cavity 2401E, wherein the first water cavity 2401E of the base 24E is communicated with the third communicating opening 203E of the filtering device 20 and the purified water outlet 2301E of the secondary filter 23E respectively. In other words, the membrane filament channel 2310E of the ultrafiltration membrane filament 231E of the secondary filter 23E is communicated with the third communicating opening 203E of the filtering device 20E through the purified water outlet 2301E of the secondary filter 23E and the first water cavity 2401E of the base 24E, so that the secondary purified water generated by the secondary filter 23E can flow out through the third communicating opening 203E. Preferably, the third communicating opening 203E is provided at the base 24E. More preferably, the secondary filter 23E is water-sealedly provided at the base 24E, and the secondary filter 23 and the base 24E define the first water cavity 2401E therebetween.

As shown in FIG. 1 to FIG. 5C, the primary filter 22E of the filtering device 20E of the faucet water purifier according to the first embodiment of the present invention is provided at the base 24E, and the base 24E further defines a second water cavity 2402E, wherein the second water cavity 2402E of the base 24E is communicated with the second communicating opening 202E of the filtering device 20E and the purified water channel 2201E respectively. In other words, the purified water channel 2201E of the filtering device 20E is communicated with the second communicating opening 202E of the filtering device 20E through the second water cavity 2402E of the base 24E, so that the purified water generated by the primary filter 22E can flow out through the second communicating opening 202E. It is appreciated that when the control valve 10E of the faucet water purifier of the present invention controls the raw water back flushing the primary filter 22E, the raw water flows into the filtering device 20E through the second communicating opening 202E of the filtering device 20E, and flows into the purified water channel 2201E of the filtering device 20E through the second water cavity 2402E of the base 24E, and the raw water back flushes the primary filter 22E under the action of water pressure, and the generated waste water flows to the first communicating opening 201E of the filtering device 20E from the raw water channel 2101E under the action of water pressure. Preferably, the second communicating opening 202E is provided at the base 24E.

As shown in FIG. 1 to FIG. 5C, the primary filter 22E of the filtering device 20E of the faucet water purifier according to the first embodiment of the present invention is water-sealedly provided at the base 24E, so as to prevent the raw water inside the raw water channel 2101E from flowing into the purified water channel 2201E. More preferably, the primary filter 22E is detachably provided at the base 24E, so that the primary filter 22E can be replaced. Alternatively, the primary filter 22E is water-sealedly provided at the outer casing 21E, so that the raw water can only flow inside the raw water channel 2101E. Alternatively, the primary filter 22E is detachably provided at the outer casing 21E. Alternatively, the primary filter 22E is integrally provided at the base 24E. Alternatively, the primary filter 22E is integrally provided at the outer casing 21E.

As shown in FIG. 1 to FIG. 5C, the secondary filter 23E of the filtering device 20E of the faucet water purifier according to the first embodiment of the present invention further comprises a shell 232E, wherein the ultrafiltration membrane filaments 231E of the secondary filter 23E are disposed inside the shell 232E, and the shell 232E has at least one water inlet 2320E, wherein the inner space and the outer space of the shell 232E are communicated with each other by the water inlet 2320E of the shell 232E, so that when the faucet water purifier of the present invention is under the first purifying working state, the purified water generated by the primary filter 22E flows to the ultrafiltration membrane filaments 231E through the water inlet 2320E of the shell 232E under the action of water pressure. Therefore, the water inlet 2320E of the shell 232E of the secondary filter 23E can be regard as a part of the purified water channel 2201E of the filtering device 20E.

As shown in FIG. 1 to FIG. 5C, the base 24E of the filtering device 20E of the faucet water purifier according to the first embodiment of the present invention comprises a base bottom 241E and a first spacing portion 242E, wherein the first spacing portion 242E is provided at the base bottom 241E and extended from the base bottom 241E, wherein the first spacing portion 242E is provided between the first water cavity 2401E and the second water cavity 2402E, so as to separate the first water cavity 2401E and the second water cavity 2402E from each other. Preferably, the base 24E further comprises a second spacing portion 243E provided at the base bottom 241E and extended from the base bottom 241E, wherein the second water cavity 2402E is defined between the first spacing portion 242E and the second spacing portion 243E, and the first water cavity 2401E is defined and embraced by the first spacing portion 242E. More preferably, the first spacing portion 242E and the second spacing portion 243E are both ring-shaped, and the second spacing portion 243E is provided at the outer side of the first spacing portion 242E.

As shown in FIG. 1 to FIG. 5C the purified water channel 2201E of the filtering device 20E, the second water cavity 2402E of the base 24E and the second communicating opening 202E of the filtering device 20E of the faucet water purifier according to the first embodiment of the present invention define a primary purified water route, the membrane filament channel 2310E of the ultrafiltration membrane filament 231E of the secondary filter 23E, the purified water outlet 2301E of the secondary filter 23E, the first water cavity 2401E of the base 24E and the third communicating opening 203E of the filtering device 20E define a secondary purified water route. It is appreciated that the primary purified water route and the secondary purified water route are spaced from each other, so as to prevent the water inside the primary purified water route and the secondary purified water route from being mixed, in other words, the primary purified water route and the secondary purified water route are spaced from each other, so as to prevent the purified water generated by the primary filter 22E from mixing into the purified water generated by the secondary filter 23E.

As shown in FIG. 1 to FIG. 5C, the first communicating opening 201E of the filtering device 20E of the faucet water purifier according to the first embodiment of the present invention is preferably provided at the base 24E. Alternatively, the first communicating opening 201E of the filtering device 20E is defined at the outer casing 21E. As shown in FIG. 1 to FIG. 5C, the outer casing 21E of the filtering device 20E of the faucet water purifier according to the first embodiment of the present invention is preferably provided at the edge of the base 24E. Preferably, the outer casing 21E is integrated with the base 24E.

Figure 5A:
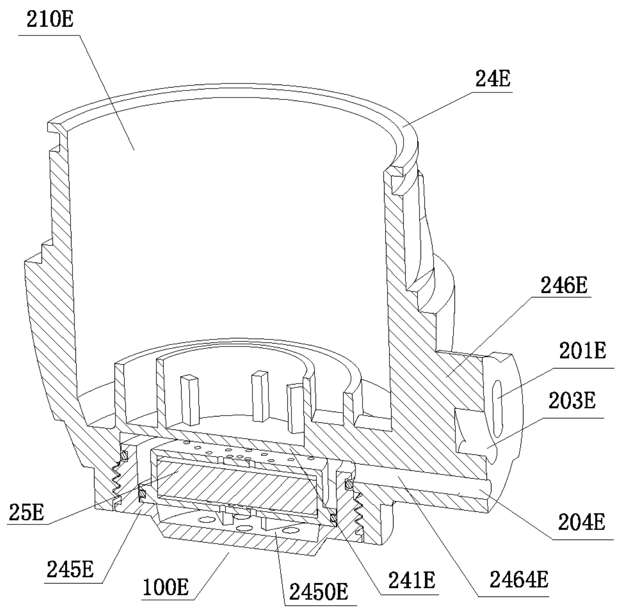
FIG. 5A is a sectional view of the base and a terminal filter of the filtering device of the faucet water purifier according to the above first embodiment of the present invention.
Figure 5B:
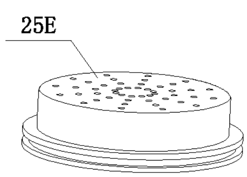
FIG. 5B is a perspective view of the terminal filter of the filtering device of the faucet water purifier according to the above first embodiment of the present invention.
Figure 5C:
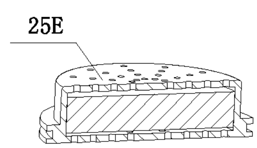
FIG. 5C is a sectional view of the terminal filter of the filtering device of the faucet water purifier according to the above first embodiment of the present invention.
Figure 6A:
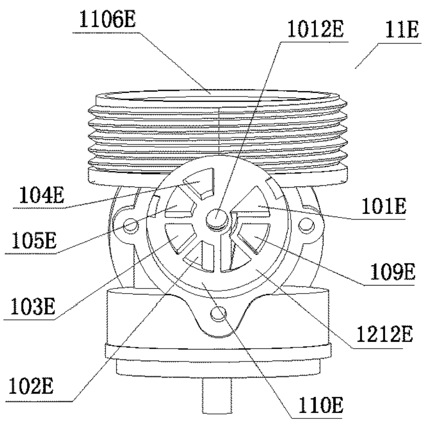
FIG. 6A is a perspective view of a plane valve of the faucet water purifier according to the above first embodiment of the present invention, which shows a first channel, a second channel, a third channel, a fourth channel, a fifth channel, a ninth channel and a draining channel of the plane valve.
Figure 6B:
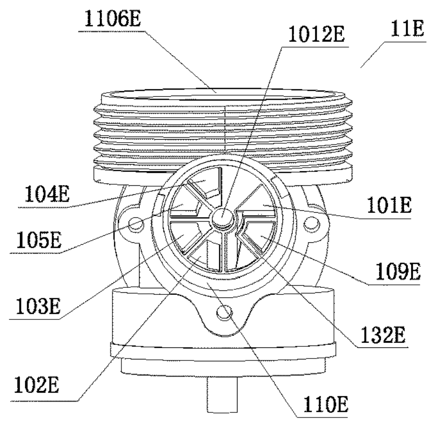
FIG. 6B is another perspective view of the plane valve of the faucet water purifier according to the above first embodiment of the present invention, which shows the first channel, the second channel, the third channel, the fourth channel, the fifth channel, the ninth channel, the draining channel and a second seal of the plane valve.
Figure 6C:
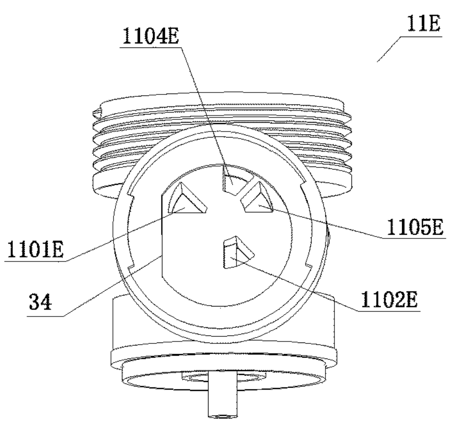
FIG. 6C is another perspective view of the plane valve of the faucet water purifier according to the above first embodiment of the present invention, which shows a first opening, a second opening, a fourth opening and a fifth opening of the valve body.
Figure 6D:
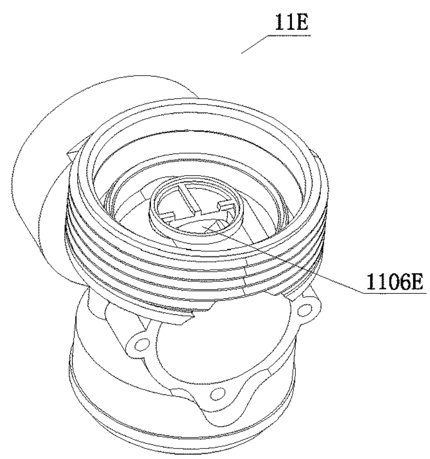
FIG. 6D is another perspective view of the plane valve of the faucet water purifier according to the above first embodiment of the present invention, which shows a raw water inlet of the valve body.
Figure 6E:
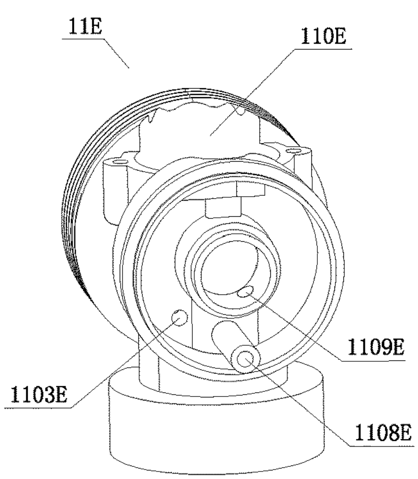
FIG. 6E is another perspective view of the plane valve of the faucet water purifier according to the above first embodiment of the present invention, which shows a third opening, a raw water opening and a draining opening of the valve body.
Figure 6F:
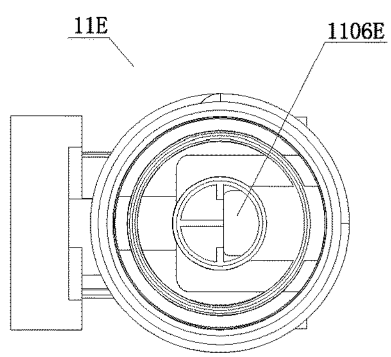
FIG. 6F is a top view of the valve body of the plane valve of the faucet water purifier according to the above first embodiment of the present invention.
Figure 6G:
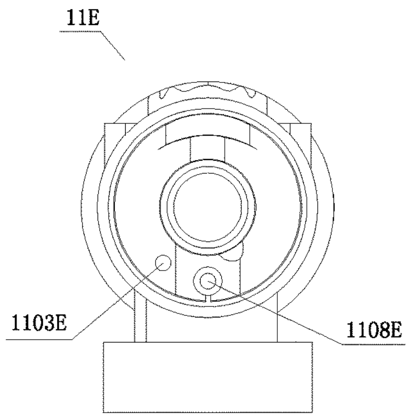
FIG. 6G is a bottom view of the valve body of the plane valve of the faucet purifier according to the above first embodiment of the present invention.
Figure 6H:
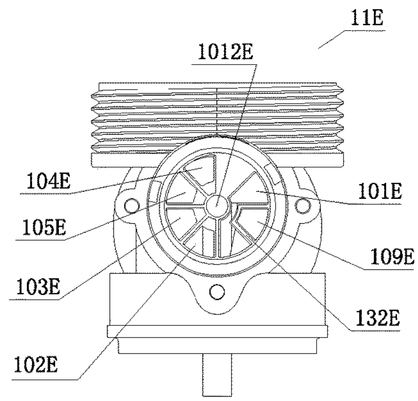
FIG. 6H is a front view of the valve body of the plane valve of the faucet purifier according to the above first embodiment of the present invention.
Figure 6I:
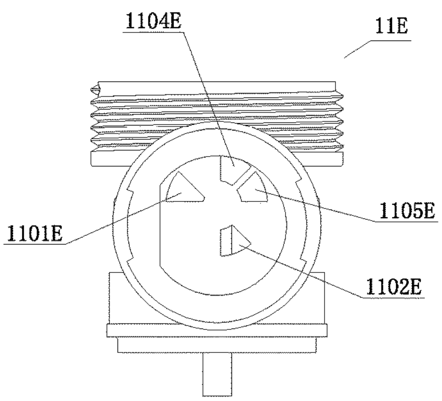
FIG. 6I is a perspective view of the valve body of the plane valve of the faucet water purifier according to the above first embodiment of the present invention.
Figure 7A:
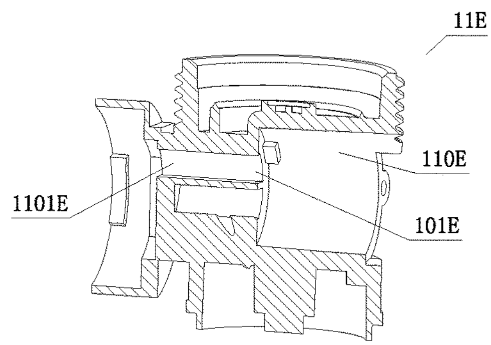
FIG. 7A is a sectional view of the valve body of the plane valve of the faucet water purifier according to the above first embodiment of the present invention, which shows the first channel and the first opening of the plane valve.
Figure 7B:
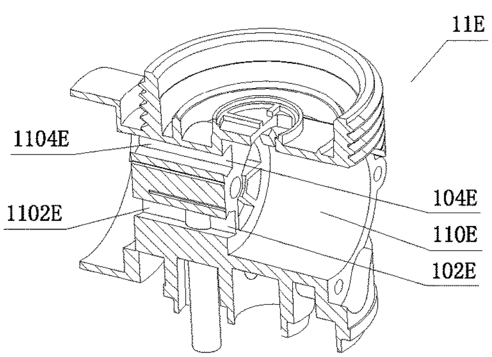
FIG. 7B is another sectional view of the valve body of the plane valve of the faucet water purifier according to the above first embodiment of the present invention, which shows the second channel, the fourth channel, the second opening and the fourth opening of the plane valve.
Figure 7C:
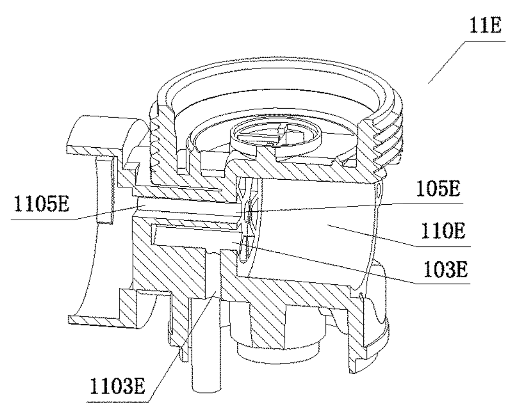
FIG. 7C is another sectional view of the valve body of the plane valve of the faucet water purifier according to the above first embodiment of the present invention, which shows the third channel, the fifth channel, the third opening and the fifth opening of the plane valve.
Figure 7D:
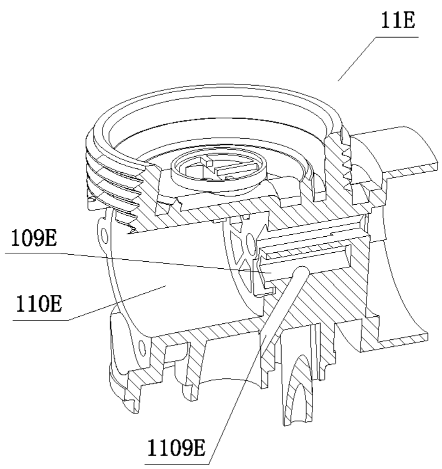
FIG. 7D is another sectional view of the valve body of the plane valve of the faucet water purifier according to the above first embodiment of the present invention, which shows the ninth channel and the raw water opening of the plane valve.
Figure 7E:
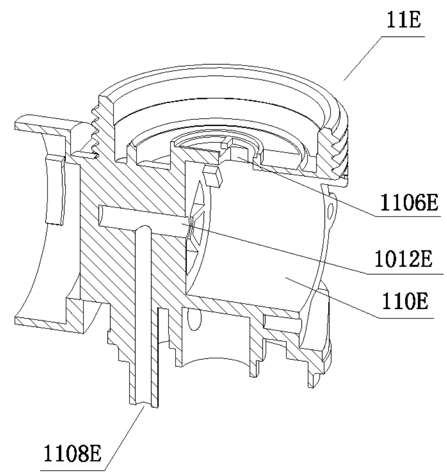
FIG. 7E is another sectional view of the valve body of the plane valve of the faucet water purifier according to the above first embodiment of the present invention, which shows the draining channel and the draining opening of the plane valve.

As shown in FIG. 5A to FIG. 5C, the base 24E of the filtering device 20E of the water faucet purifier according to the first embodiment of the present invention further comprises a water supplying portion 245E, wherein the water supplying portion 245E is extended from the base bottom 241E, wherein the water supplying portion 245E defines the first water outlet 100E.

As shown in FIG. 5A to FIG. 5C, the filtering device 20E of the faucet water purifier according to the first embodiment of the present invention further comprises a terminal filter 25E, wherein the base bottom 241E and the water supplying portion 245E of the base 24E define a purifying cavity 2450E therebetween, wherein the terminal filter 25E is disposed inside the purifying cavity 2450E, wherein the purifying cavity 2450E is communicated with a fifth opening 1105E of the control valve 10E and the first water outlet 100E respectively, so that the terminal filter 25E can further filter the purified water generated by the secondary filter 23E before it is provided to the users through the first water outlet 100E. In other words, the terminal filter 25E is provided at the upstream of the first water outlet 100E and the downstream of the fifth opening 1105E of the control valve 10E to further filter the purified water generated by the secondary filter 23E, and then provides it to the users for using. Those skilled in the art will appreciate that the terminal filter 25E may also be made of carbon fiber or other filter materials to improve the taste of water. Preferably, the water supplying portion 245E is detachably provided at the base bottom 241E of the base 24E, the terminal filter 25E is detachably provided at the purifying cavity 2450E, so that the terminal filter 25E can be replaced. More preferably, the water supplying portion 245E is detachably screwed at the base bottom 241E of the base 24E. Alternatively, the water supplying portion 245E is detachably clamped at the base bottom 241E of the base 24E.

As shown in FIG. 1 to FIG. 5C, the base 24E of the faucet water purifier according to the first embodiment of the present invention further has a communicating portion 246E, wherein the communicating portion 246E has a first communicating channel 2461E, a second communicating channel 2462E and a third communicating channel 2463E, wherein the first communicating channel 2461E is provided to be communicated with the first communicating opening 201E and the raw water channel 2101E respectively, the second communicating channel 2462E is provided to be communicated with the second communicating opening 202E and the second water cavity 2402E respectively, the third communicating channel 2463E is provided to be communicated with the third communicating opening 203E and the first water cavity 2401E respectively. Further, the communicating portion 246E has a purified water supplying channel 2464E, wherein the purified water supplying channel 2464E is provided to be communicated with the fifth opening 1105E and the first water outlet 100E respectively, so that the purified water generated by the secondary filter 23E of the filtering device 20E of the faucet water purifier of the present invention can flow out through the fifth opening 1105E of the control valve 10E, and flows to the first water outlet 100E through the purified water supplying channel 2464E. Preferably, the first communicating channel 2461E is provided between the first communicating opening 201E and the raw water channel 2101E, the second communicating channel 2462E is provided between the second communicating opening 202E and the second water cavity 2402E, the third communicating channel 2463E is provided between the third communicating opening 203E and the first water cavity 2401E, the purified water supplying channel 2464E is provided between the fifth opening 1105E and the first water outlet 100E. More preferably, the purified water supplying channel 2464E is provided to be communicated with the fifth opening 1105E and the purifying cavity 2450E respectively, so that the purified water supplying channel 2464E is capable of communicating with the first water outlet 100E through the purifying cavity 2450E. Preferably, the first water outlet 100E comprises a plurality of water outlet holes.

As shown in FIG. 1 to FIG. 3C, the filtering device 20E of the faucet water purifier according to the first embodiment of the present invention further comprises a brush 26E, wherein the brush 26E comprises a brush body 261E, wherein the brush body 261E is rotatably provided between the outer casing 21E and the primary filter 22E, so that when the brush body 261E is rotated, the outer surface of the primary filter 22E facing the outer casing 21E can be flushed. Further, the brush body 261E of the brush 26E of the filtering device 20E comprises a bristle holder 2611E and a plurality of brush bristles 2612E, wherein the brush bristles 2612E of the brush body 261E of the brush 26E are provided at the bristle holder 2611E, and the brush bristles 2612E are provided to face the primary filter 22E, so that when the brush body 261E is rotated, the brush bristles 2612E can flush the outer surface of the primary filter 22E. It is appreciated that when the primary filter 22E of the filtering device 20E of the faucet water purifier of the present invention is back flushed, rotating the brush body 261E can make the outer surface of the primary filter 22E facing the outer casing 21E be flushed clean. In other words, combining the brush 26E with the back flushing to the primary filter 22E of the filtering device 20E of the faucet water purifier of the present invention by the raw water can effectively back-flush the primary filter 22E of the filtering device 20E of the faucet water purifier of the present invention, so as to improve the service life of the filtering device 20E of the faucet water purifier of the present invention.

As shown in FIG. 1 to FIG. 3C, the brush 26E of the filtering device 20E of the faucet water purifier according to the first embodiment of the present invention further has an operation end 262E provided at the bristle holder 2611E, the outer casing 21E of the filtering device 20E has an operation hole 211E, the operation end 262E is extended from the bristle holder 2611E, and crosses through the operation hole 211E of the outer casing 21E, so that the users can rotate the operation end 262E through a driving mechanism, such as a rotating button, a rotating handle, etc., so as to drive the brush body 261E to rotate along the outer surface of the primary filter 22E. It is appreciated that the operation end 262E is extended from the bristle holder 2611E, and passes through the operation hole 211E of the outer casing 21E.

As shown in FIG. 1 to FIG. 13D, the control valve 10E of the faucet water purifier according to the first embodiment of the present invention comprises a valve body 11E and a valve core 12E, wherein the valve body 11E defines a valve cavity 110E, a first opening 1101E, a second opening 1102E, a third opening 1103E, a fourth opening 1104E, a fifth opening 1105E, a raw water inlet 1106E and a draining opening 1108E, wherein the valve core 12E is provided at the valve cavity 110E, wherein the first opening 1101E of the valve body 11E is adapted to be communicated with the first communicating opening 201E of the filtering device 20E, the second opening 1102E of the valve body 11E is adapted to be communicated with the second communicating opening 202E of the filtering device 20E, the fourth opening 1104E of the valve body 11E is adapted to be communicated with the third communicating opening 203E of the filtering device 20E, the fifth opening 1105E of the valve body 11E is adapted to be communicated with a first water outlet 100E, the third opening 1103E of the valve body 11E is adapted to be communicated with a second water outlet 200E, the raw water inlet 1106E of the valve body 11E is adapted to be communicated with a raw water source (for example, a water outlet of a faucet).

As shown in FIG. 1 to FIG. 13D, the control valve 10E of the faucet water purifier according to the first embodiment of the present invention has a first purifying working position, wherein when the control valve 10E is under the first purifying working position, the valve core 12E of the control valve 10E defines a first communicating passage 1001E and a second communicating passage 1002E, wherein the first communicating passage 1001E is communicated with the first opening 1101E of the valve body 11E and the raw water inlet 1106E respectively, the second communicating passage 1002E is communicated with the fourth opening 1104E of the valve body 11E and the fifth opening 1105E respectively. Further, when the control valve 10E is under the first purifying working position, the second opening 1102E of the valve body 11E is not communicated with the third opening 1103E. In other words, when the control valve 10E is under the first purifying working position, the second opening 1102E of the valve body 11E cannot communicate with the third opening 1103E. Accordingly, when the control valve 10E is under the first purifying working position, under the action of water pressure, the raw water or the tap water flows into the raw water inlet 1106E of the valve body 11E of the control valve 10E, and then flows to the first opening 1101E of the valve body 11E through the first communicating passage 1001E, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. Further, when the control valve 10E is under the first purifying working position, the second opening 1102E of the valve body 11E cannot communicate with the third opening 1103E, so that the purified water inside the purified water channel 2201E cannot flow freely through the second communicating opening 202E of the filtering device 20E under the control the control valve 10E. Therefore, the purified water generated by the primary filter 22E is further purified and treated by the secondary filter 23E, the purified water generated by the secondary filter 23E flows out from the third communicating opening 203E through the purified water outlet 2301E, and flows through the fourth opening 1104E, the second communicating passage 1002E and the fifth opening 1105E in sequence, so that the purified water generated by the secondary filter 23E can be provided through the first water outlet 100E communicated with the fifth opening 1105E. Preferably, the secondary filter 23E is an ultrafiltration filter. Accordingly, the purified water generated by the secondary filter 23E can be directly drunk. It is appreciated that when the control valve 10E of the faucet water purifier according to the first embodiment of the present invention is controlled under the first purifying working position, the faucet water purifier of the present invention is controlled under its first purifying working state.

As shown in FIG. 1 to FIG. 13D, the control valve 10E of the faucet water purifier according to the first embodiment of the present invention has a back flushing working position, wherein when the control valve 10E is under the back flushing working position, the valve core 12E of the control valve 10E defines a third communicating passage 1003E and a fourth communicating passage 1004E, wherein the third communicating passage 1003E is communicated with the second opening 1102E of the valve body 11E and the raw water inlet 1106E respectively, the fourth communicating passage 1004E is communicated with the first opening 1101E of the valve body 11E and the draining opening 1108E respectively. Accordingly, when the control valve 10E is under the back flushing working position, under the action of water pressure, the raw water or the tap water flows from the raw water inlet 1106E of the valve body 11E of the control valve 10E, and flows into the second opening 1102E of the valve body 11E through the third communicating passage 1003E, and further flows into the filtering device 20E through the second communicating opening 202E of the filtering device 20E, the raw water flows into the primary filter 22E through the purified water channel 2201E of the filtering device 20E under the action of water pressure, and after back flushing the primary filter 22E, the generated waste water flows into the raw water channel 2101E. At this time, since the first opening 1101E of the valve body 11E is communicated with the draining opening 1108E through the fourth communicating passage 1004E, therefore, the waste water generated by using the raw water to back-flush the primary filter 22E flows into the raw water channel 2101E and flows out of the first communicating opening 201E, and flows through the first opening 1101E, the fourth communicating passage 1004E and the draining opening 1108E in sequence, so that the waste water generated by using the raw water to back-flush the primary filter 22E can flow out through the draining opening 1108E. It is appreciated that when the control valve 10E of the faucet water purifier according to the first embodiment of the present invention is controlled under the back flushing working position, the faucet water purifier of the present invention is controlled under its back flushing working state.

As shown in FIG. 1 to FIG. 13D, the valve body 11E of the control valve 10E of the faucet water purifier according to the first embodiment of the present invention has a raw water opening 1109E, wherein the control valve 10E has a raw water supplying working position, wherein when the control valve 10E is under the raw water supplying working position, the valve core 12E of the control valve 10E defines a fifth communicating passage 1005E, wherein the fifth communicating passage 1005E is communicated with the raw water opening 1109E of the valve body 11E and the raw water inlet 1106E respectively, so that the raw water or tap water can be supplied by the raw water opening 1109E. Further, when the control valve 10E is under the raw water supplying working position, the raw water inlet 1106E is not communicated with every of the first opening 1101E, the second opening 1102E, the third opening 1103E, the fourth opening 1104E and the fifth opening 1105E. It is appreciated that when the control valve 10E of the faucet water purifier according to the first embodiment of the present invention is controlled under the raw water supplying working position, the faucet water purifier of the present invention is controlled under its raw water supplying working position working state. Preferably, the raw water opening 1109E of the control valve 10E defines the raw water outlet of the faucet water purifier of the present invention.

As shown in FIG. 1 to FIG. 13D, the control valve 10E of the faucet water purifier according to the first embodiment of the present invention has a second purifying working position, wherein when the control valve 10E is under the second purifying working position, the valve core 12E of the control valve 10E defines a sixth communicating passage 1006E and a seventh communicating passage 1007E, wherein the sixth communicating passage 1006E is communicated with the first opening 1101E of the valve body 11E and the raw water inlet 1106E respectively, the seventh communicating passage 1007E is communicated with the second opening 1102E of the valve body 11E and the third opening 1103E respectively. Further, when the control valve 10E is under the second purifying working position, the fourth opening 1104E of the valve body 11E is not communicated with the fifth opening 1105E. In other words, when the control valve 10E is under the second purifying working position, the fourth opening 1104E of the valve body 11E cannot communicate with the fifth opening 1105E. Accordingly, when the control valve 10E is under the second purifying working position, under the action of water pressure, the raw water or the tap water flows into the raw water inlet 1106E of the valve body 11E of the control valve 10E, and then flows to the first opening 1101E of the valve body 11E through the sixth communicating passage 1006E, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. At this time, since the second opening 1102E of the valve body 11E is communicated with the third opening 1103E through the seventh communicating passage 1007E, therefore, after the purified water generated by the primary filter 22E flows into the purified water channel 2201E, it flows out through the second communicating opening 202E, and flows through the second opening 1102E, the seventh communicating passage 1007E and the third opening 1103E in sequence, so that the purified water generated by the primary filter 22E can be provided through the second water outlet 200E communicated with the third opening 1103E. It is appreciated that when the control valve 10E of the faucet water purifier according to the first embodiment of the present invention is controlled under the second purifying working position, the faucet water purifier of the present invention is controlled under its second purifying working state.

As shown in FIG. 1 to FIG. 13D, the control valve 10E of the faucet water purifier according to the first embodiment of the present invention is a plane valve, wherein the valve core 12E of the plane valve 10E further comprises a fixed disk 121E and a rotatable disk 122E, wherein the fixed disk 121E has a first fluid control surface 1210E, the rotatable disk 122E has a second fluid control surface 1220E, wherein the rotatable disk 122E and the fixed disk 121E are both provided at the valve cavity 110E, wherein the second fluid control surface 1220E of the rotatable disk 122E is provided on the first fluid control surface 1210E of the fixed disk 121E, and the rotatable disk 122E is provided to be capable of rotating relative to the fixed disk 121E. Preferably, the raw water inlet 1106E is communicated with the valve cavity 110E of the valve body 11E.

As shown in FIG. 1 to FIG. 13D, the plane valve 10E of the faucet water purifier according to the first embodiment of the present invention has a first channel 101E, a second channel 102E, a third channel 103E, a fourth channel 104E, a fifth channel 105E, a sixth channel 106E, a seventh channel 107E and an eighth channel 108E, wherein the first channel 101E, the second channel 102E, the third channel 103E, the fourth channel 104E and the fifth channel 105E are provided at the fixed disk 121E respectively and extended from the first fluid control surface 1210E of the fixed disk 121E respectively; the sixth channel 106E, the seventh channel 107E and the eighth channel 108E are provided at the rotatable disk 122E respectively and extended from the second fluid control surface 1220E of the rotatable disk 122E respectively, wherein the first channel 101E is communicated with the first opening 1101E, the second channel 102E is communicated with the second opening 1102E, the third channel 103E is communicated with the third opening 1103E, the fourth channel 104E is communicated with the fourth opening 1104E, the fifth channel 105E is communicated with the fifth opening 1105E, the eighth channel 108E is communicated with the draining opening 1108E. Preferably, the raw water inlet

Figure 1:
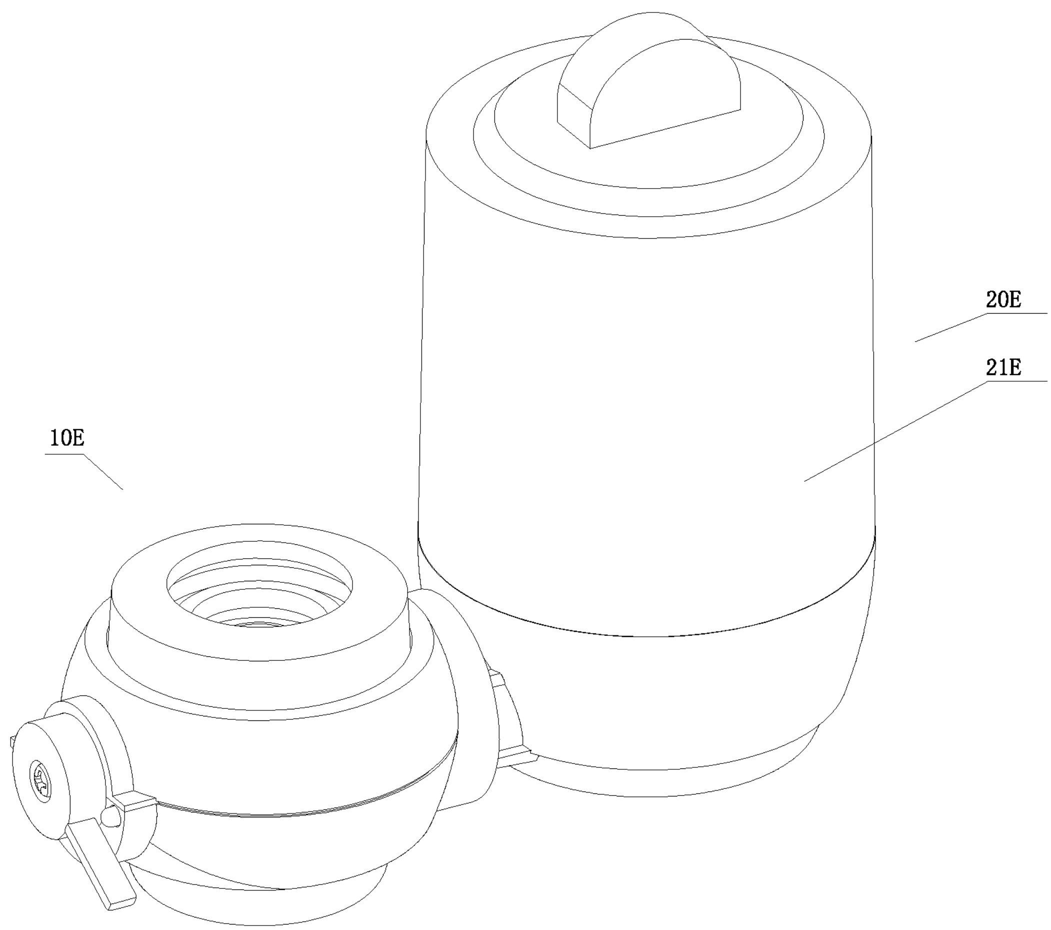
FIG. 1 is a front view of the faucet water purifier according to a first embodiment of the present invention.
Figure 13A:
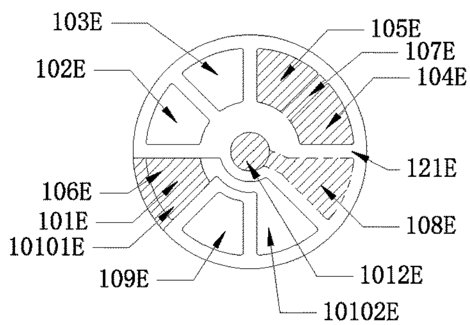
FIG. 13A is a diagram of the communication between the channels of the rotatable disk and the channels of the fixed disk of the plane valve, when the plane valve of the faucet water purifier according to the above first embodiment of the present invention is under a first purifying working position, wherein the shaded area shown in FIG. 13A shows the passages defined by the communication between the rotatable disk and the fixed disk of the plane valve.
Figure 13B:
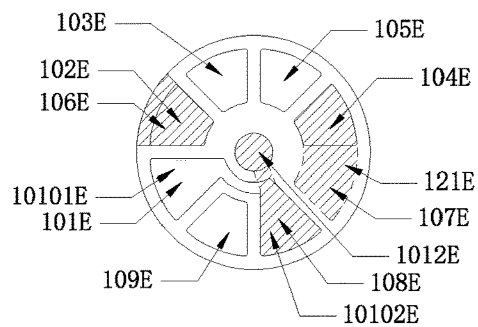
FIG. 13B is a diagram of the communication between the channels of the rotatable disk and the channels of the fixed disk of the plane valve, when the plane valve of the faucet water purifier according to the above first embodiment of the present invention is under a back-flushing working position, wherein the shaded area shown in FIG. 13B shows the passages defined by the communication between the rotatable disk and the fixed disk of the plane valve.
Figure 13C:
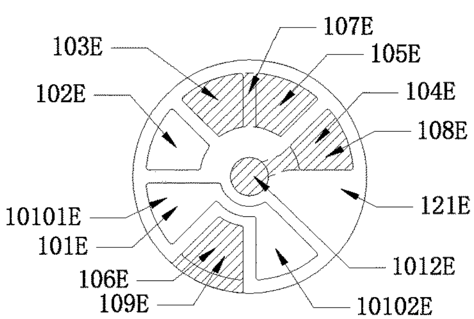
FIG. 13C is a diagram of the communication between the channels of the rotatable disk and the channels of the fixed disk of the plane valve, when the plane valve of the faucet water purifier according to the above first embodiment of the present invention is under a raw water supplying working position, wherein the shaded area shown in FIG. 13C shows the passages defined by the communication between the rotatable disk and the fixed disk of the plane valve.
Figure 13D:
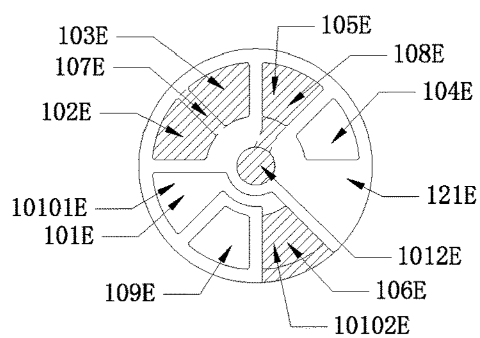
FIG. 13D is a diagram of the communication between the channels of the rotatable disk and the channels of the fixed disk of the plane valve, when the plane valve of the faucet water purifier according to the above first embodiment of the present invention is under a second purifying working position, wherein the shaded area shown in FIG. 13D shows the passages defined by the communication between the rotatable disk and the fixed disk of the plane valve.

1106E and the sixth channel 106E are communicated with the valve cavity 110E respectively, so that the sixth channel 106E is communicated with the raw water inlet 1106E. More preferably, the seventh channel 107E and the eighth channel 108E of the rotatable disk 122E are communicating blind holes. As shown in FIG. 1 and FIG. 13D, the plane valve 10E of the faucet water purifier according to the first embodiment of the present invention further has a draining channel 1012E, wherein the draining channel 1012E is provided at the fixed disk 121E and extended from the first fluid control surface 1210E of the fixed disk 121E, wherein the eighth channel 108E of the plane valve 10E is communicated with the draining channel 1012E, the draining channel 1012E is communicated with the draining opening 1108E. Preferably, the first channel 101E is provided between the second channel 102E and the fourth channel 104E, and a ninth channel 109E is provided at the outer side of the first channel 101E. More preferably, the ninth channel 109E and the first channel 101E are provided between the second channel 102E and the fourth channel 104E.

As shown in FIG. 1 to FIG. 13D, the first fluid control surface 1210E of the fixed disk 121E of the plane valve 10E of the faucet water purifier according to the first embodiment of the present invention defines an inner portion 12101E and an edge portion 12102E extended outward from the inner portion 12101E, wherein the draining channel 1012E of the plane valve 10E is arranged at the inner portion 12101E of the fixed disk 121E, the first channel 101E, the second channel 102E, the third channel 103E, the fifth channel 105E and the fourth channel 104E of the plane valve 10E are arranged clockwise on the edge portion 12102E of the first fluid control surface 1210E of the fixed disk 121E in this order, wherein the sixth channel 106E, the seventh channel 107E and the eighth channel 108E of the plane valve 10E are arranged clockwise on the second fluid control surface 1220E of the rotatable disk 122E in this order. Alternatively, the first channel 101E, the second channel 102E, the third channel 103E, the fifth channel 105E and the fourth channel 104E of the plane valve 10E are arranged anticlockwise at the first fluid control surface 1210E of the fixed disk 121E of the plane valve 10E in this order, wherein the sixth channel 106E, the seventh channel 107E and the eighth channel 108E of the plane valve 10E are arranged anticlockwise at the second fluid control surface 1220E of the rotatable disk 122E in this order. In other words, the first channel 101E, the second channel 102E, the third channel 103E, the fifth channel 105E and the fourth channel 104E of the plane valve 10E are arranged to surround the draining channel 1012E. Preferably, the first channel 101E, the second channel 102E, the third channel 103E, the fifth channel 105E and the fourth channel 104E and the draining channel 1012E are spacedly arranged at the first fluid control surface 1210E of the fixed disk 121E of the plane valve 10E, the sixth channel 106E, the seventh channel 107E and the eighth channel 108E are spacedly arranged at the second fluid control surface 1220E of the rotatable disk 122E.

As shown in FIG. 1 and FIG. 13D, the rotatable disk 122E of the plane valve 10E of the faucet water purifier according to the first embodiment of the present invention is capable of rotating relative to the fixed disk 121E, so that the plane valve 10E has a first purifying working position and a back flushing working position, wherein when the plane valve 10E of the faucet water purifier according to the first embodiment of the present invention is under the first purifying working position, the sixth channel 106E of the plane valve 10E is communicated with the first channel 101E, so as to define the first communicating passage 1001E communicated with the raw water inlet 1106E and the first opening 1101E respectively, the seventh channel 107E is communicated with the fourth channel 104E and the fifth channel 105E respectively, so as to define the second communicating passage 1002E communicated with the fourth opening 1104E and the fifth opening 1105E respectively. As shown in FIG. 13A to FIG. 13D, when the plane valve 10E is under the first purifying working position, the second channel 102E and the third channel 103E of the plane valve 10E are blocked (or closed) by the rotatable disk 122E respectively. Accordingly, the primary purified water generated by the primary filter 22E will flow to the secondary filter 23E under the action of water pressure, and after it is further purified and treated by the secondary filter 23E, it is provided through the fourth opening 1104E, the second communicating passage 1002E and the fifth opening 1105E. When the plane valve 10E is under the back flushing working position, the sixth channel 106E of the plane valve 10E is communicated with the second channel 102E, so as to define the third communicating passage 1003E communicated with the raw water inlet 1106E and the second opening 1102E respectively, the eighth channel 108E is communicated with the first channel 101E and the draining channel 1012E respectively, so as to define the fourth communicating passage 1004E communicated with the first opening 1101E and the draining opening 1108E respectively. As shown in FIG. 13A to FIG. 13D, when the plane valve 10E of the faucet water purifier according to the first embodiment of the present invention is under the back flushing working position, the third channel 103E and the fifth channel 105E of the plane valve 10E are blocked (or closed) by the rotatable disk 122E respectively.

As shown in FIG. 1 to FIG. 13D, the valve body 11E of the plane valve 10E of the water faucet purifier according to the first embodiment of the present invention further defines the ninth channel 109E, wherein the ninth channel 109E is provided at the fixed disk 121E and extended from the first fluid control surface 1210E of the fixed disk 121E, the ninth channel 109E is communicated with the raw water opening 1109E, wherein when the plane valve 10E is under the raw water supplying working position, the sixth channel 106E of the plane valve 10E is communicated with the ninth channel 109E, so as to define the fifth communicating passage 1005E communicating with the raw water inlet 1106E and the raw water opening 1109E respectively to allow the raw water to flow into the raw water inlet 1106E and further be supplied through the sixth channel 106E, the ninth channel 109E and the raw water opening 1109E, wherein when the plane valve 10E is under the raw water supplying working position, the first channel 101E and the second channel 102E of the plane valve 10E are respectively blocked by the rotatable disk 122E.

As shown in FIG. 1 to FIG. 13D, the plane valve 10E of the faucet water purifier according to the first embodiment of the present invention further has a second purifying working position, wherein when the plane valve 10E is under the second purifying working position, the sixth channel 106E of the plane valve 10E is communicated with the first channel 101E respectively, so as to define the sixth communicating passage 1006E communicated with the raw water inlet 1106E and the first opening 1101E respectively, the seventh channel 107E is communicated with the second channel 102E and the third channel 103E respectively, so as to define the seventh communicating passage 1007E communicated with the second opening 1102E and the third opening 1103E respectively. When the plane valve 10E of the faucet water purifier according to the first embodiment of the present invention is under the second purifying working position, the fourth channel 104E of the plane valve 10E are blocked (or closed) by the rotatable disk 122E, so that the water inside the fourth channel 104E cannot flow freely, accordingly, the primary purified water generated by the primary filter 22E will flow to the second opening 1102E under the action of water pressure, and be provided through the seventh communicating passage 1007E and the third opening 1103E.

As shown in FIG. 1 to FIG. 13D, the first opening 1101E, the second opening 1102E, the fourth opening 1104E and the fifth opening 1105E of the plane valve 10E of the faucet water purifier according to the first embodiment of the present invention are provided at the same side of the valve body 11E of the plane valve 10E. Further, the raw water opening 1109E of the plane valve 10E is provided at a bottom the valve body 11E of the plane valve 10E.

As shown in FIG. 1 to FIG. 13D, the first channel 101E of the plane valve 10E of the faucet water purifier according to the first embodiment of the present invention has a first communicating part 10101E, a second communicating part 10102E and a third communicating part 10103E extended between the first communicating part 10101E and the second communicating part 10102E, wherein the ninth channel 109E of the plane valve 10E is arranged at the outside of the third communicating part 10103E, wherein when the plane valve 10E is in the first purifying working position, the first communicating part 10101E of the first channel 101E of the plane valve 10E is communicated with the sixth channel 106E and the seventh channel 107E is communicated with the fourth channel 104E and the fifth channel 105E respectively; when the plane valve 10E is in the back flushing working position, the sixth channel 106E of the plane valve 10E is communicated with the second channel 102E, and the eighth channel 108E of the plane valve 10*e* is respectively communicated with the second communicating part 10102E of the first channel 101E and the draining channel 1012E; when the plane valve 10E is in the second purifying working position, the second communicating part 10102E of the first channel 101E of the plane valve 10E is communicated with the sixth channel 106E, and the seventh channel 107E is communicated with the second channel 102E and the third channel 103E respectively. As shown in FIG. 1 to FIG. 13D, when the plane valve 10E is under the first purifying working position, the second communicating part 10102E of the first channel 101E of the plane valve 10E is blocked by the rotatable disk 122E; when the plane valve 10E is under the back flushing working position, the first communicating part 10101E of the first channel 101E of the plane valve 10E is blocked by the rotatable disk 122E; when the plane valve 10E is under the second purifying working position, the first communicating part 10101E of the first channel 101E of the plane valve 10E is blocked by the rotatable disk 122E. Preferably, the third communicating part 10103E of the first channel 101E is arranged on the first fluid control surface 1210E of the fixed disk 121E of the plane valve 10E. More preferably, the ninth channel 109E is provided between the first communicating part 10101E and the second communicating part 10102E. Preferably, the third communicating part 10103E of the first channel 101E is arranged within the fixed disk 121E of the plane valve 10E.

Figure 8A:
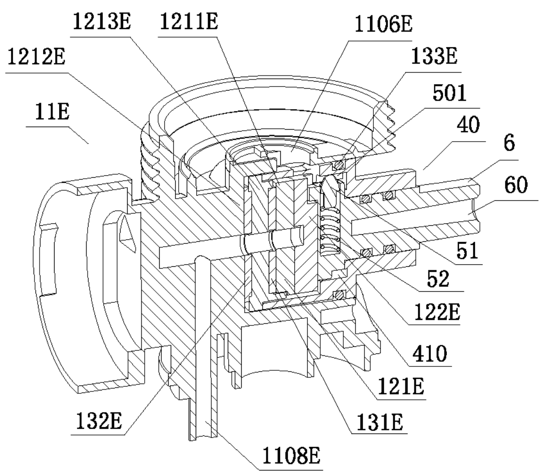
FIG. 8A is a sectional view of the plane valve of the faucet water purifier according to the above first embodiment of the present invention, wherein a fixing device is disposed inside the valve cavity of the plane valve.
Figure 8B:
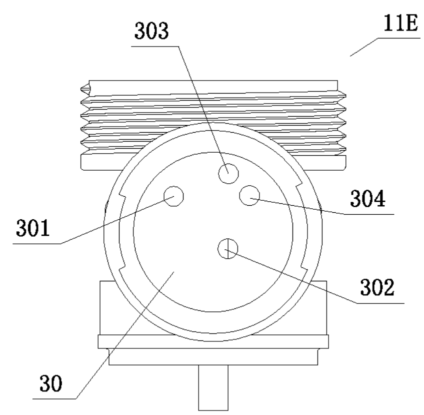
FIG. 8B is a perspective view of the valve body of the plane valve of the faucet water purifier according to the above first embodiment of the present invention, wherein a guiding plate of the faucet water purifier of the present invention is provided at the valve body of the plane valve.
Figure 8C:
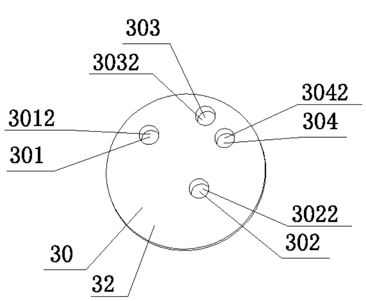
FIG. 8C is a perspective view of the guiding plate of the faucet water purifier according to the above first embodiment of the present invention.
Figure 8D:
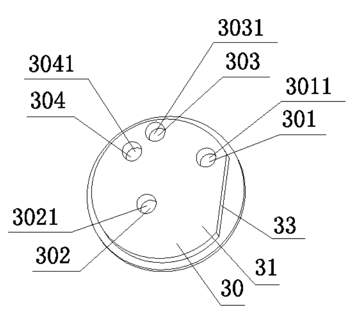
FIG. 8D is another perspective view of the guiding plate of the faucet water purifier according to the above first embodiment of the present invention.
Figure 9A:
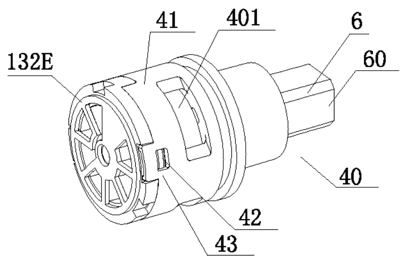
FIG. 9A is a perspective view of the fixing device of the faucet water purifier according to the above first embodiment of the present invention.
Figure 9B:
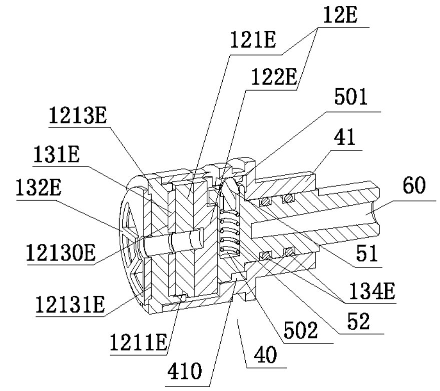
FIG. 9B is a sectional view of the fixing device of the faucet water purifier according to the above first embodiment of the present invention.
Figure 9C:
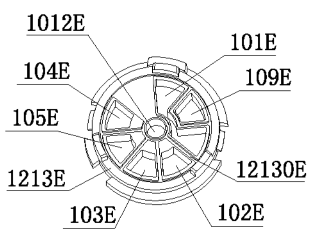
FIG. 9C is a perspective view of a fixing portion of a fixed disk of the plane valve of the faucet water purifier according to the above first embodiment of the present invention, which shows first sealing groove of the fixing portion.
Figure 9D:
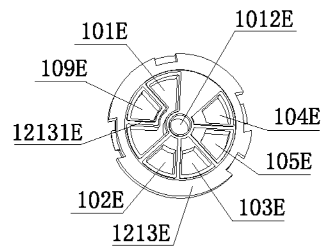
FIG. 9D is another perspective view of the fixing portion of the fixed disk of the plane valve of the faucet water purifier according to the above first embodiment of the present invention, which shows second sealing groove of the fixing portion.
Figure 9E:
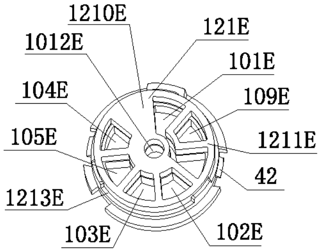
FIG. 9E shows the fixing portion of the fixed disk of the plane valve of the faucet water purifier according to the above first embodiment of the present invention, wherein an upper end portion of the fixed disk is provided at the fixing portion.
Figure 9F:
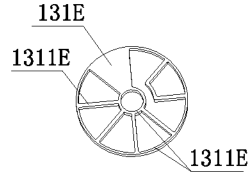
FIG. 9F is a perspective view of a first seal of a sealing assembly of the faucet water purifier according to the above first embodiment of the present invention.
Figure 9G:
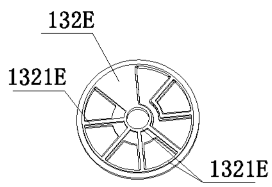
FIG. 9G is a perspective view of the second seal of the sealing assembly of the faucet water purifier according to the above first embodiment of the present invention.
Figure 9H:
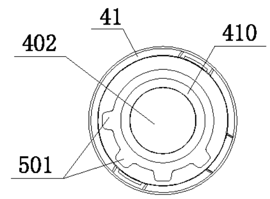
FIG. 9H is a perspective view of a fixing holder of the fixing device of the faucet water purifier according to the above first embodiment of the present invention, which shows restricting grooves of the fixing holder.
Figure 10A:
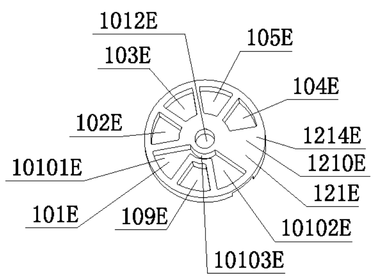
FIG. 10A is a perspective view of the fixed disk of the plane valve of the faucet water purifier according to the above first embodiment of the present invention.
Figure 10B:
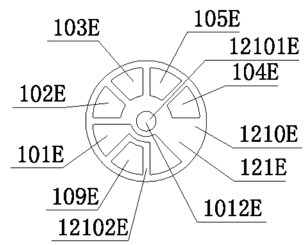
FIG. 10B is a top view of the fixed disk of the plane valve of the faucet water purifier according to the above first embodiment of the present invention.
Figure 10C:
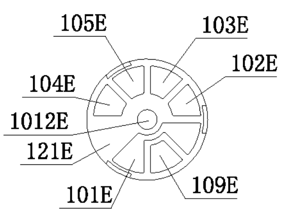
FIG. 10C is a bottom view of the fixed disk of the plane valve of the faucet water purifier according to the above first embodiment of the present invention.
Figure 10D:
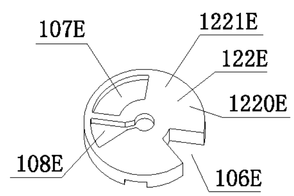
FIG. 10D is a perspective view of a rotatable disk of the plane valve of the faucet water purifier according to the above first embodiment of the present invention.
Figure 10E:
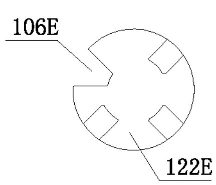
FIG. 10E is a top view of the rotatable disk of the plane valve of the faucet water purifier according to the above first embodiment of the present invention.
Figure 10F:
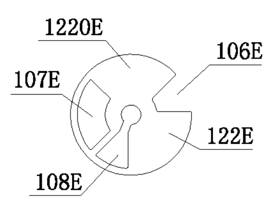
FIG. 10F is a bottom view of the rotatable disk of the plane valve of the faucet water purifier according to the above first embodiment of the present invention.
Figure 11A:
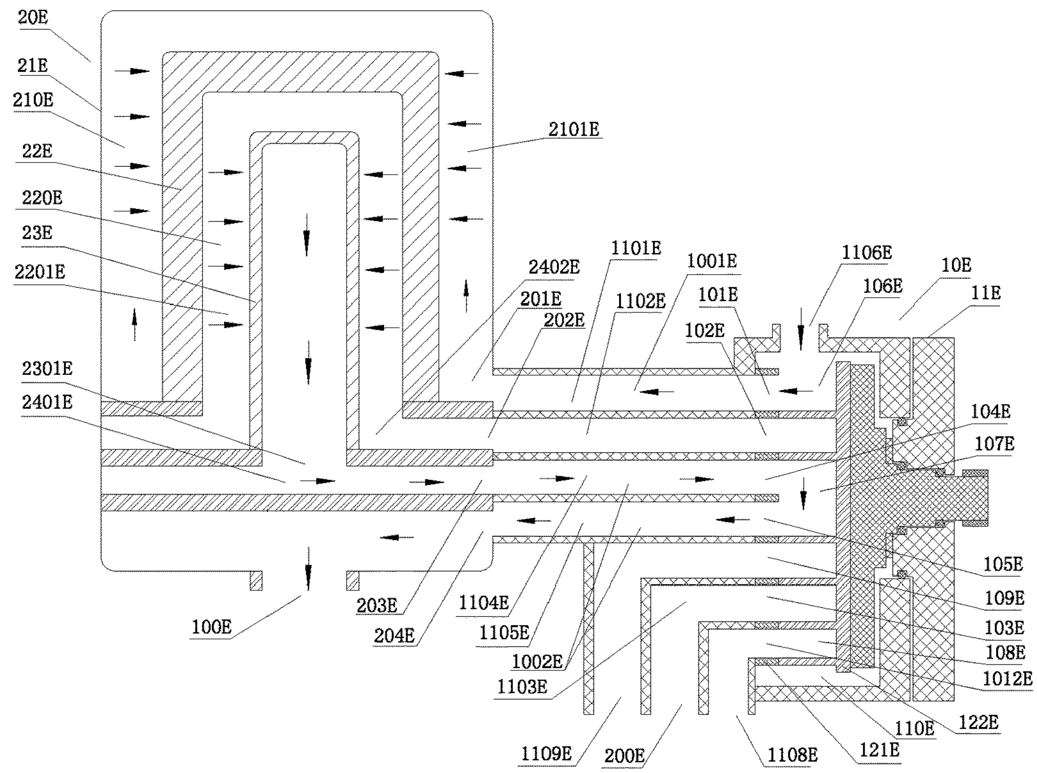
FIG. 11A is a structure diagram of the faucet water purifier according to the above first embodiment of the present invention, wherein the faucet water purifier shown in FIG. 11A is under a first purifying working state, and the arrows shown in FIG. 11A respectively point to the directions of water flow.
Figure 11B:
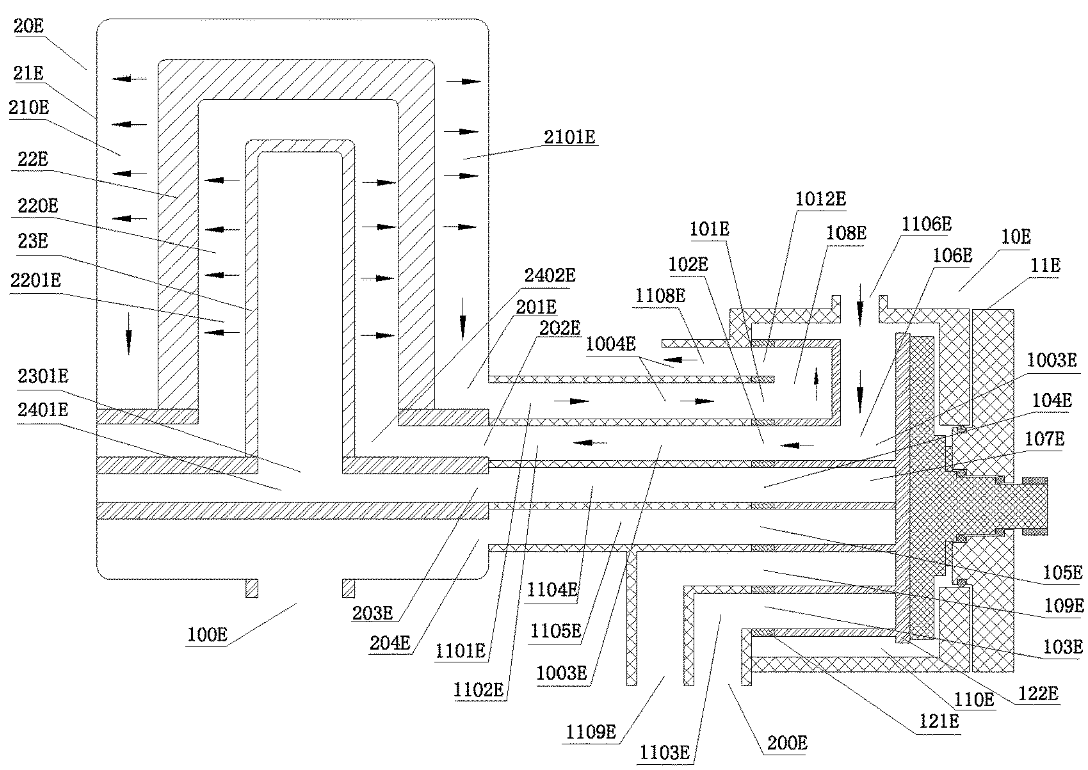
FIG. 11B is a structure diagram of the faucet water purifier according to the above first embodiment of the present invention, wherein the faucet water purifier shown in FIG. 11B is under a back flushing working state, and the arrows shown in FIG. 11B respectively point to the directions of water flow.
Figure 11C:
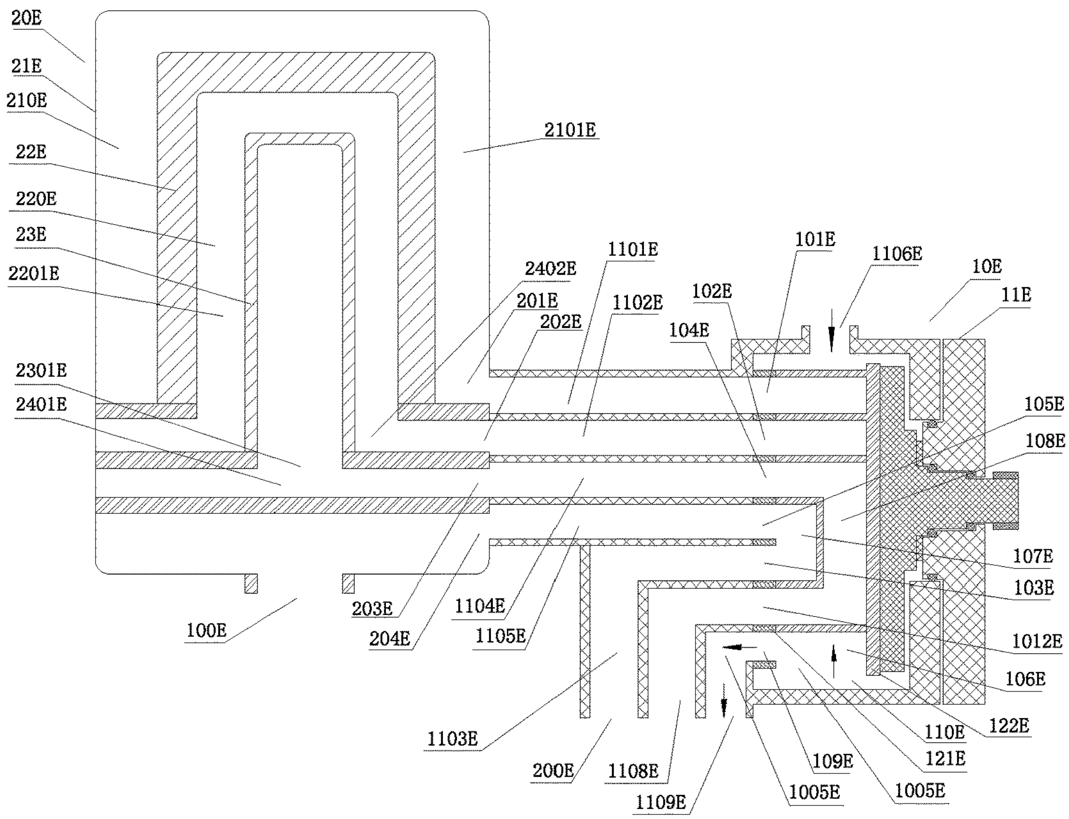
FIG. 11C is a structure diagram of the faucet water purifier according to the above first embodiment of the present invention, wherein the faucet water purifier shown in the drawing is under a raw water supplying working state, and the arrows in the drawing point to the direction of water flow.
Figure 11D:
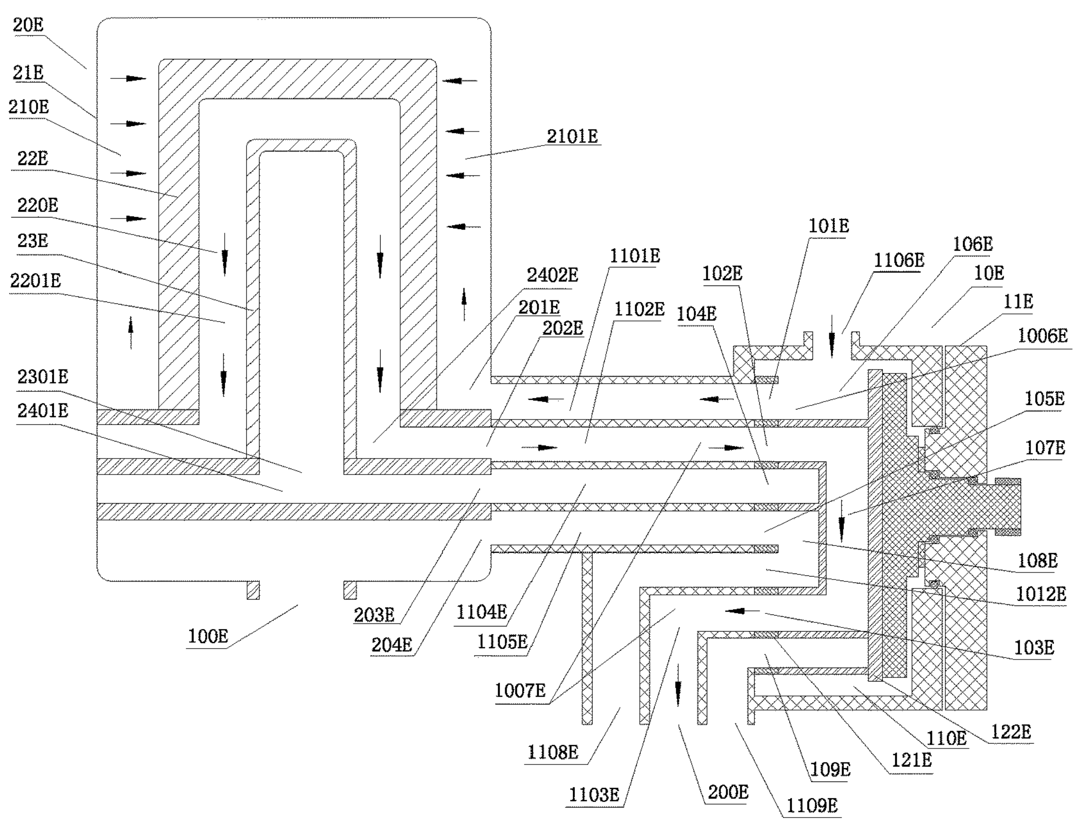
FIG. 11D is a structure diagram of the faucet water purifier according to the above first embodiment of the present invention, wherein the faucet water purifier shown in FIG. 11D is under a second purifying working state, and the arrows shown in FIG. 11D point to the direction of water flow.
Figure 12A:
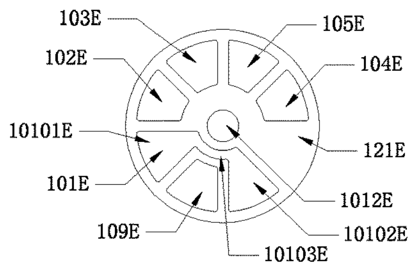
FIG. 12A is a structure diagram of the fixed disk of the plane valve of the faucet water purifier according to the above first embodiment of the present invention.
Figure 12B:
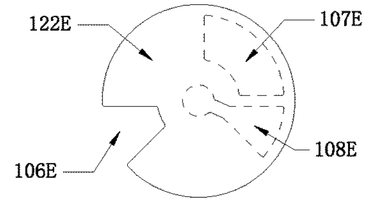
FIG. 12B is a structure diagram of the rotatable disk of the plane valve of the faucet water purifier according to the above first embodiment of the present invention, wherein the dotted line shown in FIG. 12B shows a communicating channel of the rotatable disk.
Figure 12C:
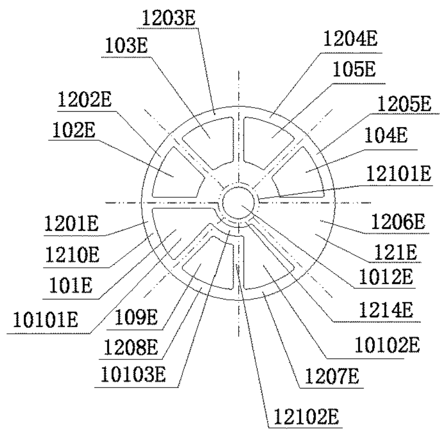
FIG. 12C is a diagram of the equal division of the fixed disk of the plane valve of the faucet water purifier according to the above first embodiment of the present invention, which shows channels are provided in the specific equal division positions of the fixed disk.
Figure 12D:
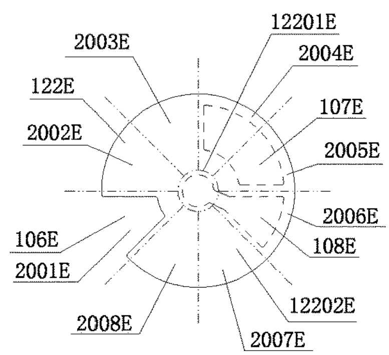
FIG. 12D is a diagram of the equal division of the rotatable disk of the plane valve of the faucet water purifier according to the above first embodiment of the present invention, which shows channels are provided in the specific equal division positions of the rotatable disk.

As shown in FIG. 8B to FIG. 8D, the faucet water purifier according to the first embodiment of the present invention further comprises a guiding plate 30, wherein the guiding plate 30 is provided between the base 24E of the filtering device 20E and the valve body 11E of the plane valve 10E, wherein the guiding plate 30 has a first flow guiding hole 301, a second flow guiding hole 302 and a third flow guiding hole 303, wherein the first flow guiding hole 301 has a first flow guiding port 3011 and a second flow guiding port 3012, the second flow guiding hole 302 has a third flow guiding port 3021 and a fourth flow guiding port 3022, the third flow guiding hole 303 has a fifth flow guiding port 3031 and a sixth flow guiding port 3032, wherein the guiding plate 30 further has a first side surface 31 and a second side surface 32, wherein the first flow guiding port 3011, the third flow guiding port 3021 and the fifth flow guiding port 3031 are provided at the first side surface 31 of the guiding plate 30, the second flow guiding port 3012, the fourth flow guiding port 3022 and the sixth flow guiding port 3032 are provided at the second side surface 32 of the guiding plate 30, wherein the first side surface 31 of the guiding plate 30 is provided to face the valve body 11E, the second side surface 32 is provided to face the base 24E. Further, the first flow guiding port 3011 is provided to be adapted to communicate with the first opening 1101E of the valve body 11E, the third flow guiding port 3021 is provided to be adapted to communicate with the second opening 1102E, the fifth flow guiding port 3031 is provided to be adapted to communicate with the fourth opening 1104E, the second flow guiding port 3012 is provided to be adapted to communicate with the first communicating opening 201E of the filtering device 20E, the fourth flow guiding port 3022 is provided to be adapted to communicate with the second communicating opening 202E, the sixth flow guiding port 3032 is provided to be adapted to communicate with the third communicating opening 203E. In other words, the first flow guiding hole 301 of the guiding plate 30 is communicated with the first opening 1101E and the first communicating opening 201E respectively, the second flow guiding hole 302 is communicated with the second opening 1102E and the second communicating opening 202E respectively, the third flow guiding hole 303 is communicated with the fourth opening 1104E and the third communicating opening 203E respectively. Preferably, the guiding plate 30 is made of sealing material, so as to be water-sealedly provided between the base 24E of the filtering device 20E and the control valve 10E, and then plays a role of water-sealedly sealing the connection between the base 24E of the filtering device 20E and the valve body 11E of the control valve 10E.

As shown in FIG. 8B to 8D, the purified water supplying channel 2464E of the base 24E of the faucet water purifier according to the first embodiment of the present invention has a purified water opening 204E, the guiding plate 30 has a purified water through hole 304, wherein the purified water through hole 304 has a first purified water port 3041 and a second purified water port 3042, wherein the first purified water port 3041 is arranged on the first side 31 of the guiding plate 30, the second purified water port 3042 is arranged on the second side 32 of the guiding plate 30, the purified water opening 204E is arranged on the base 24E, wherein the first purified water port 3041 is arranged suitable for communicating with the fifth opening 1105E of the valve body 11E, the second purified water port 3042 is arranged to communicate with the purified water opening 204E of the purified water supplying channel 2464E of the filtering device 20E.

As shown in FIG. 6C to FIG. 8D, the guiding plate 30 of the faucet water purifier according to the first embodiment of the present invention further comprises a positioning protrusion 33, wherein the positioning protrusion 33 is preferably provided at the first side surface 31, wherein the positioning protrusion 33 is provided to engage with the positioning groove 34 provided at the valve body 11E, so as to help the guiding plate 30 to be correctly provided between the valve body 11E of the control valve 10E and the base 24E of the filtering device 20E. It is appreciated that when the positioning protrusion 33 of the guiding plate 30 is correctly engaged with the positioning groove 34 provided at the valve body 11E, the first flow guiding port 3011 is communicated with the first opening 1101E of the valve body 11E, the third flow guiding port 3021 is communicated with the second opening 1102E, the fifth flow guiding port 3031 is communicated with the fourth opening 1104E, the second flow guiding port 3012 is communicated with the first communicating opening 201E of the filtering device 20E, the fourth flow guiding port 3022 is communicated with the second communicating opening 202E, the sixth flow guiding port 3032 is communicated with the third communicating opening 203E. It is worth mentioning that the guiding plate 30 of the faucet water purifier of the present invention will significantly reduce the manufacturing difficulty of the base 24E of the filtering device 20E of the faucet water purifier of the present invention. As shown in FIG. 2 and FIG. 8B to FIG. 8D, the distribution and shape of the first opening 1101E, the second opening 1102E and the fourth opening 1104E of the valve body 11E of the control valve 10E of the faucet water purifier of the present invention in the valve body 11E are relatively irregular, which causes that the first communicating opening 201E, the second communicating opening 202E and the third communicating opening 203E of the filtering device 20E are difficult to cooperate and communicate with the first opening 1101E, the second opening 1102E and the fourth opening 1104E. In addition, if the base 24E of the filtering device 20E is directly communicated with the valve body 11E, the distribution and shape of the first opening 1101E, the second opening 1102E and the fourth opening 1104E of the valve body 11E in the valve body 11E determine the distribution and shape of the first communicating opening 201E, the second communicating opening 202E and the third communicating opening 203E of the filtering device 20E in its base 24E, which will cause the significant increase of the manufacturing difficulty of the base 24E of the filtering device 20E. The structure of the guiding plate 30 adopted by the faucet water purifier of the present invention what the first flow guiding port 3011 provided at its first side surface 31 is adapted to communicate with the first opening 1101E of the valve body 11E, the third flow guiding port 3021 is adapted to communicate with the second opening 1102E, the fifth flow guiding port 3031 is adapted to communicate with the fourth opening 1104E, the second flow guiding port 3012 provided at its second side surface 32 is adapted to communicate with the first communicating opening 201E of the filtering device 20E, the fourth flow guiding port 3022 is adapted to communicate with the second communicating opening 202E, and the sixth flow guiding port 3032 is adapted to communicate with the third communicating opening 203E, is convenient for the first communicating opening 201E, the second communicating opening 202E and the third communicating opening 203E of the filtering device 20E to cooperate and communicate with the first opening 1101E, the second opening 1102E and the fourth opening 1104E. In addition, the above-mentioned structure of the guiding plate 30 adopted by the faucet water purifier of the present invention also makes the base 24E of the filtering device 20E of the faucet water purifier of the present invention and the valve body 11E of the control valve 10E can be manufactured separately, and the distribution and shape of the first communicating opening 201E, the second communicating opening 202E and the third communicating opening 203E of the filtering device 20E in the base 24E are not restricted by the distribution and shape of the first opening 1101E, the second opening 1102E and the fourth opening 1104E of the valve body 11E in the valve body 11E. This reduces the manufacturing difficulty of the base 24E of the filtering device 20E.

As shown in FIG. 9A to FIG. 9H, the fixed disk 121E of the valve core 12E of the plane valve 10E of the faucet water purifier according to the first embodiment of the present invention comprises an upper end portion 1211E, a lower end portion 1212E and a fixing portion 1213E provided between the upper end portion 1211E and the lower end portion 1212E, wherein the upper end portion 1211E defines the first fluid control surface 1210E of the fixed disk 121E, and the lower end portion 1212E is provided at the valve cavity 110E of the valve body 11E. Preferably, the lower end portion 1212E of the fixed disk 121E of the valve core 12E of the plane valve 10E of the faucet water purifier of the present invention is integrally provided at the inner wall of the valve body 11E of the plane valve 10E.

As shown in FIG. 8A and FIG. 9A to FIG. 9H, the control valve 10E of the faucet water purifier according to the first embodiment of the present invention further comprises a fixing device 40, wherein the fixing device 40 comprises a fixing holder 41, a first clamping connector 42 and a second clamping connector 43, wherein the fixing holder 41 of the fixing device 40 has at least one accommodation chamber 410 and at least one water inlet opening 401, wherein the water inlet opening 401 is communicated with the raw water inlet 1106E and the accommodation chamber 410 respectively, wherein the first clamping connector 42 is provided at the fixing portion 1213E of the fixed disk 121E, the second clamping connector 43 is provided at the fixing holder 41, wherein the first clamping connector 42 and the second clamping connector 43 are provided to be adapted to be clamped together, so that the fixing portion 1213E of the fixed disk 121E can be fixed at the fixing holder 41 through the first clamping connector 42 and the second clamping connector 43. Further, the water inlet opening 401 of the fixing holder 41 and the raw water inlet 1106E are both communicated with the valve cavity 110E of the valve body 11E, so that the accommodation chamber 410 of the fixing holder 41 is communicated with the raw water inlet 1106E of the valve body 11E through the water inlet opening 401 and the valve cavity 110E of the valve body 11E, and the raw water can flow into the accommodation chamber 410 of the fixing holder 41 through the raw water inlet 1106E of the valve body 11E. As shown in FIG. 8A to FIG. 9H, the accommodation chamber 410 of the fixing holder 41 of the fixing device 40 of the faucet water purifier according to the first embodiment of the present invention is provided to be adapted to accommodate the upper end portion 1211E of the fixed disk 121E and the rotatable disk 122E inside it, the sixth channel 106E of the plane valve 10E is provided to communicate with the accommodation chamber 410 of the fixing holder 41, so that raw water can be provided to the sixth channel 106E of the plane valve 10E through the water inlet opening 401 and the accommodation chamber 410 of the fixing holder 41. In other words, the sixth channel 106E of the plane valve 10E is communicated with the raw water inlet 1106E of the valve body 11E through the accommodation chamber 410 of the fixing holder 41, the water inlet opening 401 and the valve cavity 110E of the valve body 11E. As shown in FIG. 8A and FIG. 9A to FIG. 9H, the upper end portion 1211E of the fixed disk 121E is further adapted to be detachably clamped at the fixing portion 1213E of the fixed disk 121E, the fixing portion 1213E of the fixed disk 121E is adapted to be detachably clamped at the lower end portion 1212E of the fixed disk 121E, so that the upper end portion 1211E of the fixed disk 121E cannot rotate relative to the fixing portion 1213E, the fixing portion 1213E of the fixed disk 121E cannot rotate relative to the lower end portion 1212E.

It is worth mentioning that the upper end portion 1211E of the fixed disk 121E of the valve core 12E of the plane valve 10E of the faucet water purifier of the present invention is detachably clamped at the fixing portion 1213E of the fixed disk 121E, the fixing portion 1213E of the fixed disk 121E is detachably clamped at the lower end portion 1212E of the fixed disk 121E, and the upper end portion 1211E of the fixed disk 121E and the rotatable disk 122E are accommodated inside the accommodation chamber 410 of the fixing holder 41, so that the upper end portion 1211E and the fixing portion 1213E of the fixed disk 121E and the rotatable disk 122E can be integrated together through the fixing holder 41, the first clamping connector 42 and the second clamping connector 43 of the fixing device 40. Especially, since the upper end portion 1211E of the fixed disk 121E defines the first fluid control surface 1210E of the fixed disk 121E, and the upper end portion 1211E of the fixed disk 121E is detachably clamped at the fixing portion 1213E of the fixed disk 121E, so that the upper end portion 1211E can be manufactured separately and the side surface of the upper end portion 1211E facing the rotatable disk 122E can be easily processed, such as being polished smooth, to form the first fluid control surface 1210E. However, if the fixed disk 121E of the valve core 12E of the plane valve 10E of the faucet water purifier of the present invention is fixedly provided at the valve body 11E, or the fixed disk 121E of the valve core 12E of the plane valve 10E is integrated with the valve body 11E, the side surface of the upper end portion 1211E of the fixed disk 121E of the valve core 12E of the plane valve 10E, which faces the rotatable disk 122E, is difficult to be processed and obtain the first fluid control surface 1210E.

As shown in FIG. 2, FIG. 8A and FIG. 9A to FIG. 9H, the first clamping connector 42 of the fixing device 40 of the faucet water purifier according to the first embodiment of the present invention comprises a plurality of hooks 421 provided at the side wall of the fixing portion 1213E of the fixed disk 121E, the second clamping connector 43 has a plurality of clamping concave grooves 430, wherein the hooks 421 of the first clamping connector 42 are adapted to engage with the clamping concave grooves 430 of the second clamping connector 43, so that the first clamping connector 42 can be clamped with the second clamping connector 43. Alternatively, the first clamping connector 42 has a plurality of clamping concave grooves 430 provided at the side wall of the fixing portion 1213E of the fixed disk 121E, the second clamping connector 43 has a plurality of hooks 421 provided at the fixing holder 41, wherein the hooks 421 of the second clamping connector 43 are adapted to engage with the clamping concave grooves 430 of the first clamping connector 42. In other words, the hooks 421 of the fixing device 40 are provided at the fixing holder 41, and the clamping concave grooves 430 are provided at the side wall of the fixing portion 1213E of the fixed disk 121E. Further, the fixing device 40 has a set of guiding grooves 400 and a set of guiding members 45, wherein the guiding grooves 400 are provided at the side wall of the fixing portion 1213E of the fixed disk 121E respectively, the guiding members 45 are provided at the second clamping connector 43 and extended from the second clamping connector 43, wherein the guiding members 45 are provided directly facing the clamping concave grooves 430 respectively, and the width of the guiding member 45 is not greater than the width of the guiding groove 400, so that the first clamping connector 42 and the second clamping connector 43 can be clamped together under the guidance of the guiding grooves 400 and the guiding members 45.

As shown in FIG. 2, FIG. 8A and FIG. 9A to FIG. 9B, the control valve 10E of the faucet water purifier according to the first embodiment of the present invention further comprises a driving assembly 6, wherein the driving assembly 6 is provided for driving the rotatable disk 122E of the plane valve 10E to rotate relative to the fixed disk 121E. As shown in FIG. 2, FIG. 8A and FIG. 9A to FIG. 9B, exemplarily, the driving assembly 6 comprises a valve rod 60, the fixing holder 41 further comprises an operation opening 402, wherein the operation opening 402 is communicated with the accommodation chamber 410 of the fixing holder 41, wherein the valve rod 60 has a driving end 61 and an operating end 62 extended from the driving end 61, wherein the driving end 61 of the valve rod 60 is disposed inside the accommodation chamber 410 of the fixing holder 41, the operating end 62 of the valve rod 60 is extended from the driving end 61 and sticks out of the accommodation chamber 410 of the fixing holder 41 through the operation opening 402 of the fixing holder 41. Accordingly, when the operating end 62 of the valve rod 60 is operated to rotate, the driving end 61 is driven to rotate and further drives the rotatable disk 122E to rotate, so that the plane valve 10E is controlled to under the corresponding working position. Accordingly, the upper end portion 1211E and the fixing portion 1213E of the fixed disk 121E, the rotatable disk 122E and the valve rod 60 can be integrated together through the fixing holder 41, the first clamping connector 42 and the second clamping connector 43 of the fixing device 40, so as to reduce the manufacturing difficulty of the fixed disk 121E, and reduce the difficulty of assembling the upper end portion 1211E and the fixing portion 1213E of the fixed disk 121E, the rotatable disk 122E and the valve rod 60 into the valve cavity 110E of the valve body 11E. It is appreciated that the way of integrating the upper end portion 1211E and the fixing portion 1213E of the fixed disk 121E, the rotatable disk 122E and the valve rod 60 together through the fixing holder 41, the first clamping connector 42 and the second clamping connector 43 of the fixing device 40 also makes the upper end portion 1211E and the fixing portion 1213E of the fixed disk 121E, the rotatable disk 122E and the valve rod 60 more convenient for the automated assembly and production of the plane valve 10E. Further, the outer diameter of the driving end 61 of the valve rod 60 is smaller than the inner diameter of the accommodation chamber 410 of the fixing holder 41 and greater than the inner diameter of the operation opening 402 of the fixing holder 41, the outer diameter of the operating end 62 of the valve rod 60 is smaller than the inner diameter of operation opening 402 of the fixing holder 41, so that the fixing holder 41 can be can be pressed against the driving end 61 of the valve rod 60 under the action of external force, and the rotatable disk 122E can be pressed against the upper end portion 1211E of the fixed disk 121E under the action of the driving end 61 of the valve rod 60, and the second fluid control surface 1220E of the rotatable disk 122E is provided on the first fluid control surface 1210E of the fixed disk 121E.

Figure 2:
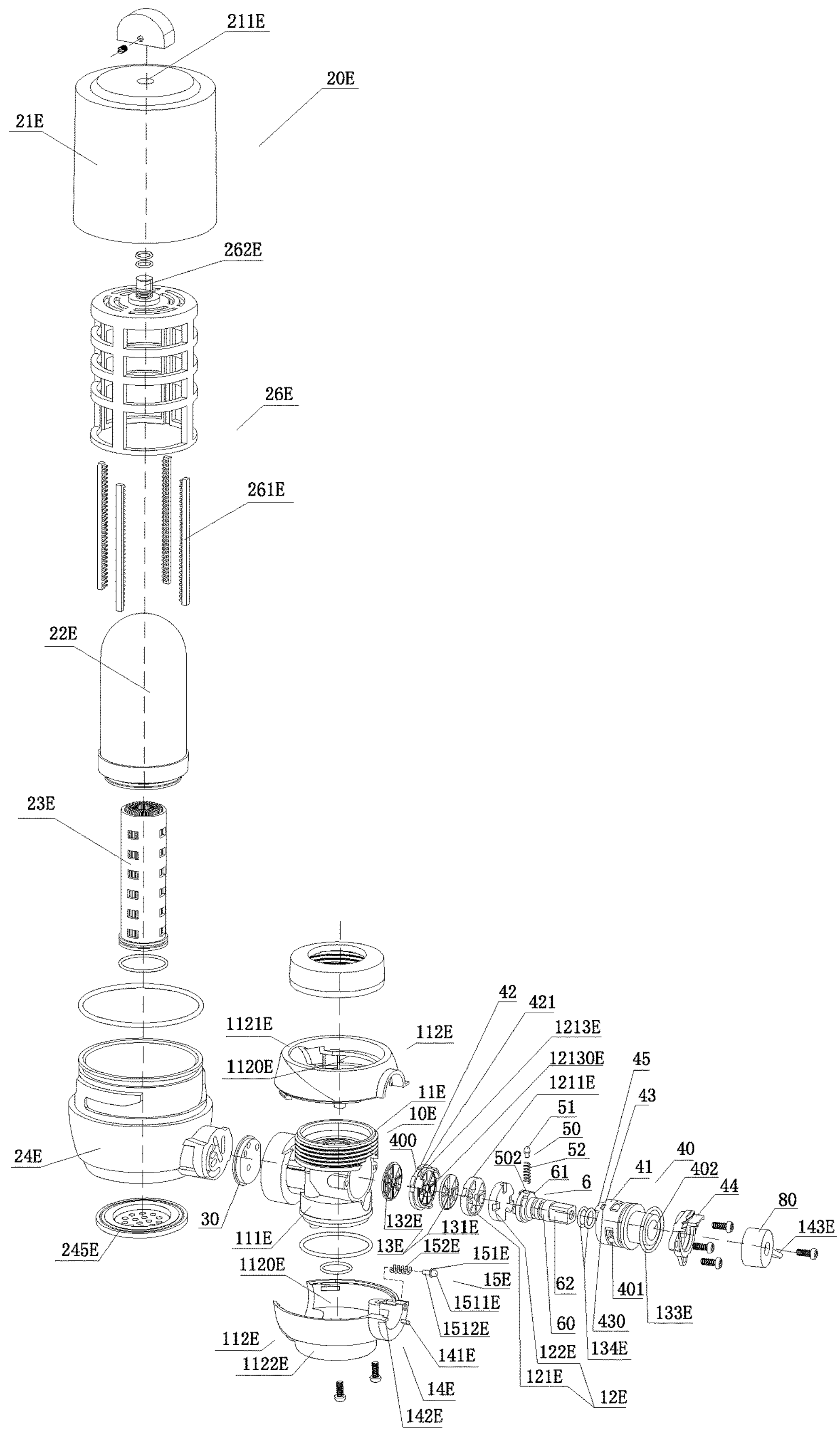
FIG. 2 is an exploded view of the faucet water purifier according to the above first embodiment of the present invention.
Figure 3A:
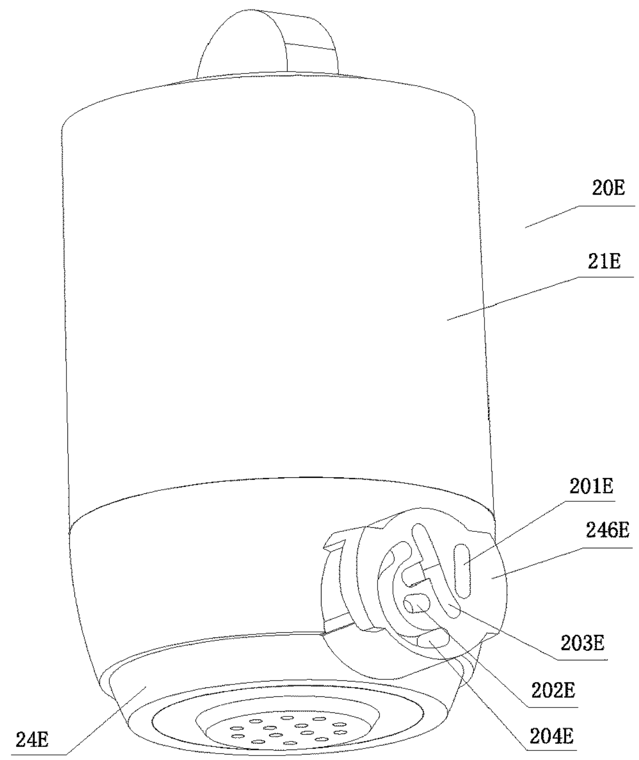
FIG. 3A is a front view of the filtering device of the faucet water purifier according to the above first embodiment of the present invention.
Figure 3B:
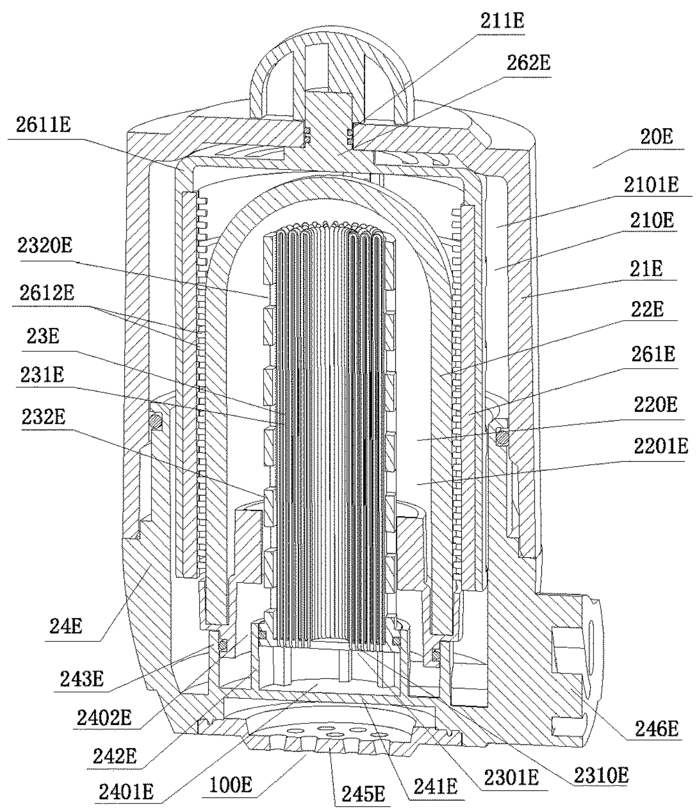
FIG. 3B is a sectional view of the filtering device of the faucet water purifier according to the above first embodiment of the present invention.
Figure 3C:
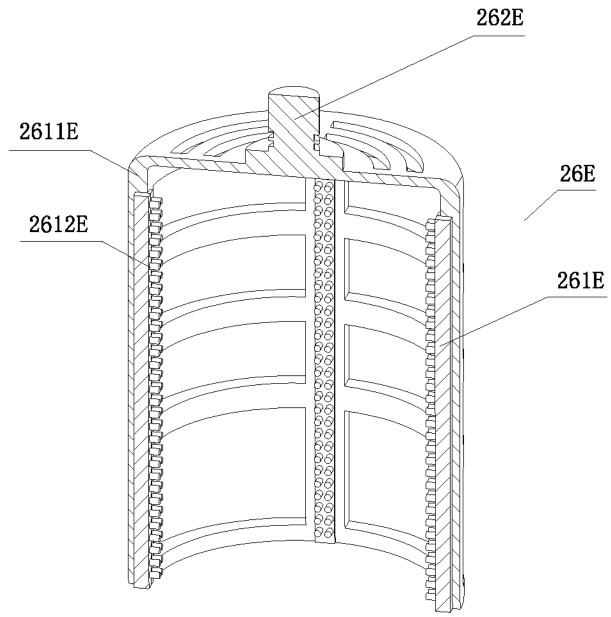
FIG. 3C is another sectional view of the filtering device of the faucet water purifier according to the above first embodiment of the present invention, which shows a brush of the filtering device.
Figure 3D:
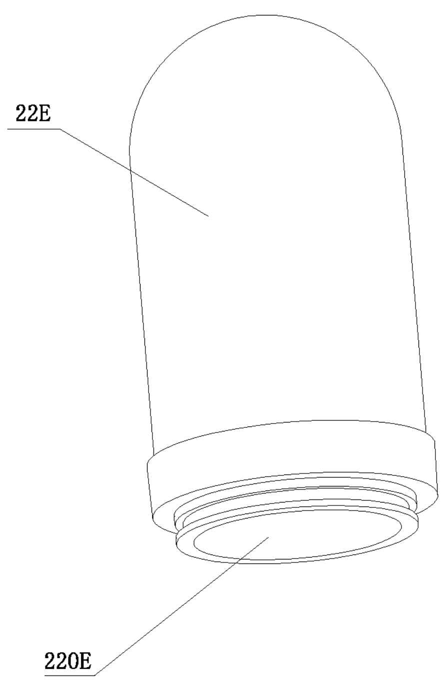
FIG. 3D is a perspective view of a primary filter of the filtering device of the faucet water purifier according to the above first embodiment of the present invention.
Figure 3E:
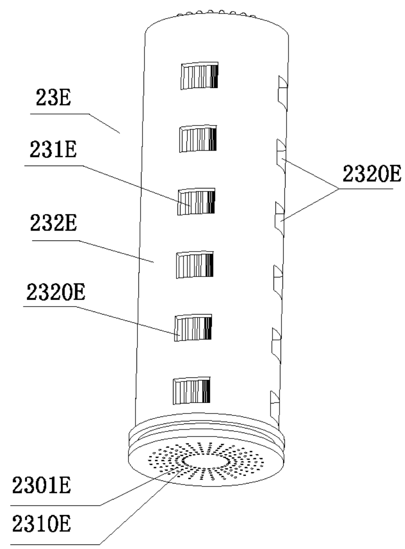
FIG. 3E is a perspective view of a secondary filter of the filtering device of the faucet water purifier according to the above first embodiment of the present invention.
Figure 4A:
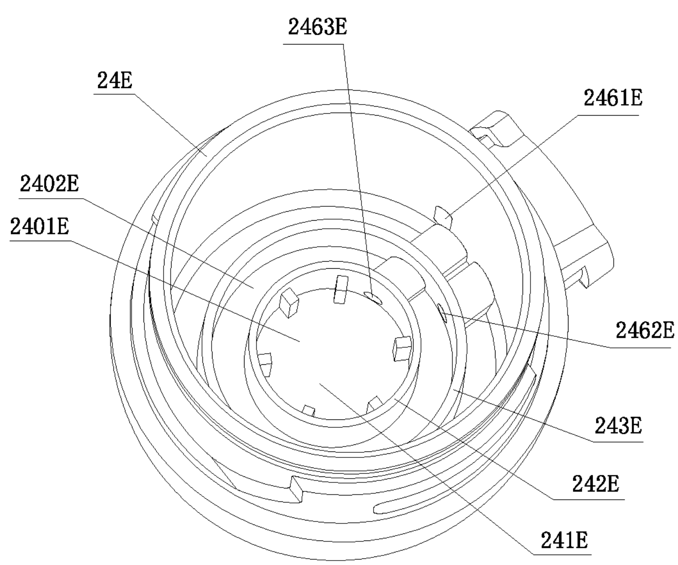
FIG. 4A is a perspective view of a base of the filtering device of the faucet water purifier according to the above first embodiment of the present invention.
Figure 4B:
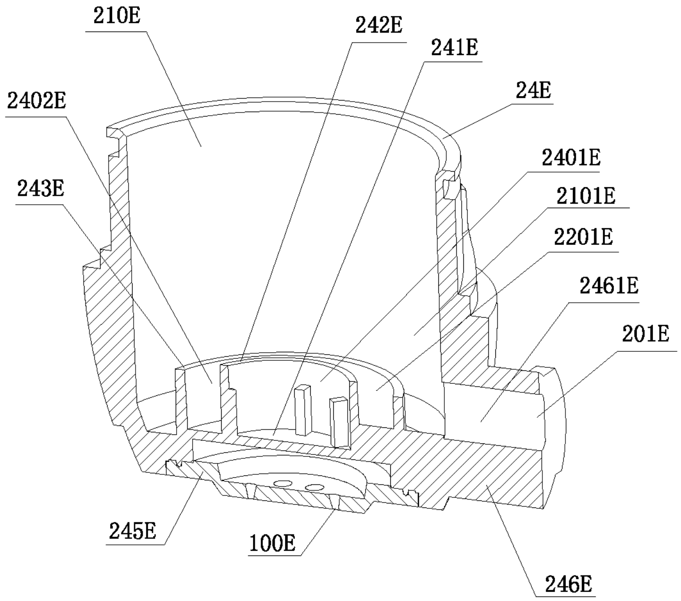
FIG. 4B is a sectional view of the base of the filtering device of the faucet water purifier according to the above first embodiment of the present invention.
Figure 4C:
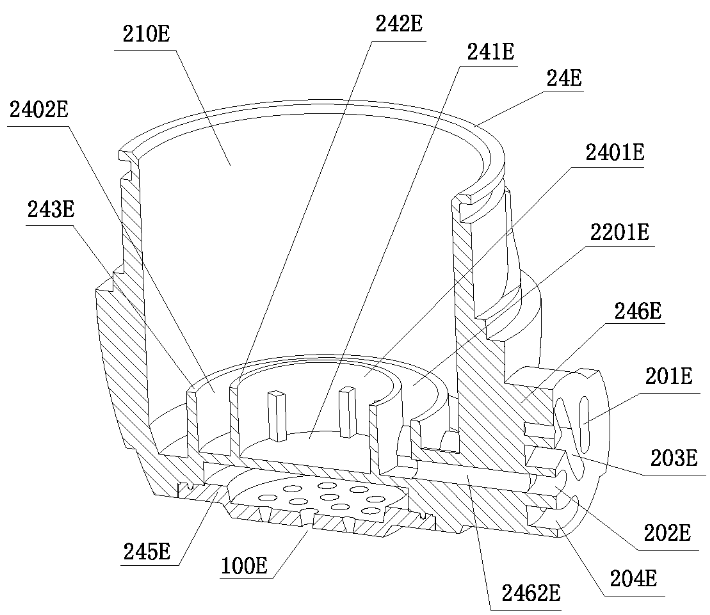
FIG. 4C is another sectional view of the base of the filtering device of the faucet water purifier according to the above first embodiment of the present invention.
Figure 4D:
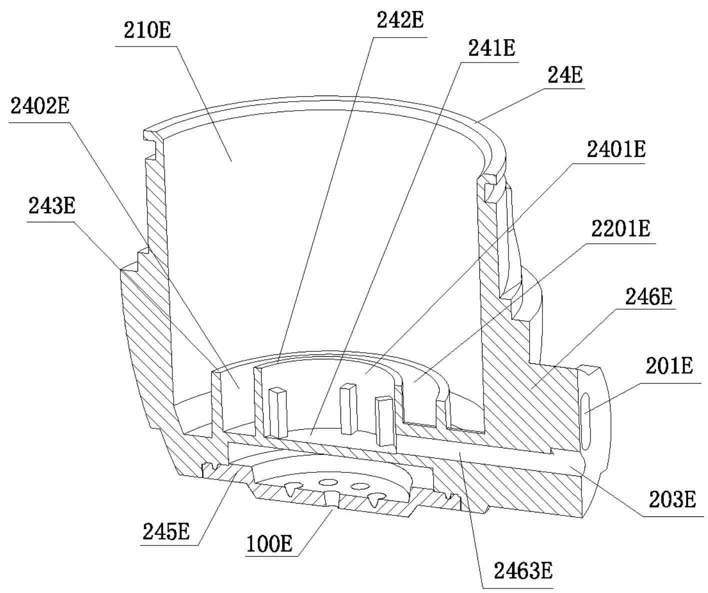
FIG. 4D is another sectional view of the base of the filtering device of the faucet water purifier according to the above first embodiment of the present invention.
Figure 4E:
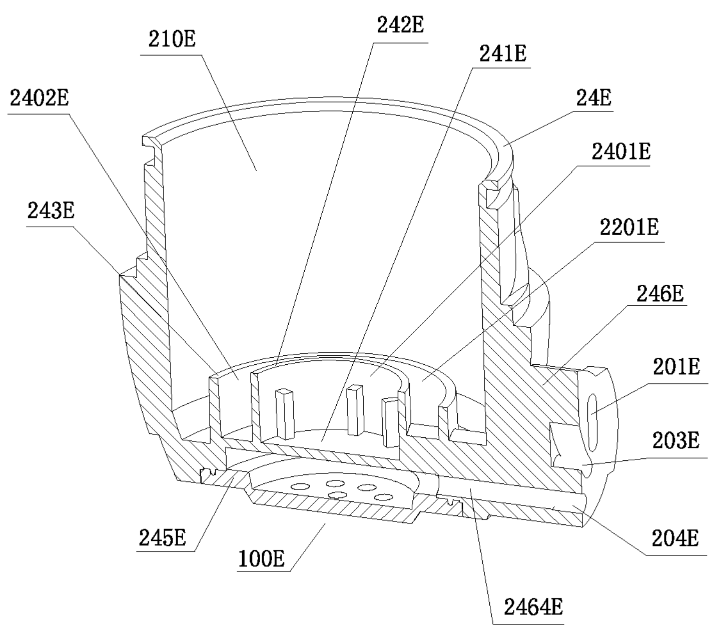
FIG. 4E is another sectional view of the base of the filtering device of the faucet water purifier according to the above first embodiment of the present invention.

It is appreciated that the driving assembly 6 can be any mechanism or assembly unit for driving the rotatable disk 122E of the plane valve 10E to rotate relative to the fixed disk 121E. Exemplarily, the driving assembly 6 also can be a gear set for driving the rotatable disk 122E of the plane valve 10E to rotate relative to the fixed disk 121E, wherein the gear set comprises a driving gear and driven cogs provided at the side wall of the rotatable disk 122E, the driving gear is engaged with and driven cogs of the rotatable disk 122E, so that the users or the operators can drive the rotatable disk 122E to rotate relative to the fixed disk 121E by rotating the driving gear. Exemplarily, the driving assembly 6 also comprises a driving rod provided at the rotatable disk 122E of the plane valve 10E and paralleled with the second fluid control surface 1220E of the rotatable disk 122E, and the users can drive the rotatable disk 122E to rotate relative to the fixed disk 121E by driving the driving rod of the driving assembly 6. As shown in FIG. 2, the fixing device 40 of the faucet water purifier according to the first embodiment of the present invention further comprises a fixing member 44, wherein the fixing member 44 is provided pressing against the fixing holder 41, and the fixing member 44 is provided to be adapted to be fixed at the valve body 11E of the plane valve 10E. Accordingly, the fixing holder 41 is held inside the valve cavity 110E of the valve body 11E through the fixing member 44.

As shown in FIG. 2, FIG. 8A and FIG. 8A to FIG. 9B, the control valve 10E of the faucet water purifier according to the first embodiment of the present invention further comprises a positioning assembly 50, wherein the positioning assembly 50 has a restricting element 51, a resetting element 52 provided at the restricting element 51, a plurality of restricting grooves 501 provided at the inner wall of the fixing holder 41 and an operation chamber 502 provided at the driving end 61 of the valve rod 60, wherein the restricting element 51 and the resetting element 52 are both disposed inside the operation chamber 502, and the resetting element 52 is provided between the restricting element 51 and the driving end 61, so that when the driving end 61 of the valve rod 60 is rotated and the restricting element 51 directly faces the restricting grooves 501, the restricting element 51 can move into the restricting grooves 501 under the action of the resetting force (or elastic force) of the resetting element 52; at this time, when the driving end 61 of the valve rod 60 continues to be rotated to make the fixing holder 41 press the restricting element 51 and further to make the restricting element 51 retract into the operation chamber 502, the driving end 61 of the valve rod 60 can be easily rotated and the restricting element 51 is kept retracted inside the operation chamber 502 under the pressure of the fixing holder 41. It is appreciated that when the driving end 61 of the valve rod 60 is rotated to make the restricting element 51 directly facing the restricting grooves 501 and further to make the restricting element 51 to move into the restricting grooves 501, the plane valve 10E is maintained under a corresponding working position, and the faucet water purifier of the present invention is under a corresponding working state. It should be understood that the resetting element 52 is a resetting spring. Alternatively, the resetting element 52 is a resetting elastic piece. Preferably, the restricting element 51 is provided to be engaged with the restricting grooves 501, so that the restricting element 51 can be stably held inside the restricting grooves 501 when there is no appropriate external force to drive the valve rod 60 to rotate.

As shown in FIG. 2 and FIG. 8A to FIG. 9B, the plane valve 10E of the faucet water purifier according to the first embodiment of the present invention further comprises a sealing assembly 13E, wherein the sealing assembly 13E has a first seal 131E, wherein the first seal 131E is provided between the upper end portion 1211E and the fixing portion 1213E of the fixed disk 121E. Further, the first seal 131E has a plurality of first sealing strips 1311E, the fixing portion 1213E of the fixed disk 121E has a set of first sealing grooves 12130E, wherein the first sealing grooves 12130E are provided to respectively surround the first channel 101E, the second channel 102E, the third channel 103E, the fourth channel 104E, the fifth channel 105E, the draining channel 1012E and the ninth channel 109E (if any) of the fixed disk 121E, the first sealing strips 1311E of the first seal 131E are provided according to the first sealing grooves 12130E of the fixing portion 1213E, so that the first sealing strips 1311E of the first seal 131E can be engaged with the first sealing grooves 12130E of the fixing portion 1213E and realizes the sealing between the upper end portion 1211E and the fixing portion 1213E of the fixed disk 121E. It should be understood that the first sealing grooves 12130E are defined at one side of the fixing portion 1213E facing the upper end portion 1211E. Further, the sealing assembly 13E has a second seal 132E, wherein the second seal 132E is provided between the fixing portion 1213E and the lower end portion 1212E of the fixed disk 121E. Further, the second seal 132E has a plurality of second sealing strips 1321E, the fixing portion 1213E of the fixed disk 121E has a plurality of second sealing grooves 12131E, wherein the second sealing grooves 12131E are provided to respectively surround the first channel 101E, the second channel 102E, the third channel 103E, the fourth channel 104E, the fifth channel 105E, the draining channel 1012E and the ninth channel 109E of the fixed disk 121E, the second sealing strips 1321E of the second seal 132E are provided according to the second sealing grooves 12131E of the fixing portion 1213E, so that the second sealing strips 1321E of the second seal 132E can be engaged with the second sealing grooves 12131E of the fixing portion 1213E and realizes the sealing between the lower end portion 1212E and the fixing portion 1213E of the fixed disk 121E. It is appreciated that the second sealing grooves 12131E are defined at one side of the fixing portion 1213E facing the lower end portion 1212E.

As shown in FIG. 2 and FIG. 8A to FIG. 9B, the sealing assembly 13E of the faucet water purifier according to the first embodiment of the present invention further comprises at least one first sealing ring 133E, wherein the first sealing ring 133E is provided at the outer surface of the fixing holder 41, so as to realize the sealing between the fixing holder 41 and the inner wall of the valve body 11E and prevent the raw water from flowing out between the fixing holder 41 and the inner wall of the valve body 11E. Further, the sealing assembly 13E comprises at least one second sealing ring 134E, wherein the second sealing ring 134E is provided between the valve rod 60 and the fixing holder 41, so as to realize the sealing between the valve rod 60 and the inner wall of the fixing holder 41 and prevent the raw water from flowing out between the valve rod 60 and the inner wall of the fixing holder 41.

As shown in FIG. 2 and FIG. 8A to FIG. 9H, the plane valve 10E of the faucet water purifier according to the first embodiment of the present invention further comprises a rotary knob 80, wherein the rotary knob 80 is provided at the operating end 62 of the valve rod 60, so that the users can rotate the valve rod 60 to rotate the rotatable disk 122E and control the plane valve 10E to be under the corresponding working position.

As shown in FIG. 11A to FIG. 13D, the first fluid control surface 1210E of the fixed disk 121E of the plane valve 10E of the faucet water purifier according to the first embodiment of the present invention has an inner portion 12101E and an edge portion 12102E extended outward from the inner portion 12101E, which are shown by the dashed lines, wherein the inner portion 12101E and the edge portion 12102E are provided at a top end portion 1214E of the fixed disk 121E, and the edge portion 12102E (or the part other than the inner portion 12101E) of the first fluid control surface 1210E are equally divided into a first portion 1201E, a second portion 1202E, a third portion 1203E, a fourth portion 1204E, a fifth portion 1205E, a sixth portion 1206E, a seventh portion 1207E and an eighth portion 1208E, which are shown by the dashed lines, the second fluid control surface 1220E of the rotatable disk 122E of the plane valve 10E has an inner region 12201E and an edge region 12202E extended outward from the inner region 12201E, which are shown by the dashed lines, wherein the inner region 12201E and the edge region 12202E are provided at a bottom end portion 1221E of the rotatable disk 122E, and the edge region 12202E (or the part other than the inner region 12201E) of the second fluid control surface 1220E are equally divided into a first region 2001E, a second region 2002E, a third region 2003E, a fourth region 2004E, a fifth region 2005E, a sixth region 2006E, a seventh region 2007E and an eighth region 2008E, which are shown by the dashed lines, wherein the first channel 101E is extended downward from the first portion 1201E and the seventh portion 1207E of the first fluid control surface 1210E of the fixed disk 121E, the first channel 101E is further extended downward from the eighth portion 1208E of the first fluid control surface 1210E of the fixed disk 121E, the second channel 102E is extended downward from the second portion 1202E of the first fluid control surface 1210E of the fixed disk 121E, the third channel 103E is extended downward from the third portion 1203E of the first fluid control surface 1210E of the fixed disk 121E, the fourth channel 104E is extended downward from the fifth portion 1205E of the first fluid control surface 1210E of the fixed disk 121E, the fifth channel 105E is extended downward from the fourth portion 1204E of the first fluid control surface 1210E of the fixed disk 121E, the sixth channel 106E is extended upward from the first region 2001E of the second fluid control surface 1220E of the rotatable disk 122E, the seventh channel 107E is extended upward from the fourth region 2004E and the fifth region 2005E of the second fluid control surface 1220E of the rotatable disk 122E, the eighth channel 108E is extended upward from the sixth region 2006E and the inner region 12201E of the second fluid control surface 1220E of the rotatable disk 122E, the draining channel 1012E is extended downward from the inner portion 12101E of the first fluid control surface 1210E of the fixed disk 121E. As shown in FIG. 12A to FIG. 12D, preferably, the edge portion 12102E of the first fluid control surface 1210E are equally divided clockwise into the first portion 1201E, the second portion 1202E, the third portion 1203E, the fourth portion 1204E, the fifth portion 1205E, the sixth portion 1206E, the seventh portion 1207E and the eighth portion 1208E, the edge region 12202 of the second fluid control surface 1220E of the rotatable disk 122E of the plane valve 12E are equally divided clockwise into the first region 2001E, the second region 2002E, the third region 2003E, the fourth region 2004E, the fifth region 2005E, the sixth region 2006E, the seventh region 2007E and the eighth region 2008E. Further, the ninth channel 109E is extended downward from the eighth portion 1208E of the first fluid control surface 1210E of the fixed disk 121E. In other words, the first fluid control surface 1210E of the fixed disk 121E of the plane valve 10E defines eight equal divisions, and the second fluid control surface 1220E of the rotatable disk 122E of the plane valve 10E defines eight equal divisions, wherein when the rotatable disk 122E of the plane valve 10E is rotated until the first equal division (the first region 2001E) of the second fluid control surface 1220E of the rotatable disk 122E directly faces the second equal division (the second portion 1202E) of the first fluid control surface 1210E of the fixed disk 121E, the fourth equal division (the fourth region 2004E) and the fifth equal division (the fifth region 2005E) of the second fluid control surface 1220E of the rotatable disk 122E of the plane valve 10E directly faces the fifth equal division (the fifth portion 1205E) and the sixth equal division (the sixth portion 1206E) of the first fluid control surface 1210E of the fixed disk 121E, the sixth equal division (the sixth region 2006E) of the second fluid control surface 1220E of the rotatable disk 122E directly faces the seventh equal division (the seventh portion 1207E) of the first fluid control surface 1210E of the fixed disk 121E, so that the sixth channel 106E of the plane valve 10E is communicated with the second channel 102E, the seventh channel 107E is communicated with the fourth channel 104E, and the eighth channel 108E is communicated with the first channel 101E and the draining channel 1012E respectively, so as to allow the raw water to flow into the filtering device 20E through the raw water inlet 1106E, the sixth channel 106E, the second channel 102E, the second opening 1102E and the second communicating opening 202E. After the raw water back flushes (referring to the flow direction of the water in the primary filter 22E during the back flushing is opposite to the flow direction of the water in the primary filter 22E during the filtering) the primary filter 22E of the filtering device 20E, it flows out through the first communicating opening 201E of the filtering device 20E, and then flows out through the first opening 1101E, the first channel 101E, the eighth channel 108E, the draining channel 109E and the draining opening 1109E, accordingly, the faucet water purifier is under the back flushing working state at this time. Further, when the rotatable disk 122E of the plane valve 10E is rotated until the first equal division (the first region 2001E of the second fluid control surface 1220E of the rotatable disk 122E directly faces the first equal division (the first portion 1201E) of the first fluid control surface 1210E of the fixed disk 121E, the fourth equal division (the fourth region 2004E and the fifth equal division (the fifth region 2005E) of the second fluid control surface 1220E of the rotatable disk 122E of the plane valve 10E directly faces the fourth equal division (the fourth portion 1204E) and the fifth equal division (the fifth portion 1205E) of the first fluid control surface 1210E of the fixed disk 121E, the sixth equal division (the sixth region 2006E) of the second fluid control surface 1220E of the rotatable disk 122E directly faces the sixth equal division (the sixth portion 1206E) of the first fluid control surface 1210E of the fixed disk 121E, so that the sixth channel 106E of the plane valve 10E is communicated with the first channel 101E, the seventh channel 107E is communicated with the fourth channel 104E and the fifth channel 105E respectively, and the eighth channel 108E is communicated with the draining channel 1012E, so as to allow the raw water to flow into the filtering device 20E through the raw water inlet 1106E, the sixth channel 106E, the first channel 101E, the first opening 1101E and the first communicating opening 201E. After the raw water is filtered by the primary filter 22E of the filtering device 20E, the generated purified water flows into the purified water channel 2201E, and the purified water generated by the primary filter 22E is further filtered by the secondary filter 23E to prepare the secondary purified water and the secondary purified water flows out of the third communicating opening 203E through the purified water outlet 2301E, and then it flows out through the fourth opening 1104E, the fourth channel 104E, the seventh channel 107E, the fifth channel 105E and the fifth opening 1105E and is supplied, accordingly, the faucet water purifier is under the first purifying working state at this time. Further, when the rotatable disk 122E of the plane valve 10E is rotated until the first equal division (the first region 2001E) of the second fluid control surface 1220E of the rotatable disk 122E directly faces the eighth equal division (the eighth portion 1208E) of the first fluid control surface 1210E of the fixed disk 121E, the fourth equal division (the fourth region 2004E) and the fifth equal division (the fifth region 2005E) of the second fluid control surface 1220E of the rotatable disk 122E of the plane valve 10E directly faces the third equal division (the third portion 1203E) and the fourth equal division (the fourth portion 1204E) of the first fluid control surface 1210E of the fixed disk 121E, the sixth equal division (the sixth region 2006E) of the second fluid control surface 1220E of the rotatable disk 122E directly faces the fifth equal division (the fifth portion 1205E) of the first fluid control surface 1210E of the fixed disk 121E, so that the sixth channel 106E of the plane valve 10E is communicated with the ninth channel 109E, the seventh channel 107E is communicated with the third channel 103E and the fifth channel 105E, and the eighth channel 108E is communicated with the fourth channel 104E and the draining channel 1012E respectively, so as to allow the raw water to flow into the filtering device 20E through the raw water inlet 1106E, the sixth channel 106E, the ninth channel 109E, and then flow out through the raw water opening 1109E and be supplied, accordingly, the faucet water purifier is under the raw water supplying working state at this time. Further, when the rotatable disk 122E of the plane valve 10E is rotated until the first equal division (the first region 2001E) of the second fluid control surface 1220E of the rotatable disk 122E directly faces the seventh equal division (the seventh portion 1207E) of the first fluid control surface 1210E of the fixed disk 121E, the fourth equal division (the fourth region 2004E) and the fifth equal division (the fifth region 2005E) of the second fluid control surface 1220E of the rotatable disk 122E of the plane valve 10E directly faces the second equal division (the second portion 1202E) and the third equal division (the third portion 1203E) of the first fluid control surface 1210E of the fixed disk 121E, the sixth equal division (the sixth region 2006E) of the second fluid control surface 1220E of the rotatable disk 122E directly faces the fourth equal division (the fourth portion 1204E) of the first fluid control surface 1210E of the fixed disk 121E, so that the sixth channel 106E of the plane valve 10E is communicated with the first channel 101E, the seventh channel 107E is communicated with the second channel 102E and the third channel 103E, and the eighth channel 108E is communicated with the fifth channel 105E and the draining channel 1012E respectively, so as to allow the raw water to flow into the filtering device 20E through the raw water inlet 1106E, the sixth channel 106E, the first channel 101E, the first opening 1101E and the first communicating opening 201E. After the raw water is filtered by the primary filter 22E of the filtering device 20E, it flows out through the first communicating opening 1102E of the filtering device 20E, and then it flows out through the second opening 1102E, the second channel 102E, the seventh channel 107E, the third channel 103E and the third opening 1103E and is supplied, accordingly, the faucet water purifier is under the second purifying working state at this time.

It is worth mentioning that when the users need to switch the faucet water purifier according to the first embodiment of the present invention from the back flushing working state to the first purifying working state, only need to anticlockwise rotate the rotatable disk 122E of the plane valve 10E for one equal division angle, so that the first region 2001E of the second fluid control surface 1220E of the rotatable disk 122E directly faces the first portion 1201E of the first fluid control surface 1210E of the fixed disk 121E; when the users need to switch the faucet water purifier according to the first embodiment of the present invention from the first purifying working state to the raw water supplying working state, only need to anticlockwise rotate the rotatable disk 122E of the plane valve 10E for one equal division angle again, so that the first region 2001E of the second fluid control surface 1220E of the rotatable disk 122E directly faces the eighth portion 1208E of the first fluid control surface 1210E of the fixed disk 121E; when the users need to switch the faucet water purifier according to the first embodiment of the present invention from the raw water supplying working state to the second purifying working state, only need to anticlockwise rotate the rotatable disk 122E of the plane valve 10E for one equal division angle again, so that the first region 2001E of the second fluid control surface 1220E of the rotatable disk 122E directly faces the seventh portion 1207E of the first fluid control surface 1210E of the fixed disk 121E, as shown in FIG. 11A to FIG. 13D. In other words, the structure of the plane valve 10E of the faucet water purifier of the present invention enables the four working states of the second purifying working state, the raw water supplying working state, the first purifying working state and the back flushing working state to be continuously distributed, so that the complete switching between two adjacent working states of the second purifying working state, the raw water supplying working state, the first purifying working state and the back flushing working state of the faucet water purifier of the present invention can be realized only by rotating the rotatable disk 122E of the plane valve 10E for one equal division angle. The switching mode between the four working states of the faucet water purifier determined by the structure of the plane valve 10E of the faucet water purifier of the present invention will make the switching between the four working states of the faucet water purifier of the present invention more in line with the usage habits of the users and not easily cause an error in working state switching due to the different rotation angles when the users switch the working states. It is appreciated that since the edge portion 12102E of the first fluid control surface 1210E of the plane valve 10E of the faucet water purifier according to the first embodiment of the present invention is divided into eight equal divisions, and the edge region 12202E of the second fluid control surface 1220E of the rotatable disk 122E of the plane valve 10E is divided into eight equal divisions, accordingly, each time the faucet water purifier of the present invention realizes one working state switching, the rotatable disk 122E of the plane valve 10E rotates 45 degrees. in other words, one equal division angle of the rotatable disk 122E and the fixed disk 121E of the plane valve 10E is 45 degrees. Alternatively, the edge portion 12102E of the first fluid control surface 1210E is equally divided anticlockwise into the first portion 1201E, the second portion 1202E, the third portion 1203E, the fourth portion 1204E, the fifth portion 1205E, the sixth portion 1206E, the seventh portion 1207E and the eighth portion 1208E, the edge region 12202 of the second fluid control surface 1220E of the rotatable disk 122E of the plane valve 12E is equally divided anticlockwise into the first region 2001E, the second region 2002E, the third region 2003E, the fourth region 2004E, the fifth region 2005E, the sixth region 2006E, the seventh region 2007E and the eighth region 2008E. At this time, the structure of the plane valve

10E of the faucet water purifier of the present invention enables the four working states of the back flushing working state, the first purifying working state, the raw water supplying working state and the second purifying working state to be continuously distributed, so that the complete switching between two adjacent working states of the back flushing working state, the first purifying working state, the raw water supplying working state and the second purifying working state of the faucet water purifier of the present invention can be realized only by rotating the rotatable disk 122E of the plane valve 10E for one equal division angle.

As shown in FIG. 2, the plane valve 10E of the faucet water purifier according to the first embodiment of the present invention further includes a stopper 14E, wherein the stopper 14E is provided to prevent the invalid rotating of the rotatable disk 122E of the plane valve 10E relative to the fixed disk 121E. In other words, when the rotatable disk 122E of the plane valve 10E is rotated until the first region 2001E of the second fluid control surface 1220E of the rotatable disk 122E directly faces the second portion 1202E of the first fluid control surface 1210E of the fixed disk 121E, the faucet water purifier of the present invention is switched to the back flushing working state, rotate clockwise the rotatable disk 122E of the plane valve 10E by an equal angle, communicate the sixth channel 106E of the plane valve 10E with the third channel 103E, so as to make the raw water flow from the sixth channel 106E to the third channel 103E and further flow out from the third opening 1103E; and when the rotatable disk 122E of the plane valve 10E is rotated until the first region 2001E of the second fluid control surface 1220E of the rotatable disk 122E directly faces the seventh portion 1207E of the first fluid control surface 1210E of the fixed disk 121E, the faucet water purifier of the present invention is switched to the second purifying working state, rotate anticlockwise the rotatable disk 122E of the plane valve 10E by an equal angle, make the sixth channel 106E of the plane valve 10E be blocked by the first fluid control surface 1210E of the fixed disk 121E. The above two rotation modes of the rotatable disk 122E of the plane valve 10E relative to the disk 121E cannot make the faucet water purifier of the present invention realize practical functions, which are invalid rotations.

As shown in FIG. 2, the stopper 14E of the faucet water purifier according to the first embodiment of the present invention comprises a first stopping member 141E and a second stopping member 142E, wherein the first stopping member 141E and the second stopping member 142E are respectively provided on the valve body 11E, the first stopping member 141E is arranged to prevent the knob 80 from further clockwise rotation when the rotatable disk 122E of the plane valve 10E is rotated so that the first region 2001E of the second fluid control surface 1220E of the rotatable disk 122E directly faces the second portion 1202E of the first fluid control surface 1210E of the fixed disk 121E; the second stopping member 142E is provided to prevent the knob 80 from further anticlockwise rotation when the rotatable disk 122E of the plane valve 10E is rotated so that the rotatable disk 122E of the plane valve 10E is rotated until the first region 2001E of the second fluid control surface 1220E of the rotatable disk 122E directly faces the seventh portion 1207E of the first fluid control surface 1210E of the fixed disk 121E, so as to prevent the rotatable disk 122E of the plane valve 10E from rotating meaninglessly relative to the fixed disk 121E. The stopper 14E of the faucet water purifier according to the first embodiment of the present invention further comprises a blocker 143E, wherein the blocker 143E is provided at the knob 80 and protruded outward from the knob 80, so as to enable the blocker 143E to be blocked by the first stopping member 141E when the first region 2001E of the second fluid control surface 1220E of the rotatable disk 122E directly faces the second portion 1202E of the first fluid control surface 1210E of the fixed disk 121E, and be blocked by the second stopping member 142E when the rotatable disk 122E of the plane valve 10E is rotated so that the rotatable disk 122E of the plane valve 10E is rotated until the first region 2001E of the second fluid control surface 1220E of the rotatable disk 122E directly faces the seventh portion 1207E of the first fluid control surface 1210E of the fixed disk 121E.

As shown in FIG. 2, the plane valve 10E of the faucet water purifier according to the first embodiment of the present invention further comprises a reminding mechanism 15E, wherein the reminding mechanism 15E is provided to give a block to the knob 80 when the user switches the faucet water purifier of the present invention to the back flushing working state, so that the user has to significantly increase the rotating force of rotating the knob 80, the knob 80 can be rotated to continue to rotate and switch the faucet water purifier of the present invention to the back flushing working state. In this way, the user can be reminded that the faucet water purifier of the present invention is switched to the back flushing working state.

As shown in FIG. 2, the reminding mechanism 15E of the plane valve 10E of the faucet water purifier according to the first embodiment of the present invention comprises a driven member 151E and an elastic element 152E, wherein the driven member 151E comprises a driven end 1511E and a fixed end 1512E extended from the driven end 1511E, wherein the elastic element 152E is provided at the fixed end 1512E, the driven end 1511E is provided to face the knob 80, wherein when the user rotates the rotatable disk 122E of the plane valve 10E to make the first region 2001E of the second fluid control surface 1220E of the rotatable disk 122E directly face the second portion 1202E of the first fluid control surface 1210E of the fixed disk 121E, the driven end 1511E of the driven member 151E of the reminding mechanism 15E will block the blocker 143E, when the user increases the force to rotate the knob 80, the blocker 143E drives the driven end 1511E of the driven member 151E, so as to deform the elastic element 152E and continue to rotate the knob 80, and make the rotatable disk 122E to continue rotate and the first region 2001E of the second fluid control surface 1220E of the rotatable disk 122E directly face the second portion 1202E of the first fluid control surface 1210E of the fixed disk 121E. Preferably, the elastic element 152E is a spring.

As shown in FIG. 2, the valve body 11E further comprises a valve main body 111E and a valve housing 112E, wherein the valve housing 112E is provided on the outer surface of the valve main body 111E. It is appreciated that the first stopping member 141E, the second stopping member 142E and the reminding mechanism 15E are respectively provided on the valve housing 112E of the valve body 11E. Further, the valve housing 112E of the valve body 11E includes an upper housing 1121E and a lower housing 1122E, wherein the upper housing 1121E and the lower housing 1122E of the valve housing 112E form a valve body cavity 1120E therebetween, wherein the valve body cavity 1120E is provided to receive the valve main body 111E of the valve body 11E.

As shown in FIG. 10A to FIG. 10F and FIG. 12A to FIG. 13D, according to the first embodiment of the present invention, the present invention further provides a valve disk assembly for a plane valve of a faucet water purifier, which comprises a fixed disk 121E and a rotatable disk 122E, wherein the fixed disk 121E has a first fluid control surface 1210E, the rotatable disk 122E has a second fluid control surface 1220E, wherein the rotatable disk 122E and the fixed disk 121E are both disposed inside the valve cavity 110E, wherein the second fluid control surface 1220E of the rotatable disk 122E is provided at the first fluid control surface 1210E of the fixed disk 121E, and the rotatable disk 122E is provided to be capable of rotating relative to the fixed disk 121E, wherein the plane valve 10E has a first channel 101E, a second channel 102E, a third channel 103E, a fourth channel 104E, a fifth channel 105E, a sixth channel 106E, a seventh channel 107E and an eighth channel 108E, wherein the first channel 101E, the second channel 102E, the third channel 103E, the fourth channel 104E and the fifth channel 105E are provided at the fixed disk 121E respectively and extended from the first fluid control surface 1210E of the fixed disk 121E respectively; the sixth channel 106E, the seventh channel 107E and the eighth channel 108E are provided at the rotatable disk 122E respectively and extended from the second fluid control surface 1220E of the rotatable disk 122E respectively, wherein the first channel 101E is communicated with the first opening 1101E, the second channel 102E is communicated with the second opening 1102E, the third channel 103E is communicated with the third opening 1103E, the fourth channel 104E is communicated with the fourth opening 1104E, the fifth channel 105E is communicated with the fifth opening 1105E, the sixth channel 106E is communicated with the raw water inlet 1106E, the eighth channel 108E is communicated with the draining opening 1108E. Preferably, the raw water inlet 1106E and the sixth channel 106E are communicated with the valve cavity 110E respectively, so that the sixth channel 106E is communicated with the raw water inlet 1106E. More preferably, the seventh channel 107E and the eighth channel 108E of the rotatable disk 122E are communicating blind holes. The plane valve 10E further has a ninth channel 109E, wherein the ninth channel 109E is provided at the fixed disk 121E and extended from the first fluid control surface 1210E of the fixed disk 121E, wherein the ninth channel 109E is communicated with the raw water opening 1109E. The faucet water purifier according to the first embodiment of the present invention further has a draining channel 1012E, wherein the draining channel 1012E is provided at the fixed disk 121E and extended from the first fluid control surface 1210E of the fixed disk 121E, wherein the eighth channel 108E of the plane valve 10E is communicated with the draining channel 1012E, the draining channel 1012E is communicated with the draining opening 1108E.

FIG. 14A to FIG. 15E illustrate an alternative embodiment of the filtering device 20E of the faucet water purifier according to the first embodiment of the present invention, wherein the filtering device 20F comprises an outer casing 21E, a primary filter 22E and a secondary filter 23F, wherein the outer casing 21E defines a first accommodation cavity 210E, the primary filter 22E defines a second accommodation cavity 220E, wherein the primary filter 22E is disposed inside the first accommodation cavity 210E of the outer casing 21E, the secondary filter 23F is disposed inside the second accommodation cavity 220E of the primary filter 22E, and the outer casing 21E and the primary filter 22E define a raw water channel 2101E therebetween, the primary filter 22E and the secondary filter 23F define a purified water channel 2201F (the purified water channel 2201F can be regard as a part of the second accommodation cavity 220E) therebetween, the secondary filter 23F has a purified water outlet 2301F. Accordingly, since the secondary filter 23F is disposed inside the second accommodation cavity 220E of the primary filter 22E, after the raw water flows into the raw water channel 2101E under the action of water pressure and is treated by the primary filter 22E, the purified water generated by the primary filter 22E can flow to the secondary filter 23F under the action of water pressure and be treated by the secondary filter 23F, and the cleaner secondary purified water is obtained, wherein the secondary purified water flows out through the purified water outlet 2301F under the action of water pressure and is provided.

As shown in FIG. 14A to FIG. 15E, the secondary filter 23F of the filtering device 20F of the faucet water purifier according to the first embodiment of the present invention comprises a plurality of ultrafiltration membrane filaments 231F and a flow collecting tube 233F, wherein the ultrafiltration membrane filaments 231F and the flow collecting tube 233F are all disposed inside the second accommodation cavity 220E of the primary filter 22E, and the ultrafiltration membrane filaments 231F are provided to surround the flow collecting tube 233F, wherein the flow collecting tube 233F has at least one water collecting hole 2330F and a flow collecting channel 2331F, wherein the flow collecting channel 2331F is provided to communicate with the water collecting hole 2330F and the second communicating opening 202E of the filtering device 20F respectively, so that the purified water generated by the primary filter 22E can flow to the ultrafiltration membrane filaments 231F through the purified water channel 2201F under the action of water pressure, and flows to the flow collecting tube 233F through the gap between the ultrafiltration membrane filaments 231F, and is collected by the water collecting hole 2330F of the flow collecting tube 233F and flows to the second communicating opening 202E of the filtering device 20F through the flow collecting channel 2331F. It is appreciated that when the purified water generated by the primary filter 22E flows to the flow collecting tube 233F through the purified water channel 2201F and the gap between the ultrafiltration membrane filaments 231F, the purified water generated by the primary filter 22E has a flushing action for the ultrafiltration membrane filaments 231F of the secondary filter 23F, so that the ultrafiltration membrane filaments 231F of the secondary filter 23F has a better filtering effect and the service life of the secondary filter 23F is prolonged. Further, when back flushing the primary filter 22E of the filtering device 20F, the raw water flows from the second communicating opening 202E into the purified water channel 2201F through the flow collecting channel 2331F of the flow collecting tube 233F and the water collecting hole 2330F of the flow collecting tube 233F, and back flushes the primary filter 22E, the generated waste water flows to the first communicating opening 201E through the raw water channel 2101E. Further, each of the ultrafiltration membrane filaments 231F of the secondary filter 23F defines a membrane filament channel 2310F, wherein the membrane filament channels 2310F of the ultrafiltration membrane filaments 231F of the secondary filter 23F are all communicated with the purified water outlet 2301F of the secondary filter 23F.

As shown in FIG. 14A to FIG. 15E, the filtering device 20F of the faucet water purifier according to the first embodiment of the present invention further comprises a base 24F, wherein the secondary filter 23F is provided at the base 24F, and the base 24F defines a first water cavity 2401F and a second water cavity 2402F, wherein the first water cavity 2401F of the base 24F is communicated with the purified water outlet 2301F of the secondary filter 23F and the third communicating opening 203E of the filtering device 20F respectively, the second water cavity 2402F is communicated with the flow collecting channel 2331F of the flow collecting tube 233F of the secondary filter 23F and the second communicating opening 202E of the filtering device 20F respectively. In other words, the membrane filament channel 2310F of the ultrafiltration membrane filament 231F of the secondary filter 23F is communicated with the third communicating opening 203E of the filtering device 20F through the purified water outlet 2301F of the secondary filter 23F and the first water cavity 2401F of the base 24F, so that the secondary purified water generated by the secondary filter 23F can flow out through the third communicating opening 203E; the flow collecting channel 2331F of the flow collecting tube 233F of the secondary filter 23F is communicated with the second communicating opening 202E of the filtering device 20F through the second water cavity 2402F of the base 24F, so that the purified water generated by the primary filter 22E can flow out through the second communicating opening 202E. It is appreciated that when back flushing the primary filter 22E of the filtering device 20F, the raw water flows into the filtering device 20F through the second communicating opening 202E of the filtering device 20F, and flows into the purified water channel 2201F of the filtering device 20F through the second water cavity 2402F of the base 24F, and the flow collecting channel 2331F and the water collecting hole 2330F of the flow collecting tube 233F. Accordingly, the secondary filter 23F of the filtering device 20F is an external pressure type ultrafiltration filter. Preferably, the second communicating opening 202E and the third communicating opening 203E are both provided at the base 24F. More preferably, the flow collecting tube 233F and the secondary filter 23F are water-sealedly provided at the base 24F respectively, and the first water cavity 2401F is defined between the secondary filter 23F and the base 24F, the second water cavity 2402F is defined between the flow collecting tube 233F and the base 24F. Alternatively, the primary filter 22E is water-sealedly provided at the outer casing 21E, the secondary filter 23F is water-sealedly provided at the base 24F.

As shown in FIG. 14A to FIG. 15E, the base 24F of the filtering device 20F of the faucet water purifier according to the first embodiment of the present invention comprises a base bottom 241E, a first spacing portion 242F and a second spacing portion 243F, wherein the first spacing portion 242F and the second spacing portion 243F are both provided at the base bottom 241E and extended from the base bottom 241E, wherein the first water cavity 2401F is provided between the first spacing portion 242F and the second spacing portion 243F, the second water cavity 2402F is defined and embraced by the second spacing portion 243F. More preferably, the first spacing portion 242F and the second spacing portion 243F are both ring-shaped, and the first spacing portion 242F is provided at the outer side of the second spacing portion 243F. Accordingly, the second spacing portion 243F is provided between the first water cavity 2401F and the second water cavity 2402F, so as to separate the first water cavity 2401F and the second water cavity 2402F with each other.

As shown in FIG. 14A to FIG. 15E, the purified water channel 2201F, the water collecting hole 2330F, the flow collecting channel 2331F of the filtering device 20F of the faucet water purifier according to the first embodiment of the present invention, the second water cavity 2402F of the base 24F and the second communicating opening 202E of the filtering device 20F define a primary purified water route, the membrane filament channels 2310F of the ultrafiltration membrane filaments 231F of the secondary filter 23F, the purified water outlet 2301F of the secondary filter 23F, the first water cavity 2401F of the base 24F and the third communicating opening 203E of the filtering device 20F define a secondary purified water route. It is appreciated that the primary purified water route and the secondary purified water route are spaced from each other, so as to prevent the water inside the primary purified water route and the secondary purified water route from being mixed, in other words, the primary purified water route and the secondary purified water route are spaced from each other, so as to prevent the purified water generated by the primary filter 22E from mixing into the purified water generated by the secondary filter 23F.

As shown in FIG. 14A to FIG. 15E, the secondary filter 23F of the filtering device 20F of the faucet water purifier according to the first embodiment of the present invention further comprises a shell 232F, wherein the ultrafiltration membrane filaments 231F of the secondary filter 23F are disposed inside the shell 232F, and the shell 232F has at least one water inlet 2320F, wherein the inner space and the outer space of the shell 232F are communicated with each other by the water inlet 2320F of the shell 232F, so that when the faucet water purifier of the present invention is under the first purifying working state, the purified water generated by the primary filter 22E flows to the ultrafiltration membrane filaments 231F through the water inlet 2320F of the shell 232F under the action of water pressure. Therefore, the water inlet 2320F of the shell 232F of the secondary filter 23F can be regard as a part of the purified water channel 2201F of the filtering device 20F.

Figure 14A:
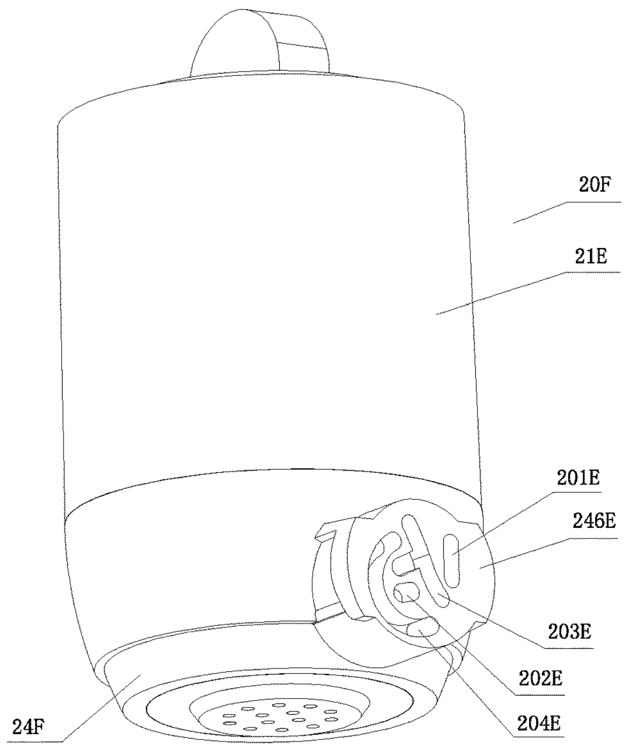
FIG. 14A is a front view of an alternative embodiment of the filtering device of the faucet water purifier according to the above first embodiment of the present invention.
Figure 14B:
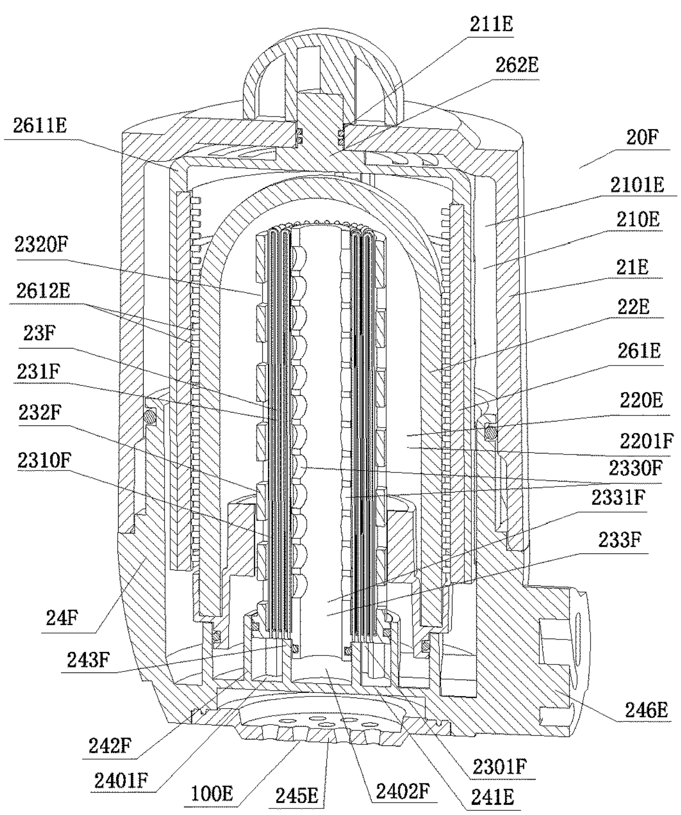
FIG. 14B is a sectional view of the alternative embodiment of the filtering device of the faucet water purifier according to the above first embodiment of the present invention.
Figure 14C:
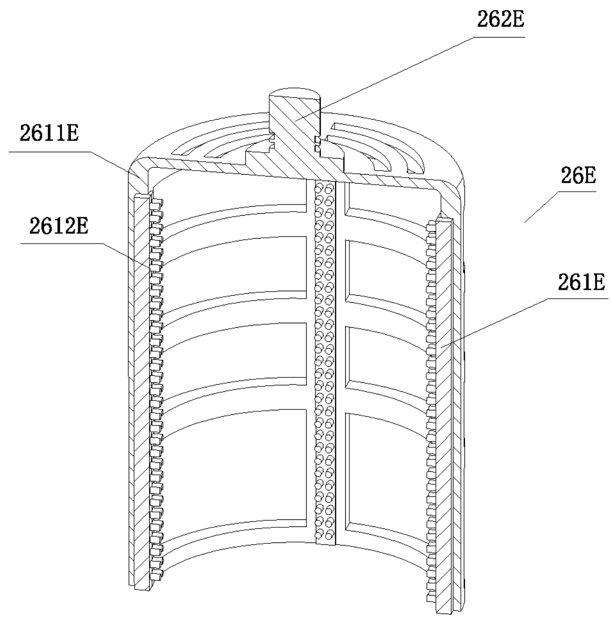
FIG. 14C is another sectional view of the alternative embodiment of the filtering device of the faucet water purifier according to the above first embodiment of the present invention, which shows a brush of the filtering device.
Figure 14D:
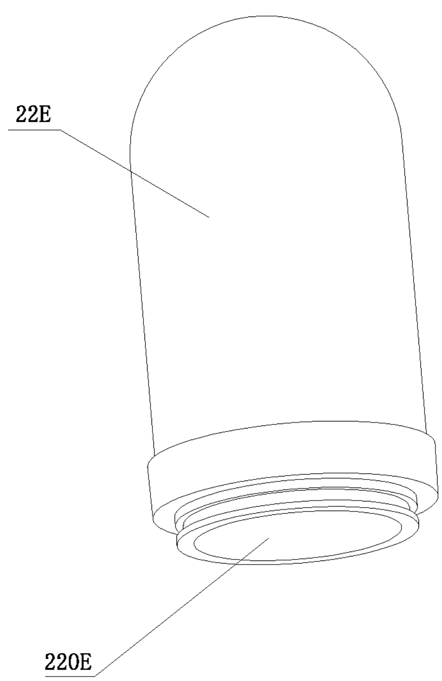
FIG. 14D is a perspective view of a primary filter of the alternative embodiment of the filtering device of the faucet water purifier according to the above first embodiment of the present invention.
Figure 14E:
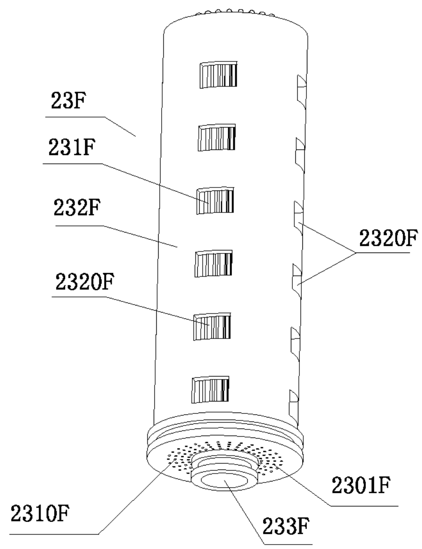
FIG. 14E is a perspective view of a secondary filter of the alternative embodiment of the filtering device of the faucet water purifier according to the above first embodiment of the present invention.
Figure 15A:
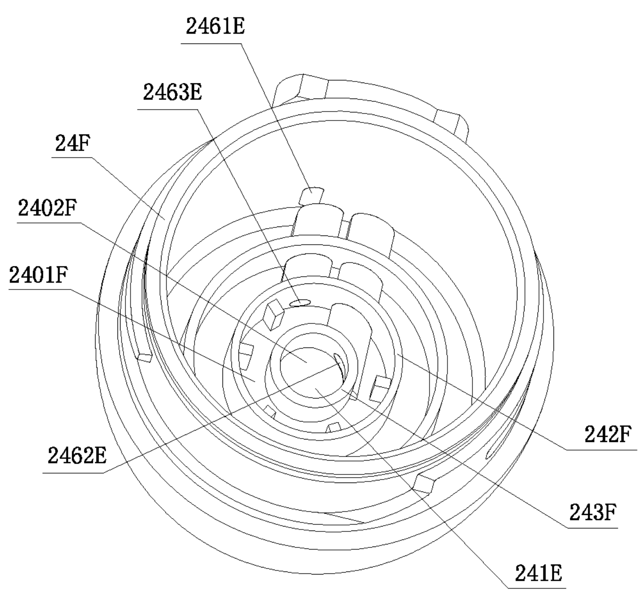
FIG. 15A is a perspective view of a base of the alternative embodiment of the filtering device of the faucet water purifier according to the above first embodiment of the present invention.
Figure 15B:
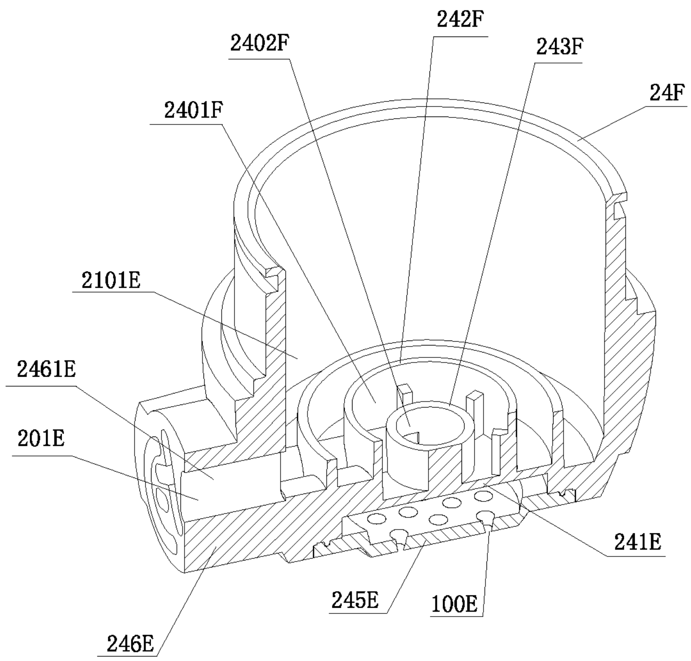
FIG. 15B is a sectional view of the base of the alternative embodiment of the filtering device of the faucet water purifier according to the above first embodiment of the present invention.
Figure 15C:
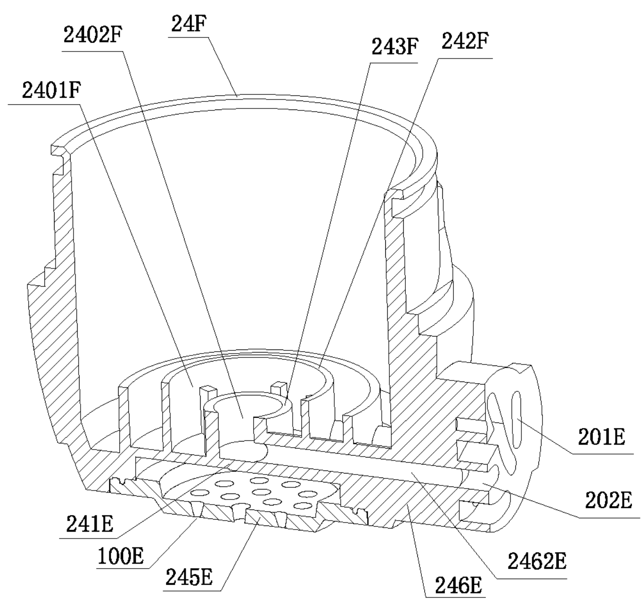
FIG. 15C is another sectional view of the base of the alternative embodiment of the filtering device of the faucet water purifier according to the above first embodiment of the present invention.
Figure 15D:
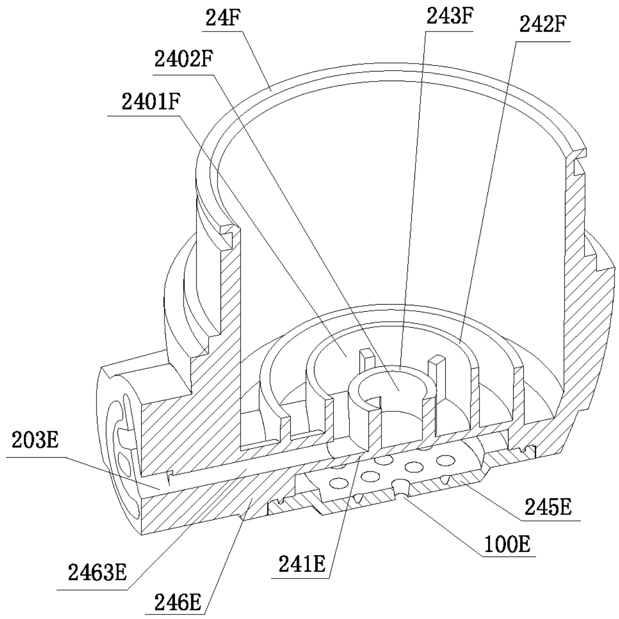
FIG. 15D is another sectional view of the base of the alternative embodiment of the filtering device of the faucet water purifier according to the above first embodiment of the present invention.
Figure 15E:
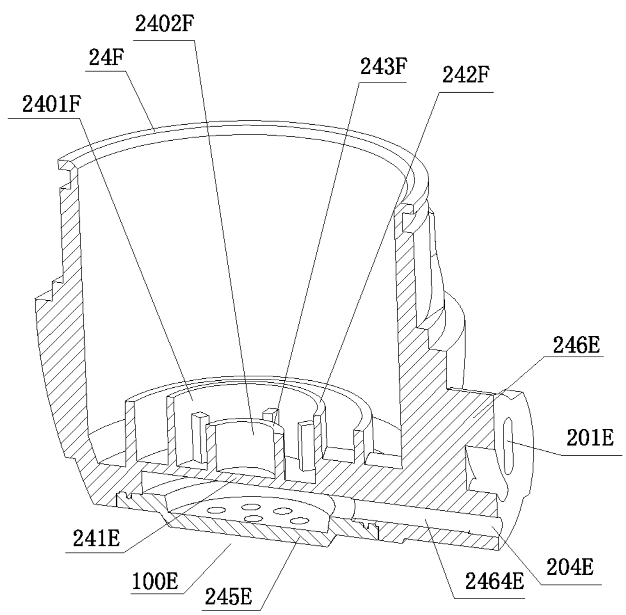
FIG. 15E is another sectional view of the base of the alternative embodiment of the filtering device of the faucet water purifier according to the above first embodiment of the present invention.
Figure 16A:
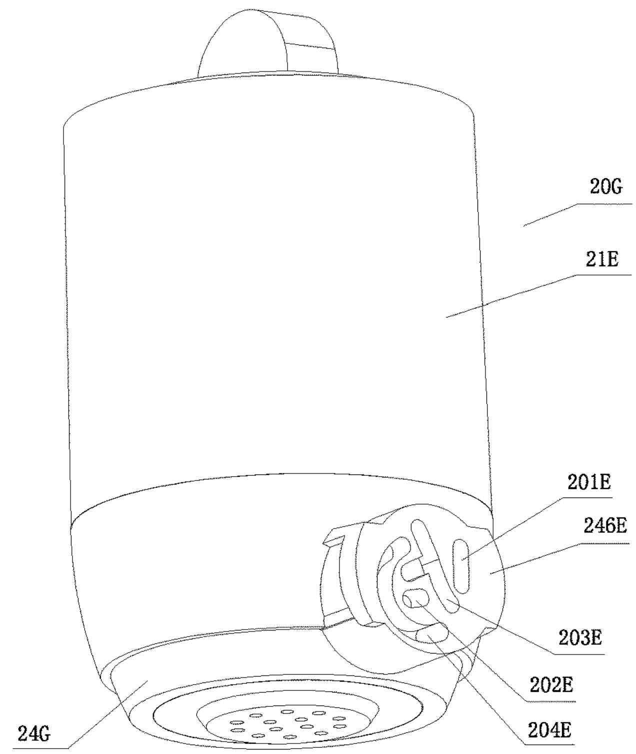
FIG. 16 is an exploded view of an alternative embodiment of the control valve of the faucet water purifier according to the above first embodiment of the present invention.
Figure 16B:
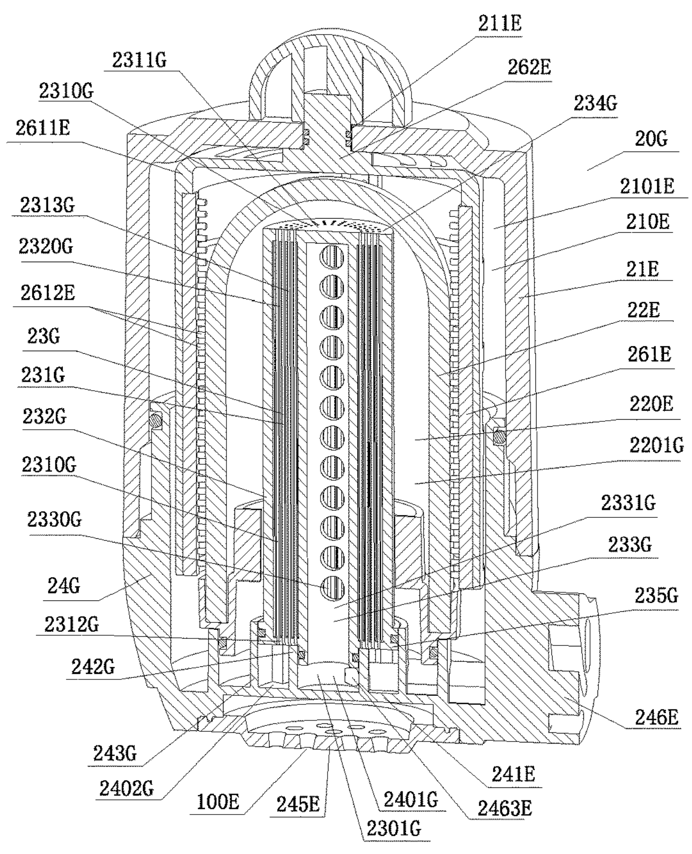
Figure 16C:
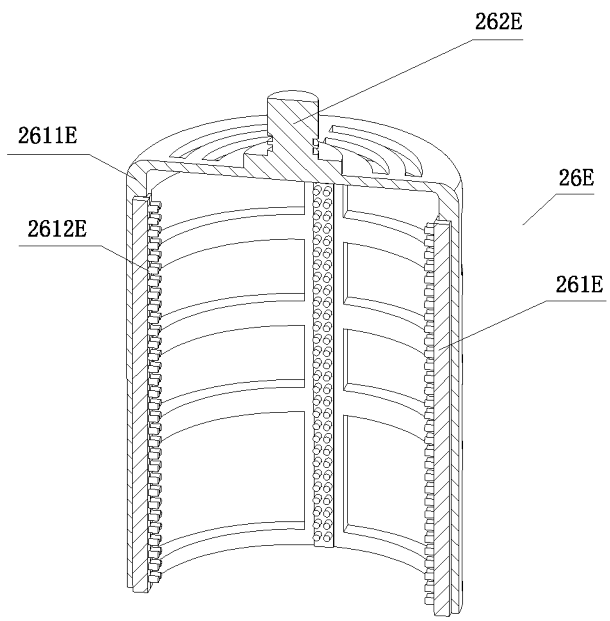
Figure 16D:
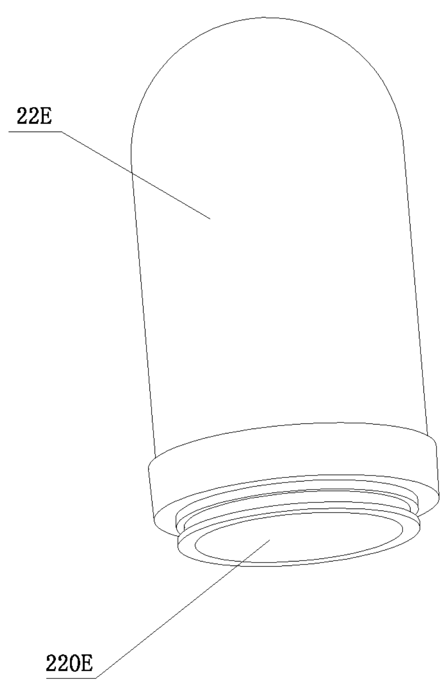
Figure 16E:
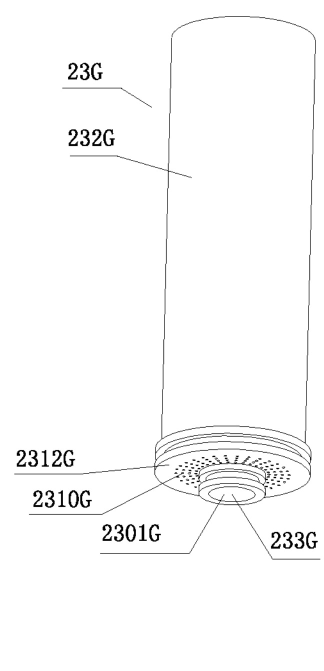
Figure 16F:
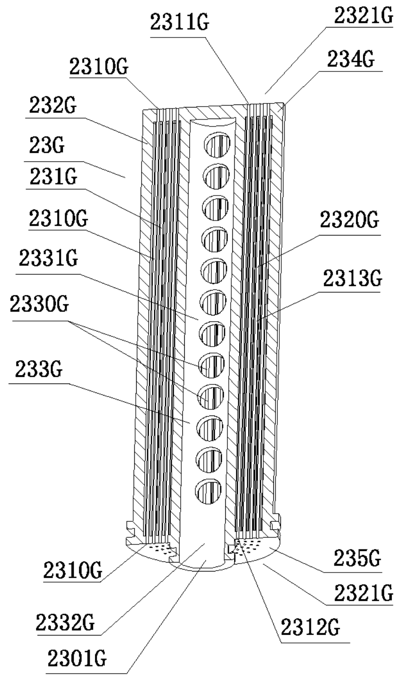
Figure 17A:
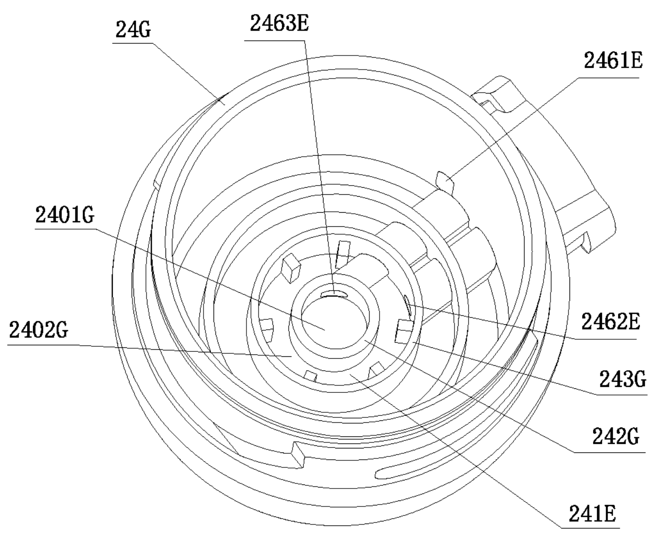
FIG. 17A is a perspective view of the alternative embodiment of the plane valve of the faucet water purifier according to the above first embodiment of the present invention, which shows a first channel, a second channel, a third channel, a fourth channel, a fifth channel, a ninth channel and a raw water inlet channel of the plane valve.
Figure 17B:
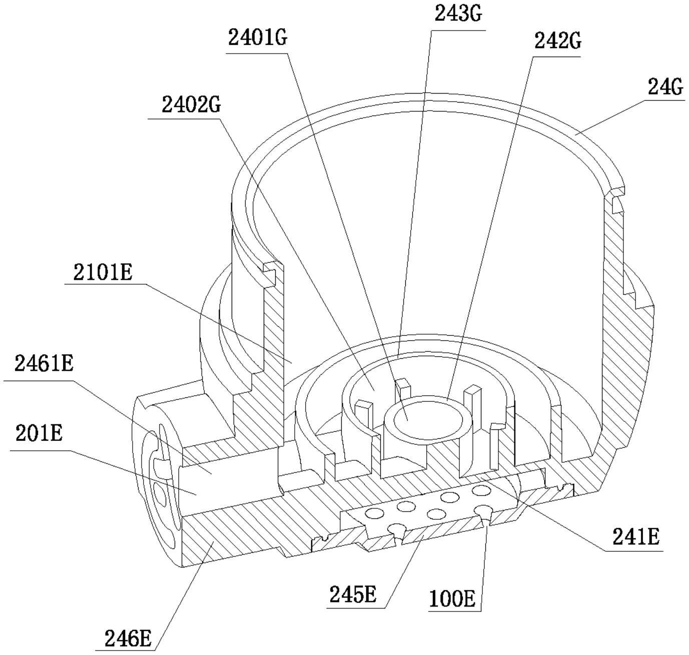
FIG. 17B is another perspective view of the alternative embodiment of the plane valve of the faucet water purifier according to the above first embodiment of the present invention, which shows the first channel, the second channel, the third channel, the fourth channel, the fifth channel, the ninth channel, the raw water inlet channel and a second seal of the plane valve.
Figure 17C:
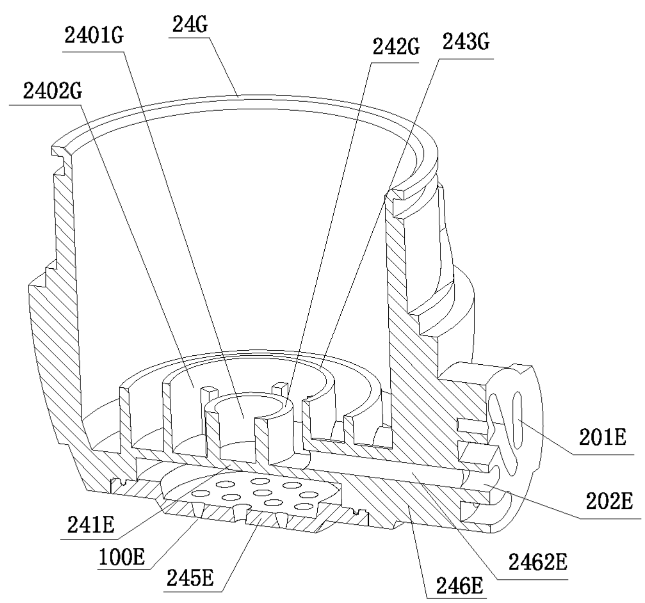
FIG. 17C is another perspective view of the alternative embodiment of the plane valve of the faucet water purifier according to the above first embodiment of the present invention, which shows a first opening, a second opening, a fourth opening and a fifth opening of the valve body.
Figure 17D:
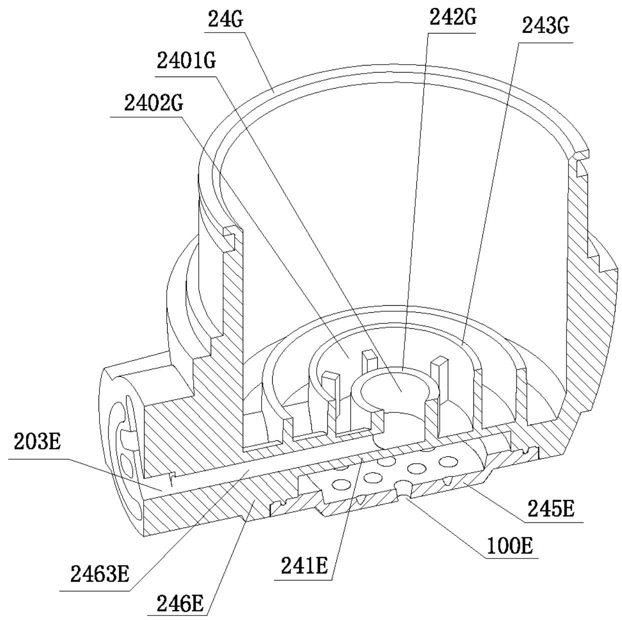
FIG. 17D is another perspective view of the alternative embodiment of the plane valve of the faucet water purifier according to the above first embodiment of the present invention, which shows a raw water inlet of the valve body.
Figure 17E:
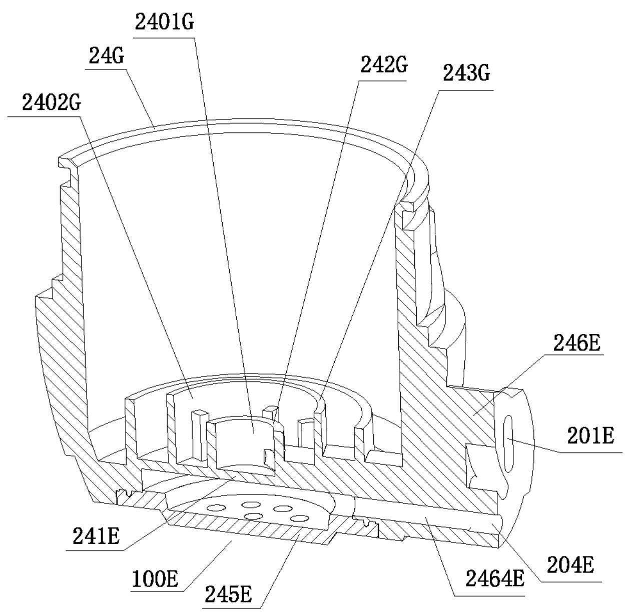
FIG. 17E is another perspective view of the alternative embodiment of the plane valve of the faucet water purifier according to the above first embodiment of the present invention, which shows a third opening, a raw water opening and a draining opening of the valve body.
Figure 18:
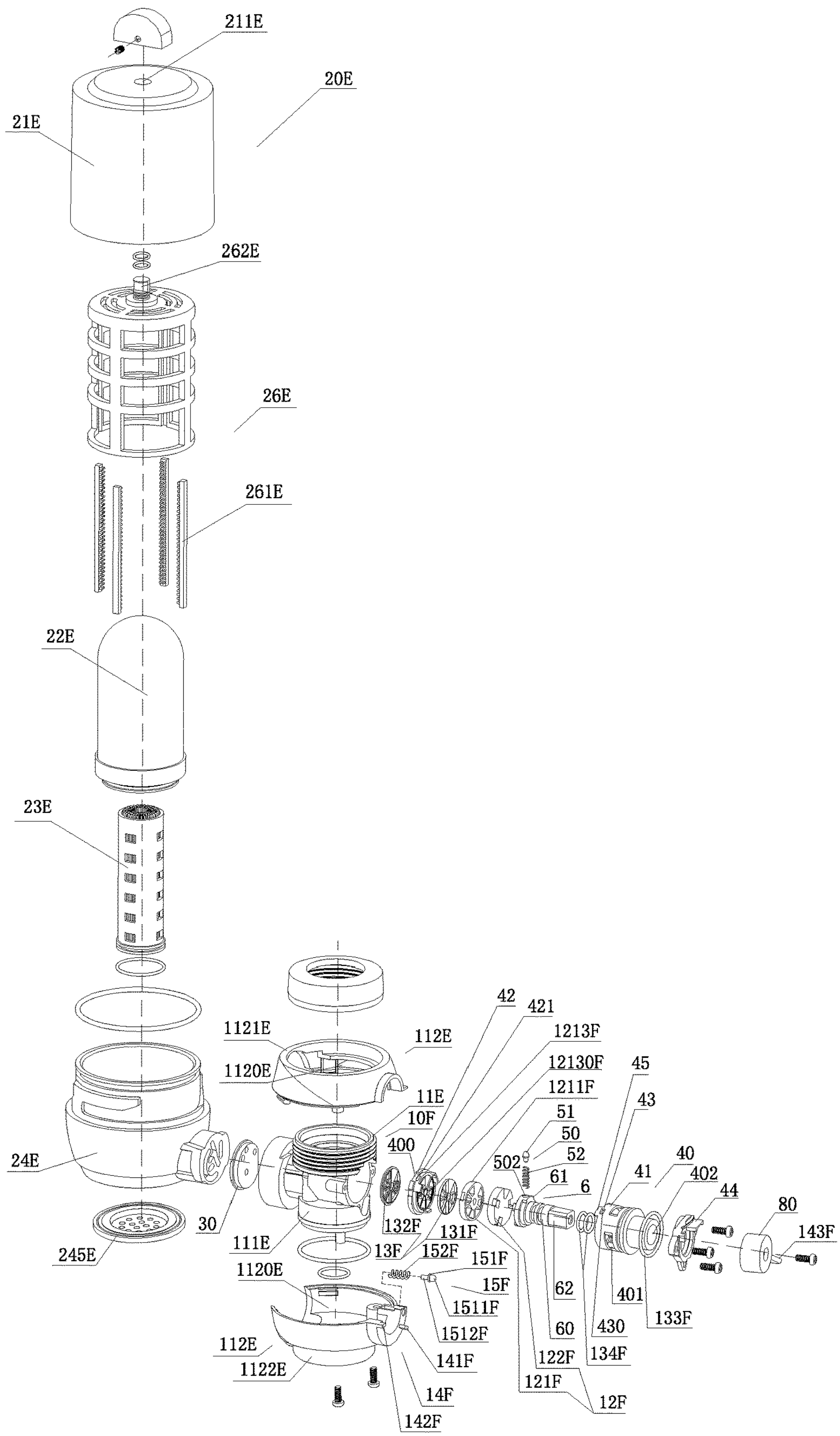
FIG. 18A is a sectional view of the alternative embodiment of the plane valve of the faucet water purifier according to the above first embodiment of the present invention, which shows the first channel and the first opening of the plane valve.
FIG. 18B is another sectional view of the alternative embodiment of the plane valve of the faucet water purifier according to the above first embodiment of the present invention, which shows the second channel, the fourth channel, the second opening and the fourth opening.
FIG. 18C is another sectional view of the alternative embodiment of the plane valve of the faucet water purifier according to the above first embodiment of the present invention, which shows the third channel, the fifth channel, the third opening, the fifth opening and the draining opening of the plane valve, wherein the draining opening is communicated with the valve cavity.
FIG. 18D is another sectional view of the alternative embodiment of the plane valve of the faucet water purifier according to the above first embodiment of the present invention, which shows the ninth channel and the raw water opening of the plane valve.
FIG. 18E is another sectional view of the alternative embodiment of the plane valve of the faucet water purifier according to the above first embodiment of the present invention, which shows the raw water inlet and the raw water inlet channel of the plane valve.
Figure 19A:
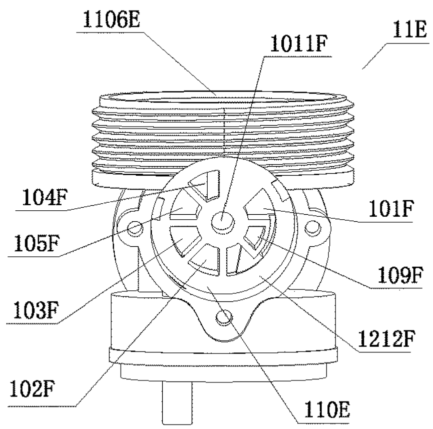
FIG. 19A is another sectional view of the alternative embodiment of the plane valve of the faucet water purifier according to the above first embodiment of the present invention, wherein the fixing device is disposed inside the valve cavity of the plane valve.
Figure 19B:
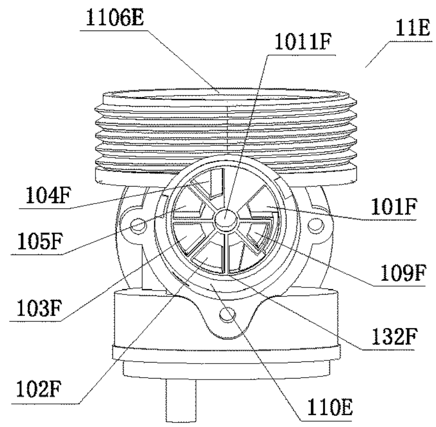
FIG. 19B is a perspective view of the alternative embodiment of the plane valve of the faucet water purifier according to the above first embodiment of the present invention, wherein the guiding plate of the faucet water purifier of the present invention is provided at the valve body of the plane valve.
Figure 19C:
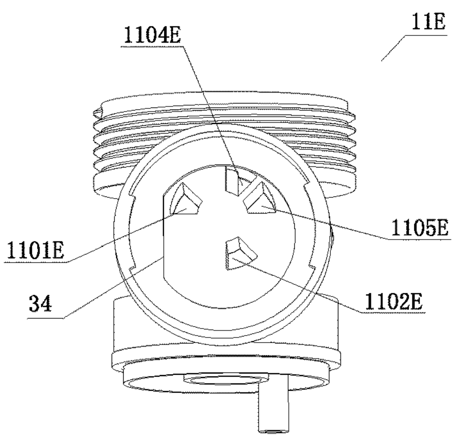
FIG. 19C is a perspective view of the guiding plate of the alternative embodiment of the plane valve of the faucet water purifier according to the above first embodiment of the present invention.
Figure 19D:
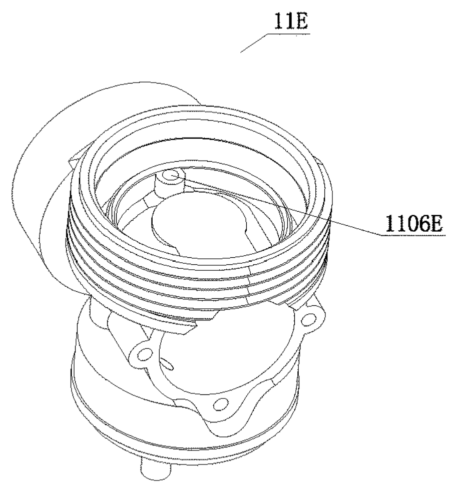
FIG. 19D is another perspective view of the guiding plate of the alternative embodiment of the plane valve of the faucet water purifier according to the above first embodiment of the present invention.
Figure 19E:
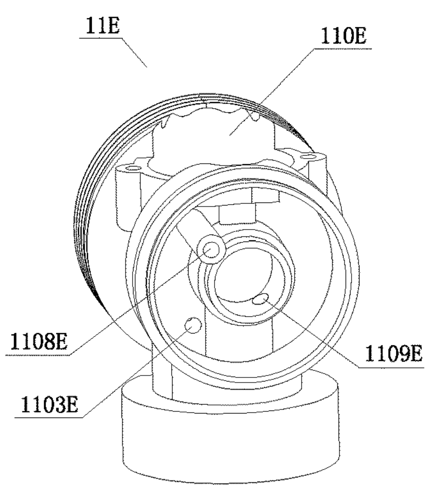
Figure 19F:
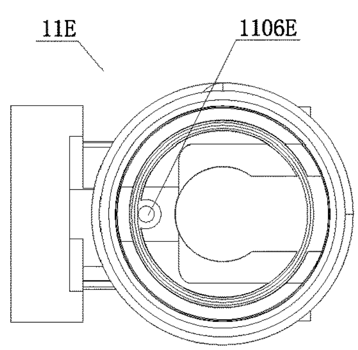
Figure 19G:
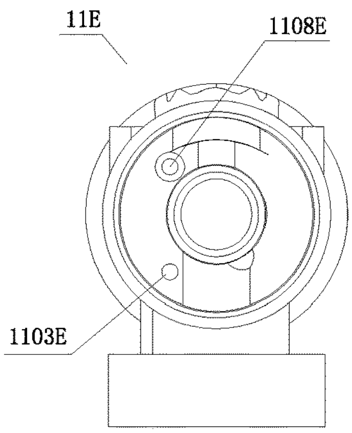
Figure 19H:
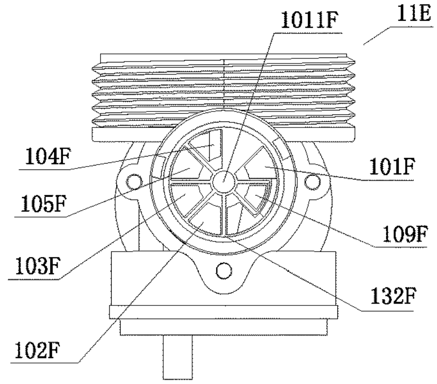
Figure 19I:
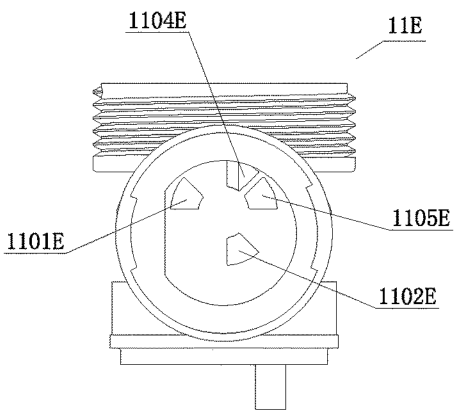
Figure 20A:
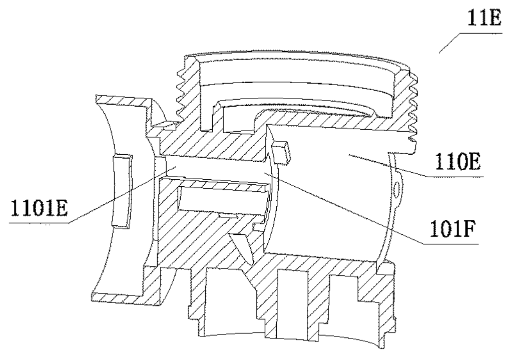
FIG. 20A is a perspective view of the fixing device of the alternative embodiment of the plane valve of the faucet water purifier according to the above first embodiment of the present invention.
Figure 20B:
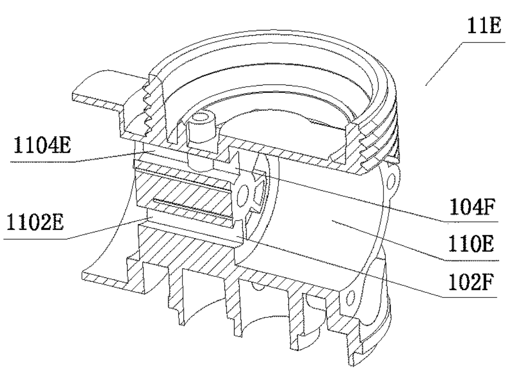
FIG. 20B is a sectional view of the fixing device of the alternative embodiment of the plane valve of the faucet water purifier according to the above first embodiment of the present invention.
Figure 20C:
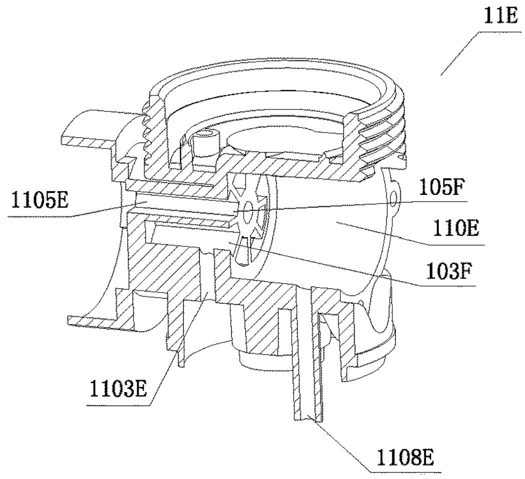
FIG. 20C is a perspective view of the fixing portion of the fixed disk of the alternative embodiment of the plane valve of the faucet water purifier according to the above second embodiment of the present invention, which shows the first sealing grooves of the fixing portion.
Figure 20D:
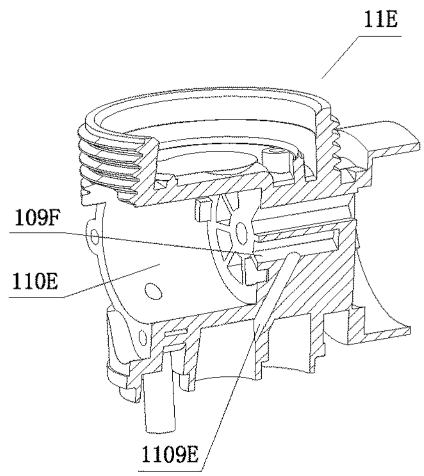
FIG. 20D is another perspective view of the fixing portion of the fixed disk of the alternative embodiment of the plane valve of the faucet water purifier according to the above first embodiment of the present invention, which shows the second sealing grooves of the fixing portion.
Figure 20E:
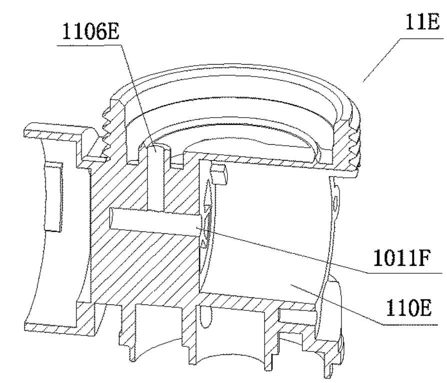
FIG. 20E is a perspective view of the upper end portion of the fixed disk of the alternative embodiment of the plane valve of the faucet water purifier according to the above first embodiment of the present invention, wherein the upper end portion of the fixed disk is provided at the fixing portion of the fixed disk.
Figure 21A:
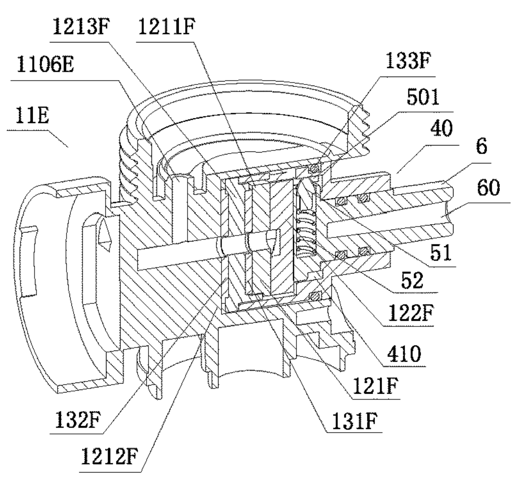
FIG. 21A is a perspective view of the fixed disk of the alternative embodiment of the plane valve of the faucet water purifier according to the above first embodiment of the present invention.
Figure 21B:
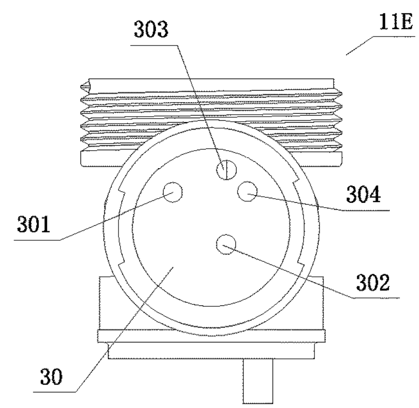
FIG. 21B is a top view of the fixed disk of the alternative embodiment of the plane valve of the faucet water purifier according to the above first embodiment of the present invention.
Figure 21C:
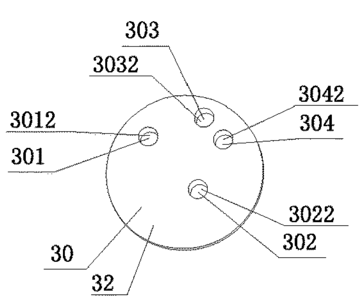
FIG. 21C is a bottom view of the fixed disk of the alternative embodiment of the plane valve of the faucet water purifier according to the above first embodiment of the present invention.
Figure 21D:
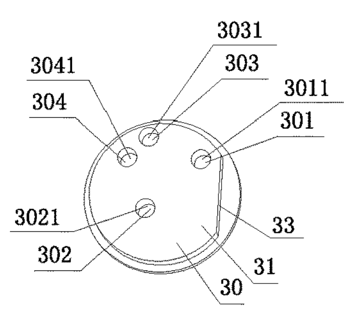
FIG. 21D is a perspective view of the rotatable disk of the alternative embodiment of the plane valve of the faucet water purifier according to the above first embodiment of the present invention.
Figure 22A:
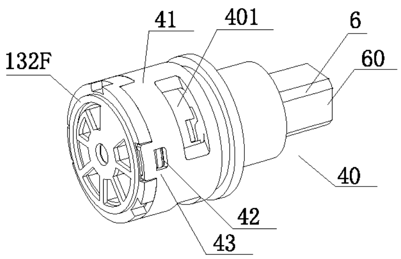
FIG. 22A is a structure diagram of the alternative embodiment of the plane valve of the faucet water purifier according to the above first embodiment of the present invention, wherein the faucet water purifier shown in FIG. 22A is under a first purifying working state, and the arrows shown in FIG. 22A point to the direction of water flow.
Figure 22B:
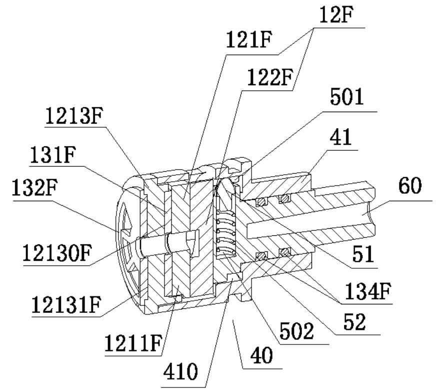
FIG. 22B is a structure diagram of the alternative embodiment of the plane valve of the faucet water purifier according to the above first embodiment of the present invention, wherein the faucet water purifier shown in FIG. 22B is under a back flushing working state, and the arrows shown in FIG. 22B point to the direction of water flow.
Figure 22C:
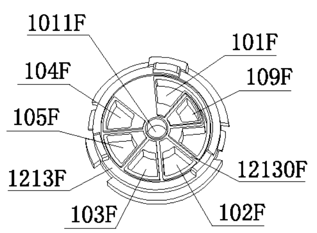
FIG. 22C is a structure diagram of the alternative embodiment of the faucet water purifier according to the above first embodiment of the present invention, wherein the faucet water purifier shown in FIG. 22B is under a raw water supplying working state, and the arrows shown in FIG. 22C point to the direction of water flow.
Figure 22D:
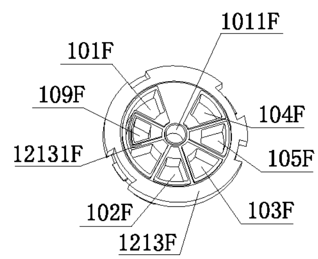
FIG. 22D is a structure diagram of the alternative embodiment of the faucet water purifier according to the above first embodiment of the present invention, wherein the faucet water purifier shown in FIG. 22D is under a second purifying working state, and the arrows shown in FIG. 22D point to the direction of water flow.
Figure 22E:
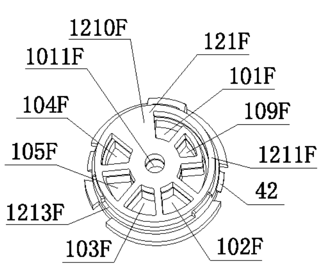
Figure 22F:
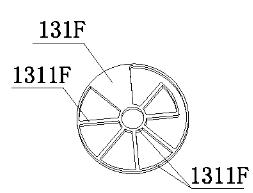
Figure 22G:
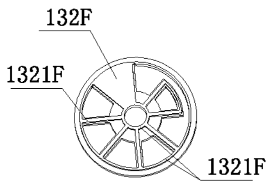
Figure 22H:
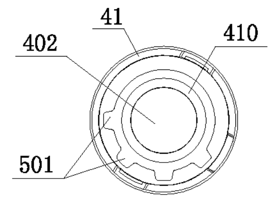
Figure 23A:
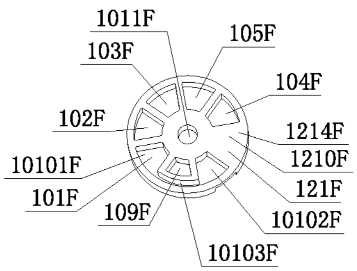
FIG. 23A is a structure diagram of the fixed disk of the alternative embodiment of the plane valve of the faucet water purifier according to the above first embodiment of the present invention.
Figure 23B:
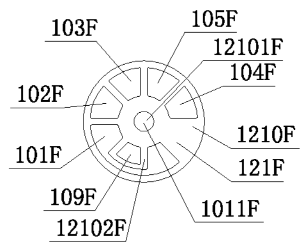
FIG. 23B is a structure diagram of the rotatable disk of the alternative embodiment of the plane valve of the faucet water purifier according to the above first embodiment of the present invention, wherein the dotted line shown in FIG. 23B shows the communicating channels of the rotatable disk.
Figure 23C:
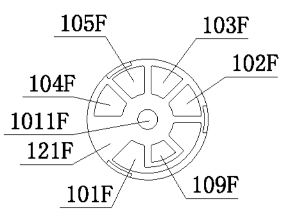
FIG. 23C is a diagram of the equal divisions of the fixed disk of the alternative embodiment of the plane valve of the faucet water purifier according to the above first embodiment of the present invention, which shows that the channels are respectively provided in the specific equal divisions of the fixed disk.
Figure 23D:
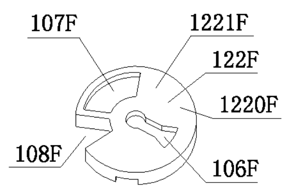
FIG. 23D is a diagram of the equal divisions of the rotatable disk of the alternative embodiment of the plane valve of the faucet water purifier according to the above first embodiment of the present invention, which shows that the channels are respectively provided in the specific equal divisions of the rotatable disk.
Figure 23E:
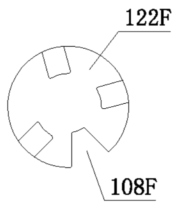
Figure 23F:
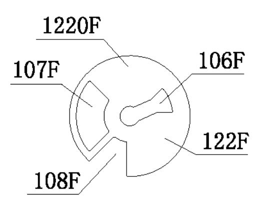

As shown in FIG. 14A to FIG. 15E, accordingly, when the filtering device 20F of the faucet water purifier according to the first embodiment of the present invention is used to treat the raw water, the users can control the raw water to flow to the first communicating opening 201E of the filtering device 20F through the control valve 10E, and the raw water flows to the raw water channel 2101E of the filtering device 20F under the action of water pressure, and then the purified water generated by the treatment of the primary filter 22E flows to the purified water channel 2201F under the action of water pressure, at this time, if the purified water inside the purified water channel 2201F can flow freely through the second communicating opening 202E of the filtering device 20F under the control of the control valve 10E, and the purified water generated by the secondary filter 23F cannot flow freely to the third communicating opening 203E, the purified water generated by the primary filter 22E will flow out and be provided under the action of water pressure through the second communicating opening 202E. Accordingly, at this time, the faucet water purifier according to the first embodiment of the present invention is under a second purifying working state, the purified water generated by the primary filter 22E will flow through the water collecting hole 2330F of the flow collecting tube 233F, the flow collecting channel 2331F, the second water cavity 2402F and the second communicating opening 202E in sequence, and be provided. On the other hand, if the purified water inside the purified water channel 2201F cannot flow freely through the second communicating opening 202E of the filtering device 20F under the control of the control valve 10E, and the purified water generated by the secondary filter 23F can flow freely to the third communicating opening 203E, the purified water generated by the primary filter 22E will be further purified by the secondary filter 23F under the action of water pressure, and the purified water generated by the secondary filter 23F will flow out through the membrane filament channel 2310F, and then flows out and is provided through the purified water outlet 2301F of the secondary filter 23F, the first water cavity 2401F and the third communicating opening 203E. Accordingly, at this time, the faucet water purifier according to the first embodiment of the present invention is under a first purifying working state. As shown in FIG. 14A and FIG. 15E, further, when the control valve 10E of the faucet water purifier according to the first embodiment of the present invention controls the raw water to back-flush the primary filter 22E of the filtering device 20F, the users can control the raw water to flow to the second communicating opening 202E of the filtering device 20F through the control valve 10E, and the raw water flows to the purified water channel 2201F of the filtering device 20F under the action of water pressure, at this time, under the control of the control valve 10E, the purified water generated by the secondary filter 23F cannot flow freely to the third communicating opening 203E, the raw water inside the purified water channel 2201F back flushes the primary filter 22E under the action of water pressure, the generated waste water flows to the first communicating opening 201E of the filtering device 20F through the raw water channel 2101E under the action of water pressure, and flows out through the first communicating opening 201E under the control of the control valve 10E. Accordingly, at this time, the faucet water purifier according to the first embodiment of the present invention is under a back flushing working state, that is, the raw water flows into the purified water channel 2201F through the second communicating opening 202E, the second water cavity 2402F, the flow collecting channel 2331F and the water collecting hole 2330F, and back flushes the primary filter 22E, the generated waste water flows to the first communicating opening 201E through the raw water channel 2101E. As shown in FIG. 14A and FIG. 15E, the faucet water purifier according to the first embodiment of the present invention further has a raw water supplying working state, wherein when the faucet water purifier of the present invention is under the raw water supplying working state, the user can control the raw water to flow directly to a raw water outlet and to be provided through the control valve 10E, instead of flowing through the filtering device 20F and being purified by the filtering device 20F.

FIG. 16 to FIG. 24D illustrate an alternative embodiment of the control valve 10E of the faucet water purifier according to the first embodiment of the present invention, which comprises a valve body 11E and a valve core 12F, wherein the valve body 11E defines a valve cavity 110E, a first opening 1101E, a second opening 1102E, a third opening 1103E, a fourth opening 1104E, a fifth opening 1105E, a raw water inlet 1106E and a draining opening 1108E, wherein the valve core 12F is disposed inside the valve cavity 110E, wherein the first opening 1101E of the valve body 11E is adapted to be communicated with the first communicating opening 201E of the filtering device 20E, the second opening 1102E of the valve body 11E is adapted to be communicated with the second communicating opening 202E of the filtering device 20E, the fourth opening 1104E of the valve body 11E is adapted to be communicated with the third communicating opening 203E of the filtering device 20E, the fifth opening 1105E of the valve body 11E is adapted to be communicated with a first water outlet 100E, the third opening 1103E of the valve body 11E is adapted to be communicated with a second water outlet 200E, the raw water inlet 1106E of the valve body 11E is adapted to be communicated with a raw water source (for example, a water outlet of a faucet).

As shown in FIG. 16 to FIG. 24D, the control valve 10F of the faucet water purifier according to the first embodiment of the present invention has a first purifying working position, wherein when the control valve 10F is under the first purifying working position, the valve core 12F of the control valve 10F defines a first communicating passage 1001F and a second communicating passage 1002F, wherein the first communicating passage 1001F is communicated with the first opening 1101E of the valve body 11E and the raw water inlet 1106E respectively, the second communicating passage 1002F is communicated with the fourth opening 1104E of the valve body 11E and the fifth opening 1105E respectively. Further, when the control valve 10F is under the first purifying working position, the second opening 1102E of the valve body 11E is not communicated with the third opening 1103E. In other words, when the control valve 10F is under the first purifying working position, the second opening 1102E of the valve body 11E cannot communicate with the third opening 1103E. Accordingly, when the control valve 10F is under the first purifying working position, under the action of water pressure, the raw water or the tap water flows into the raw water inlet 1106E of the valve body 11E of the control valve 10F, and then flows to the first opening 1101E of the valve body 11E through the first communicating passage 1001F, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201G. Further, when the control valve 10F is under the first purifying working position, the second opening 1102E of the valve body 11E cannot communicate with the third opening 1103E, so that the purified water inside the purified water channel 2201E cannot flow freely through the second communicating opening 202E of the filtering device 20E under the control the control valve 10F. Therefore, the purified water generated by the primary filter 22E is further purified and treated by the secondary filter 23E, the purified water generated by the secondary filter 23E flows out from the third communicating opening 203E through the purified water outlet 2301E, and flows through the fourth opening 1104E, the second communicating passage 1002F and the fifth opening 1105E in sequence, so that the purified water generated by the secondary filter 23E can be provided through the first water outlet 100E communicated with the fifth opening 1105E. Preferably, the secondary filter 23E is an ultrafiltration filter. Accordingly, the purified water generated by the secondary filter 23E can be directly drunk. It is appreciated that when the control valve 10F of the faucet water purifier according to the first embodiment of the present invention is controlled under the first purifying working position, the faucet water purifier of the present invention is controlled under its first purifying working state.

As shown in FIG. 16 to FIG. 24D, the control valve 10F of the faucet water purifier according to the first embodiment of the present invention has a back flushing working position, wherein when the control valve 10F is under the back flushing working position, the valve core 12F of the control valve 10F defines a third communicating passage 1003F and a fourth communicating passage 1004F, wherein the third communicating passage 1003F is communicated with the second opening 1102E of the valve body 11E and the raw water inlet 1106E respectively, the fourth communicating passage 1004F is communicated with the first opening 1101E of the valve body 11E and the draining opening

1108E respectively. Accordingly, when the control valve 10F is under the back flushing working position, under the action of water pressure, the raw water or the tap water flows from the raw water inlet 1106E of the valve body 11E of the control valve 10F, and flows into the second opening 1102E of the valve body 11E through the third communicating passage 1003F, and further flows into the filtering device 20E through the second communicating opening 202E of the filtering device 20E, the raw water flows into the primary filter 22E through the purified water channel 2201E of the filtering device 20E under the action of water pressure, and after back flushing the primary filter 22E, the generated waste water flows into the raw water channel 2101E. At this time, since the first opening 1101E of the valve body 11E is communicated with the draining opening 1108E through the fourth communicating passage 1004F, therefore, the waste water generated by using the raw water to back-flush the primary filter 22E flows into the raw water channel 2101E and flows out of the first communicating opening 201E, and flows through the first opening 1101E, the fourth communicating passage 1004F and the draining opening 1108E in sequence, so that the waste water generated by using the raw water to back-flush the primary filter 22E can flow out through the draining opening 1108E. It is appreciated that when the control valve 10F of the faucet water purifier according to the first embodiment of the present invention is controlled under the back flushing working position, the faucet water purifier of the present invention is controlled under its back flushing working state.

As shown in FIG. 16 to FIG. 24D, the control valve 10F of the faucet water purifier according to the first embodiment of the present invention has a raw water opening 1109E, wherein the control valve 10F further has a raw water supplying working position, wherein when the control valve 10F is under the raw water supplying working position, the valve core 12F of the control valve 10F defines a fifth communicating passage 1005F, wherein the fifth communicating passage 1005F is communicated with the raw water opening 1109E of the valve body 11E and the raw water inlet 1106E respectively, so that the raw water or the tap water can be supplied by the raw water opening 1109E. Further, when the control valve 10F is under the raw water supplying working position, the raw water inlet 1106E is not communicated with every of the first opening 1101E, the second opening 1102E, the third opening 1103E, the fourth opening 1104E and the fifth opening 1105E. It is appreciated that when the control valve 10F of the faucet water purifier according to the first embodiment of the present invention is controlled under the raw water supplying working position, the faucet water purifier of the present invention is controlled under its raw water supplying working position working state. Preferably, the raw water opening 1109E of the control valve 10F defines the raw water outlet of the faucet water purifier of the present invention.

As shown in FIG. 16 to FIG. 24D, the control valve 10F of the faucet water purifier according to the first embodiment of the present invention has a second purifying working position, wherein when the control valve 10F is under the second purifying working position, the valve core 12F of the control valve 10F defines a sixth communicating passage 1006F and a seventh communicating passage 1007F, wherein the sixth communicating passage 1006F is communicated with the first opening 1101E of the valve body 11E and the raw water inlet 1106E respectively, the seventh communicating passage 1007F is communicated with the second opening 1102E of the valve body 11E and the third opening 1103E respectively. Further, when the control valve 10F is under the second purifying working position, the fourth opening 1104E of the valve body 11E is not communicated with the fifth opening 1105E. In other words, when the control valve 10F is under the second purifying working position, the fourth opening 1104E of the valve body 11E cannot communicate with the fifth opening 1105E. Accordingly, when the control valve 10F is under the second purifying working position, under the action of water pressure, the raw water or the tap water flows into the raw water inlet 1106E of the valve body 11E of the control valve 10F, and then flows to the first opening 1101E of the valve body 11E through the sixth communicating passage 1006F, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. At this time, since the second opening 1102E of the valve body 11E is communicated with the third opening 1103E through the seventh communicating passage 1007F, therefore, after the purified water generated by the primary filter 22E flows into the purified water channel 2201E, it flows out through the second communicating opening 202E, and flows through the second opening 1102E, the seventh communicating passage 1007F and the third opening 1103E in sequence, so that the purified water generated by the primary filter 22E can be provided through the second water outlet 200E communicated with the third opening 1103E. It is appreciated that when the control valve 10F of the faucet water purifier according to the first embodiment of the present invention is controlled under the second purifying working position, the faucet water purifier of the present invention is controlled under its second purifying working state.

As shown in FIG. 16 to FIG. 24D, the control valve 10F of the faucet water purifier according to the first embodiment of the present invention is a plane valve, wherein the valve core 12F of the plane valve 10F further comprises a fixed disk 121F and a rotatable disk 122F, wherein the fixed disk 121F has a first fluid control surface 1210F, the rotatable disk 122F has a second fluid control surface 1220F, wherein the rotatable disk 122F and the fixed disk 121F are both disposed inside the valve cavity 110E, wherein the second fluid control surface 1220F of the rotatable disk 122F is provided on the first fluid control surface 1210F of the fixed disk 121F, and the rotatable disk 122F is provided to be capable of rotating relative to the fixed disk 121F.

As shown in FIG. 16 to FIG. 24D, the plane valve 10F of the faucet water purifier according to the first embodiment of the present invention has a first channel 101F, a second channel 102F, a third channel 103F, a fourth channel 104F, a fifth channel 105F, a sixth channel 106F, a seventh channel 107F, an eighth channel 108E and a raw water inlet channel 1011F, wherein the first channel 101F, the second channel 102F, the third channel 103F, the fourth channel 104F and the fifth channel 105F are provided at the fixed disk 121F respectively and extended from the first fluid control surface 1210F of the fixed disk 121F respectively; the sixth channel 106F, the seventh channel 107F and the eighth channel 108E are provided at the rotatable disk 122F respectively and extended from the second fluid control surface 1220F of the rotatable disk 122F respectively, wherein the first channel 101F is communicated with the first opening 1101E, the second channel 102F is communicated with the second opening 1102E, the third channel 103F is communicated with the third opening 1103E, the fourth channel 104F is communicated with the fourth opening 1104E, the fifth channel 105F is communicated with the fifth opening 1105E, the sixth channel 106F is communicated with the raw water inlet channel 1011F, the raw water inlet channel 1011F is communicated with the raw water inlet 1106E, the eighth channel 108F is communicated with the draining opening 1108E. Preferably, the draining opening 1108E and the eighth channel 108F are communicated with the valve cavity 110E respectively, so that the eighth channel 108F is communicated with the draining opening 1108E. More preferably, the sixth channel 106F and the seventh channel 107F of the rotatable disk 122F are preferably communicating blind holes. Preferably, the first channel 101F is provided between the second channel 102F and the fourth channel 104F, and a ninth channel 109F is provided at the inner side of the first channel 101F. More preferably, the ninth channel 109F and the first channel 101F are provided between the second channel 102F and the fourth channel 104F.

As shown in FIG. 16 to FIG. 24D, the first fluid control surface 1210F of the fixed disk 121F of the plane valve 10F of the faucet water purifier according to the first embodiment of the present invention defines an inner portion 12101F and an edge portion 12102F extended outward from the inner portion 12101F, wherein the raw water inlet channel 1011F of the plane valve 10F is provided at the inner portion 12101F of the fixed disk 121F, the first channel 101F, the second channel 102F, the third channel 103F, the fifth channel 105F and the fourth channel 104F of the plane valve 10F are arranged clockwise on the edge portion 12102F of the first fluid control surface 1210F of the fixed disk 121F in this order, wherein the sixth channel 106F, the seventh channel 107F and the eighth channel 108F of the plane valve 10F are arranged clockwise on the second fluid control surface 1220F of the rotatable disk 122F in this order. Alternatively, the first channel 101F, the second channel 102F, the third channel 103F, the fifth channel 105F and the fourth channel 104F of the plane valve 10F are arranged anticlockwise at the first fluid control surface 1210F of the fixed disk 121F of the plane valve 10F in this order, wherein the sixth channel 106F, the seventh channel 107F and the eighth channel 108F of the plane valve 10F are arranged anticlockwise at the second fluid control surface 1220F of the rotatable disk 122F in this order. In other words, the first channel 101F, the second channel 102F, the third channel 103F, the fifth channel 105F and the fourth channel 104F of the plane valve 10F are arranged to surround the raw water inlet channel 1011F. Preferably, the first channel 101F, the second channel 102F, the third channel 103F, the fifth channel 105F and the fourth channel 104F and the raw water inlet channel 1011F of the plane valve 10F are spacedly arranged at the first fluid control surface 10F of the fixed disk 121F of the plane valve 10F, the sixth channel 106F, the seventh channel 107F and the eighth channel 108F of the plane valve 10F are spacedly arranged at the second fluid control surface 1220F of the rotatable disk 122F.

As shown in FIG. 16 to FIG. 24D, the rotatable disk 122F of the plane valve 10F of the faucet water purifier according to the first embodiment of the present invention is capable of rotating relative to the fixed disk 121F, so that the plane valve 10F has a first purifying working position and a back flushing working position, wherein when the plane valve 10F of the faucet water purifier according to the first embodiment of the present invention is under the first purifying working position, the sixth channel 106F of the plane valve 10F is communicated with the raw water inlet channel 1011F and the first channel 101F respectively, so as to define the first communicating passage 1001F communicated with the raw water inlet 1106E and the first opening 1101E respectively, the seventh channel 107F is communicated with the fourth channel 104F and the fifth channel 105F respectively, so as to define the second communicating passage 1002F communicated with the fourth opening 1104E and the fifth opening 1105E respectively; as shown in FIG. 16 to FIG. 24D, when the plane valve 10F is under the first purifying working position, the second channel 102F and the third channel 103F of the plane valve 10F are blocked (or closed) by the rotatable disk 122F respectively. Accordingly, the primary purified water generated by the primary filter 22E will flow to the secondary filter 23E under the action of water pressure, and after it is further purified and treated by the secondary filter 23E, it is provided through the fourth opening 1104E, the second communicating passage 1002F and the fifth opening 1105E. When the plane valve 10F is under the back flushing working position, the sixth channel 106F of the plane valve 10F is communicated with the raw water inlet channel 1011F and the second channel 102F, so as to define the third communicating passage 1003F communicated with the raw water inlet 1106E and the second opening 1102E respectively, the eighth channel 108F is communicated with the first channel 101F, so as to define the fourth communicating passage 1004F communicated with the first opening 1101E and the draining opening 1108E respectively. As shown in FIG. 16 to FIG. 24D, when the plane valve 10F of the faucet water purifier according to the first embodiment of the present invention is under the back flushing working position, the third channel 103F and the fifth channel 105F of the plane valve 10F are blocked (or closed) by the rotatable disk 122F respectively.

As shown in FIG. 16 to FIG. 24D, the valve body 11E of the plane valve 10F of the water faucet purifier according to the first embodiment of the present invention further has the ninth channel 109F, wherein the ninth channel 109F is provided at the fixed disk 121F and extended from the first fluid control surface 1210F of the fixed disk 121F, the ninth channel 109F is communicated with the ninth channel 1109E, wherein when the plane valve 10F is under the raw water supplying working position, the sixth channel 106F of the plane valve 10F is communicated with the raw water inlet channel 1011F and the ninth channel 109F, so as to define the fifth communicating passage 1005F communicating with the raw water inlet 1106E and the raw water opening 1109E respectively to allow the raw water to flow into the raw water inlet 1106E and further be supplied through the raw water inlet channel 1011F, the sixth channel 106E, the ninth channel 109E and the raw water opening 1109E, wherein when the plane valve 10F is under the raw water supplying working position, the first channel 101F and the second channel 102F of the plane valve 10F are respectively blocked by the rotatable disk 122F.

As shown in FIG. 16 to FIG. 24D, the plane valve 10F of the faucet water purifier according to the first embodiment of the present invention further has a second purifying working position, wherein when the plane valve 10F is under the second purifying working position, the sixth channel 106F of the plane valve 10F is communicated with the raw water inlet channel 1011F and the first channel 101F respectively, so as to define the sixth communicating passage 1006F communicated with the raw water inlet 1106E and the first opening 1101E respectively, the seventh channel 107F is communicated with the second channel 102F and the third channel 103F respectively, so as to define the seventh communicating passage 1007F communicated with the second opening 1102E and the third opening 1103E respectively. When the plane valve 10F of the faucet water purifier according to the first embodiment of the present invention is under the second purifying working position, the fourth channel 104F of the plane valve 10F is blocked (or closed) by the rotatable disk 122F, so that the water inside the fourth channel 104F cannot flow freely. Accordingly, the primary purified water generated by the primary filter 22E will flow to the second opening 1102E under the action of water pressure, and be provided through the seventh communicating passage 1007F and the third opening 1103E.

As shown in FIG. 16 to FIG. 24D, the first channel 101F of the plane valve 10F of the faucet water purifier according to the first embodiment of the present invention has a first communicating part 10101F, a second communicating part 10102F and a third communicating part 10103F extended between the first communicating part 10101F and the second communicating part 10102F, wherein the ninth channel 109F of the plane valve 10F is arranged at the inner side of the third communicating part 10103F, wherein when the plane valve 10F is under the first purifying working position, the sixth channel 106E of the plane valve 10F is communicated with the first communicating part 10101F of the first channel 101E and the raw water inlet channel 1011F, the seventh channel 107F is communicated with the fourth channel 104F and the fifth channel 105F respectively; when the plane valve 10F is under the back flushing working position, the sixth channel 106E of the plane valve 10F is communicated with the second channel 102F and the raw water inlet channel 1011F, and the eighth channel 108F of the plane valve 10E is respectively communicated with the second communicating part 10102F of the first channel 101E; when the plane valve 10F is under the second purifying working position, the sixth channel 106E of the plane valve 10F is communicated with the second communicating part 10102F of the first channel 101E and the raw water inlet channel 1011F respectively, and the seventh channel 107F is communicated with the second channel 102F and the third channel 103F respectively. As shown in FIG. 16 to FIG. 24D, when the plane valve 10F is under the first purifying working position, the second communicating part 10102F of the first channel 101F of the plane valve 10F is blocked by the rotatable disk 122F; when the plane valve 10F is under the back flushing working position, the first communicating part 10101F of the first channel 101F of the plane valve 10F is blocked by the rotatable disk 122F; when the plane valve 10F is under the second purifying working position, the first communicating part 10101F of the first channel 101F of the plane valve 10F is blocked by the rotatable disk 122F. Preferably, the third communicating part 10103F of the first channel 101F is arranged on the first fluid control surface 1210F of the fixed disk 121F of the plane valve 10F. Preferably, the third communicating part 10103F of the first channel 101F is arranged within the fixed disk 121F of the plane valve 10F.

As shown in FIG. 16 to FIG. 24D, the fixed disk 121F of the valve core 12F of the plane valve 10F of the faucet water purifier according to the first embodiment of the present invention comprises an upper end portion 1211F, a lower end portion 1212F and a fixing portion 1213F provided between the upper end portion 1211F and the lower end portion 1212F, wherein the upper end portion 1211F defines the first fluid control surface 1210F of the fixed disk 121F, and the lower end portion 1212F is provided at the valve cavity 110E of the valve body 11EE. Preferably, the lower end portion 1212F of the fixed disk 121F of the valve core 12F of the plane valve 10F of the faucet water purifier of the present invention is integrally provided at the inner wall of the valve body 11 of the plane valve 10F.

As shown in FIG. 16 to FIG. 24D, the plane valve 10F of the faucet water purifier according to the first embodiment of the present invention further comprises a sealing assembly 13F, wherein the sealing assembly 13F has a first seal 131F, wherein the first seal 131F is provided between the upper end portion 1211F and the fixing portion 1213F of the fixed disk 121F. Further, the first seal 131F has a plurality of first sealing strips 1311F, the fixing portion 1213F of the fixed disk 121F has a plurality of first sealing grooves 12130F, wherein the first sealing grooves 12130F are provided to respectively surround the first channel 101F, the second channel 102F, the third channel 103F, the fourth channel 104F, the fifth channel 105F, the raw water inlet channel 1011F and the ninth channel 109F (if any) of the fixed disk 121F, the first sealing strips 1311F of the first seal 131F are provided according to the first sealing grooves 12130F of the fixing portion 1213F, so that the first sealing strips 1311F of the first seal 131F can be engaged with the first sealing grooves 12130F of the fixing portion 1213F and realize the sealing between the upper end portion 1211F and the fixing portion 1213F of the fixed disk 121F. It should be understood that the first sealing grooves 12130F are defined at one side of the fixing portion 1213F facing the upper end portion 1211F. Further, the sealing assembly 13F has a second seal 132F, wherein the second seal 132F is provided between the fixing portion 1213F and the lower end portion 1212F of the fixed disk 121F. Further, the second seal 132F has a plurality of second sealing strips 1321F, the fixing portion 1213F of the fixed disk 121F has a plurality of second sealing grooves 12131F, wherein the second sealing grooves 12131F are provided to respectively surround the first channel 101F, the second channel 102F, the third channel 103F, the fourth channel 104F, the fifth channel 105F, the raw water inlet channel 1011F and the ninth channel 109F of the fixed disk 121F, the second sealing strips 1321F of the second seal 132F are provided according to the second sealing grooves 12131F of the fixing portion 1213F, so that the second sealing strips 1321F of the second seal 132F can be engaged with the second sealing grooves 12131F of the fixing portion 1213F and realize the sealing between the lower end portion 1212F and the fixing portion 1213F of the fixed disk 121F. It is appreciated that the second sealing grooves 12131F are defined at one side of the fixing portion 1213F facing the lower end portion 1212F.

As shown in FIG. 16 to FIG. 24D, the sealing assembly 13F of the faucet water purifier according to the first embodiment of the present invention further comprises at least one first sealing ring 133F, wherein the first sealing ring 133F is provided at the outer surface of the fixing holder 41, so as to realize the sealing between the fixing holder 41 and the inner wall of the valve body 11E and prevent the raw water from flowing out between the fixing holder 41 and the inner wall of the valve body 11E. Further, the sealing assembly 13F comprises at least one second sealing ring 134F, wherein the second sealing ring 134F is provided between the valve rod 60 and the fixing holder 41, so as to realize the sealing between the valve rod 60 and the inner wall of the fixing holder 41 and prevent water from flowing out between the valve rod 60 and the inner wall of the fixing holder 41.

As shown in FIG. 16 to FIG. 24D, the water inlet opening 401 of the fixing holder 41 of the fixed device 40 and the draining opening 1108E of the plane valve 10F of the faucet water purifier according to the first embodiment of the present invention are respectively communicated with the valve cavity 110E of the valve body 11E, and the water inlet opening 401 of the fixed support 41 is communicated with the accommodation chamber 410, the accommodation chamber 410 of the fixing holder 41 is communicated with the eighth channel 108F of the plane valve 10F, so that the waste water can be discharged from the eighth channel 108F, the accommodation chamber 410 of the fixing holder 41, the water inlet opening 401, the valve cavity 110E of the valve body 11E and the draining opening 1108E. As shown in FIG. 16 to FIG. 24D, the accommodation chamber 410 of the fixing holder 41 of the fixing device 40 of the faucet water purifier according to the first embodiment of the present invention is provided to be adapted to accommodate the upper end portion 1211F of the fixed disk 121F and the rotatable disk 122F inside the accommodation chamber 410, the eighth channel 108F of the plane valve 10E is provided to communicate with the accommodation chamber 410 of the fixing holder 41, so that the waste water can be discharged from through the water inlet opening 401 and the draining opening 1108E of the plane valve 10F. As shown in FIG. 16 to FIG. 24D, further, the upper end portion 1211F of the fixed disk 121F is adapted to be detachably clamped at the fixing portion 1213F of the fixed disk 121F, the fixing portion 1213F of the fixed disk 121F is adapted to be detachably clamped at the lower end portion 1212F of the fixed disk 121F, so that the upper end portion 1211F of the fixed disk 121F cannot rotate relative to the fixing portion 1213F, the fixing portion 1213F of the fixed disk 121F cannot rotate relative to the lower end portion 1212F.

Figure 24A:
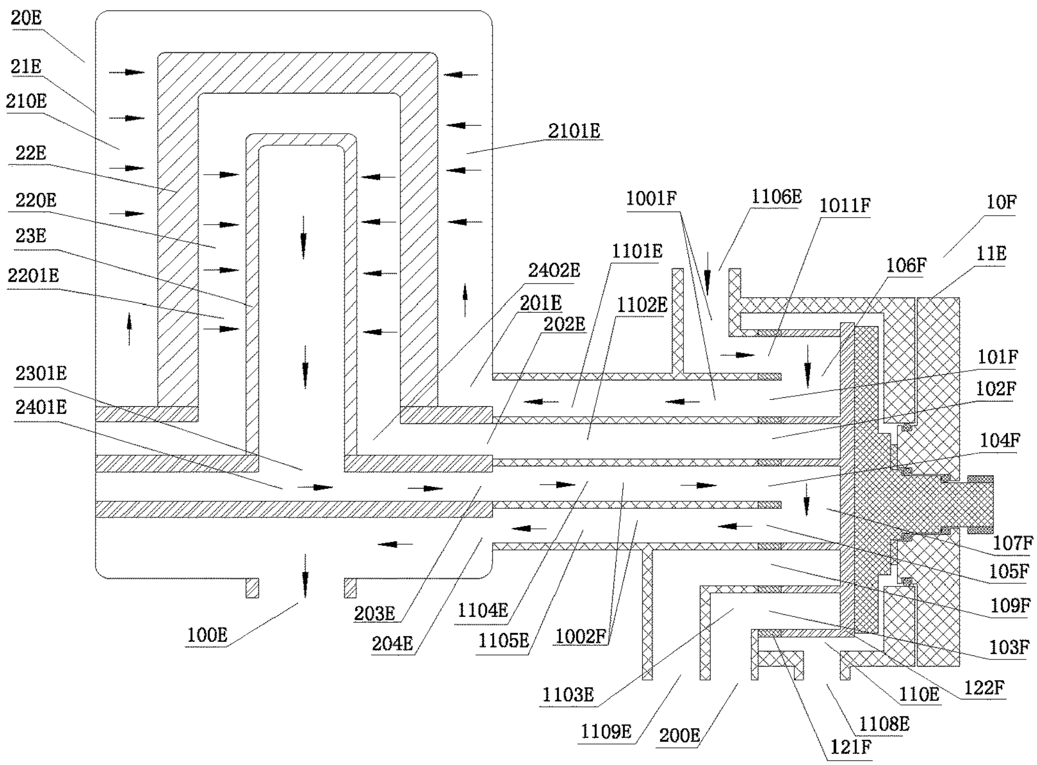
FIG. 24A is a diagram of the communication between the channels of the rotatable disk and the channels of the fixed disk of the plane valve, when the alternative embodiment of the plane valve of the faucet water purifier according to the above first embodiment of the present invention is under a first purifying working position, wherein the shaded area shown in FIG. 24A shows the passages defined by the communication between the rotatable disk and the fixed disk of the plane valve.
Figure 24B:
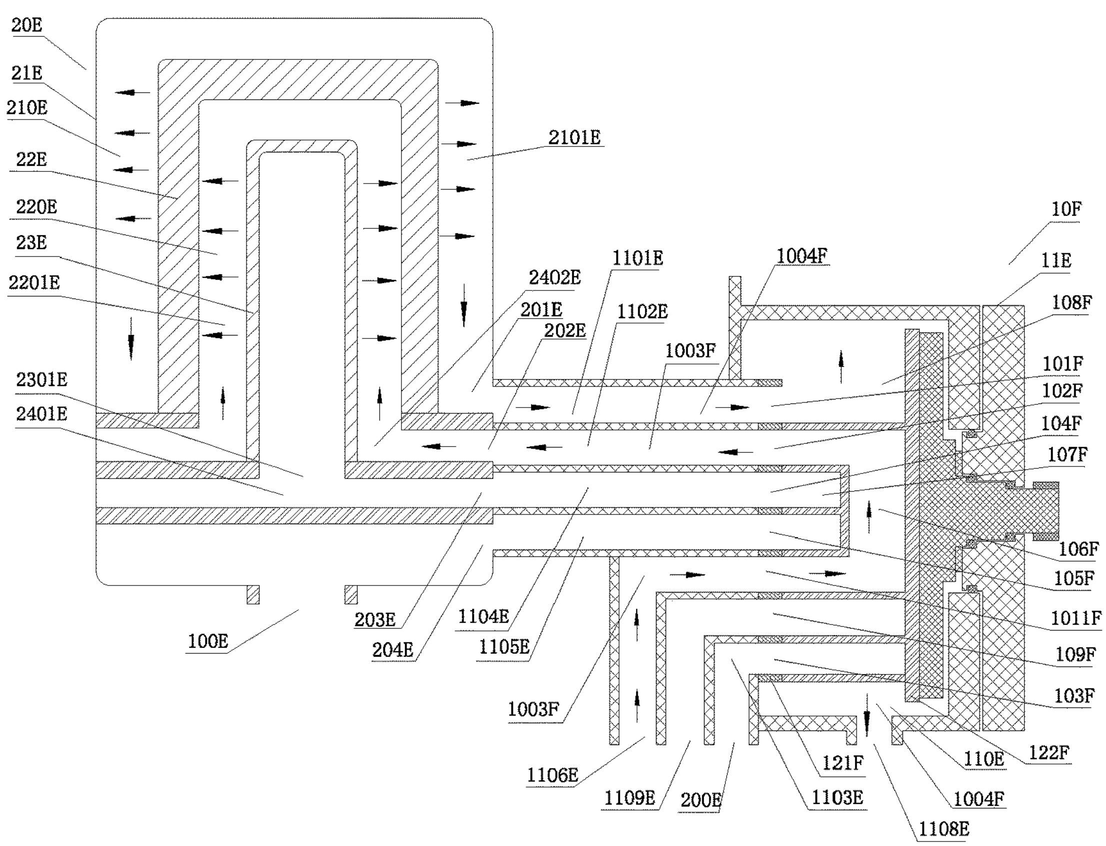
FIG. 24B is a diagram of the communication between the channels of the rotatable disk and the channels of the fixed disk of the plane valve, when the alternative embodiment of the plane valve of the faucet water purifier according to the above first embodiment of the present invention is under a back flushing working position, wherein the shaded area shown in FIG. 24B shows the passages defined by the communication between the rotatable disk and the fixed disk of the plane valve.
Figure 24C:
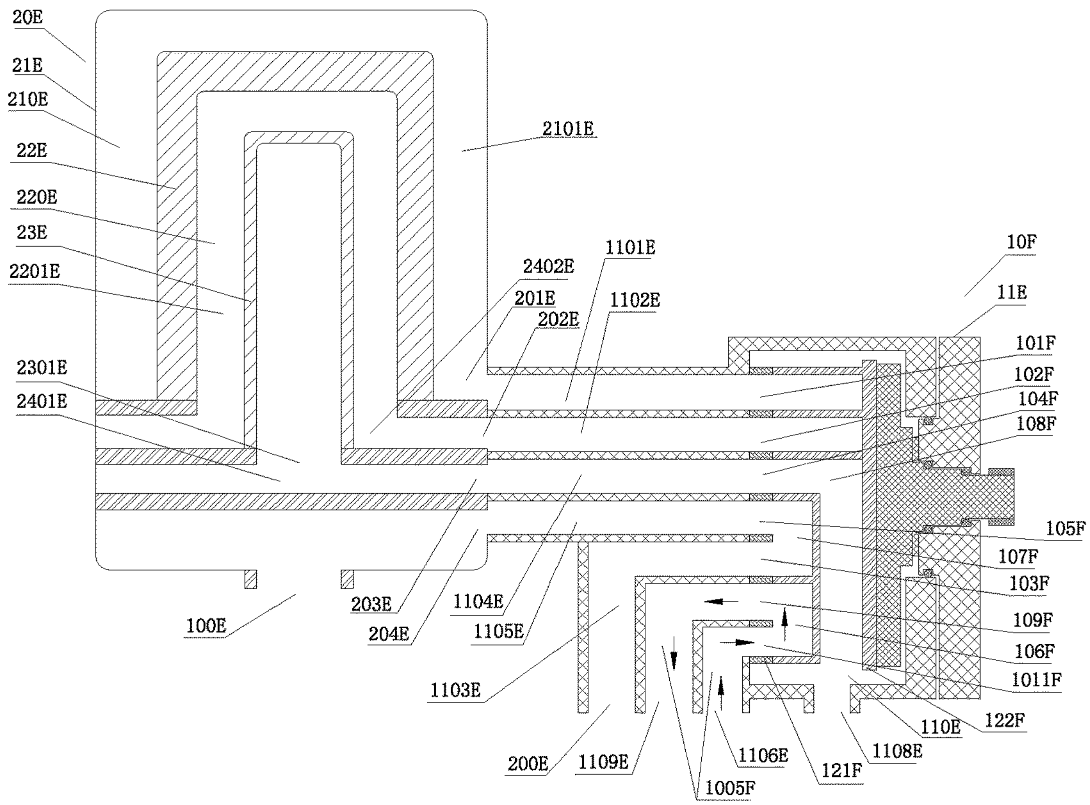
FIG. 24C is a diagram of the communication between the channels of the rotatable disk and the channels of the fixed disk of the plane valve, when the alternative embodiment of the plane valve of the faucet water purifier according to the above first embodiment of the present invention is under a raw water supplying working position, wherein the shaded area shown in FIG. 24C shows the passages defined by the communication between the rotatable disk and the fixed disk of the plane valve.
Figure 24D:
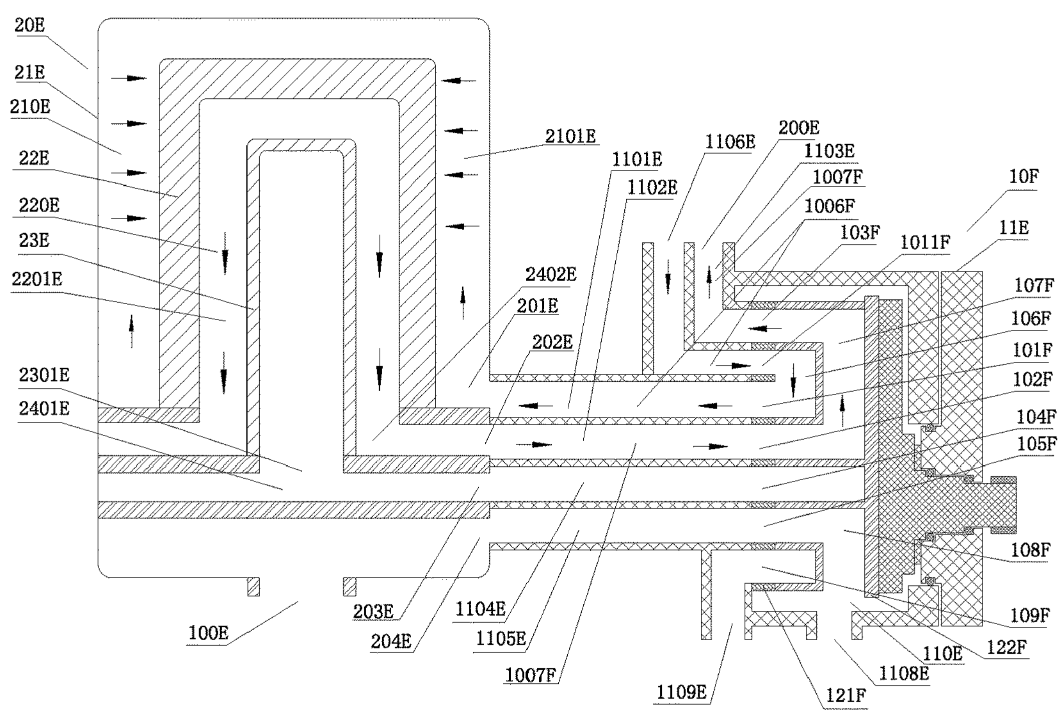
FIG. 24D is a diagram of the communication between the channels of the rotatable disk and the channels of the fixed disk of the plane valve, when the alternative embodiment of the plane valve of the faucet water purifier according to the above first embodiment of the present invention is under a second purifying working position, wherein the shaded area shown in FIG. 24D shows the passages defined by the communication between the rotatable disk and the fixed disk of the plane valve.
Figure 25A:
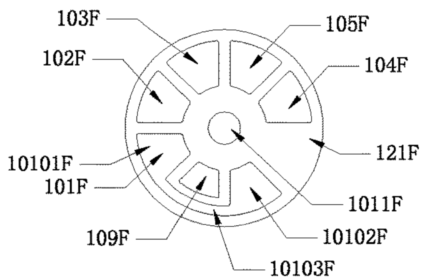
FIG. 25 is an exploded view of another alternative embodiment of the control valve of the faucet water purifier according to the above first embodiment of the present invention.
Figure 25B:
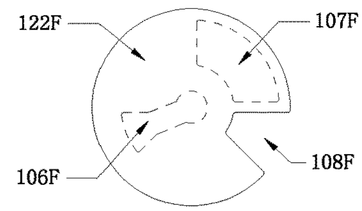
Figure 25C:
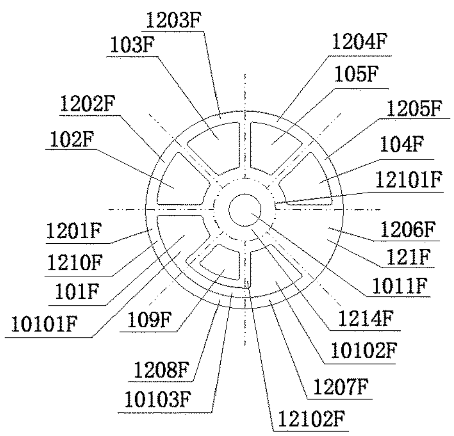
Figure 25D:
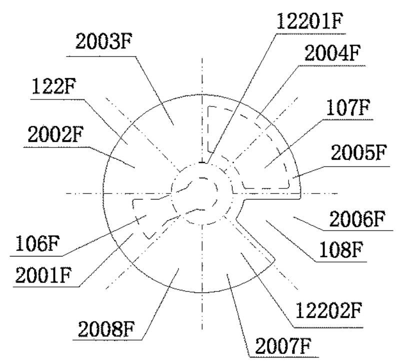
Figure 26A:
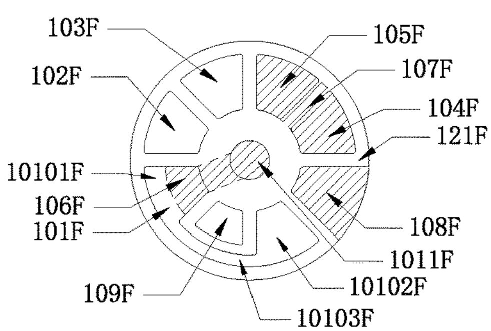
FIG. 26A is a perspective view of the alternative embodiment of the plane valve of the faucet water purifier according to the above first embodiment of the present invention, which shows a first channel, a second channel, a third channel, a fourth channel, a fifth channel, an eighth channel and a ninth channel of the plane valve.
Figure 26B:
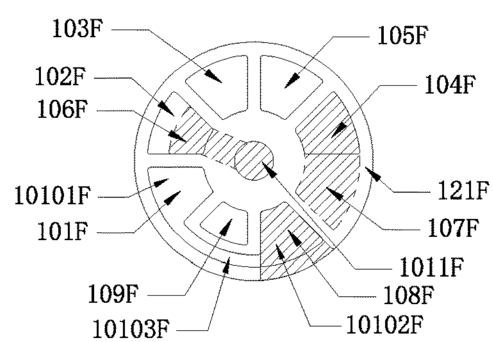
FIG. 26B is another perspective view of the alternative embodiment of the plane valve of the faucet water purifier according to the above first embodiment of the present invention, which shows the first channel, the second channel, the third channel, the fourth channel, the fifth channel, the eighth channel, the ninth channel and a second seal of the plane valve.
Figure 26C:
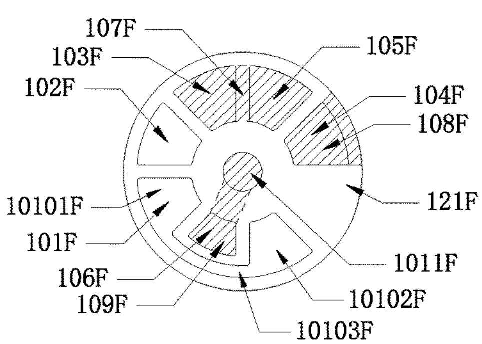
FIG. 26C is another perspective view of the alternative embodiment of the plane valve of the faucet water purifier according to the above first embodiment of the present invention, which shows a first opening, a second opening, a fourth opening and a fifth opening of the valve body.
Figure 26D:
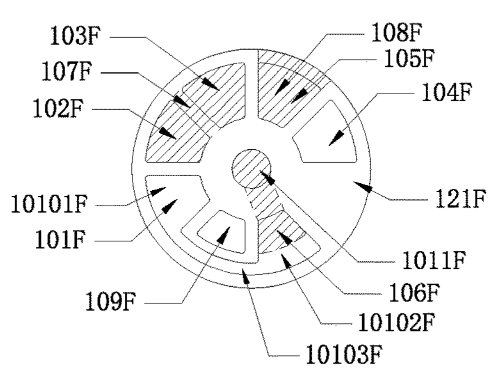
FIG. 26D is another perspective view of the alternative embodiment of the plane valve of the faucet water purifier according to the above first embodiment of the present invention, which shows a raw water inlet of the valve body.
Figure 27:
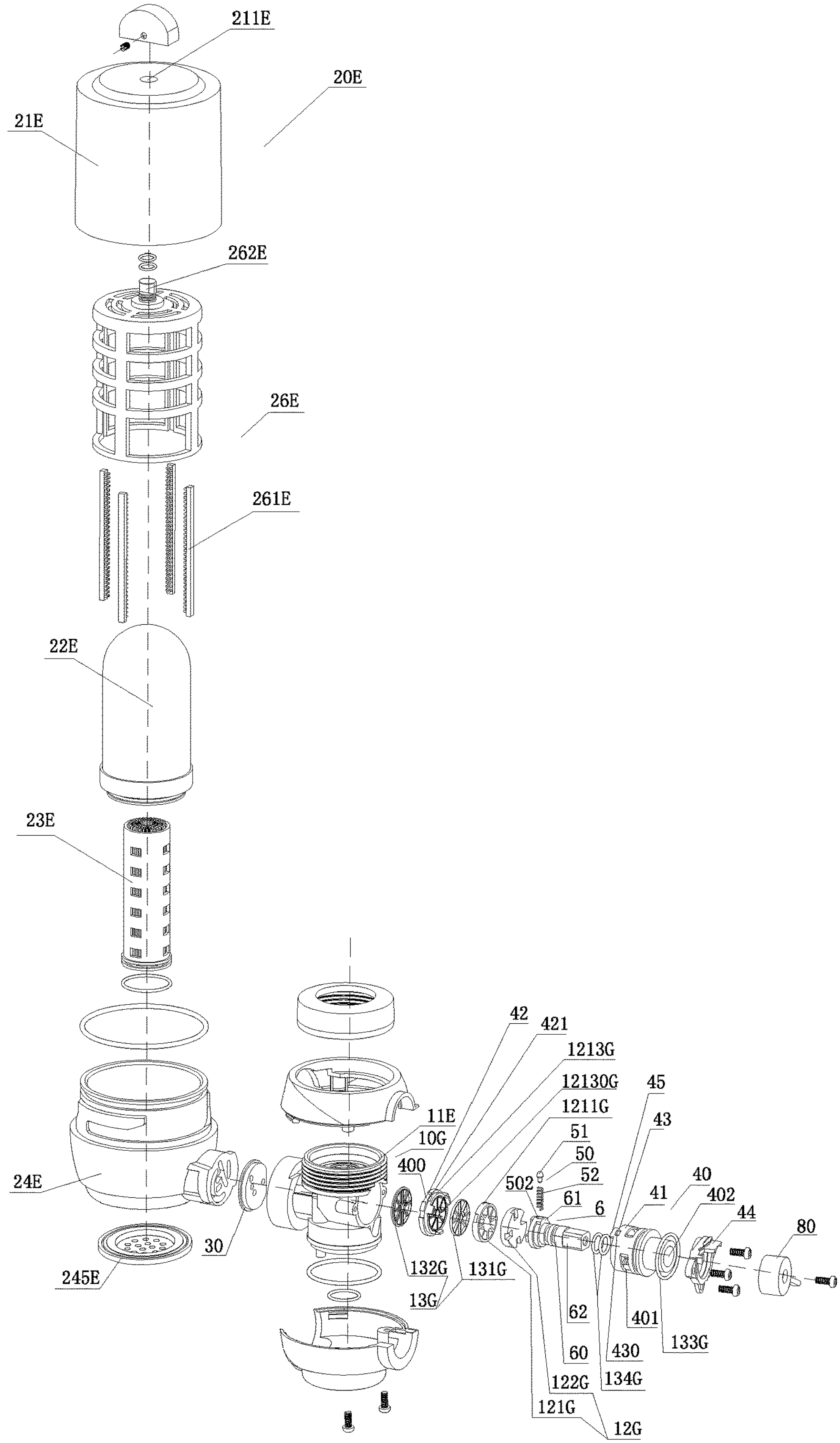

As shown in 16 to FIG. 24D, the first fluid control surface 1210F of the fixed disk 121F of the plane valve 10F of the faucet water purifier according to the first embodiment of the present invention has an inner portion 12101F and an edge portion 12102F extended outward from the inner portion 12101F, which are shown by the dashed lines, wherein the inner portion 12101F and the edge portion 12102F are provided at a top end portion 1214F of the fixed disk 121F, and the edge portion 12102F (or the part other than the inner portion 12101F) of the first fluid control surface 1210F are equally divided into a first portion 1201F, a second portion 1202F, a third portion 1203F, a fourth portion 1204F, a fifth portion 1205F, a sixth portion 1206F, a seventh portion 1207F and an eighth portion 1208F, which are shown by the dashed lines, the second fluid control surface 1220F of the rotatable disk 122F of the plane valve 10F has an inner region 12201F and an edge region 12202F extended outward from the inner region 12201F, which are shown by the dashed lines, wherein the inner region 12201F and the edge region 12202F are provided at a bottom end portion 1221F of the rotatable disk 122F, and the edge region 12202F (or the part other than the inner region 12201F) of the second fluid control surface 1220F are equally divided into a first region 2001F, a second region 2002F, a third region 2003F, a fourth region 2004F, a fifth region 2005F, a sixth region 2006F, a seventh region 2007F and an eighth region 2008F, which are shown by the dashed lines, wherein the first channel 101F is extended downward from the first portion 1201F and the seventh portion 1207F of the first fluid control surface 1210F of the fixed disk 121F, the first channel 101F is further extended downward from the eighth portion 1208F of the first fluid control surface 1210F of the fixed disk 121F, the second channel 101E is extended downward from the second portion 1202F of the first fluid control surface 1210F of the fixed disk 121F, the third channel 103F is extended downward from the third portion 1203F of the first fluid control surface 1210F of the fixed disk 121F, the fourth channel 104F is extended downward from the fifth portion 1205F of the first fluid control surface 1210F of the fixed disk 121F, the fifth channel 105F is extended downward from the fourth portion 1204F of the first fluid control surface 1210F of the fixed disk 121F, the sixth channel 106F is extended upward from the first region 2001F and the inner region 12201F of the second fluid control surface 1220F of the rotatable disk 122F, the seventh channel 107F is extended upward from the fourth region 2004F and the fifth region 2005F of the second fluid control surface 1220F of the rotatable disk 122F, the eighth channel 108F is extended upward from the sixth region 2006F of the second fluid control surface 1220F of the rotatable disk 122E, the raw water inlet channel 1011F is extended downward from the inner portion 12101F of the first fluid control surface 1210F of the fixed disk 121F. As shown in FIG. 16 to FIG. 24D, preferably, the edge portion 12102F of the first fluid control surface 1210F are equally divided clockwise into the first portion 1201F, the second portion 1202F, the third portion 1203F, the fourth portion 1204F, the fifth portion 1205F, the sixth portion 1206F, the seventh portion 1207F and the eighth portion 1208F, the edge region 12202F of the second fluid control surface 1220F of the rotatable disk 122F of the plane valve 12F are equally divided clockwise into the first region 2001F, the second region 2002F, the third region 2003F, the fourth region 2004F, the fifth region 2005F, the sixth region 2006F, the seventh region 2007F and the eighth region 2008F. Further, the ninth channel 109F is extended downward from the eighth portion 1208F of the first fluid control surface 1210F of the fixed disk 121F. In other words, the first fluid control surface 1210F of the fixed disk 121F of the plane valve 10F defines eight equal divisions, and the second fluid control surface 1220F of the rotatable disk 122F of the plane valve 10F defines eight equal divisions, wherein when the rotatable disk 122F of the plane valve 10F is rotated until the first equal division (the first region 2001F) of the second fluid control surface 1220F of the rotatable disk 122F directly faces the second equal division (the second portion 1202F) of the first fluid control surface 1210F of the fixed disk 121F, the fourth equal division (the fourth region 2004F) and the fifth equal division (the fifth region 2005F) of the second fluid control surface 1220F of the rotatable disk 122F of the plane valve 10F directly faces the fifth equal division (the fifth portion 1205F) and the sixth equal division (the sixth portion 1206F) of the first fluid control surface 1210F of the fixed disk 121F, the sixth equal division (the sixth region 2006F) of the second fluid control surface 1220F of the rotatable disk 122F directly faces the seventh equal division (the seventh portion 1207F) of the first fluid control surface 1210F of the fixed disk 121F, so that the sixth channel 106F of the plane valve 10F is communicated with the raw water inlet channel 1011F and the second channel 102F respectively, the seventh channel 107F is communicated with the fourth channel 104F, and the eighth channel 108F is communicated with the first channel 101F, so as to allow the raw water to flow into the filtering device 20E through the raw water inlet 1106E, the raw water inlet channel 1011F, the sixth channel 106F, the second channel 102F, the second opening 1102E and the second communicating opening 202E. After the raw water back flushes (referring to the flow direction of the water in the primary filter 22E during the back flushing is opposite to the flow direction of the water in the primary filter 22E during the filtering) the primary filter 22E of the filtering device 20E, it flows out through the first communicating opening 201E of the filtering device 20E, and then flows out through the first opening 1101E, the first channel 101F, the eighth channel 108F and the draining opening 1108E, accordingly, the faucet water purifier is under the back flushing working state at this time. Further, when the rotatable disk 122F of the plane valve 10F is rotated until the first equal division (the first region 2001F) of the second fluid control surface 1220F of the rotatable disk 122F directly faces the first equal division (the first portion 1201F) of the first fluid control surface 1210F of the fixed disk 121F, the fourth equal division (the fourth region 2004F) and the fifth equal division (the fifth region 2005F) of the second fluid control surface 1220F of the rotatable disk 122F of the plane valve 10F directly faces the fourth equal division (the fourth portion 1204F) and the fifth equal division (the fifth portion 1205F) of the first fluid control surface 1210F of the fixed disk 121F, the sixth equal division (the sixth region 2006F) of the second fluid control surface 1220F of the rotatable disk 122F directly faces the sixth equal division (the sixth portion 1206F) of the first fluid control surface 1210F of the fixed disk 121F, so that the sixth channel 106F of the plane valve 10F is communicated with the raw water inlet channel 1011F and the first channel 101F, the seventh channel 107F is communicated with the fourth channel 104F and the fifth channel 105F, and the eighth channel 108F is blocked by the second fluid control surface 1220F of the rotatable disk 122F, so as to allow the raw water to flow into the filtering device 20E through the raw water inlet 1106E, the raw water inlet channel 1011F, the sixth channel 106F, the first channel 101F, the first opening 1101E and the first communicating opening 201E. After the raw water is filtered by the primary filter 22E of the filtering device 20E, the generated purified water flows into the purified water channel 2201E, and the purified water generated by the primary filter 22E is further filtered by the secondary filter 23E to prepare the secondary purified water and the secondary purified water flows out of the third communicating opening 203E through the purified water outlet 2301E, and then it flows out through the fourth opening 1104E, the fourth channel 104F, the seventh channel 107F, the fifth channel 105F and the fifth opening 1105E and is supplied, accordingly, the faucet water purifier is under the first purifying working state at this time. Further, when the rotatable disk 122F of the plane valve 10F is rotated until the first equal division (the first region 2001F) of the second fluid control surface 1220F of the rotatable disk 122F directly faces the eighth equal division (the eighth portion 1208F) of the first fluid control surface 1210F of the fixed disk 121F, the fourth equal division (the fourth region 2004F) and the fifth equal division (the fifth region 2005F) of the second fluid control surface 1220F of the rotatable disk 122F of the plane valve 10F directly faces the third equal division (the third portion 1203F) and the fourth equal division (the fourth portion 1204F) of the first fluid control surface 1210F of the fixed disk 121F, the sixth equal division (the sixth region 2006F) of the second fluid control surface 1220F of the rotatable disk 122F directly faces the fifth equal division (the fifth portion 1205F) of the first fluid control surface 1210F of the fixed disk 121F, so that the sixth channel 106F of the plane valve 10F is communicated with the raw water inlet channel 1011F and the ninth channel 109F respectively, the seventh channel 107F is communicated with the third channel 103F and the fifth channel 105F respectively, and the eighth channel 108F is communicated with the fourth channel 104F, so as to allow the raw water to flow in through the raw water inlet 1106E, the raw water inlet channel 1011F, the sixth channel 106F, the ninth channel 109F, and then flow out through the raw water opening 1109E and be supplied, accordingly, the faucet water purifier is under the raw water supplying working state at this time. Further, when the rotatable disk 122F of the plane valve 10F is rotated until the first equal division (the first region 2001F) of the second fluid control surface 1220F of the rotatable disk 122F directly faces the seventh equal division (the seventh portion 1207F) of the first fluid control surface 1210F of the fixed disk 121F, the fourth equal division (the fourth region 2004F) and the fifth equal division (the fifth region 2005F) of the second fluid control surface 1220F of the rotatable disk 122F of the plane valve 10F directly faces the second equal division (the second portion 1202F) and the third equal division (the third portion 1203F) of the first fluid control surface 1210F of the fixed disk 121F, the sixth equal division (the sixth region 2006F) of the second fluid control surface 1220F of the rotatable disk 122F directly faces the fourth equal division (the fourth portion 1204F) of the first fluid control surface 1210F of the fixed disk 121F, so that the sixth channel 106F of the plane valve 10F is communicated with the raw water inlet channel 1011F and the first channel 101F respectively, the seventh channel 107F is communicated with the second channel 102F and the third channel 103F respectively, and the eighth channel 108F is communicated with the fifth channel 105F, so as to allow the raw water to flow into the filtering device 20E through the raw water inlet 1106E, the raw water inlet channel 1011F, the sixth channel 106F, the first channel 101F, the first opening 1101E and the first communicating opening 201E. After the raw water is filtered by the primary filter 22E of the filtering device 20E, it flows out through the purified water channel 2201E and the second communicating opening 202E of the filtering device 20E, and then it flows out through the second opening 102E, the second channel 102F, the seventh channel 107F, the third channel 103F and the third opening 1103E and is supplied, accordingly, the faucet water purifier is under the second purifying working state at this time.

It is worth mentioning that when the users need to switch the faucet water purifier according to the first embodiment of the present invention from the back flushing working state to the first purifying working state, only need to anticlockwise rotate the rotatable disk 122F of the plane valve 10F for one equal division angle, so that the first region 2001F of the second fluid control surface 1220F of the rotatable disk 122F directly faces the third portion 1201F of the first fluid control surface 1210F of the fixed disk 121F; when the users need to switch the faucet water purifier according to the first embodiment of the present invention from the first purifying working state to the raw water supplying working state, only need to anticlockwise rotate the rotatable disk 122F of the plane valve 10F for one equal division angle again, so that the first region 2001F of the second fluid control surface 1220F of the rotatable disk 122F directly faces the eighth portion 1208F of the first fluid control surface 1210F of the fixed disk 121F; when the users need to switch the faucet water purifier according to the first embodiment of the present invention from the raw water supplying working state to the second purifying working state, only need to anticlockwise rotate the rotatable disk 122F of the plane valve 10F for one equal division angle again, so that the first region 2001F of the second fluid control surface 1220F of the rotatable disk 122F directly faces the seventh portion 1207F of the first fluid control surface 1210F of the fixed disk 121F, as shown in FIG. 16 to FIG. 24D. In other words, the structure of the plane valve 10F of the faucet water purifier of the present invention enables the four working states of the second purifying working state, the raw water supplying working state, the first purifying working state and the back flushing working state to be continuously distributed, so that the complete switching between two adjacent working states of the second purifying working state, the raw water supplying working state, the first purifying working state and the back flushing working state of the faucet water purifier of the present invention can be realized only by rotating the rotatable disk 122F of the plane valve 10F for one equal division angle. The switching mode between the four working states of the faucet water purifier determined by the structure of the plane valve 10F of the faucet water purifier of the present invention will make the switching between the four working states of the faucet water purifier of the present invention more in line with the usage habits of the users and not easily cause an error in working state switching due to the different rotation angles when the users switch the working states. It is appreciated that since the edge portion 12102F of the first fluid control surface 1210F of the plane valve 10F of the faucet water purifier according to the first embodiment of the present invention is divided into eight equal divisions, and the edge region 12202F of the second fluid control surface 1220F of the rotatable disk 122F of the plane valve 10F is divided into eight equal divisions, accordingly, each time the faucet water purifier of the present invention realizes one working state switching, the rotatable disk 122F of the plane valve 10F rotates 45 degrees. In other words, one equal division angle of the rotatable disk 122F and the fixed disk 121F of the plane valve 10F is 45 degrees. Alternatively, the edge portion 12102F of the first fluid control surface 1210F is equally divided anticlockwise into the first portion 1201F, the second portion 1202F, the third portion 1203F, the fourth portion 1204F, the fifth portion 1205F, the sixth portion 1206F, the seventh portion 1207F and the eighth portion 1208F, the edge region 12202F of the second fluid control surface 1220F of the rotatable disk 122F of the plane valve 12F is equally divided anticlockwise into the first region 2001F, the second region 2002F, the third region 2003F, the fourth region 2004F, the fifth region 2005F, the sixth region 2006F, the seventh region 2007F and the eighth region 2008F. At this time, the structure of the plane valve 10F of the faucet water purifier of the present invention enables the four working states of the back flushing working state, the first purifying working state, the raw water supplying working state and the second purifying working state to be continuously distributed, so that the complete switching between two adjacent working states of the back flushing working state, the first purifying working state, the raw water supplying working state and the second purifying working state of the faucet water purifier of the present invention can be realized only by rotating the rotatable disk 122F of the plane valve 10F for one equal division angle.

As shown in FIG. 16, the plane valve 10F of the faucet water purifier according to the first embodiment of the present invention further includes a stopper 14F, wherein the stopper 14F is provided to prevent the invalid rotating of the rotatable disk 122F of the plane valve 10F relative to the fixed disk 121F. In other words, when the rotatable disk 122F of the plane valve 10F is rotated until the first region 2001F of the second fluid control surface 1220F of the rotatable disk 122F directly faces the second portion 1202F of the first fluid control surface 1210F of the fixed disk 121F, the faucet water purifier of the present invention is switched to the back flushing working state, rotate clockwise the rotatable disk 122F of the plane valve 10F by an equal angle, communicate the sixth channel 106F of the plane valve 10F with the raw water inlet channel 1011F and the third channel 103F respectively, so as to make the raw water flow from the raw water inlet channel 1011F and the sixth channel 106F to the third channel 103F and further flow out from the third opening 1103E; and when the rotatable disk 122F of the plane valve 10F is rotated until the first region 2001F of the second fluid control surface 1220F of the rotatable disk 122F directly faces the seventh portion 1207F of the first fluid control surface 1210F of the fixed disk 121F, the faucet water purifier of the present invention is switched to the second purifying working state, rotate anticlockwise the rotatable disk 122F of the plane valve 10F by an equal angle, make the sixth channel 106F of the plane valve 10F be communicated merely with the raw water inlet channel 1011F. The above two rotation modes of the rotatable disk 122F of the plane valve 10F relative to the disk 121F cannot make the faucet water purifier of the present invention realize practical functions, which are invalid rotations.

As shown in FIG. 16, the stopper 14F of the faucet water purifier according to the first embodiment of the present invention comprises a first stopping member 141F and a second stopping member 142F, wherein the first stopping member 141F and the second stopping member 142F are respectively provided on the valve body 11E, the first stopping member 141F is arranged to prevent the knob 80 from further clockwise rotation when the rotatable disk 122F of the plane valve 10F is rotated so that the first region 2001F of the second fluid control surface 1220F of the rotatable disk 122F directly faces the second portion 1202F of the first fluid control surface 1210F of the fixed disk 121F; the second stopping member 142F is provided to prevent the knob 80 from further anticlockwise rotation when the rotatable disk 122F of the plane valve 10F is rotated so that the rotatable disk 122F of the plane valve 10F is rotated until the first region 2001F of the second fluid control surface 1220F of the rotatable disk 122F directly faces the seventh portion 1207F of the first fluid control surface 1210F of the fixed disk 121F, so as to prevent the rotatable disk 122F of the plane valve 10F from rotating meaninglessly relative to the fixed disk 121F. The stopper 14F of the faucet water purifier according to the first embodiment of the present invention further comprises a blocker 143F, wherein the blocker 143F is provided at the knob 80 and protruded outward from the knob 80, so as to enable the blocker 143F to be blocked by the first stopping member 141F when the first region 2001F of the second fluid control surface 1220F of the rotatable disk 122F directly faces the second portion 1202F of the first fluid control surface 1210F of the fixed disk 121F, and be blocked by the second stopping member 142F when the rotatable disk 122F of the plane valve 10F is rotated so that the rotatable disk 122F of the plane valve 10F is rotated until the first region 2001F of the second fluid control surface 1220F of the rotatable disk 122F directly faces the seventh portion 1207F of the first fluid control surface 1210F of the fixed disk 121F.

As shown in FIG. 16, the plane valve 10F of the faucet water purifier according to the first embodiment of the present invention further comprises a reminding mechanism 15F, wherein the reminding mechanism 15F is provided to give a block to the knob 80 when the user switches the faucet water purifier of the present invention to the back flushing working state, so that the user has to significantly increase the rotating force of rotating the knob 80, the knob 80 can be rotated to continue to rotate and switch the faucet water purifier of the present invention to the back flushing working state. In this way, the user can be reminded that the faucet water purifier of the present invention is switched to the back flushing working state.

As shown in FIG. 16, the reminding mechanism 15F of the plane valve 10F of the faucet water purifier according to the first embodiment of the present invention comprises a driven member 151F and an elastic element 152F, wherein the driven member 151F comprises a driven end 1511F and a fixed end 1512F extended from the driven end 1511F, wherein the elastic element 152F is provided at the fixed end 1512F, the driven end 1511F is provided to face the knob 80, wherein when the user rotates the rotatable disk 122F of the plane valve 10F to make the first region 2001F of the second fluid control surface 1220F of the rotatable disk 122F directly face the second portion 1202F of the first fluid control surface 1210F of the fixed disk 121F, the driven end 1511F of the driven member 151F of the reminding mechanism 15F will block the blocker 143F, when the user increases the force to rotate the knob 80, the blocker 143F drives the driven end 1511F of the driven member 151F, so as to deform the elastic element 152F and continue to rotate the knob 80, and make the rotatable disk 122F to continue rotate and the first region 2001F of the second fluid control surface 1220F of the rotatable disk 122F directly face the second portion 1202F of the first fluid control surface 1210F of the fixed disk 121F. Preferably, the elastic element 152F is a spring.

As shown in FIG. 16, the valve body 11E further comprises a valve main body 111E and a valve housing 112E, wherein the valve housing 112E is provided on the outer surface of the valve main body 111E. It is appreciated that the first stopping member 141F, the second stopping member 142F and the reminding mechanism 15F are respectively provided on the valve housing 112E of the valve body 11E. Further, the valve housing 112E of the valve body 11E includes an upper housing 1121E and a lower housing 1122E, wherein the upper housing 1121E and the lower housing 1122E of the valve housing 112E form a valve body cavity 1120E therebetween, wherein the valve body cavity 1120E is provided to receive the valve main body 111E of the valve body 11E.

As shown in FIG. 16 to FIG. 24D, according to the first embodiment of the present invention, the present invention further provides a valve disk assembly for a plane valve of a faucet water purifier, which comprises a fixed disk 121F and a rotatable disk 122F, wherein the fixed disk 121F has a first fluid control surface 1210F, the rotatable disk 122F has a second fluid control surface 1220F, wherein the rotatable disk 122F and the fixed disk 121F are both disposed inside the valve cavity 110E, wherein the second fluid control surface 1220F of the rotatable disk 122F is provided on the first fluid control surface 1210F of the fixed disk 121F, and the rotatable disk 122F is provided to be capable of rotating relative to the fixed disk 121F, wherein the plane valve 10F has a first channel 101F, a second channel 102F, a third channel 103F, a fourth channel 104F, a fifth channel 105F, a sixth channel 106F, a seventh channel 107F, an eighth channel 108F and a raw water inlet channel 1011F, wherein the first channel 101F, the second channel 102F, the third channel 103F, the fourth channel 104F, the fifth channel 105F and the raw water inlet channel 1011F are arranged at the fixed disk 121F respectively and extended from the first fluid control surface 1210F of the fixed disk 121F respectively; the sixth channel 106F, the seventh channel 107F and the eighth channel 108F are arranged at the rotatable disk 122F respectively and extended from the second fluid control surface 1220F of the rotatable disk 122F respectively, wherein the first channel 101F is communicated with the first opening 1101E, the second channel 102F is communicated with the second opening 1102E, the third channel 103F is communicated with the third opening 1103E, the fourth channel 104F is communicated with the fourth opening 1104E, the fifth channel 105F is communicated with the fifth opening 1105E, the sixth channel 106F is communicated with the raw water inlet channel 1011F, the raw water inlet channel 1011F is communicated with the raw water inlet 1106E, the eighth channel 108F is communicated with the draining opening 1108E. Preferably, the eighth channel 108F and the draining opening 1108E are communicated with the valve cavity 110E respectively, so that the eighth channel 108F is communicated with the draining opening 1108E. More preferably, the sixth channel 106F and the seventh channel 107F of the rotatable disk 122F are preferably communicating blind holes. The plane valve 10F further has the ninth channel 109F, wherein the ninth channel 109F is provided at the fixed disk 121F and extended from the first fluid control surface 1210F of the fixed disk 121F, wherein the ninth channel 109F is communicated with the raw water opening 1109E.

As shown in FIG. 25 to FIG. 33D, the control valve 10G of the faucet water purifier according to the first embodiment of the present invention comprises a valve body 11E and a valve core 12G, wherein the valve body 11E defines a valve cavity 110E, a first opening 1101E, a second opening 1102E, a third opening 1103E, a fourth opening 1104E, a fifth opening 1105E, a raw water inlet 1106E and a draining opening 1108E, wherein the valve core 12G is provided at the valve cavity 110E, wherein the first opening 1101E of the valve body 11E is adapted to be communicated with the first communicating opening 201E of the filtering device 20E, the second opening 1102E of the valve body 11E is adapted to be communicated with the second communicating opening 202E of the filtering device 20E, the fourth opening 1104E of the valve body 11E is adapted to be communicated with the third communicating opening 203E of the filtering device 20E, the fifth opening 1105E of the valve body 11E is adapted to be communicated with a first water outlet 100E, the third opening 1103E of the valve body 11E is adapted to be communicated with a second water outlet 200E, the raw water inlet 1106E of the valve body 11E is adapted to be communicated with a raw water source (for example, a water outlet of a faucet).

As shown in FIG. 25 to FIG. 33D, the control valve 10G of the faucet water purifier according to the first embodiment of the present invention has a first purifying working position, wherein when the control valve 10G is under the first purifying working position, the valve core 12G of the control valve 10G defines a first communicating passage 1001G and a second communicating passage 1002G, wherein the first communicating passage 1001G is communicated with the first opening 1101E of the valve body 11E and the raw water inlet 1106E respectively, the second communicating passage 1002G is communicated with the fourth opening 1104E of and the fifth opening 1105E the valve body 11E respectively. Further, when the control valve 10G is under the first purifying working position, the second opening 1102E of the valve body 11E is not communicated with the third opening 1103E. In other words, when the control valve 10G is under the first purifying working position, the second opening 1102E of the valve body 11E cannot communicate with the third opening 1103E. Accordingly, when the control valve 10G is under the first purifying working position, under the action of water pressure, the raw water or the tap water flows into the raw water inlet 1106E of the valve body 11E of the control valve 10G, and then flows to the first opening 1101E of the valve body 11E through the first communicating passage 1001G, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. Further, when the control valve 10G is under the first purifying working position, the second opening 1102E of the valve body 11E cannot communicate with the third opening 1103E, so that the purified water inside the purified water channel 2201E cannot flow freely through the second communicating opening 202E of the filtering device 20E under the control the control valve 10G. Therefore, the purified water generated by the primary filter 22E is further purified and treated by the secondary filter 23E, the purified water generated by the secondary filter 23E flows out from the third communicating opening 203E through the purified water outlet 2301E, and flows through the fourth opening 1104E, the second communicating passage 1002G and the fifth opening 1105E in sequence, so that the purified water generated by the secondary filter 23E can be provided through the first water outlet 100E communicated with the fifth opening 1105E. Preferably, the secondary filter 23E is an ultrafiltration filter. Accordingly, the purified water generated by the secondary filter 23E can be directly drunk. It is appreciated that when the control valve 10G of the faucet water purifier according to the first embodiment of the present invention is controlled under the first purifying working position, the faucet water purifier of the present invention is controlled under its first purifying working state.

As shown in FIG. 25 to FIG. 33D, the control valve 10G of the faucet water purifier according to the first embodiment of the present invention has a back flushing working position, wherein when the control valve 10G is under the back flushing working position, the valve core 12G of the control valve 10G defines a third communicating passage 1003G and a fourth communicating passage 1004G, wherein the third communicating passage 1003G is communicated with the second opening 1102E of the valve body 11E and the raw water inlet 1106E respectively, the fourth communicating passage 1004G is communicated with the first opening 1101E of the valve body 11E and the draining opening 1108E respectively. Accordingly, when the control valve 10G is under the back flushing working position, under the action of water pressure, the raw water or the tap water flows into the raw water inlet 1106E of the valve body 11E of the control valve 10G, and flows to the second opening 1102E of the valve body 11E through the third communicating passage 1003G, and further flows into the filtering device 20E through the second communicating opening 202E of the filtering device 20E, the raw water flows into the primary filter 22E through the purified water channel 2201E of the filtering device 20E under the action of water pressure, after the raw water back flushes the primary filter 22E, the generated waste water flows into the raw water channel 2101E. At this time, since the first opening 1101E of the valve body 11E is communicated with the draining opening 1108E through the fourth communicating passage 1004G, therefore, the waste water generated by using the raw water to back-flush the primary filter 22E flows into the raw water channel 2101E and flows out of the first communicating opening 201E, and flows through the first opening 1101E, the fourth communicating passage 1004G and the draining opening 1108E in sequence, so that the waste water generated by using the raw water to back-flush the primary filter 22E can flow out through the draining opening 1108E. It is appreciated that when the control valve 10G of the faucet water purifier according to the first embodiment of the present invention is controlled under the back flushing working position, the faucet water purifier of the present invention is controlled under its back flushing working state.

As shown in FIG. 25 to FIG. 33D, the control valve 10G of the faucet water purifier according to the first embodiment of the present invention further has a raw water opening 1109E, wherein the control valve 10G further has a raw water supplying working position, wherein when the control valve 10G is under the raw water supplying working position, the valve core 12G of the control valve 10G defines a fifth communicating passage 1005G, wherein the fifth communicating passage 1005G is communicated with the raw water opening 1109E of the valve body 11E and the raw water inlet 1106E respectively, so that the raw water or the tap water can be supplied by the raw water opening 1109E. Further, when the control valve 10G is under the raw water supplying working position, the raw water inlet 1106E is not communicated with every of the first opening 1101E, the second opening 1102E, the third opening 1103E, the fourth opening 1104E and the fifth opening 1105E. It is appreciated that when the control valve 10G of the faucet water purifier according to the first embodiment of the present invention is controlled under the raw water supplying working position, the faucet water purifier of the present invention is controlled under its raw water supplying working position working state. Preferably, the raw water opening 1109E of the control valve 10G defines the raw water outlet of the faucet water purifier of the present invention.

As shown in FIG. 25 to FIG. 33D, the control valve 10G of the faucet water purifier according to the first embodiment of the present invention has a second purifying working position, wherein when the control valve 10G is under the second purifying working position, the valve core 12G of the control valve 10G defines a sixth communicating passage 1006G and a seventh communicating passage 1007G, wherein the sixth communicating passage 1006G is communicated with the first opening 1101E of the valve body 11E and the raw water inlet 1106E respectively, the seventh communicating passage 1007G is communicated with the second opening 1102E and the third opening 1103E of the valve body 11E respectively. Further, when the control valve 10G is under the second purifying working position, the fourth opening 1104E of the valve body 11E is not communicated with the fifth opening 1105E. In other words, when the control valve 10G is under the second purifying working position, the fourth opening 1104E of the valve body 11E cannot communicate with the fifth opening 1105E. Accordingly, when the control valve 10G is under the second purifying working position, under the action of water pressure, the raw water or the tap water flows into the raw water inlet 1106E of the valve body 11E of the control valve 10G, and then flows to the first opening 1101E of the valve body 11E through the sixth communicating passage 1006G, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. At this time, since the second opening 1102E of the valve body 11E is communicated with the third opening 1103E through the seventh communicating passage 1007G, therefore, after the purified water generated by the primary filter 22E flows into the purified water channel 2201E, it flows out through the second communicating opening 202E, and flows through the second opening 1102E, the seventh communicating passage 1007G and the third opening 1103E in sequence, so that the purified water generated by the primary filter 22E can be provided through the second water outlet 200E communicated with the third opening 1103E. It is appreciated that when the control valve 10G of the faucet water purifier according to the first embodiment of the present invention is controlled under the second purifying working position, the faucet water purifier of the present invention is controlled under its second purifying working state. As shown in FIG. 25 to FIG. 33D, the control valve 10G of the faucet water purifier according to the first embodiment of the present invention is a plane valve, wherein the valve core 12G of the plane valve 10G further comprises a fixed disk 121G and a rotatable disk 122G, wherein the fixed disk 121G has a first fluid control surface 1210G, the rotatable disk 122G has a second fluid control surface 1220G, wherein the rotatable disk 122G and the fixed disk 121G are both disposed inside the valve cavity 110E, wherein the second fluid control surface 1220G of the rotatable disk 122G is provided on the first fluid control surface 1210G of the fixed disk 121G, and the rotatable disk 122G is provided to be capable of rotating relative to the fixed disk 121G.

As shown in FIG. 25 to FIG. 33D, the plane valve 10G of the faucet water purifier according to the first embodiment of the present invention has a first channel 101G, a second channel 102G, a third channel 103G, a fourth channel 104G, a fifth channel 105G, a sixth channel 106G, a seventh channel 107G and an eighth channel 108G, wherein the first channel 101G, the second channel 102G, the third channel 103G, the fourth channel 104G, the fifth channel 105G and the eighth channel 108G are provided at the fixed disk 121G respectively and extended from the first fluid control surface 1210G of the fixed disk 121G respectively; the sixth channel 106G and the seventh channel 107G are provided at the rotatable disk 122G respectively and extended from the second fluid control surface 1220G of the rotatable disk 122G respectively, wherein the first channel 101G is communicated with the first opening 1101E, the second channel 102G is communicated with the second opening 1102E, the third channel 103G is communicated with the third opening 1103E, the fourth channel 104G is communicated with the fourth opening 1104E, the fifth channel 105G is communicated with the fifth opening 1105E, the sixth channel 106G is communicated with the raw water inlet 1106E, the eighth channel 108G is communicated with the draining opening 1108E. Preferably, the raw water inlet 1106E and the sixth channel 106G are communicated with the valve cavity 110E respectively, so that the sixth channel 106G is communicated with the raw water inlet 1106E. More preferably, the seventh channel 107G of the rotatable disk 122G is a communicating blind hole. Preferably, the first channel 101G is provided between the third channel 103G and the eighth channel 108G, and the ninth channel 109G is provided at the outer side of the first channel 101G. More preferably, the ninth channel 109G and the first channel 101G are provided between the third channel 103G and the eighth channel 108G.

As shown in FIG. 25 to FIG. 33D, the first fluid control surface 1210G of the fixed disk 121G of the plane valve 10G of the faucet water purifier according to the first embodiment of the present invention defines an inner portion 12101G and an edge portion 12102G extended outward from the inner portion 12101G, the first channel 101G, the third channel 103G, the second channel 102G, the fourth channel 104G, the fifth channel 105G and the eighth channel 108G of the plane valve 10G are arranged clockwise on the edge portion 12102G of the first fluid control surface 1210G of the fixed disk 121G in this order. Alternatively, the first channel 101G, the third channel 103G, the second channel 102G, the fourth channel 104G, the fifth channel 105G and the eighth channel 108G of the plane valve 10G are arranged anticlockwise at the first fluid control surface 1210G of the fixed disk 121G in this order. In other words, the first channel 101G, the third channel 103G, the second channel 102G, the fourth channel 104G, the fifth channel 105G and the eighth channel 108G of the plane valve 10G are provided to surround the inner portion 12101G. Preferably, the first channel 101G, the third channel 103G, the second channel 102G, the fourth channel 104G, the fifth channel 105G and the eighth channel 108G of the plane valve 10G are spacedly provided at the first fluid control surface 1210G of the fixed disk 121G of the plane valve 10G, the sixth channel 106G and the seventh channel 107G of the plane valve 10G are spacedly arranged at the second fluid control surface 1220G of the rotatable disk 122G.

As shown in FIG. 25 to FIG. 33D, the rotatable disk 122G of the plane valve 10G of the faucet water purifier according to the first embodiment of the present invention is capable of rotating relative to the fixed disk 121G, so that the plane valve 10G has a first purifying working position and a back flushing working position, wherein when the plane valve 10G of the faucet water purifier according to the first embodiment of the present invention is under the first purifying working position, the sixth channel 106G of the plane valve 10G is communicated with the first channel 101G, so as to define the first communicating passage 1001G communicated with the raw water inlet 1106E and the first opening 1101E respectively, the seventh channel 107G is communicated with the fourth channel 104G and the fifth channel 105G respectively, so as to define the second communicating passage 1002G communicated with the fourth opening 1104E and the fifth opening 1105E respectively; as shown in FIG. 25 to FIG. 33D, when the plane valve 10G is under the first purifying working position, the second channel 102G, the third channel 103G and the eighth channel 108G of the plane valve 10G are blocked (or closed) by the rotatable disk 122G respectively. Accordingly, the primary purified water generated by the primary filter 22E will flow to the secondary filter 23E under the action of water pressure, and after it is further purified and treated by the secondary filter 23E, it is provided through the fourth opening 1104E, the second communicating passage 1002G and the fifth opening 1105E. When the plane valve 10G is under the back flushing working position, the sixth channel 106G of the plane valve 10G is communicated with the second channel 102G, so as to define the third communicating passage 1003G communicated with the raw water inlet 1106E and the second opening 1102E respectively, the seventh channel 107G is communicated with the first channel 101G and the eighth channel 108G respectively, so as to define the fourth communicating passage 1004G communicated with the first opening 1101E and the draining opening 1108E respectively. As shown in FIG. 25 to FIG. 33D, when the plane valve 10G of the faucet water purifier according to the first embodiment of the present invention is under the back flushing working position, the third channel 103G, the fourth channel 104G and the fifth channel 105G of the plane valve 10G are blocked (or closed) by the rotatable disk 122G respectively.

As shown in FIG. 25 to FIG. 33D, the plane valve 10G of the water faucet purifier according to the first embodiment of the present invention further has a ninth channel 109G, wherein the ninth channel 109G is provided at the fixed disk 121G and extended from the first fluid control surface 1210G of the fixed disk 121G, wherein the ninth channel 109G is communicated with the raw water opening 1109E, wherein when the plane valve 10G is under the raw water supplying working position, the sixth channel 106G of the plane valve 10G is communicated with the ninth channel 109G, so as to define the fifth communicating passage 1005G communicating with the raw water inlet 1106E and the raw water opening 1109E respectively to allow the raw water to flow into the raw water inlet 1106E and further be supplied through the sixth channel 106G, the ninth channel 109G and the raw water opening 1109E, wherein when the plane valve 10G is under the raw water supplying working position, the first channel 101G, the third channel 103G, the fifth channel 105G and the eighth channel 108G of the plane valve 10G are respectively blocked by the rotatable disk 122G.

As shown in FIG. 25 to FIG. 33D, the plane valve 10G of the faucet water purifier according to the first embodiment of the present invention further has a second purifying working position, wherein when the plane valve 10G is under the second purifying working position, the sixth channel 106G of the plane valve 10G is communicated with the first channel 101G, so as to define the sixth communicating passage 1006G communicated with the raw water inlet 1106E and the first opening 1101E respectively, the seventh channel 107G is communicated with the second channel 102G and the third channel 103G respectively, so as to define the seventh communicating passage 1007G communicated with the second opening 1102E and the third opening 1103E respectively. When the plane valve 10G of the faucet water purifier according to the first embodiment of the present invention is under the second purifying working position, the fourth channel 104G of the plane valve 10G is blocked (or closed) by the rotatable disk 122G, so that the water inside the fourth channel 104G cannot flow freely, accordingly, the primary purified water generated by the primary filter 22E will flow to the second opening 1102E under the action of water pressure, and be provided through the seventh communicating passage 1007G and the third opening 1103E, and when the plane valve 10G of the faucet water purifier according to the first embodiment of the present invention is under the second purifying working position, the fifth channel 105G and the eighth channel 108G of the plane valve 10G are blocked (or closed) by the rotatable disk 122G respectively.

As shown in FIG. 25 to FIG. 33D, the first opening 1101E, the second opening 1102E, the fourth opening 1104E and the fifth opening 1105E of the plane valve 10G of the faucet water purifier according to the first embodiment of the present invention are provided at a same side of the valve body 11E of the plane valve 10G. Further, the raw water opening 1109E of the plane valve 10G is provided at a bottom the valve body 11E of the plane valve 10G.

As shown in FIG. 25 to FIG. 33D, the first channel 101G of the plane valve 10G of the faucet water purifier according to the first embodiment of the present invention has a first communicating part 10101G, a second communicating part 10102G and a third communicating part 10103G extended between the first communicating part 10101G and the second communicating part 10102G, wherein the ninth channel 109G of the plane valve 10G is arranged at the outside of the third communicating part 10103G, wherein when the plane valve 10G is under the first purifying working position, the first communicating part 10101G of the first channel 101G of the plane valve 10G is communicated with the sixth channel 106G and the seventh channel 107G is communicated with the fourth channel 104G and the fifth channel 105G respectively; when the plane valve 10G is under the back flushing working position, the sixth channel 106G of the plane valve 10G is communicated with the second channel 102G, and the seventh channel 107G of the plane valve 10G is respectively communicated with the second communicating part 10102E of the first channel 101G and the eighth channel 108G; when the plane valve 10G is under the second purifying working position, the second communicating part 10102G of the first channel 101G of the plane valve 10G is communicated with the sixth channel 106G, and the seventh channel 107E is communicated with the second channel 102G and the third channel 103G respectively. As shown in FIG. 25 to FIG. 33D, further, when the plane valve 10G is under the first purifying working position, the second communicating part 10102G of the first channel 101G of the plane valve 10G is blocked by the rotatable disk 122G; when the plane valve 10G is under the back flushing working position, the first communicating part 10101G of the first channel 101G of the plane valve 10G is blocked by the rotatable disk 122G; when the plane valve 10G is under the second purifying working position, the first communicating part 10101G of the first channel 101G of the plane valve 10G is blocked by the rotatable disk 122G. Preferably, the third communicating part 10103G of the first channel 101G is arranged on the first fluid control surface 1210G of the fixed disk 121G of the plane valve 10G. Alternatively, the third communicating part 10103G of the first channel 101G is arranged within the fixed disk 121G of the plane valve 10G.

As shown in FIG. 23 to FIG. 33D, the fixed disk 121G of the valve core 12G of the plane valve 10G of the faucet water purifier according to the first embodiment of the present invention comprises an upper end portion 1211G, a lower end portion 1212G and a fixing portion 1213G provided between the upper end portion 1211G and the lower end portion 1212G, wherein the upper end portion 1211G defines the first fluid control surface 1210G of the fixed disk 121G, and the lower end portion 1212G is provided at the valve cavity 110E of the valve body 11E. Preferably, the lower end portion 1212G of the fixed disk 121G of the valve core 12G of the plane valve 10G of the faucet water purifier of the present invention is integrally provided at the inner wall of the valve body 11E of the plane valve 10G.

As shown in FIG. 25 to FIG. 33D, the plane valve 10G of the faucet water purifier according to the first embodiment of the present invention further comprises a sealing assembly 13G, wherein the sealing assembly 13G has a first seal 131G, wherein the first seal 131G is provided between the upper end portion 1211G and the fixing portion 1213G of the fixed disk 121G. Further, the first seal 131G has a plurality of first sealing strips 1311G, the fixing portion 1213G of the fixed disk 121G has a plurality of first sealing grooves 12130G, wherein the first sealing grooves 12130G are provided to respectively surround the first channel 101G, the second channel 102G, the third channel 103G, the fourth channel 104G, the fifth channel 105G, the eighth channel 108G and the ninth channel 109G (if any) of the fixed disk 121G, the first sealing strips 1311G of the first seal 131G are provided according to the first sealing grooves 12130G of the fixing portion 1213G, so that the first sealing strips 1311G of the first seal 131G can be engaged with the first sealing grooves 12130G of the fixing portion 1213G and realize the sealing between the upper end portion 1211G and the fixing portion 1213G of the fixed disk 121G. It is appreciated that the first sealing grooves 12130G are defined at one side of the fixing portion 1213G, which face the upper end portion 1211G. Further, the sealing assembly 13G has a second seal 132G, wherein the second seal 132G is provided between the fixing portion 1213G and the lower end portion 1212G of the fixed disk 121G. Further, the second seal 132G has a plurality of second sealing strips 1321G, the fixing portion 1213G of the fixed disk 121G has a plurality of second sealing grooves 12131G, wherein the second sealing grooves 12131G are provided to respectively surround the first channel 101G, the second channel 102G, the third channel 103G, the fourth channel 104G, the fifth channel 105G, the eighth channel 108G and the ninth channel 109G of the fixed disk 121G, the second sealing strips 1321G of the second seal 132G are provided according to the second sealing grooves 12131G of the fixing portion 1213G, so that the second sealing strips 1321G of the second seal 132G can be engaged with the second sealing grooves 12131G of the fixing portion 1213G and realize the sealing between the lower end portion 1212G and the fixing portion 1213G of the fixed disk 121G. It is appreciated that the second sealing grooves 12131G are defined at one side of the fixing portion 1213G, which face the lower end portion 1212G.

As shown in FIG. 25 to FIG. 33D, the sealing assembly 13G of the faucet water purifier according to the first embodiment of the present invention further comprises at least one first sealing ring 133G, wherein the first sealing ring 133G is provided at the outer surface of the fixing holder 41, so as to realize the sealing between the fixing holder 41 and the inner wall of the valve body 11E and prevent the raw water from flowing out between the fixing holder 41 and the inner wall of the valve body 11E. Further, the sealing assembly 13G comprises at least one second sealing ring 134G, wherein the second sealing ring 134G is provided between the valve rod 60 and the fixing holder 41, so as to realize the sealing between the valve rod 60 and the inner wall of the fixing holder 41 and prevent water from flowing out between the valve rod 60 and the inner wall of the fixing holder 41.

As shown in FIG. 25 to FIG. 33D, the water inlet opening 401 of the fixing holder 41 of the fixing device 40 of the faucet water purifier according to the first embodiment of the present invention and the raw water inlet 1106E are both communicated with the valve cavity 110E of the valve body 11E of the plane valve 10G, so that the accommodation chamber 410 of the fixing holder 41 is communicated with the raw water inlet 1106E of the valve body 11E through the water inlet opening 401 and the valve cavity 110E of the valve body 11E, and the raw water can flow into the accommodation chamber 410 of the fixing holder 41 through the raw water inlet 1106E of the valve body 11E. As shown in FIG. 25 to FIG. 33D, the accommodation chamber 410 of the fixing holder 41 of the fixing device 40 of the faucet water purifier according to the first embodiment of the present invention is provided to be adapted to accommodate the upper end portion 1211G of the fixed disk 121G and the rotatable disk 122G inside the accommodation chamber 410, the sixth channel 106G of the plane valve 10G is provided to communicate with the accommodation chamber 410 of the fixing holder 41, so that raw water can be provided to the sixth channel 106G of the plane valve 10G through the water inlet opening 401 and the accommodation chamber 410 of the fixing holder 41. In other words, the sixth channel 106G of the plane valve 10G is communicated with the raw water inlet 1106E of the valve body 11E through the accommodation chamber 410 of the fixing holder 41, the water inlet opening 401 and the valve cavity 110E of the valve body 11E. As shown in FIG. 25 to FIG. 33D, further, the upper end portion 1211G of the fixed disk 121G is adapted to be detachably clamped at the fixing portion 1213G of the fixed disk 121G, the fixing portion 1213G of the fixed disk 121G is adapted to be detachably clamped at the lower end portion 1212G of the fixed disk 121G, so that the upper end portion 1211G of the fixed disk 121G cannot rotate relative to the fixing portion 1213G, the fixing portion 1213G of the fixed disk 121G cannot rotate relative to the lower end portion 1212G.

As shown in 25 to FIG. 33D, the first fluid control surface 1210G of the fixed disk 121G of the plane valve 10G of the faucet water purifier according to the first embodiment of the present invention has an inner portion 12101G and an edge portion 12102G extended outward from the inner portion 12101G, which are shown by the dashed lines, wherein the inner portion 12101G and the edge portion 12102G are provided at a top end portion 1214G of the fixed disk 121G, and the edge portion 12102G (or the part other than the inner portion 12101G) of the first fluid control surface 1210G are equally divided into a first portion 1201G, a second portion 1202G, a third portion 1203G, a fourth portion 1204G, a fifth portion 1205G, a sixth portion 1206G, a seventh portion 1207G and an eighth portion 1208G, which are shown by the dashed lines, the second fluid control surface 1220G of the rotatable disk 122G of the plane valve 10G has an inner region 12201G and an edge region 12202G extended outward from the inner region 12201G, which are shown by the dashed lines, wherein the inner region 12201G and the edge region 12202G are provided at a bottom end portion 1221G of the rotatable disk 122G, and the edge region 12202G (or the part other than the inner region 12201G) of the second fluid control surface 1220G are equally divided into a first region 2001G, a second region 2002G, a third region 2003G, a fourth region 2004G, a fifth region 2005G, a sixth region 2006G, a seventh region 2007G and an eighth region 2008G, which are shown by the dashed lines, wherein the first channel 101G is extended downward from the first portion 1201G and the seventh portion 1207G of the first fluid control surface 1210G of the fixed disk 121G, the first channel 101G is further extended downward from the eighth portion 1208G of the first fluid control surface 1210G of the fixed disk 121G, the second channel 101G is extended downward from the third portion 1203G of the first fluid control surface 1210G of the fixed disk 121G, the third channel 103G is extended downward from the second portion 1202G of the first fluid control surface 1210G of the fixed disk 121G, the fourth channel 104G is extended downward from the fourth portion 1205G of the first fluid control surface 1210G of the fixed disk 121G, the fifth channel 105G is extended downward from the fifth portion 1205G of the first fluid control surface 1210G of the fixed disk 121G, the sixth channel 106G is extended upward from the first region 2001G of the second fluid control surface 1220G of the rotatable disk 122G, the seventh channel 107G is extended upward from the fourth region 2004G and the fifth region 2005G of the second fluid control surface 1220G of the rotatable disk 122G, the eighth channel 108G is extended downward from the sixth portion 1206G of the first fluid control surface 1210G of the fixed disk 121G. As shown in FIG. 25 to FIG. 33D, preferably, the edge portion 12102G of the first fluid control surface 1210G are equally divided clockwise into the first portion 1201G, the second portion 1202G, the third portion 1203G, the fourth portion 1204G, the fifth portion 1205G, the sixth portion 1206G, the seventh portion 1207G and the eighth portion 1208G, the edge region 12202G of the second fluid control surface 1220G of the rotatable disk 122G of the plane valve 12G are equally divided clockwise into the first region 2001G, the second region 2002G, the third region 2003G, the fourth region 2004G, the fifth region 2005G, the sixth region 2006G, the seventh region 2007G and the eighth region 2008G. Further, the ninth channel 109G is extended downward from the eighth portion 1208G of the first fluid control surface 1210G of the fixed disk 121G. In other words, the first fluid control surface 1210G of the fixed disk 121G of the plane valve 10G defines eight equal divisions, and the second fluid control surface 1220G of the rotatable disk 122G of the plane valve 10G defines eight equal divisions, wherein when the rotatable disk 122G of the plane valve 10G is rotated until the first division (the first region 2001G) of the second fluid control surface 1220G of the rotatable disk 122G directly faces the third division (the fourth portion 1203G) of the first fluid control surface 1210G of the fixed disk 121G, the fourth division (the fourth region 2004G) and the fifth division (the fifth region 2005G) of the second fluid control surface 1220G of the rotatable disk 122G of the plane valve 10G directly face the sixth division (the sixth portion 1206G) and the seventh division (the seventh portion 1207G) of the first fluid control surface 1210G of the fixed disk 121G, so that the sixth channel 106G of the plane valve 10G is communicated with the second channel 102G, and the seventh channel 107G is communicated with the first channel 101G and the eighth channel 108G respectively, so as to allow the raw water to flow into the filtering device 20E through the raw water inlet 1106E, the sixth channel 106G, the second channel 102G, the second opening 1102G and the second communicating opening 202G. After the raw water back flushes (referring to the flow direction of the water in the primary filter 22E during the back flushing is opposite to the flow direction of the water in the primary filter 22E during the filtering) the primary filter 22E of the filtering device 20E, the raw water flows out through the first communicating opening 201E of the filtering device 20E, and then flows out through the first opening 1101E, the first channel 101G, the seventh channel 107G, the eighth channel 108G and the draining opening 1108E, accordingly, the faucet water purifier is under the back flushing working state at this time. Further, when the rotatable disk 122G of the plane valve 10G is rotated until the first division (the first region 2001G) of the second fluid control surface 1220G of the rotatable disk 122G directly faces the first division (the first portion 1201G) of the first fluid control surface 1210G of the fixed disk 121G, the fourth division (the fourth region 2004G) and the fifth division (the fifth region 2005G) of the second fluid control surface 1220G of the rotatable disk 122G of the plane valve 10G directly face the fourth division (the fourth portion 1204G) and the fifth division (the fifth portion 1205G) of the first fluid control surface 1210G of the fixed disk 121G, so that the sixth channel 106G of the plane valve 10G is communicated with the first channel 101G, and the seventh channel 107G is communicated with the fourth channel 104G and the fifth channel 105G respectively, so as to allow the raw water to flow into the filtering device 20E through the raw water inlet 1106E, the sixth channel 106G, the first channel 101G, the first opening 1101E and the first communicating opening 201E. After the raw water is filtered by the primary filter 22E of the filtering device 20E, the generated purified water flows into the purified water channel 2201E of the filtering device 20E, and the secondary purified water that the purified water generated by the primary filter 22E further filtered by the secondary filter 23E flows out the third communicating opening 203E through the purified water outlet 2301E, then flows out and is provided through the fourth opening 1104E, the fourth channel 104G, the seventh channel 107G, the fifth channel 105G and the fifth opening 1105E, accordingly, the faucet water purifier is under the first purifying working state at this time. Further, when the rotatable disk 122G of the plane valve 10G is rotated until the first equal division (the first region 2001G) of the second fluid control surface 1220G of the rotatable disk 122G directly faces the eighth equal division (the eighth portion 1208G) of the first fluid control surface 1210G of the fixed disk 121G, the fourth equal division (the fourth region 2004G) and the fifth equal division (the fifth region 2005G) of the second fluid control surface 1220G of the rotatable disk 122G of the plane valve 10G directly face the third equal division (the third portion 1203G) and the fourth equal division (the fourth portion 1204G) of the first fluid control surface 1210G of the fixed disk 121G, so that the sixth channel 106G of the plane valve 10G is communicated with the ninth channel 109G, the seventh channel 107G is communicated with the second channel 102G and the fourth channel 104G, so as to allow the raw water to flow into the filtering device 20E through the raw water inlet 1106E, the sixth channel 106G, the ninth channel 109G, and then flow out through the raw water opening 1109E and be supplied, accordingly, the faucet water purifier is under the raw water supplying working state at this time. Further, when the rotatable disk 122G of the plane valve 10G is rotated until the first division (the first region 2001G) of the second fluid control surface 1220G of the rotatable disk 122G directly faces the seventh division (the seventh portion 1207G) of the first fluid control surface 1210G of the fixed disk 121G, the fourth equal division (the fourth region 2004G) and the fifth equal division (the fifth region 2005G) of the second fluid control surface 1220G of the rotatable disk 122G of the plane valve 10G directly face the second equal division (the second portion 1202G) and the third equal division (the third portion 1203G) of the fixed disk 121G, so that the sixth channel 106G of the plane valve 10G is communicated with the first channel 101G, and the seventh channel 107G is communicated with the second channel 102G and the third channel 103G respectively, so as to allow the raw water to flow into the filtering device 20E through the raw water inlet 1106E, the sixth channel 106G, the first channel 101G, the first opening 1101E and the first communicating opening 201E. After the raw water is filtered by the primary filter 22E of the filtering device 20E, it flows out through the purified water channel 2201E of the primary filter 22E and the second communicating opening 202E, and then flows out and is provided through the second opening 1102E, the second channel 102G, the seventh channel 107G, the third channel 103G and the third opening 1103E, accordingly, the faucet water purifier is under the second purifying working state at this time.

It is worth mentioning that when the users need to switch the faucet water purifier according to the first embodiment of the present invention from the first purifying working state to the raw water supplying working state, only need to anticlockwise rotate the rotatable disk 122G of the plane valve 10G for one equal division angle, so that the first region 2001G of the second fluid control surface 1220G of the rotatable disk 122G directly faces the eighth portion 1208G of the first fluid control surface 1210G of the fixed disk 121G; when the users need to switch the faucet water purifier according to the first embodiment of the present invention from the raw water supplying working state to the second purifying working state, only need to anticlockwise rotate the rotatable disk 122G of the plane valve 10G for one equal division angle again, so that the first region 2001G of the second fluid control surface 1220G of the rotatable disk 122G directly faces the seventh portion 1207G of the first fluid control surface 1210G of the fixed disk 121G, as shown in FIG. 25 to FIG. 33D. In other words, the structure of the plane valve 10G of the faucet water purifier of the present invention enables the three working states of the second purifying working state, the raw water supplying working state and the first purifying working state to be continuously distributed, so that the complete switching between two adjacent working states of the second purifying working state, the raw water supplying working state and the first purifying working state of the faucet water purifier of the present invention can be realized only by rotating the rotatable disk 122G of the plane valve 10G for one equal division angle. The switching mode between the three working states of the faucet water purifier determined by the structure of the plane valve 10G of the faucet water purifier of the present invention will make the switching between the three working states of the faucet water purifier of the present invention more in line with the usage habits of the users and not easily cause an error in working state switching due to the different rotation angles when the users switch the working states. It is appreciated that since the edge portion 12102G of the first fluid control surface 1210G of the plane valve 10G of the faucet water purifier according to the first embodiment of the present invention is divided into eight equal divisions, and the edge region 12202G of the second fluid control surface 1220G of the rotatable disk 122G of the plane valve 10G is divided into eight equal divisions, accordingly, each of one equal division angle of the rotatable disk 122G of the plane valve 10G and one equal division angle of the fixed disk 121G is 45 degree. Alternatively, the edge portion 12102G of the first fluid control surface 1210G is equally divided anticlockwise into the first portion 1201G, the second portion 1202G, the third portion 1203G, the fourth portion 1204G, the fifth portion 1205G, the sixth portion 1206G, the seventh portion 1207G and the eighth portion 1208G, the edge region 12202G of the second fluid control surface 1220G of the rotatable disk 122G of the plane valve 12G is equally divided anticlockwise into the first region 2001G, the second region 2002G, the third region 2003G, the fourth region 2004G, the fifth region 2005G, the sixth region 2006G, the seventh region 2007G and the eighth region 2008G. At this time, the structure of the plane valve 10G of the faucet water purifier of the present invention enables the three working states of the first purifying working state, the raw water supplying working state and the second purifying working state to be continuously distributed, so that the complete switching between two adjacent working states of the first purifying working state, the raw water supplying working state and the second purifying working state of the faucet water purifier of the present invention can be realized only by rotating the rotatable disk 122G of the plane valve 10G for one equal division angle.

As shown in FIG. 25 to FIG. 33D, according to the first embodiment of the present invention, the present invention further provides a valve disk assembly for a plane valve of a faucet water purifier, which comprises a fixed disk 121G and a rotatable disk 122G, wherein the fixed disk 121G has a first fluid control surface 1210G, the rotatable disk 122G has a second fluid control surface 1220G, wherein the rotatable disk 122G and the fixed disk 121G are both disposed inside the valve cavity 110E, wherein the second fluid control surface 1220G of the rotatable disk 122G is provided on the first fluid control surface 1210G of the fixed disk 121G, and the rotatable disk 122G is provided to be capable of rotating relative to the fixed disk 121G, wherein the plane valve 10G has a first channel 101G, a second channel 102G, a third channel 103G, a fourth channel 104G, a fifth channel 105G, a sixth channel 106G, a seventh channel 107G and an eighth channel 108G, wherein the first channel 101G, the second channel 102G, the third channel 103G, the fourth channel 104G, the fifth channel 105G and the eighth channel 108G are provided at the fixed disk 121G respectively and extended from the first fluid control surface 1210G of the fixed disk 121G respectively; the sixth channel 106G and the seventh channel 107G are provided at the rotatable disk 122G respectively and extended from the second fluid control surface 1220G of the rotatable disk 122G respectively, wherein the first channel 101G is communicated with the first opening 1101E, the second channel 102G is communicated with the second opening 1102E, the third channel 103G is communicated with the third opening 1103E, the fourth channel 104G is communicated with the fourth opening 1104E, the fifth channel 105G is communicated with the fifth opening 1105E, the sixth channel 106G is communicated with the raw water inlet 1106E, the eighth channel 108G is communicated with the draining opening 1108E. Preferably, the seventh channel 107G of the rotatable disk 122G is preferably a communicating blind hole. The plane valve 10G further has a ninth channel 109G, wherein a ninth channel 109G is provided at the fixed disk 121G and extended from the first fluid control surface 1210G of the fixed disk 121G, wherein the ninth channel 109G is communicated with the raw water opening 1109E.

As shown in FIG. 34 to FIG. 42D, the control valve 10E of the faucet water purifier according to the first embodiment of the present invention comprises a valve body 11E and a valve core 12H, wherein the valve body 11E defines a valve cavity 110E, a first opening 1101E, a second opening 1102E, a third opening 1103E, a fourth opening 1104E, a fifth opening 1105E, a raw water inlet 1106E and a draining opening 1108E, wherein the valve core 12H is disposed inside the valve cavity 110E, wherein the first opening 1101E of the valve body 11E is adapted to be communicated with the first communicating opening 201E of the filtering device 20E, the second opening 1102E of the valve body 11E is adapted to be communicated with the second communicating opening 202E of the filtering device 20E, the fourth opening 1104E of the valve body 11E is adapted to be communicated with the third communicating opening 203E of the filtering device 20E, the fifth opening 1105E of the valve body 11E is adapted to be communicated with a first water outlet 100E, the third opening 1103E of the valve body 11E is adapted to be communicated with a second water outlet 200E, the raw water inlet 1106E of the valve body 11E is adapted to be communicated with a raw water source (for example, a water outlet of a faucet).

As shown in FIG. 34 to FIG. 42D, the control valve 10H of the faucet water purifier according to the first embodiment of the present invention has a first purifying working position, wherein when the control valve 10H is under the first purifying working position, the valve core 12H of the control valve 10H defines a first communicating passage 1001H and a second communicating passage 1002H, wherein the first communicating passage 1001H is communicated with the first opening 1101E of the valve body 11E and the raw water inlet 1106E respectively, the second communicating passage 1002H is communicated with the fourth opening 1104E and the fifth opening 1105E of the valve body 11E respectively. Further, when the control valve 10H is under the first purifying working position, the second opening 1102E of the valve body 11E is not communicated with the third opening 1103E. In other words, when the control valve 10H is under the first purifying working position, the second opening 1102E of the valve body 11E cannot communicate with the third opening 1103E. Accordingly, when the control valve 10H is under the first purifying working position, under the action of water pressure, the raw water or the tap water flows into the raw water inlet 1106E of the valve body 11E of the control valve 10H, and then flows to the first opening 1101E of the valve body 11E through the first communicating passage 1001H, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. Further, when the control valve 10H is under the first purifying working position, the second opening 1102E of the valve body 11E cannot communicate with the third opening 1103E, so that the purified water inside the purified water channel 2201E cannot flow freely through the second communicating opening 202E of the filtering device 20E under the control the control valve 10H. Therefore, the purified water generated by the primary filter 22E is further purified and treated by the secondary filter 23E, the purified water generated by the secondary filter 23E flows out from the third communicating opening 203E through the purified water outlet 2301E, and flows through the fourth opening 1104E, the second communicating passage 1002H and the fifth opening 1105E in sequence, so that the purified water generated by the secondary filter 23E can be provided through the first water outlet 100E communicated with the fifth opening 1105E. Preferably, the secondary filter 23E is an ultrafiltration filter. Accordingly, the purified water generated by the secondary filter 23E can be directly drunk. It is appreciated that when the control valve 10H of the faucet water purifier according to the first embodiment of the present invention is controlled under the first purifying working position, the faucet water purifier of the present invention is controlled under its first purifying working state.

As shown in FIG. 34 to FIG. 42D, the control valve 10H of the faucet water purifier according to the first embodiment of the present invention has a back flushing working position, wherein when the control valve 10H is under the back flushing working position, the valve core 12H of the control valve 10H defines a third communicating passage 1003H and a fourth communicating passage 1004H, wherein the third communicating passage 1003H is communicated with the second opening 1102E of the valve body 11E and the raw water inlet 1106E respectively, the fourth communicating passage 1004H is communicated with the first opening 1101E of the valve body 11E and the draining opening 1108E respectively. Accordingly, when the control valve 10H is under the back flushing working position, under the action of water pressure, the raw water or the tap water flows into the raw water inlet 1106E of the valve body 11E of the control valve 10H, and flows to the second opening 1102E of the valve body 11E through the third communicating passage 1003H, and further flows into the filtering device 20E through the second communicating opening 202E of the filtering device 20E, the raw water flows into the primary filter 22E through the purified water channel 2201E of the filtering device 20E under the action of water pressure, after the raw water back flushes the primary filter 22E, the generated waste water flows into the raw water channel 2101E. At this time, since the first opening 1101E of the valve body 11E is communicated with the draining opening 1108E through the fourth communicating passage 1004H, therefore, the waste water generated by using the raw water to back-flush the primary filter 22E flows into the raw water channel 2101E and flows out of the first communicating opening 201E, and flows through the first opening 1101E, the fourth communicating passage 1004H and the draining opening 1108E in sequence, so that the waste water generated by using the raw water to back-flush the primary filter 22E can flow out through the draining opening 1108E. It is appreciated that when the control valve 10H of the faucet water purifier according to the first embodiment of the present invention is controlled under the back flushing working position, the faucet water purifier of the present invention is controlled under its back flushing working state.

As shown in FIG. 34 to FIG. 42D, the control valve 10H of the faucet water purifier according to the first embodiment of the present invention further has a raw water opening 1109E, wherein the control valve 10H further has a raw water supplying working position, wherein when the control valve 10H is under the raw water supplying working position, the valve core 12H of the control valve 10H defines a fifth communicating passage 1005H, wherein the fifth communicating passage 1005H is communicated with the raw water opening 1109E of the valve body 11E and the raw water inlet 1106E respectively, so that the raw water or the tap water can be supplied by the raw water opening 1109E. Further, when the control valve 10H is under the raw water supplying working position, the raw water inlet 1106E is not communicated with every of the first opening 1101E, the second opening 1102E, the third opening 1103E, the fourth opening 1104E and the fifth opening 1105E. It is appreciated that when the control valve 10H of the faucet water purifier according to the first embodiment of the present invention is controlled under the raw water supplying working position, the faucet water purifier of the present invention is controlled under its raw water supplying working position working state. Preferably, the raw water opening 1109E of the control valve 10H defines the raw water outlet of the faucet water purifier of the present invention.

As shown in FIG. 34 to FIG. 42D, the control valve 10H of the faucet water purifier according to the first embodiment of the present invention has a second purifying working position, wherein when the control valve 10H is under the second purifying working position, the valve core 12H of the control valve 10H defines a sixth communicating passage 1006H and a seventh communicating passage 1007H, wherein the sixth communicating passage 1006H is communicated with the first opening 1101E of the valve body 11E and the raw water inlet 1106E respectively, the seventh communicating passage 1007H is communicated with the second opening 1102E and the third opening 1103E of the valve body 11E respectively. Further, when the control valve 10H is under the second purifying working position, the fourth opening 1104E of the valve body 11E is not communicated with the fifth opening 1105E. In other words, when the control valve 10H is under the second purifying working position, the fourth opening 1104E of the valve body 11E cannot communicate with the fifth opening 1105E. Accordingly, when the control valve 10H is under the second purifying working position, under the action of water pressure, the raw water or the tap water flows into the raw water inlet 1106E of the valve body 11E of the control valve 10H, and then flows to the first opening 1101E of the valve body 11E through the sixth communicating passage 1006H, so as to further flow to the raw water channel 2101E of the filtering device 20E through the first communicating opening 201E of the filtering device 20E, and after the raw water flowing into the raw water channel 2101E is filtered by the primary filter 22E, and the generated purified water flows into the purified water channel 2201E. At this time, since the second opening 1102E of the valve body 11E is communicated with the third opening 1103E through the seventh communicating passage 1007H, therefore, after the purified water generated by the primary filter 22E flows into the purified water channel 2201E, it flows out through the second communicating opening 202E, and flows through the second opening 1102E, the seventh communicating passage 1007H and the third opening 1103E in sequence, so that the purified water generated by the primary filter 22E can be provided through the second water outlet 200E communicated with the third opening 1103E. It is appreciated that when the control valve 10H of the faucet water purifier according to the first embodiment of the present invention is controlled under the second purifying working position, the faucet water purifier of the present invention is controlled under its second purifying working state.

As shown in FIG. 34 to FIG. 42D, the control valve 10H of the faucet water purifier according to the first embodiment of the present invention is a plane valve, wherein the valve core 12H of the plane valve 10H further comprises a fixed disk 121H and a rotatable disk 122H, wherein the fixed disk 121H has a first fluid control surface 1210H, the rotatable disk 122H has a second fluid control surface 1220H, wherein the rotatable disk 122H and the fixed disk 121H are both disposed inside the valve cavity 110E, wherein the second fluid control surface 1220H of the rotatable disk 122H is provided on the first fluid control surface 1210H of the fixed disk 121H, and the rotatable disk 122H is provided to be capable of rotating relative to the fixed disk 121H.

As shown in FIG. 34 to FIG. 42D, the plane valve 10H of the faucet water purifier according to the first embodiment of the present invention has a first channel 101H, a second channel 102H, a third channel 103H, a fourth channel 104H, a fifth channel 105H, a sixth channel 106H, a seventh channel 107H, an eighth channel 108E and a raw water inlet channel 1011H, wherein the first channel 101H, the second channel 102H, the third channel 103H, the fourth channel 104H, the fifth channel 105H, the eighth channel 108E and the raw water inlet channel 1011H are provided at the fixed disk 121H respectively and extended from the first fluid control surface 1210H of the fixed disk 121H respectively; the sixth channel 106H and the seventh channel 107H are provided at the rotatable disk 122H respectively and extended from the second fluid control surface 1220H of the rotatable disk 122H respectively, wherein the first channel 101H is communicated with the first opening 1101E, the second channel 102H is communicated with the second opening 1102E, the third channel 103H is communicated with the third opening 1103E, the fourth channel 104H is communicated with the fourth opening 1104E, the fifth channel 105H is communicated with the fifth opening 1105E, the sixth channel 106H is communicated with the raw water inlet channel 1011H, the raw water inlet channel 1011H is communicated with the raw water inlet 1106E, the eighth channel 108H is communicated with the draining opening 1108E. Preferably, the sixth channel 106H and the seventh channel 107H of the rotatable disk 122H are preferably communicating blind holes. More preferably, the first channel 101H is provided between the third channel 103H and the eighth channel 108H, and the ninth channel 109H is provided at the inner side of the first channel 101H. Most preferably, the ninth channel 109H and the first channel 101H are provided between the third channel 103H and the eighth channel 108H.

As shown in FIG. 34 to FIG. 42D, the first fluid control surface 1210H of the fixed disk 121H of the plane valve 10H of the faucet water purifier according to the first embodiment of the present invention defines an inner portion 12101H and an edge portion 12102H extended outward from the inner portion 12101H, the raw water inlet channel 1011H of the plane valve 10H is provided at the inner portion 12101H of the first fluid control surface 1210H of the fixed disk 121H, the first channel 101H, the third channel 103H, the second channel 102H, the fourth channel 104H, the fifth channel 105H and the eighth channel 108H of the plane valve 10H are arranged clockwise on the edge portion 12102H of the first fluid control surface 1210H of the fixed disk 121H in this order. Alternatively, the first channel 101H, the third channel 103H, the second channel 102H, the fourth channel 104H, the fifth channel 105H and the eighth channel 108H of the plane valve 10H are provided anticlockwise at the first fluid control surface 1210H of the fixed disk 121H in this order. In other words, the first channel 101H, the third channel 103H, the second channel 102H, the fourth channel 104H, the fifth channel 105H and the eighth channel 108H of the plane valve 10H are provided to surround the raw water inlet channel 1011H. Preferably, the first channel 101H, the third channel 103H, the second channel 102H, the fourth channel 104H, the fifth channel 105H, the eighth channel 108H and the raw water inlet channel 1011H of the plane valve 10H are spacedly arranged at the first fluid control surface 10H of the fixed disk 121H of the plane valve 10H, the sixth channel 106H and the seventh channel 107H of the plane valve 10H are spacedly arranged at the second fluid control surface 1220H of the rotatable disk 122H.

As shown in FIG. 34 to FIG. 42D, the rotatable disk 122H of the plane valve 10H of the faucet water purifier according to the first embodiment of the present invention is capable of rotating relative to the fixed disk 121H, so that the plane valve 10H has a first purifying working position and a back flushing working position, wherein when the plane valve 10H of the faucet water purifier according to the first embodiment of the present invention is under the first purifying working position, the sixth channel 106H of the plane valve 10H is communicated with the raw water inlet channel 1011H and the first channel 101H respectively, so as to define the first communicating passage 1001H communicated with the raw water inlet 1106E and the first opening 1101E respectively, the seventh channel 107H is communicated with the fourth channel 104H and the fifth channel 105H respectively, so as to define the second communicating passage 1002H communicated with the fourth opening 1104E and the fifth opening 1105E respectively; as shown in FIG. 34 to FIG. 42D, when the plane valve 10H is under the first purifying working position, the second channel 102H, the third channel 103H and the eighth channel 108H of the plane valve 10H are blocked (or closed) by the rotatable disk 122H respectively. Accordingly, the primary purified water generated by the primary filter 22E will flow to the secondary filter 23E under the action of water pressure, and after it is further purified and treated by the secondary filter 23E, it is provided through the fourth opening 1104E, the second communicating passage 1002H and the fifth opening 1105E. When the plane valve 10H is under the back flushing working position, the sixth channel 106H of the plane valve 10H is communicated with the raw water inlet channel 1011H and the second channel 102H, so as to define the third communicating passage 1003H communicated with the raw water inlet 1106E and the second opening 1102E respectively, the seventh channel 107H is communicated with the first channel 101H and the eighth channel 108H respectively, so as to define the fourth communicating passage 1004H communicated with the first opening 1101E and the draining opening 1108E respectively. As shown in FIG. 34 to FIG. 42D, when the plane valve 10H of the faucet water purifier according to the first embodiment of the present invention is under the back flushing working position, the third channel 103H, the fourth channel 104H and the fifth channel 105H of the plane valve 10H are blocked (or closed) by the rotatable disk 122H respectively.

As shown in FIG. 34 to FIG. 42D, the plane valve 10H of the water faucet purifier according to the first embodiment of the present invention further has a ninth channel 109H, wherein the ninth channel 109H is provided at the fixed disk 121H and extended from the first fluid control surface 1210H of the fixed disk 121H, the ninth channel 109H is communicated with the raw water opening 1109E, wherein when the plane valve 10H is under the raw water supplying working position, the sixth channel 106H of the plane valve 10H is communicated with the raw water inlet channel 1011H and the ninth channel 109H, so as to define the fifth communicating passage 1005H communicating with the raw water inlet 1106E and the raw water opening 1109E respectively to allow the raw water to flow into the raw water inlet 1106E and further be supplied through the raw water inlet channel 1011H, the sixth channel 106E, the ninth channel 109E and the raw water opening 1109E, wherein when the plane valve 10H is under the raw water supplying working position, the first channel 101H, the third channel 103H, the fifth channel 105H and the eighth channel 108H of the plane valve 10H are respectively blocked by the rotatable disk 122H.

As shown in FIG. 34 to FIG. 42D, the plane valve 10H of the faucet water purifier according to the first embodiment of the present invention further has a second purifying working position, wherein when the plane valve 10H is under the second purifying working position, the sixth channel 106H of the plane valve 10H is communicated with the raw water inlet channel 1011H and the first channel 101H respectively, so as to define the sixth communicating passage 1006H communicated with the raw water inlet 1106E and the first opening 1101E respectively, the seventh channel 107H is communicated with the second channel 102H and the third channel 103H respectively, so as to define the seventh communicating passage 1007H communicated with the second opening 1102E and the third opening 1103E respectively. When the plane valve 10H of the faucet water purifier according to the first embodiment of the present invention is under the second purifying working position, the fourth channel 104H of the plane valve 10H is blocked (or closed) by the rotatable disk 122H, so that the water inside the fourth channel 104H cannot flow freely, accordingly, the primary purified water generated by the primary filter 22E will flow to the second opening 1102E under the action of water pressure, and be provided through the seventh communicating passage 1007H and the third opening 1103E, and when the plane valve 10H of the faucet water purifier according to the first embodiment of the present invention is under the second purifying working position, the fifth channel 105H and the eighth channel 108H of the plane valve 10H are blocked (or closed) by the rotatable disk 122H respectively.

As shown in FIG. 34 to FIG. 42D, the first opening 1101E, the second opening 1102E, the fourth opening 1104E and the fifth opening 1105E of the plane valve 10H of the faucet water purifier according to the first embodiment of the present invention are provided at a same side of the valve body 11E of the plane valve 10H. Further, the raw water opening 1109E of the plane valve 10H is provided at a bottom the valve body 11E of the plane valve 10H.

As shown in FIG. 34 to FIG. 42D, the first channel 101H of the plane valve 10H of the faucet water purifier according to the first embodiment of the present invention has a first communicating part 10101H, a second communicating part 10102H and a third communicating part 10103H extended between the first communicating part 10101H and the second communicating part 10102H, wherein the ninth channel 109H of the plane valve 10H is arranged at the inner side of the third communicating part 10103H, wherein when the plane valve 10H is under the first purifying working position, the sixth channel 106E of the plane valve 10H is communicated with the raw water inlet channel 1011H and the first communicating part 10101H of the first channel 101E respectively, the seventh channel 107H is communicated with the fourth channel 104H and the fifth channel 105H respectively; when the plane valve 10H is under the back flushing working position, the sixth channel 106E of the plane valve 10H is communicated with the raw water inlet channel 1011H and the second channel 102H respectively, and the seventh channel 107H of the plane valve 10E is respectively communicated with the eighth channel 108H and the second communicating part 10102H of the first channel 101E; when the plane valve 10H is under the second purifying working position, the sixth channel 106E of the plane valve 10H is communicated with the raw water inlet channel 1011H and the second communicating part 10102H of the first channel 101E respectively, and the seventh channel 107H is communicated with the second channel 102H and the third channel 103H respectively. As shown in FIG. 34 to FIG. 42D, further, when the plane valve 10H is under the first purifying working position, the second communicating part 10102H of the first channel 101H of the plane valve 10H is blocked by the rotatable disk 122H; when the plane valve 10H is under the back flushing working position, the first communicating part 10101H of the first channel 101H of the plane valve 10H is blocked by the rotatable disk 122H; when the plane valve 10H is under the second purifying working position, the first communicating part 10101H of the first channel 101H of the plane valve 10H is blocked by the rotatable disk 122H. Preferably, the third communicating part 10103H of the first channel 101H is arranged on the first fluid control surface 1210H of the fixed disk 121H of the plane valve 10H. Preferably, the third communicating part 10103H of the first channel 101H is arranged within the fixed disk 121H of the plane valve 10H.

As shown in FIG. 34 to FIG. 42D, the fixed disk 121H of the valve core 12H of the plane valve 10H of the faucet water purifier according to the first embodiment of the present invention comprises an upper end portion 1211H, a lower end portion 1212H and a fixing portion 1213H provided between the upper end portion 1211H and the lower end portion 1212H, wherein the upper end portion 1211H defines the first fluid control surface 1210H of the fixed disk 121H, and the lower end portion 1212H is disposed inside the valve cavity 110E of the valve body 11E. Preferably, the lower end portion 1212H of the fixed disk 121H of the valve core 12H of the plane valve 10H of the faucet water purifier of the present invention is integrally provided at the inner wall of the valve body 11E of the plane valve 10H.

As shown in FIG. 34 to FIG. 42D, the plane valve 10H of the faucet water purifier according to the first embodiment of the present invention further comprises a sealing assembly 13H, wherein the sealing assembly 13H has a first seal 131H, wherein the first seal 131H is provided between the upper end portion 1211H and the fixing portion 1213H of the fixed disk 121H. Further, the first seal 131H has a plurality of first sealing strips 1311H, the fixing portion 1213H of the fixed disk 121H has a plurality of first sealing grooves 12130H, wherein the first sealing grooves 12130H are provided to respectively surround the first channel 101H, the second channel 102H, the third channel 103H, the fourth channel 104H, the fifth channel 105H, the eighth channel 108H, the raw water inlet channel 1011H and the ninth channel 109H (if any) of the fixed disk 121H, the first sealing strips 1311H of the first seal 131H are provided according to the first sealing grooves 12130H of the fixing portion 1213H, so that the first sealing strips 1311H of the first seal 131H can be engaged with the first sealing grooves 12130H of the fixing portion 1213H and realize the sealing between the upper end portion 1211H and the fixing portion 1213H of the fixed disk 121H. It is appreciated that the first sealing grooves 12130H are defined at one side of the fixing portion 1213H, which face the upper end portion 1211H. Further, the sealing assembly 13H has a second seal 132H, wherein the second seal 132H is provided between the fixing portion 1213H and the lower end portion 1212H of the fixed disk 121H. Further, the second seal 132H has a plurality of second sealing strips 1321H, the fixing portion 1213H of the fixed disk 121H has a plurality of second sealing grooves 12131H, wherein the second sealing grooves 12131H are provided to respectively surround the first channel 101H, the second channel 102H, the third channel 103H, the fourth channel 104H, the fifth channel 105H, the eighth channel 108H, the raw water inlet channel 1011H and the ninth channel 109H of the fixed disk 121H, the second sealing strips 1321H of the second seal 132H are designed according to the second sealing grooves 12131H of the fixing portion 1213H, so that the second sealing strips 1321H of the second seal 132H can be engaged with the second sealing grooves 12131H of the fixing portion 1213H and realize the sealing between the lower end portion 1212H and the fixing portion 1213H of the fixed disk 121H. It is appreciated that the second sealing grooves 12131H are defined at one side of the fixing portion 1213H, which face the lower end portion 1212H.

As shown in FIG. 34 to FIG. 42D, the accommodation chamber 410 of the fixing holder 41 of the fixing device 40 of the faucet water purifier according to the first embodiment of the present invention is provided to be adapted to accommodate the upper end portion 1211H of the fixed disk 121H and the rotatable disk 122H inside the accommodation chamber 410. As shown in FIG. 34 to FIG. 42D, further, the upper end portion 1211H of the fixed disk 121H is adapted to be detachably clamped at the fixing portion 1213H of the fixed disk 121H, the fixing portion 1213H of the fixed disk 121H is adapted to be detachably clamped at the lower end portion 1212H of the fixed disk 121H, so that the upper end portion 1211H of the fixed disk 121H cannot rotate relative to the fixing portion 1213H, the fixing portion 1213H of the fixed disk 121H cannot rotate relative to the lower end portion 1212H.

As shown in FIG. 34 to FIG. 42D, the first fluid control surface 1210H of the fixed disk 121H of the plane valve 10H of the faucet water purifier according to the first embodiment of the present invention has an inner portion 12101H and an edge portion 12102H extended outward from the inner portion 12101H, which are shown by the dashed lines, wherein the inner portion 12101H and the edge portion 12102H are provided at a top end portion 1214H of the fixed disk 121H, and the edge portion 12102H (or the part other than the inner portion 12101H) of the first fluid control surface 1210H are equally divided into a first portion 1201H, a second portion 1202H, a third portion 1203H, a fourth portion 1204H, a fifth portion 1205H, a sixth portion 1206H, a seventh portion 1207H and an eighth portion 1208H, which are shown by the dashed lines, the second fluid control surface 1220H of the rotatable disk 122H of the plane valve 10H has an inner region 12201H and an edge region 12202H extended outward from the inner region 12201H, which are shown by the dashed lines, wherein the inner region 12201H and the edge region 12202H are provided at a bottom end portion 1221H of the rotatable disk 122H, and the edge region 12202H (or the part other than the inner region 12201H) of the second fluid control surface 1220H are equally divided into a first region 2001H, a second region 2002H, a third region 2003H, a fourth region 2004H, a fifth region 2005H, a sixth region 2006H, a seventh region 2007H and an eighth region 2008H, which are shown by the dashed lines, wherein the first channel 101H is extended downward from the first portion 1201H and the seventh portion 1207H of the first fluid control surface 1210H of the fixed disk 121H, the first channel 101H is further extended downward from the eighth portion 1208H of the first fluid control surface 1210H of the fixed disk 121H, the second channel 102H is extended downward from the third portion 1203H of the first fluid control surface 1210H of the fixed disk 121H, the third channel 103H is extended downward from the second portion 1202H of the first fluid control surface 1210H of the fixed disk 121H, the fourth channel 104H is extended downward from the fourth portion 1204H of the first fluid control surface 1210H of the fixed disk 121H, the fifth channel 105H is extended downward from the fifth portion 1205H of the first fluid control surface 1210H of the fixed disk 121H, the sixth channel 106H is extended upward from the first region 2001H and the inner region 12201H of the second fluid control surface 1220H of the rotatable disk 122H, the seventh channel 107H is extended upward from the fourth region 2004H and the fifth region 2005H of the second fluid control surface 1220H of the rotatable disk 122H, the eighth channel 108H is extended downward from the sixth portion 1206H of the first fluid control surface 1210H of the rotatable disk 121H, the raw water inlet channel 1011H is extended downward from the inner portion 12101H of the first fluid control surface 1210H of the fixed disk 121H. As shown in FIG. 34 to FIG. 42D, preferably, the edge portion 12102H of the first fluid control surface 1210H are equally divided clockwise into the first portion 1201H, the second portion 1202H, the third portion 1203H, the fourth portion 1204H, the fifth portion 1205H, the sixth portion 1206H, the seventh portion 1207H and the eighth portion 1208H, the edge region 12202H of the second fluid control surface 1220H of the rotatable disk 122H of the plane valve 12H are equally divided clockwise into the first region 2001H, the second region 2002H, the third region 2003H, the fourth region 2004H, the fifth region 2005H, the sixth region 2006H, the seventh region 2007H and the eighth region 2008H. Further, the ninth channel 109H is extended downward from the eighth portion 1208H of the first fluid control surface 1210H of the fixed disk 121H. In other words, the first fluid control surface 1210H of the fixed disk 121H of the plane valve 10H defines eight equal divisions, and the second fluid control surface 1220H of the rotatable disk 122H of the plane valve 10H defines eight equal divisions, wherein when the rotatable disk 122H of the plane valve 10H is rotated until the first division (the first region 2001H) of the second fluid control surface 1220H of the rotatable disk 122H directly faces the third division (the third portion 1203H) of the first fluid control surface 1210H of the fixed disk 121H, the fourth division (the fourth region 2004H) and the fifth division (the fifth region 2005H) of the second fluid control surface 1220H of the rotatable disk 122H of the plane valve 10H directly face the sixth division (the sixth portion 1206H) and the seventh division (the seventh portion 1207H) of the first fluid control surface 1210H of the fixed disk 121H, so that the sixth channel 106H of the plane valve 10H is communicated with the raw water inlet channel 1011H and the second channel 102H, and the seventh channel 107H is communicated with the first channel 101H and the eighth channel 108H respectively, so as to allow the raw water to flow into the filtering device 20E through the raw water inlet 1106H, the raw water inlet channel 1011H, the sixth channel 106H, the second channel 102H, the second opening 1102E and the second communicating opening 202E. After the raw water back flushes (referring to the flow direction of the water in the primary filter 22E during the back flushing is opposite to the flow direction of the water in the primary filter 22E during the filtering) the primary filter 22E of the filtering device 20E, the raw water flows out through the first communicating opening 201E of the filtering device 20E, and then flows out through the first opening 1101E, the first channel 101H, the seventh channel 107H, the eighth channel 108H and the draining opening 1109E, accordingly, the faucet water purifier is under the back flushing working state at this time. Further, when the rotatable disk 122H of the plane valve 10H is rotated until the first division (the first region 2001H) of the second fluid control surface 1220H of the rotatable disk 122H directly faces the first division (the first portion 1201H) of the first fluid control surface 1210H of the fixed disk 121H, the fourth division (the fourth region 2004H) and the fifth division (the fifth region 2005H) of the second fluid control surface 1220H of the rotatable disk 122H of the plane valve 10H directly face the fourth division (the fourth portion 1204H) and the fifth division (the fifth portion 1205H) of the first fluid control surface 1210H of the fixed disk 121H, so that the sixth channel 106H of the plane valve 10H is communicated with the raw water inlet channel 1011H and the first channel 101H respectively, and the seventh channel 107H is communicated with the fourth channel 104H and the fifth channel 105H respectively, so as to allow the raw water to flow into the filtering device 20E through the raw water inlet 1106E, the raw water inlet channel 1011H, the sixth channel 106H, the first channel 101H, the first opening 1101E and the first communicating opening 201E. After the raw water is filtered by the primary filter 22E of the filtering device 20E, the generated purified water flows into the purified water channel 2201E of the filtering device 20E, and the secondary purified water that the purified water generated by the primary filter 22E further filtered by the secondary filter 23E flows out the third communicating opening 203E through the purified water outlet 2301E, then flows out and is provided through the fourth opening 1104E, the fourth channel 104H, the seventh channel 107H, the fifth channel 105H and the fifth opening 1105E, accordingly, the faucet water purifier is under the first purifying working state at this time. Further, when the rotatable disk 122H of the plane valve 10H is rotated until the first equal division (the first region 2001H) of the second fluid control surface 1220H of the rotatable disk 122H directly faces the eighth equal division (the eighth portion 1208H) of the first fluid control surface 1210H of the fixed disk 121H, the fourth equal division (the fourth region 2004H) and the fifth equal division (the fifth region 2005H) of the second fluid control surface 1220H of the rotatable disk 122H of the plane valve 10H directly face the third equal division (the third portion 1203H) and the fourth equal division (the fourth portion 1204H) of the first fluid control surface 1210H of the fixed disk 121H respectively, so that the sixth channel 106H of the plane valve 10H is communicated with the raw water inlet channel 1011H and the ninth channel 109H respectively, the seventh channel 107H is communicated with the second channel 102H and the fourth channel 104H respectively, so as to allow the raw water to flow into the filtering device 20E through the raw water inlet 1106E, the raw water inlet channel 1011H, the sixth channel 106H, the ninth channel 109H, and then flow out through the raw water opening 1109E and be supplied, accordingly, the faucet water purifier is under the raw water supplying working state at this time. Further, when the rotatable disk 122H of the plane valve 10H is rotated until the first division (the first region 2001H) of the second fluid control surface 1220H of the rotatable disk 122H directly faces the seventh division (the seventh portion 1207H) of the first fluid control surface 1210H of the fixed disk 121H, the fourth equal division (the fourth region 2004H) and the fifth equal division (the fifth region 2005H) of the second fluid control surface 1220H of the rotatable disk 122H of the plane valve 10H directly face the second equal division (the second portion 1202H) and the third equal division (the third portion 1203H) of the fixed disk 121H, so that the sixth channel 106H of the plane valve 10H is communicated with the raw water inlet channel 1011H and the first channel 101H respectively, and the seventh channel 107H is communicated with the second channel 102H and the third channel 103H respectively, so as to allow the raw water to flow into the filtering device 20E through the raw water inlet 1106E, the raw water inlet channel 1011H, the sixth channel 106H, the first channel 101H, the first opening 1101E and the first communicating opening 201E. After the raw water is filtered by the primary filter 22E of the filtering device 20E, it flows out through the purified water channel 2201E of the primary filter 22E and the second communicating opening 202E, and then flows out and is provided through the second opening 1102E, the second channel 102H, the seventh channel 107H, the third channel 103H and the third opening 1103E, accordingly, the faucet water purifier is under the second purifying working state at this time.

It is worth mentioning that when the users need to switch the faucet water purifier according to the first embodiment of the present invention from the first purifying working state to the raw water supplying working state, only need to anticlockwise rotate the rotatable disk 122H of the plane valve 10H for one equal division angle, so that the first region 2001H of the second fluid control surface 1220H of the rotatable disk 122H directly faces the eighth portion 1208H of the first fluid control surface 1210H of the fixed disk 121H; when the users need to switch the faucet water purifier according to the first embodiment of the present invention from the raw water supplying working state to the second purifying working state, only need to anticlockwise rotate the rotatable disk 122H of the plane valve 10H for one equal division angle again, so that the first region 2001H of the second fluid control surface 1220H of the rotatable disk 122H directly faces the seventh portion 1207H of the first fluid control surface 1210H of the fixed disk 121H, as shown in FIG. 34 to FIG. 42D. In other words, the structure of the plane valve 10H of the faucet water purifier of the present invention enables the three working states of the second purifying working state, the raw water supplying working state and the first purifying working state to be continuously distributed, so that the complete switching between two adjacent working states of the second purifying working state, the raw water supplying working state and the first purifying working state of the faucet water purifier of the present invention can be realized only by rotating the rotatable disk 122H of the plane valve 10H for one equal division angle. The switching mode between the three working states of the faucet water purifier determined by the structure of the plane valve 10H of the faucet water purifier of the present invention will make the switching between the three working states of the faucet water purifier of the present invention more in line with the usage habits of the users and not easily cause an error in working state switching due to the different rotation angles when the users switch the working states. It is appreciated that since the edge portion 12102H of the first fluid control surface 1210H of the plane valve 10H of the faucet water purifier according to the first embodiment of the present invention is divided into eight equal divisions, and the edge region 12202H of the second fluid control surface 1220H of the rotatable disk 122H of the plane valve 10H is divided into eight equal divisions, accordingly, each of one equal division angle of the rotatable disk 122H of the plane valve 10H and one equal division angle of the fixed disk 121H is 45 degree. Alternatively, the edge portion 12102H of the first fluid control surface 1210H is equally divided anticlockwise into the first portion 1201H, the second portion 1202H, the third portion 1203H, the fourth portion 1204H, the fifth portion 1205H, the sixth portion 1206H, the seventh portion 1207H and the eighth portion 1208H, the edge region 12202H of the second fluid control surface 1220H of the rotatable disk 122H of the plane valve 10H is equally divided anticlockwise into the first region 2001H, the second region 2002H, the third region 2003H, the fourth region 2004H, the fifth region 2005H, the sixth region 2006H, the seventh region 2007H and the eighth region 2008H. At this time, the structure of the plane valve 10H of the faucet water purifier of the present invention enables the three working states of the first purifying working state, the raw water supplying working state and the second purifying working state to be continuously distributed, so that the complete switching between two adjacent working states of the first purifying working state, the raw water supplying working state and the second purifying working state of the faucet water purifier of the present invention can be realized only by rotating the rotatable disk 122H of the plane valve 10H for one equal division angle.

As shown in FIG. 34 to FIG. 42D, according to the first embodiment of the present invention, the present invention further provides a valve disk assembly for a plane valve of a faucet water purifier, which comprises a fixed disk 121H and a rotatable disk 122H, wherein the fixed disk 121H has a first fluid control surface 1210H, the rotatable disk 122H has a second fluid control surface 1220H, wherein the rotatable disk 122H and the fixed disk 121H are both disposed inside the valve cavity 110E, wherein the second fluid control surface 1220H of the rotatable disk 122H is provided on the first fluid control surface 1210H of the fixed disk 121H, and the rotatable disk 122H is provided to be capable of rotating relative to the fixed disk 121H, wherein the plane valve 10H has a first channel 101H, a second channel 102H, a third channel 103H, a fourth channel 104H, a fifth channel 105H, a sixth channel 106H, a seventh channel 107H, an eighth channel 108H and a raw water inlet channel 1011H, wherein the first channel 101H, the second channel 102H, the third channel 103H, the fourth channel 104H, the fifth channel 105H, the eighth channel 108H and the raw water inlet channel 1011H are arranged at the fixed disk 121H respectively and extended from the first fluid control surface 1210H of the fixed disk 121H respectively; the sixth channel 106H and the seventh channel 107H are arranged at the rotatable disk 122H respectively and extended from the second fluid control surface 1220H of the rotatable disk 122H respectively, wherein the first channel 101H is communicated with the first opening 1101E, the second channel 102H is communicated with the second opening 1102E, the third channel 103H is communicated with the third opening 1103E, the fourth channel 104H is communicated with the fourth opening 1104E, the fifth channel 105H is communicated with the fifth opening 1105E, the sixth channel 106H is communicated with the raw water inlet channel 1011H, the raw water inlet channel 1011H is communicated with the raw water inlet 1106E, the eighth channel 108H is communicated with the draining opening 1108E. Preferably, the sixth channel 106H and the seventh channel 107H of the rotatable disk 122H are preferably communicating blind holes. The plane valve 10H further has the ninth channel 109H, wherein the ninth channel 109H is provided at the fixed disk 121H and extended from the first fluid control surface 1210H of the fixed disk 121H, wherein the ninth channel 109H is communicated with the raw water opening 1109E.

As shown in FIG. 43 to FIG. 47C, a faucet water purifier of a second embodiment of the present invention is illustrated, wherein the faucet water purifier of the present invention comprises a control valve 10 and a filtering device 20, wherein the control valve 10 is provided for controlling the flow of water, such as controlling the supply of raw water (or tap water) to the filtering device 20 and controlling the supply of the purified water generated or produced by treating the raw water by the filtering device 20.

As shown in FIG. 43 to FIG. 47C, the filtering device 20 of the faucet water purifier according to the second embodiment of the present invention comprises a outer casing 21, a primary filter 22 and a secondary filter 23, wherein the outer casing 21 defines a first accommodation cavity 210, the primary filter 22 defines a second accommodation cavity 220, wherein the primary filter 22 is disposed inside the first accommodation cavity 210 of the outer casing 21, the secondary filter 23 is disposed inside the second accommodation cavity 220 of the primary filter 22, and a raw water channel 2101 is defined between the outer casing 21 and the primary filter 22, a purified water channel 2201 (the purified water channel 2201 can be regard as a part of the second accommodation cavity 220) is defined between the primary filter 22 and the secondary filter 23, the secondary filter 23 has a purified water outlet 2301. Accordingly, since the secondary filter 23 is disposed inside the second accommodation cavity 220 of the primary filter 22, after the raw water flows into the raw water channel 2101 under the action of water pressure and is treated by the primary filter 22, the purified water generated by the primary filter 22 can flow to the secondary filter 23 under the action of water pressure and be treated by the secondary filter 23, and the cleaner secondary purified water is obtained, wherein the secondary purified water flows out through the purified water outlet 2301 under the action of water pressure, so as to be provided. Preferably, the primary filter 22 is a ceramic filter, and the secondary filter 23 is an external pressure type ultrafiltration filter, wherein the ultrafiltration membrane filaments 231 of the secondary filter 23 are disposed inside the second accommodation cavity 220 of the primary filter 22, so that the purified water channel 2201 is defined between the ultrafiltration membrane filaments 231 of the secondary filter 23 and the primary filter 22. Therefore, the purified water generated by the primary filter 22 can be further ultrafiltered by the secondary filter 23 under the action of water pressure, so as to obtain cleaner purified water (or ultrafiltration filtered water). It should be understood that the primary filter may also be a filter made of other materials, or a composite filter made of multiple materials, for example, a composite filter composed of any two or more materials of ceramic, carbon fiber, PP cotton and activated carbon particles.

As shown in FIG. 43 to FIG. 47C, the filtering device 20 of the faucet water purifier according to the second embodiment of the present invention has a first communicating opening 201, a second communicating opening 202 and a third communicating opening 203, wherein the first communicating opening 201 of the filtering device 20 is communicated with the raw water channel 2101 of the filtering device 20, so that the control valve 10 can supply the raw water to the filtering device 20 through the first communicating opening 201, the second communicating opening 202 of the filtering device 20 is communicated with the purified water channel 2201, so that the purified water generated by treating the raw water by the primary filter 22 can flow to a second water outlet 200 of the faucet water purifier of the present invention under the control of the control valve 10 and be provided to the users, the third communicating opening 203 of the filtering device 20 is communicated with the purified water outlet 2301 of the secondary filter 23, so that the purified water generated by the secondary filter 23 can flow out through the third communicating opening 203, and be provided to the users through a first water outlet 100 of the faucet water purifier of the present invention under the control of the control valve 10. Preferably, the secondary filter 23 of the filtering device 20 of the faucet water purifier of the present invention is an external pressure type ultrafiltration filter. Accordingly, each ultrafiltration membrane filament 231 of the secondary filter 23 defines a membrane filament channel 2310, and the membrane filament channels 2310 of the ultrafiltration membrane filaments 231 are all communicated with the purified water outlet 2301 of the secondary filter 23, so that the purified water generated by each ultrafiltration membrane filament 231 of the secondary filter 23 can flow to the third communicating opening 203 of the filtering device 20 under the action of water pressure.

As shown in FIG. 43 to FIG. 47C, accordingly, when the filtering device 20 of the faucet water purifier according to the second embodiment of the present invention is used to treat the raw water, the users can control the raw water flowing to the first communicating opening 201 of the filtering device 20 through the control valve 10, and the raw water flows to the raw water channel 2101 of the filtering device 20 under the action of water pressure, then the purified water generated by the treatment of the primary filter 22 flows to the purified water channel 2201 under the action of water pressure, at this time, if the purified water inside the purified water channel 2201 can flow freely through the second communicating opening 202 of the filtering device 20 under the control of the control valve 10, and the purified water generated by the secondary filter 23 cannot flow freely to the third communicating opening 203, the purified water generated by the primary filter 22 will flow out and be provided under the action of water pressure through the second communicating opening 202. Accordingly, the faucet water purifier according to the second embodiment of the present invention is under a filtering working state at this time. On the other hand, if the purified water inside the purified water channel 2201 cannot flow freely through the second communicating opening 202 of the filtering device 20 under the control of the control valve 10, and the purified water generated by the secondary filter 23 can flow freely to the third communicating opening 203, the purified water generated by the primary filter 22 will be further purified by the secondary filter 23 under the action of water pressure, and the purified water generated by the secondary filter 23 will flow out and be provided through the third communicating opening 203. Accordingly, the faucet water purifier according to the second embodiment of the present invention is under an ultrafiltration filtering working state at this time. As shown in FIG. 43 and FIG. 47C, the faucet water purifier according to the second embodiment of the present invention further has a raw water supplying working state, wherein when the faucet water purifier of the present invention is under the raw water supplying working state, the user can control the raw water to flow directly to a raw water outlet and to be provided through the control valve 10E, instead of flowing through the filtering device 20 and being purified by the filtering device 20.

It is worth mentioning that, when the secondary filter 23 of the filtering device 20 of the faucet water purifier of the present invention is the external pressure type ultrafiltration filter, and the purified water generated by the primary filter 22 is able to flow out freely through the second communicating opening 202 of the filtering device 20, when the purified water generated by the primary filter 22 flows out through the second communicating opening 202 of the filtering device 20, the purified water generated by the primary filter 22 will flow through the ultrafiltration membrane filaments 231 of the secondary filter 23, so that the ultrafiltration membrane filaments 231 of the secondary filter 23 are flushed by the purified water generated by the primary filter 22. In other words, at this time, the filtering device 20 of the faucet water purifier of the present invention allows the purified water generated by the primary filter 22 to be provided, at the same time, the purified water generated by the primary filter 22 is further used to flush the ultrafiltration membrane filaments 231 of the secondary filter 23. Those skilled in the art know that the faucet water purifier directly installed on a faucet has a small size due to the restriction of the using space where it is located in. When the faucet water purifier adopts the ultrafiltration filter, especially the ultrafiltration filter with ultrafiltration membrane filaments as the main filter, the ultrafiltration filter is easily to stink and can no longer be used due to the accumulation of tap water impurities attached to the surface of its ultrafiltration membrane filaments, such as microorganisms, etc. The filtering device 20 of the faucet water purifier of the present invention allows the purified water generated by the primary filter 22 to be provided, at the same time, the purified water generated by the primary filter 22 is further used to flush the surfaces of the ultrafiltration membrane filaments 231 of the secondary filter 23, so as to prevent impurities such as microorganisms in the tap water from accumulating on the secondary filter 23 and prevent it from being unusable because of stinking. In other words, the faucet water purifier of the present invention uses the ingenious structural design of its filtering device 20 to solve the issue that when the traditional faucet water purifier uses the ultrafiltration filter (or ultrafiltration membrane filaments) to filter water, it is easy to cause impurities to accumulate and cannot be discharged in time and cause stinking, so that the ultrafiltration membrane filaments 231 of the secondary filter 23 have a better filtering effect and the service life of the secondary filter 23 is prolonged. More importantly, because of the small size of the traditional faucet water purifier, when it treats the raw water, such as tap water by utilizing the ultrafiltration filter, it will be blocked in a short time. The faucet water purifier of the present invention uses the purified water generated by the primary filter 22 to flush the ultrafiltration membrane filaments 231 of the secondary filter 23, which significantly improves the issue that the impurities accumulate and cannot be discharged in time when the traditional faucet water purifier uses the ultrafiltration filter (or ultrafiltration membrane filaments) to filter water, so that it is possible for the faucet water purifier to use the ultrafiltration filter to filter the water. The greater significance of the faucet water purifier of the present invention is that it may enable the consumers to get rid of the large and expensive traditional desktop water purifier. In addition, since the primary filter 22 of the faucet water purifier of the present invention is preferably a ceramic filter, although the purified water generated by its filtration is not suitable for direct drinking, the raw water is also preliminarily filtered and purified, and can be used for washing vegetables, washing face or mouth and so on.

As shown in FIG. 43 to FIG. 47C, the filtering device 20 of the faucet water purifier according to the second embodiment of the present invention further comprises a base 24, wherein the secondary filter 23 is provided at the base 24, and the base 24 defines a first water cavity 2401, wherein the first water cavity 2401 of the base 24 is communicated with the third communicating opening 203 of the filtering device 20 and the purified water outlet 2301 of the secondary filter 23 respectively. In other words, the membrane filament channel 2310 of the ultrafiltration membrane filament 231 of the secondary filter 23 is communicated with the third communicating opening 203 of the filtering device 20 through the purified water outlet 2301 of the secondary filter 23 and the first water cavity 2401 of the base 24, so that the secondary purified water generated by the secondary filter 23 can flow out through the third communicating opening 203. Preferably, the third communicating opening 203 is provided at the base 24. More preferably, the secondary filter 23 is water-sealedly provided at the base 24, and the first water cavity 2401 is defined between the secondary filter 23 and the base 24.

As shown in FIG. 43 to FIG. 47C, the primary filter 22 of the filtering device 20 of the faucet water purifier according to the second embodiment of the present invention is provided at the base 24, and the base 24 further defines a second water cavity 2402, wherein the second water cavity 2402 of the base 24 is communicated with the second communicating opening 202 of the filtering device 20 and the purified water channel 2201 respectively. In other words, the purified water channel 2201 of the filtering device 20 is communicated with the second communicating opening 202 of the filtering device 20 through the second water cavity 2402 of the base 24, so that the purified water generated by the primary filter 22 can flow out through the second communicating opening 202. Preferably, the second communicating opening 202 is provided at the base 24.

As shown in FIG. 43 to FIG. 47C, the primary filter 22 of the filtering device 20 of the faucet water purifier according to the second embodiment of the present invention is water-sealedly provided at the base 24, so as to prevent the raw water inside the raw water channel 2101 from flowing to the purified water channel 2201. More preferably, the primary filter 22 is detachably provided at the base 24, so that the primary filter 22 can be replaced. Alternatively, the primary filter 22 is water-sealedly provided at the outer casing 21, so that the raw water can only flow inside the raw water channel 2101. Alternatively, the primary filter 22 is detachably provided at the outer casing 21. Alternatively, the primary filter 22 is integrally provided at the base 24. Alternatively, the primary filter 22 is integrally provided at the outer casing 21.

As shown in FIG. 43 to FIG. 47C, the secondary filter 23 of the filtering device 20 of the faucet water purifier according to the second embodiment of the present invention further comprises a shell 232, wherein the ultrafiltration membrane filaments 231 of the secondary filter 23 are disposed inside the shell 232, and the shell 232 has at least one water inlet 2320, wherein the inner space and the outer space of the shell 232 are communicated with each other by the water inlet 2320 of the shell 232, so that when the faucet water purifier of the present invention is under the ultrafiltration filtering working state, the purified water generated by the primary filter 22 can flow to the ultrafiltration membrane filaments 231 through the water inlet 2320 of the shell 232 under the action of water pressure. Therefore, the water inlet 2320 of the shell 232 of the secondary filter 23 can be regard as a part of the purified water channel 2201 of the filtering device 20.

As shown in FIG. 43 to FIG. 47C, the base 24 of the filtering device 20 of the faucet water purifier according to the second embodiment of the present invention comprises a base bottom 241 and a first spacing portion 242, wherein the first spacing portion 242 is provided at the base bottom 241 and extended from the base bottom 241, wherein the first spacing portion 242 is provided between the first water cavity 2401 and the second water cavity 2402, so as to separate the first water cavity 2401 and the second water cavity 2402 from each other. Preferably, the base 24 further comprises a second spacing portion 243 provided at the base bottom 241 and extended from the base bottom 241, wherein the second water cavity 2402 is provided between the first spacing portion 242 and the second spacing portion 243, and the first water cavity 2401 is defined by the embracement of the first spacing portion 242. More preferably, the first spacing portion 242 and the second spacing portion 243 are both ring-shaped, and the second spacing portion 243 is provided at the outer side of the first spacing portion 242.

As shown in FIG. 43 to FIG. 47C, the first communicating opening 201 of the filtering device 20K of the faucet water purifier according to the second embodiment of the present invention is preferably provided at the base 24. Alternatively, the first communicating opening 201 of the filtering device 20 is provided at the outer casing 21. As shown in FIG. 43 to FIG. 47C, the outer casing 21 of the filtering device 20 of the faucet water purifier according to the second embodiment of the present invention is preferably provided at the edge of the base 24. Preferably, the outer casing 21 is integrated with the base 24.

As shown in FIG. 47A to FIG. 47C, the base 24 of the filtering device 20 of the faucet water purifier according to the second embodiment of the present invention further comprises a water supplying portion 245, wherein the water supplying portion 245 is extended from the base bottom 241, wherein the water supplying portion 245 defines the first water outlet 100.

As shown in FIG. 47A to FIG. 47C, further, the filtering device 20 of the water faucet purifier according to the second embodiment of the present invention further comprises a terminal filter 25, wherein a purifying cavity 2450 is defined between the base bottom 241 and the water supplying portion 245 of the base 24, wherein the terminal filter 25 is disposed inside the purifying cavity 2450, wherein the purifying cavity 2450 is provided communicating with a fifth opening 1105 of the control valve 10 and the first water outlet 100 respectively, so that the terminal filter 25 can further filter the purified water generated by the secondary filter 23 before it is provided to the users through the first water outlet 100. In other words, the terminal filter 25 is provided upstream of the first water outlet 100 and downstream of the fifth opening 1105 of the control valve 10 to further filter the purified water generated by the secondary filter 23, and then provides it to the users for using. Those skilled in the art will appreciate that the terminal filter 25 may also be made of carbon fiber or other filter materials to improve the taste of water. Preferably, the water supplying portion 245 is detachably provided at the base bottom 241 of the base 24, the terminal filter 25 is detachably provided at the purifying cavity 2450, so that the terminal filter 25 can be replaced. More preferably, the water supplying portion 245 is detachably screwed to the base bottom 241 of the base 24. Alternatively, the water supplying portion 245 is detachably clamped to the base bottom 241 of the base 24.

As shown in FIG. 45A to FIG. 46E, the base 24 of the faucet water purifier according to the second embodiment of the present invention is further provided with a communicating portion 246, wherein the communicating portion 246 has a first communicating channel 2461, a second communicating channel 2462 and a third communicating channel 2463, wherein the first communicating channel 2461 is provided to be communicated with the first communicating opening 201 and the raw water channel 2101 respectively, the second communicating channel 2462 is provided to be communicated with the second communicating opening 202 and the second water cavity 2402 respectively, the third communicating channel 2463 is provided to be communicated with the third communicating opening 203 and the first water cavity 2401 respectively. Further, the communicating portion 246 has a purified water supplying channel 2464, wherein the purified water supplying channel 2464 is provided communicating with the fifth opening 1105 and the first water outlet 100 respectively, so that the purified water generated by the secondary filter 23 of the filtering device 20 of the faucet water purifier of the present invention can flow out through the fifth opening 1105 of the control valve 10, and flows to the first water outlet 100 through the purified water supplying channel 2464. Preferably, the first communicating channel 2461 is provided between the first communicating opening 201 and the raw water channel 2101, the second communicating channel 2462 is provided between the second communicating opening 202 and the second water cavity 2402, the third communicating channel 2463 is provided between the third communicating opening 203 and the first water cavity 2401, the purified water supplying channel 2464 is provided between the fifth opening 1105 and the first water outlet 100. More preferably, the purified water supplying channel 2464 is provided communicating with the fifth opening 1105 and the purifying cavity 2450 respectively, so that the purified water supplying channel 2464 is capable of communicating with the first water outlet 100 through the purifying cavity 2450. Preferably, the first water outlet 100 comprises a plurality of water outlet holes.

FIG. 48A to FIG. 49E illustrate an alternative embodiment of the filtering device 20 of the faucet water purifier according to the second embodiment of the present invention comprises a outer casing 21, a primary filter 22 and a secondary filter 23A, wherein the outer casing 21 defines a first accommodation cavity 210, the primary filter 22 defines a second accommodation cavity 220, wherein the primary filter 22 is disposed inside the first accommodation cavity 210 of the outer casing 21, the secondary filter 23A is disposed inside the second accommodation cavity 220 of the primary filter 22, and a raw water channel 2101 is defined between the outer casing 21 and the primary filter 22, a purified water channel 2201A (the purified water channel 2201A can be regard as a part of the second accommodation cavity 220) is defined between the primary filter 22 and the secondary filter 23A, the secondary filter 23A has a purified water outlet 2301A. Accordingly, since the secondary filter 23A is disposed inside the second accommodation cavity 220 of the primary filter 22, after the raw water flows into the raw water channel 2101 under the action of water pressure and is treated by the primary filter 22, the purified water generated by the primary filter 22 can flow to the secondary filter 23A under the action of water pressure and be treated by the secondary filter 23A, and the cleaner secondary purified water is obtained, wherein the secondary purified water flows out through the purified water outlet 2301A under the action of water pressure, so as to be provided.

As shown in FIG. 48A to FIG. 49E, the secondary filter 23A of the filtering device 20A of the faucet water purifier according to the second embodiment of the present invention comprises a plurality of ultrafiltration membrane filaments 231A and a flow collecting tube 233A, wherein the ultrafiltration membrane filaments 231A and the flow collecting tube 233A are all disposed inside the second accommodation cavity 220 of the primary filter 22, and the ultrafiltration membrane filaments 231A are provided to surround the flow collecting tube 233A, wherein the flow collecting tube 233A has at least one water collecting hole 2330A and a flow collecting channel 2331A, wherein the flow collecting channel 2331A is provided to communicate with the water collecting hole 2330A and the second communicating opening 202 of the filtering device 20A respectively, so that the purified water generated by the primary filter 22 can flow to the ultrafiltration membrane filaments 231A through the purified water channel 2201A under the action of water pressure, and flows to the flow collecting tube 233A through the gap between the ultrafiltration membrane filaments 231A, and is collected by the water collecting hole 2330A of the flow collecting tube 233A and flows to the second communicating opening 202 of the filtering device 20A through the flow collecting channel 2331A. It should be understood that when the purified water generated by the primary filter 22 flows to the flow collecting tube 233A through the purified water channel 2201A and the gap between the ultrafiltration membrane filaments 231A, the purified water generated by the primary filter 22 has a flushing action for the ultrafiltration membrane filaments 231A of the secondary filter 23A, so that the ultrafiltration membrane filaments 231A of the secondary filter 23A has a better filtering effect and the service life of the secondary filter 23A is prolonged. Further, each of ultrafiltration membrane filaments 231A of the secondary filter 23A defines a membrane filament channel 2310A, wherein the membrane filament channels 2310A of the ultrafiltration membrane filaments 231A of the secondary filter 23A are all communicated with the purified water outlet 2301A of the secondary filter 23A.

As shown in FIG. 48A to FIG. 49E, the filtering device 20A of the faucet water purifier according to the second embodiment of the present invention further comprises a base 24A, wherein the secondary filter 23A is provided at the base 24A, and the base 24A defines a first water cavity 2401A and a second water cavity 2402A, wherein the first water cavity 2401A of the base 24A is communicated with the purified water outlet 2301A of the secondary filter 23A and the third communicating opening 203 of the filtering device 20A respectively, the second water cavity 2402A is communicated with the flow collecting channel 2331A of the flow collecting tube 233A of the secondary filter 23A and the second communicating opening 202 of the filtering device 20 respectively. In other words, the membrane filament channel 2310A of the ultrafiltration membrane filament 231A of the secondary filter 23A is communicated with the third communicating opening 203 of the filtering device 20A through the purified water outlet 2301A of the secondary filter 23A and the first water cavity 2401A of the base 24A, so that the secondary purified water generated by the secondary filter 23A can flow out through the third communicating opening 203, the flow collecting channel 2331A of the flow collecting tube 233A of the secondary filter 23A is communicated with the second communicating opening 202 of the filtering device 20A through the second water cavity 2402A of the base 24A, so that the purified water generated by the primary filter 22 can flow out through the second communicating opening 202. Accordingly, the secondary filter 23A of the filtering device 20A is an external pressure type ultrafiltration filter. Preferably, the second communicating opening 202 and the third communicating opening 203 are both provided at the base 24A. More preferably, the flow collecting tube 233A and the secondary filter 23A are water-sealedly provided at the base 24A respectively, and the secondary filter 23A and the base 24A define the first water cavity 2401A therebetween, the flow collecting tube 233A and the base 24A define the second water cavity 2402A therebetween. Alternatively, the primary filter 22 is water-sealedly provided at the outer casing 21, the secondary filter 23A is water-sealedly provided at the base 24A.

As shown in FIG. 48A to FIG. 49E, the base 24A of the filtering device 20A of the faucet water purifier according to the second embodiment of the present invention comprises a base bottom 241, a first spacing portion 242A and a second spacing portion 243A, wherein the first spacing portion 242A and the second spacing portion 243A are both provided at the base bottom 241 and extended from the base bottom 241, wherein the first water cavity 2401A is provided between the first spacing portion 242A and the second spacing portion 243A, the second water cavity 2402A is defined and embraced by the second spacing portion 243A. More preferably, the first spacing portion 242A and the second spacing portion 243A are both ring-shaped, and the first spacing portion 242A is provided at the outer side of the second spacing portion 243A. Accordingly, the second spacing portion 243A is provided between the first water cavity 2401A and the second water cavity 2402A, so as to separate the first water cavity 2401A and the second water cavity 2402A with each other.

As shown in FIG. 48A to FIG. 49E, the purified water channel 2201A of the filtering device 20A of the faucet water purifier according to the second embodiment of the present invention, the water collecting hole 2330A, the flow collecting channel 2331A, the second water cavity 2402A of the base 24A and the second communicating opening 202 of the filtering device 20A define a primary purified water route, the membrane filament channel 2310A of the ultrafiltration membrane filament 231A of the secondary filter 23A, the purified water outlet 2301A of the secondary filter 23A, the first water cavity 2401A of the base 24A and the third communicating opening 203 of the filtering device 20A define a secondary purified water route. It should be understood that the primary purified water route and the secondary purified water route are separated from each other, so as to prevent the water inside the primary purified water route and the secondary purified water route from mixing, in other words, the primary purified water route and the secondary purified water route are separated from each other, so as to prevent the purified water generated by the primary filter 22 from being mixed into the purified water generated by the secondary filter 23A.

As shown in FIG. 48A to FIG. 49E, the secondary filter 23A of the filtering device 20A of the faucet water purifier according to the second embodiment of the present invention further comprises a shell 232A, wherein the ultrafiltration membrane filaments 231A of the secondary filter 23A are disposed inside the shell 232A, and the shell 232A has at least one water inlet 2320A, wherein the inner space and the outer space of the shell 232A are communicated by the water inlet 2320A of the shell 232A, so that when the faucet water purifier of the present invention is under the ultrafiltration filtering working state, the purified water generated by the primary filter 22 flows to the ultrafiltration membrane filament 231A through the water inlet 2320A of the shell 232A under the action of water pressure. Therefore, the water inlet 2320A of the shell 232A of the secondary filter 23A can be regard as a part of the purified water channel 2201A of the filtering device 20A.

As shown in FIG. 48A to FIG. 49E, accordingly, when the filtering device 20A of the faucet water purifier according to the second embodiment of the present invention is used to treat the raw water, the users can control the raw water flowing to the first communicating opening 201 of the filtering device 20A through the control valve 10, and the raw water flows to the raw water channel 2101 of the filtering device 20A under the action of water pressure, then the purified water generated by the treatment of the primary filter 22 flows to the purified water channel 2201A under the action of water pressure, at this time, if the purified water inside the purified water channel 2201A can flow freely through the second communicating opening 202 of the filtering device 20A under the control of the control valve 10, and the purified water generated by the secondary filter 23A cannot flow freely to the third communicating opening 203, the purified water generated by the primary filter 22 will flow out and be provided under the action of water pressure through the second communicating opening 202. Accordingly, at this time, the faucet water purifier according to the second embodiment of the present invention is under a filtering working state, the purified water generated by the primary filter 22 will flow through the water collecting hole 2330A of the flow collecting tube 233A, the flow collecting channel 2331A, the second water cavity 2402A and the second communicating opening 202 in sequence, and be provided. On the other hand, if the purified water inside the purified water channel 2201A cannot flow freely through the second communicating opening 202 of the filtering device 20A under the control of the control valve 10, and the purified water generated by the secondary filter 23A can flow freely to the third communicating opening 203, the purified water generated by the primary filter 22 will be further purified by the secondary filter 23A under the action of water pressure, and the purified water generated by the secondary filter 23A will flow out through the membrane filament channel 2310A, and then flows out and is provided through the purified water outlet 2301A of the secondary filter 23A, the first water cavity 2401A and the third communicating opening 203. Accordingly, the faucet water purifier according to the second embodiment of the present invention is under an ultrafiltration filtering working state at this time. As shown in FIG. 48A and FIG. 49E, the faucet water purifier according to the second embodiment of the present invention further has a raw water supplying working state, wherein when the faucet water purifier of the present invention is under the raw water supplying working state, the user can control the raw water to flow directly to a raw water outlet and to be provided through the control valve 10, instead of flowing through the filtering device 20A and being purified by the filtering device 20A.

It is worth mentioning that the vast majority of existing faucet water purifiers, or even all existing faucet water purifiers in practical application, cannot achieve functions other than purification of raw water (such as filtration or ultrafiltration) and raw water supply. For example, they are difficult to control and achieve the back flushing of the primary filter element 22E of the faucet water purifier. The above-mentioned situation is related to the structure of the control valve adopted by the existing faucet water purifier. Due to the small size of the faucet water purifier, the application of the existing faucet water purifiers is often limited. Therefore, the control valve of most of the existing faucet water purifiers has a simple structure and cannot control and realize the complex functions other than the purification of raw water (such as filtration or ultrafiltration) and raw water supply. However, the control valve 10E (the control valve 10F, the control valve 10G and the control valve 10H) of the faucet water purifier of the present invention has been purposefully designed, and its special structure can not only be integrated with the faucet, but also control and realize the back flushing of the primary filter 22E of the faucet water purifier of the present invention.

It can be understood by those skilled in the art that the faucet water purifier of the present invention has a connection mechanism or installation mechanism so that the faucet water purifier can be installed or fixed on the faucet or the running water pipe adjacent to the faucet, so that the running water (or raw water) can be purified and provided under the control of the control valve 10E (the control valve 10F, the control valve 10G and the control valve 10H) of the faucet water purifier of the present invention, or directly provided. The connection mechanism or installation mechanism of the faucet water purifier of the present invention can be installed or fixed on the faucet or the tap water pipe adjacent to the faucet by screwing, connecting or any other way that facilitates the connection between the raw water inlet 1106E (or the raw water inlet 1107) of the faucet water purifier of the present invention and a faucet. Preferably, the faucet water purifier of the present invention is installed or fixed on the faucet through the connecting mechanism or installation mechanism, so that the raw water inlet 1106E (or the raw water inlet 1107) of the faucet water purifier of the present invention is connected with the faucet. Accordingly, the faucet water purifier of the present invention is arranged on the control valve 10E (the control valve 10F, the control valve 10G and the control valve 10H) through a connection mechanism or installation mechanism, and even the connection mechanism or installation mechanism can be regarded as a part of the control valve 10E (the control valve 10F, the control valve 10G and the control valve 10H).

It is worth mentioning that the terms of first, second, third, fourth, fifth, sixth, seventh, eighth and/or ninth herein are only used to name different components (or elements) of the present invention and distinguish between different components, elements and structures of the present invention, they themselves have no meaning of order or number.

Those skilled in the art should understand that the embodiments of the present invention shown in the above description and the accompanying drawings are only examples and do not limit the present invention.

The objects of the present invention have been completely and effectively realized. The function and structural principle of the present invention have been shown and explained in the above embodiments. Without departing from the principle, the embodiments of the present invention can be deformed or modified.

What is claimed is:

1. A faucet water purifier, comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source, wherein when the control valve is under a first purifying working position, the valve core of the control valve defines a first communicating passage respectively communicated with the first opening and the raw water inlet of the valve body and a second communicating passage respectively communicated with the fourth opening and the fifth opening of the valve body, wherein when the control valve is under a back flushing working position, the valve core of the control valve defines a third communicating passage respectively communicated with the second opening and the raw water inlet of the valve body and a fourth communicating passage respectively communicated with the first opening and the draining opening of the valve body, wherein the valve body of the control valve further has a raw water opening, wherein when the control valve is under a raw water supplying working position, the valve core of the control valve defines a fifth communicating passage communicated with the raw water opening and the raw water inlet of the valve body respectively, wherein when the control valve is under a second purifying working position, the valve core of the control valve defines a sixth communicating passage respectively communicated with the first opening and the raw water inlet of the valve body and a seventh communicating passage respectively communicated with the second opening and the third opening of the valve body.

2. A faucet water purifier, comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source, wherein when the control valve is under a first purifying working position, the valve core of the control valve defines a first communicating passage respectively communicated with the first opening and the raw water inlet of the valve body and a second communicating passage respectively communicated with the fourth opening and the fifth opening of the valve body, wherein the control valve is a plane valve, wherein the valve core further comprises a fixed disk and a rotatable disk, wherein the fixed disk has a first fluid control surface, and the rotatable disk has a second fluid control surface, wherein the rotatable disk and the fixed disk are disposed inside the valve cavity, wherein the second fluid control surface of the rotatable disk is provided on the first fluid control surface of the fixed disk, and the rotatable disk is capable of rotating relative to the fixed disk, wherein the plane valve has a first channel, a second channel, a third channel, a fourth channel, a fifth channel, a sixth channel, a seventh channel and an eighth channel, wherein the first channel, the second channel, the third channel, the fourth channel and the fifth channel are respectively provided at the fixed disk and extended from the first fluid control surface of the fixed disk; the sixth channel, the seventh channel and the eighth channel are respectively provided at the rotatable disk and extended from the second fluid control surface of the rotatable disk, wherein the first channel is communicated with the first opening, the second channel is communicated with the second opening, the third channel is communicated with the third opening, the fourth channel is communicated with the fourth opening, the fifth channel is communicated with the fifth opening, the sixth channel is communicated with the raw water inlet, the eighth channel is communicated with the draining opening, wherein when the plane valve is under the first purifying working position, the sixth channel of the plane valve is communicated with the first channel, so as to define the first communicating passage communicated with the raw water inlet and the first opening respectively, and the seventh channel is communicated with the fourth channel and the fifth channel respectively, so as to define the second communicating passage communicated with the fourth opening and the fifth opening respectively.

3. The faucet water purifier, as recited in claim 2, wherein the control valve further has a draining channel and a ninth channel, the valve body further has a raw water opening, wherein the draining channel is provided at the fixed disk and extended from the first fluid control surface of the fixed disk, the ninth channel is provided at the fixed disk and extended from the first fluid control surface of the fixed disk, wherein the ninth channel is communicated with the raw water opening, the eighth channel is communicated with the draining channel, the draining channel is communicated with the draining opening, wherein when the plane valve is under a back flushing working position, the sixth channel of the plane valve is communicated with the second channel to define a third communicating passage communicated with the raw water inlet and the second opening respectively, the eighth channel is communicated with the first channel and the draining channel respectively to define a fourth communicating passage communicated with the first opening and the draining opening respectively; when the plane valve is under a raw water supplying working position, the sixth channel of the plane valve is communicated with the ninth channel to define a fifth communicating passage communicated with the raw water inlet and the raw water opening respectively, when the plane valve is under a second purifying working position, the sixth channel of the plane valve is communicated with the first channel to define a sixth communicating passage communicated with the raw water inlet and the first opening respectively, and the seventh channel is communicated with the second channel and the third channel respectively to define a seventh communicating passage communicated with the second opening and the third opening respectively.

4. A faucet water purifier, comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source, wherein when the control valve is under a first purifying working position, the valve core of the control valve defines a first communicating passage respectively communicated with the first opening and the raw water inlet of the valve body and a second communicating passage respectively communicated with the fourth opening and the fifth opening of the valve body, wherein the control valve is a plane valve, wherein the valve core further comprises a fixed disk and a rotatable disk, wherein the fixed disk has a first fluid control surface, and the rotatable disk has a second fluid control surface, wherein the rotatable disk and the fixed disk are provided inside the valve cavity, wherein the second fluid control surface of the rotatable disk is provided on the first fluid control surface of the fixed disk, and the rotatable disk is capable of rotating relative to the fixed disk, wherein the plane valve has a first channel, a second channel, a third channel, a fourth channel, a fifth channel, a sixth channel, a seventh channel, an eighth channel and a raw water inlet channel, wherein the first channel, the second channel, the third channel, the fourth channel, the fifth channel and the raw water inlet channel are respectively provided at the fixed disk and extended from the first fluid control surface of the fixed disk; the sixth channel, the seventh channel and the eighth channel are respectively provided at the rotatable disk and extended from the second fluid control surface of the rotatable disk, wherein the first channel is communicated with the first opening, the second channel is communicated with the second opening, the third channel is communicated with the third opening, the fourth channel is communicated with the fourth opening, the fifth channel is communicated with the fifth opening, the sixth channel is communicated with the raw water inlet channel, the raw water inlet channel is further communicated with the raw water inlet, the eighth channel is communicated with the draining opening, wherein when the plane valve is under the first purifying working position, the sixth channel of the plane valve is communicated with the raw water inlet channel and the first channel to define the first communicating passage communicated with the raw water inlet and the first opening respectively, the seventh channel is communicated with the fourth channel and the fifth channel respectively to define the second communicating passage communicated with the fourth opening and the fifth opening respectively.

5. The faucet water purifier, as recited in claim 4, wherein the valve body further has a raw water opening, the control valve further has a ninth channel, wherein the ninth channel is provided at the fixed disk and extended from the first fluid control surface of the fixed disk, wherein the ninth channel is communicated with the raw water opening, wherein when the plane valve is under a back flushing working position, the sixth channel of the plane valve is communicated with the raw water inlet channel and the second channel respectively to define a third communicating passage communicated with the raw water inlet and the second opening respectively, the eighth channel is communicated with the first channel to define a fourth communicating passage communicated with the first opening and the draining opening respectively; when the plane valve is under a raw water supplying working position, the sixth channel of the plane valve is communicated with the raw water inlet channel and the ninth channel to define a fifth communicating passage communicated with the raw water inlet and the raw water opening respectively; when the plane valve is under a second purifying working position, the sixth channel of the plane valve is communicated with the raw water inlet channel and the first channel to define a sixth communicating passage communicated with the raw water inlet and the first opening respectively, the seventh channel is communicated with the second channel and the third channel respectively to define a seventh communicating passage communicated with the second opening and the third opening respectively.

6. A faucet water purifier, comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source, wherein when the control valve is under a first purifying working position, the valve core of the control valve defines a first communicating passage respectively communicated with the first opening and the raw water inlet of the valve body and a second communicating passage respectively communicated with the fourth opening and the fifth opening of the valve body, wherein the control valve is a plane valve, wherein the valve core further comprises a fixed disk and a rotatable disk, wherein the fixed disk has a first fluid control surface, and the rotatable disk has a second fluid control surface, wherein the rotatable disk and the fixed disk are disposed inside the valve cavity, wherein the second fluid control surface of the rotatable disk is provided on the first fluid control surface of the fixed disk, and the rotatable disk is capable of rotating relative to the fixed disk, wherein the plane valve has a first channel, a second channel, a third channel, a fourth channel, a fifth channel, a sixth channel, a seventh channel and an eighth channel, wherein the first channel, the second channel, the third channel, the fourth channel, the fifth channel and the eighth channel are respectively provided at the fixed disk and extended from the first fluid control surface of the fixed disk; the sixth channel and the seventh channel are respectively provided at the rotatable disk and extended from the second fluid control surface of the rotatable disk, wherein the first channel is communicated with the first opening, the second channel is communicated with the second opening, the third channel is communicated with the third opening, the fourth channel is communicated with the fourth opening, the fifth channel is communicated with the fifth opening, the sixth channel is communicated with the raw water inlet, the eighth channel is communicated with the draining opening, wherein when the plane valve is under the first purifying working position, the sixth channel of the plane valve is communicated with the first channel, so as to define the first communicating passage communicated with the raw water inlet and the first opening respectively, and the seventh channel is communicated with the fourth channel and the fifth channel respectively, so as to define the second communicating passage communicated with the fourth opening and the fifth opening respectively.

7. The faucet water purifier, as recited in claim 6, wherein the valve body further has a raw water opening, the control valve further has a ninth channel, wherein the ninth channel is provided at the fixed disk and extended from the first fluid control surface of the fixed disk, wherein the ninth channel is communicated with the raw water opening, wherein when the plane valve is under a back flushing working position, the sixth channel of the plane valve is communicated with the second channel to define a third communicating passage communicated with the raw water inlet and the second opening respectively, the seventh channel is communicated with the first channel and the eighth channel respectively to define a fourth communicating passage communicated with the first opening and the draining opening respectively; when the plane valve is under a raw water supplying working position, the sixth channel of the plane valve is communicated with the ninth channel to define a fifth communicating passage communicated with the raw water inlet and the raw water opening respectively; when the plane valve is under a second purifying working position, the sixth channel of the plane valve is communicated with the first channel to define a sixth communicating passage communicated with the raw water inlet and the first opening respectively, the seventh channel is communicated with the second channel and the third channel respectively to define a seventh communicating passage communicated with the second opening and the third opening respectively.

8. A faucet water purifier, comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source, wherein when the control valve is under a first purifying working position, the valve core of the control valve defines a first communicating passage respectively communicated with the first opening and the raw water inlet of the valve body and a second communicating passage respectively communicated with the fourth opening and the fifth opening of the valve body, wherein the control valve is a plane valve, wherein the valve core further comprises a fixed disk and a rotatable disk, wherein the fixed disk has a first fluid control surface, and the rotatable disk has a second fluid control surface, wherein the rotatable disk and the fixed disk are provided inside the valve cavity, wherein the second fluid control surface of the rotatable disk is provided on the first fluid control surface of the fixed disk, and the rotatable disk is capable of rotating relative to the fixed disk, wherein the plane valve has a first channel, a second channel, a third channel, a fourth channel, a fifth channel, a sixth channel, a seventh channel, an eighth channel and a raw water inlet channel, wherein the first channel, the second channel, the third channel, the fourth channel, the fifth channel, the eighth channel and the raw water inlet channel are respectively provided at the fixed disk and extended from the first fluid control surface of the fixed disk; the sixth channel and the seventh channel are respectively provided at the rotatable disk and extended from the second fluid control surface of the rotatable disk, wherein the first channel is communicated with the first opening, the second channel is communicated with the second opening, the third channel is communicated with the third opening, the fourth channel is communicated with the fourth opening, the fifth channel is communicated with the fifth opening, the sixth channel is communicated with the raw water inlet channel, the raw water inlet channel is further communicated with the raw water inlet, the eighth channel is communicated with the draining opening, wherein when the plane valve is under the first purifying working position, the sixth channel of the plane valve is communicated with the raw water inlet channel and the first channel to define the first communicating passage communicated with the raw water inlet and the first opening respectively, the seventh channel is communicated with the fourth channel and the fifth channel respectively to define the second communicating passage communicated with the fourth opening and the fifth opening respectively.

9. The faucet water purifier, as recited in claim 8, wherein the valve body further has a raw water opening, the control valve further has a ninth channel, wherein the ninth channel is provided at the fixed disk and extended from the first fluid control surface of the fixed disk, wherein the ninth channel is communicated with the raw water opening, wherein when the plane valve is under a back flushing working position, the sixth channel of the plane valve is communicated with the raw water inlet channel and the second channel respectively to define a third communicating passage communicated with the raw water inlet and the second opening respectively, the seventh channel is communicated with the first channel and the eighth channel respectively to define a fourth communicating passage communicated with the first opening and the draining opening respectively; when the plane valve is under a raw water supplying working position, the sixth channel of the plane valve is communicated with the raw water inlet channel and the ninth channel to define a fifth communicating passage communicated with the raw water inlet and the raw water opening respectively; when the plane valve is under a second purifying working position, the sixth channel of the plane valve is communicated with the raw water inlet channel and the first channel to define a sixth communicating passage communicated with the raw water inlet and the first opening respectively, the seventh channel is communicated with the second channel and the third channel respectively to define the seventh communicating passage communicated with the second opening and the third opening respectively.

10. A faucet water purifier, comprising:

a filtering device, wherein the filtering device defines a first communicating opening, a second communicating opening and a third communicating opening; and a control valve, wherein the control valve comprises a valve body and a valve core, wherein the valve body defines a valve cavity, a first opening, a second opening, a third opening, a fourth opening, a fifth opening, a raw water inlet and a draining opening, wherein the valve core is disposed inside the valve cavity, wherein the first opening of the valve body is adapted to be communicated with the first communicating opening of the filtering device, the second opening of the valve body is adapted to be communicated with the second communicating opening of the filtering device, the fourth opening of the valve body is adapted to be communicated with the third communicating opening of the filtering device, the raw water inlet of the valve body is adapted to be communicated with a raw water source, wherein the filtering device comprises an outer casing, a primary filter and a secondary filter, wherein the outer casing defines a first accommodation cavity, wherein the primary filter is disposed inside the first accommodation cavity of the outer casing, and the outer casing and the primary filter define a raw water channel therebetween, the primary filter and the secondary filter define a purified water channel therebetween, the secondary filter has a purified water outlet, wherein the first communicating opening of the filtering device is communicated with the raw water channel of the filtering device, the second communicating opening of the filtering device is communicated with the purified water channel of the filtering device, the third communicating opening of the filtering device is communicated with the purified water outlet of the secondary filter, wherein the filtering device further comprises a brush, wherein the brush comprises a brush body, wherein the brush body is rotatably provided between the outer casing and the primary filter.

11. A filtering device for a faucet water purifier, comprising:

an outer casing;

a primary filter; and a secondary filter, wherein the outer casing defines a first accommodation cavity, wherein the primary filter is disposed inside the first accommodation cavity of the outer casing, and the outer casing and the primary filter define a raw water channel therebetween, the primary filter and the secondary filter define a purified water channel therebetween, the secondary filter has a purified water outlet, wherein the filtering device defines a first communicating opening, a second communicating opening and a third communicating opening, wherein the first communicating opening of the filtering device is communicated with the raw water channel of the filtering device, the second communicating opening of the filtering device is communicated with the purified water channel of the filtering device, the third communicating opening of the filtering device is communicated with the purified water outlet of the secondary filter, wherein the filtering device further comprises a base, the base further comprises a base bottom, a communicating portion and a water supplying portion, wherein the water supplying portion is extended from the base bottom wherein the water supplying portion defines a first water outlet, the communicating portion further defines a purified water supplying channel, wherein the purified water supplying channel is communicated with the first water outlet.

12. A filtering device for a faucet water purifier, comprising:

an outer casing;

a primary filter; and a secondary filter, wherein the outer casing defines a first accommodation cavity, wherein the primary filter is disposed inside the first accommodation cavity of the outer casing, and the outer casing and the primary filter define a raw water channel therebetween, the primary filter and the secondary filter define a purified water channel therebetween, the secondary filter has a purified water outlet, wherein the filtering device defines a first communicating opening, a second communicating opening and a third communicating opening, wherein the first communicating opening of the filtering device is communicated with the raw water channel of the filtering device, the second communicating opening of the filtering device is communicated with the purified water channel of the filtering device, the third communicating opening of the filtering device is communicated with the purified water outlet of the secondary filter, wherein the filtering device further comprises a brush, wherein the brush comprises a brush body, wherein the brush body is rotatably provided between the outer casing and the primary filter.

* * * * *